US009509642B2

(12) United States Patent
Wu et al.

(10) Patent No.: US 9,509,642 B2
(45) Date of Patent: Nov. 29, 2016

(54) MESSAGING ARCHITECTURE CONFIGURED TO USE AN EXECUTION-ENABLED ELEMENT TO INITIATE AN OPERATION IN AN APPLICATION

(71) Applicant: Oracle International Corporation, Redwood Shores, CA (US)

(72) Inventors: Min Wu, Pleasanton, CA (US); Arin Bhowmick, Fremont, CA (US); Victor Chung-Wai Chan, Saratoga, CA (US); Kent O. Swartz, Leesburg, VA (US); Peter S. Tung, Redwood City, CA (US)

(73) Assignee: Oracle International Corporation, Redwood Shores, CA (US)

( * ) Notice: Subject to any disclaimer, the term of this patent is extended or adjusted under 35 U.S.C. 154(b) by 92 days.

(21) Appl. No.: 13/646,336

(22) Filed: Oct. 5, 2012

(65) Prior Publication Data

US 2014/0101263 A1  Apr. 10, 2014

(51) Int. Cl.
*H04L 12/58* (2006.01)
*G06F 15/16* (2006.01)
(Continued)

(52) U.S. Cl.
CPC .............. *H04L 51/00* (2013.01); *H04L 51/18* (2013.01); *G06F 15/16* (2013.01); *G06F 15/18* (2013.01); *G06F 17/20* (2013.01); *H04L 51/04* (2013.01)

(58) Field of Classification Search
CPC .............. H04L 12/588; H04L 12/589; H04L 12/5845; H04L 12/5825; H04L 51/24; H04L 51/06; H04L 51/32; G06F 15/16; G06F 15/18; G06F 17/20; G06Q 10/10

USPC .................................................. 709/206, 207
See application file for complete search history.

(56) References Cited

U.S. PATENT DOCUMENTS

| 5,999,948 A | 12/1999 | Nelson et al. ................. 715/207 |
| 6,691,153 B1 | 2/2004 | Hanson et al. ............... 709/204 |
| 8,055,997 B2 | 11/2011 | Gagnon ........................ 715/222 |

(Continued)

FOREIGN PATENT DOCUMENTS

EP    1 672 576 A2    6/2006    ............. G06Q 10/00

OTHER PUBLICATIONS

Booker et al., "Advanced Question and Answering Systems for Community Development," System Sciences, 2002. HICSS. Proceedings of the 35th Annual Hawaii International Conference on System Sciences, 5 pages, Jan. 2002.

(Continued)

*Primary Examiner* — Barbara Burgess
(74) *Attorney, Agent, or Firm* — Sheppard, Mullin, Richter & Hampton LLP

(57) ABSTRACT

A method, system, and computer-program product for communicating within a messaging architecture using a structured data object are disclosed. The method includes receiving an execution-enabled object and receiving a selection of the execution-enabled element. Such an execution-enabled object is configured to be included in a message sent by a messaging system. The execution-enabled object includes a response element and an execution-enabled element. The response element and the execution-enabled element are associated with one another. The execution-enabled element is configured to post an event to the messaging system upon the execution-enabled element being activated. The selection of the execution-enabled element activates the execution-enabled element.

20 Claims, 71 Drawing Sheets

(51) Int. Cl.
  *G06F 15/18* (2006.01)
  *G06F 17/20* (2006.01)

(56) References Cited

U.S. PATENT DOCUMENTS

| | | | |
|---|---|---|---|
| 8,140,952 B2 | 3/2012 | Bravery et al. | 715/200 |
| 8,255,304 B1 | 8/2012 | Lorenzo | 705/35 |
| 8,606,641 B2 | 12/2013 | Khalil | 705/26.1 |
| 8,666,929 B2* | 3/2014 | Jaffer | 705/304 |
| 2003/0101235 A1 | 5/2003 | Zhang | 709/218 |
| 2006/0026256 A1 | 2/2006 | Diddee et al. | |
| 2008/0056480 A1 | 3/2008 | Isaacs et al. | 379/265.01 |
| 2008/0103862 A1 | 5/2008 | Moss et al. | 705/8 |
| 2008/0307040 A1 | 12/2008 | So | 709/203 |
| 2009/0006550 A1 | 1/2009 | Singh et al. | 709/204 |
| 2009/0281967 A1* | 11/2009 | Jaffer | G06Q 10/10 706/11 |
| 2010/0223543 A1 | 9/2010 | Marston | 715/222 |
| 2010/0274618 A1* | 10/2010 | Byrd | G06Q 10/10 704/275 |
| 2010/0324961 A1 | 12/2010 | Singh et al. | 705/8 |
| 2011/0307355 A1* | 12/2011 | Khalil | G06Q 30/06 705/27.1 |
| 2012/0089681 A1* | 4/2012 | Chowdhury | H04L 12/6418 709/206 |
| 2012/0259926 A1* | 10/2012 | Lockhart | H04L 12/5845 709/206 |
| 2012/0317218 A1* | 12/2012 | Anderson | H04N 21/4786 709/206 |
| 2013/0055060 A1 | 2/2013 | Folsom et al. | 715/222 |
| 2014/0082523 A1 | 3/2014 | Duquene et al. | 715/753 |
| 2014/0101261 A1 | 4/2014 | Wu et al. | 709/206 |
| 2014/0101262 A1 | 4/2014 | Wu et al. | 709/206 |
| 2014/0258432 A1 | 9/2014 | Zheng et al. | 709/206 |

OTHER PUBLICATIONS

Zon-Yin et al., "Efficient Internet Chat Services for Help Desk Agents," Services Computing, 2007. SCC 2007. IEEE International Conference on Services Computing, pp. 1-8, Jul. 2007.

Sung et al., "CoMed: A Real-Time Collaborative Medicine System," Computer-Based Medical Systems, 2000. CBMS 2000 Proceedings. 6 Pages, 2000.

Siegel et al., "Designing for Deep Conversation in a Scenarios-Based E-Learning Environment," System Sciences, 2004. Proceedings of the 37th Annual Hawaii International Conference on System Sciences 2004, pp. 1-10, Jan. 2004.

Non-Final Office Action dated Jul. 30, 2014 for U.S. Appl. No. 13/646,301; 9 pages.

Final Office Action dated Nov. 13, 2014 for U.S. Appl. No. 13/646,301; 11 pages.

Non-Final Office Action dated Mar. 11, 2015 for U.S. Appl. No. 13/646,301; 12 pages.

Non-Final Office Action dated Jun. 12, 2015 for U.S. Appl. No. 13/646,258; 17 pages.

Final Office Action dated Aug. 20, 2015 for U.S. Appl. No. 13/646,301; 14 pages.

\* cited by examiner

MESSAGING ARCHITECTURE CONFIGURED TO USE AN EXECUTION-ENABLED ELEMENT TO INITIATE AN OPERATION IN AN APPLICATION

FIELD OF THE INVENTION

The present invention relates to providing communications via a messaging system, and, more particularly, to a messaging architecture configured to use an execution-enabled element to initiate an operation in an application.

DESCRIPTION OF THE RELATED ART

As network-based communications (also referred to colloquially as "online" communications) have become increasingly important in the business, academic and personal communications arenas, improved mechanisms for quickly and efficiently using such functionality have also become increasingly important. For example, messaging systems (e.g., online chat, instant messaging, and the like) are employed in a variety of settings, from internal business communications to providing customer service to social networking.

Such applications employ what are referred to herein as messaging architectures, which allow their users to quickly communicate with one another by, for example, typing in textual information into a messaging application or web page. A properly-designed messaging architecture quickly delivers messages, while providing for future upgrades, scalability, and other avenues of growth.

At a basic level, a messaging architecture provides functionality such as:
  Accepting messages (e.g., from internal and external sources)
  Determining the user to whom a given message is to be delivered
  Routing messages according to such determinations Central to such an architecture is a server system that includes a messaging server, which is typically a collection of components capable of sending and delivering messages. In addition to mechanisms provided in such a messaging server, other components of such a server system may include a Lightweight Directory Access Protocol (LDAP) server and a Domain Name System (DNS) server. Many enterprises have existing LDAP servers, databases, and related infrastructure that can be used in conjunction with a messaging server to provide support for the aforementioned sending and delivery of messages.

One example of such messaging is online chat, which may refer to any kind of communication over a network (e.g., the Internet) that offers a real-time (or near real-time) direct transmission of messages (e.g., text-, voice-, or video-based messages) from a sender to a receiver. Such an online chat system may provide point-to-point (e.g., one-on-one) communications, as well as multicast communications (i.e., communications from one sender to many receivers). Voice- and video-based chat may, for example, be supported as a feature of a Web conferencing service. In a push-mode architecture, messages flow between two (or more) people using personal computers, "smartphones," or other computing devices. Along with shared clients, such messaging techniques may offer real-time (or near real-time) direct written-language-based communications, typically conveyed over a network (e.g., the Internet). Such techniques may be configured to provide point-to-point communications, as well as multicast communications (i.e., the ability to send messages from one sender to many receivers). Online chat has become popular in enterprise collaboration (e.g., in customer service) and social networking.

However, despite the advanced features offered by today's messaging systems, the available technologies fail to adequately address certain aspects of messaging systems in a variety of applications, as well as the needs of users employing such messaging systems. For example, interactions between a user and the messaging system employed typically involve numerous human-initiated operations and human interpretation of the information thus conveyed.

One shortcoming of today's messaging systems is that such systems fail to provide an easy-to-use mechanism for conveying information between such systems and other applications the messaging system user may employ. When using online chat as a separate communication channel with unstructured data (e.g., text), several challenges exist. For example, chat data is not integrated into the systems used, requiring many copy-and-paste operations. This is particularly problematic in commercial settings, where, for example, a customer service representative typically conducts several conversations simultaneously, and thus may have not only several messaging dialogues open at once, but also some number of application dialogues. Clearly, keeping track of so many dialogue windows (and which ones belong to which conversation) can be tremendously challenging. Further, the other party's response may not be formatted properly and/or contain the proper information for use by the application program employed. This requires mental processing and re-typing of the information into the application program's dialogue, further complicating the process.

One solution to the aforementioned problems involves participants in a messaging session completing a survey in advance of communicating with other parties via the messaging system (sometimes referred to, in an online chat environment, as a "pre-chat survey"). In such a scenario, a set of questions is presented to potential participants before the messaging session begins, in order to collect information regarding the participant and their needs (e.g., information about a customer and their situation). However, such an approach is not without its problems. For example, a pre-chat survey creates a barrier between participants (e.g., a customer service agent and customer) by forcing one or more of them to complete such a questionnaire prior to communicating with other participants, potentially causing the customer to abandon the messaging session before the session has even begun. Further, a pre-chat survey cannot be used during a messaging session, only beforehand. Further still, a pre-chat survey supports only predefined questions, in a predefined order, whether or not any given question presented therein is pertinent to the user and/or the situation at hand. Having to wade through a number of questions (some of which may be completely irrelevant to the user and their situation) only serves to frustrate users and discourage them from using the messaging system to communicate with other participants.

Another solution to the aforementioned problems involves messaging session participants collaborating by way of common access to some manner of collaborative web site. This may be accomplished using what is referred to in certain scenarios as "joint form filling," by "co-browsing" a web site that affords simultaneous access, or some other such approach. In a system that supports "joint form filling," the participants both access a web page by way of a "co-browsing" feature, with one user (e.g., a customer) completing a web page that the other user (e.g., an agent) can also view (and thus direct entry of information by the first user). Certain such systems support "joint form filling" by allowing cutting-and-pasting from other windows into the chat window.

However, this alternative also suffers from a variety of drawbacks. Such problems include a lack of security (both/all users can see the information entered, as discussed in greater detail subsequently), the need for a separate web page (which results in the messaging session becoming fragmented), the mandatory presentation and completion of the entire questionnaire (with the attendant problems thereof, including increased complexity and overhead for both parties), and the resource-intensive nature of such an approach (having to load/view/complete a completely separate web page/document), among other such shortcomings.

Further, the aforementioned cut-and-paste features are only useful in personal collaboration when both parties can see and access the same form—a situation that can prove problematic. In the CRM context, for example, sharing the agent's forms with customers can be particularly awkward because such forms are configured to address the agent's needs, not those of the customer (and may, in fact, allow a party to see information meant solely for the other party's use). Moreover, because the shared interactive web application and the messaging window must be presented in two separate browser windows, mobile users are unable to view the message communications when interacting with the shared interactive web application. In such systems, the two parties interacting must also maintain separate windows for the messaging session and form.

In this vein, another possible solution is the use of a collaborative approach that employs two or more web sites, or some combination of web site(s) and application program(s). In such an "out-of-band" approach (in which certain operations, actions, communications, and the like take place via a communications channel other than the primary communications channel), users essentially run a messaging system and a separate web site or application program in tandem. In such an approach, the participants employ collaborative structures that allow for the creation, viewing, and editing of documents by launching a separate document-based dialog window. However, opening such documents in windows separate from that of the messaging session fragments the conversation (causing inefficiency, errors, and, ultimately, frustration), and fails to provide a single, comprehensive view of the messaging session. Such problems only become worse as the number of such documents (and so, windows in the user interface) are opened.

Further, existing solutions define supported types of documents must be defined prior to the messaging session, causing the same issues as those faced by approaches employing a "pre-chat survey." If no such document is defined prior to the messaging session, communications devolve into the usual unstructured format (with the attendant problems such systems are intended to address). Further, given that one or more communications channels other than the primary communications channel are employed (i.e., the messaging system), no record of such communications are maintained (at least with regard to recording mechanisms extant in the primary communications channel).

As alluded to earlier, another usability problem encountered in the design and operation of messaging systems pertains to security and privacy concerns. For example, because messaging system transcripts are displayed in plain text, user concerns with regard to the need for users to enter sensitive information often arise (e.g., in order to verify their identities by entering personal identification numbers (PINs), the last four digits of their SSNs, or other such confidential information). Even though the security of a messaging session may be guaranteed by the networking protocol employed, messaging system users often express concern over security and privacy issues, at least because such information appears as plain text in the messaging session's transcripts (rather than being masked, as would normally be the case when completing web forms). In this regard, users of such systems suffer from the loss of a sense of security, in that sensitive information (e.g., social security numbers, passwords, and other such sensitive information) is not masked or otherwise protected. There is thus a need to provide an easy-to-use mechanism for maintaining the security of information conveyed thereby, while avoiding inefficiency and complexity.

To address user's security concerns, some messaging systems simply advise users not to enter personal or sensitive information into the messaging session. Instead, certain approaches have users employ the aforementioned "pre-chat survey," redirecting users to a separate secure web site (e.g., an SSL-protected web page). As noted, such an approach is something less than ideal, causing fragmented and confusing interactions, thereby causing errors and compromising user satisfaction, among other failings. Another approach is to provide messaging services only to authenticated customers (but not to the general public), thereby drastically restricting the use of such communications and preventing the general use of such communications (in particular, without the need for a priori information, such as a username and password for the site).

Another alternative to address security concerns might be the use of pattern-matching techniques to identify and then mask certain types of sensitive information (e.g., Social Security Numbers, credit card numbers, and so on) in messaging system transcript display and storage. However, as an initial matter, such pattern matching must be performed prior to or simultaneously with a message being submitted into a messaging session. Even if such masking were achievable, there would be no opportunity to edit a response, once the information was submitted into the messaging session (in fact, a problem faced by all existing techniques that submit information into a messaging session). Further, such identification and masking experiences errors with regularity sufficient to raise users' concerns. Further still, the use of pattern matching typically fails to comprehend sensitive information that does not have a specific pattern (e.g., certain account identifiers, passwords, and other such information that varies in length and content).

What is therefore needed is a messaging architecture that provides for efficient interaction between a messaging system of the messaging architecture and one or more applications. Preferably, such a messaging system should provide for an efficient and secure user interface when effecting the communication of information using such a messaging system. Further, such a messaging system should improve the efficiency and security provided by such a messaging system when interacting with other applications.

SUMMARY OF THE INVENTION

In one embodiment, a method, system, and computer-program product for communicating within a messaging architecture using a structured data object are disclosed. The method includes receiving an execution-enabled object and receiving a selection of the execution-enabled element. Such an execution-enabled object is configured to be included in a message sent by a messaging system. The execution-enabled object includes a response element and an execution-enabled element. The response element and the execution-enabled element are associated with one another. The execution-enabled element is configured to post an event to the messaging system upon the execution-enabled element being activated. The selection of the execution-enabled element activates the execution-enabled element.

BRIEF DESCRIPTION OF THE DRAWINGS

The present invention may be better understood, and its numerous objects, features and advantages made apparent to those skilled in the art by referencing the accompanying drawings.

FIG. 3 is a block diagram illustrating an example of an agent dialogue and a customer dialogue presented by a messaging system according to embodiments of the present invention.

FIG. 5 is a block diagram illustrating an example of an agent dialogue and a customer dialogue presented by a messaging system according to embodiments of the present invention.

FIG. 41F is a block diagram illustrating another example of an agent dialogue presented by a messaging system and a user interface of a web application, according to embodiments of the present invention, in which information from a dynamic form automatically populates certain fields of the web application's user interface.

FIG. 42A is a block diagram illustrating an example of an agent dialogue presented by a messaging system and a user interface of a web application, according to embodiments of the present invention, in which the web application's user interface provides support for input field selection/submission functionality.

FIG. 42D is a block diagram illustrating an example of an agent dialogue presented by a messaging system and a user interface of a web application, according to embodiments of the present invention, in which information from a dynamic form automatically populates certain fields of the web application's user interface.

FIG. 53 is a block diagram illustrating an example of an agent dialogue and a customer dialogue presented by a messaging system according to embodiments of the present invention, in which an example of the submission/resubmission of data are depicted.

FIG. 54A is a block diagram illustrating an example of an agent dialogue and a customer dialogue presented by a messaging system according to embodiments of the present invention, in which the masking of input fields in the customer dialogue is depicted.

DETAILED DESCRIPTION

Figure 1A:
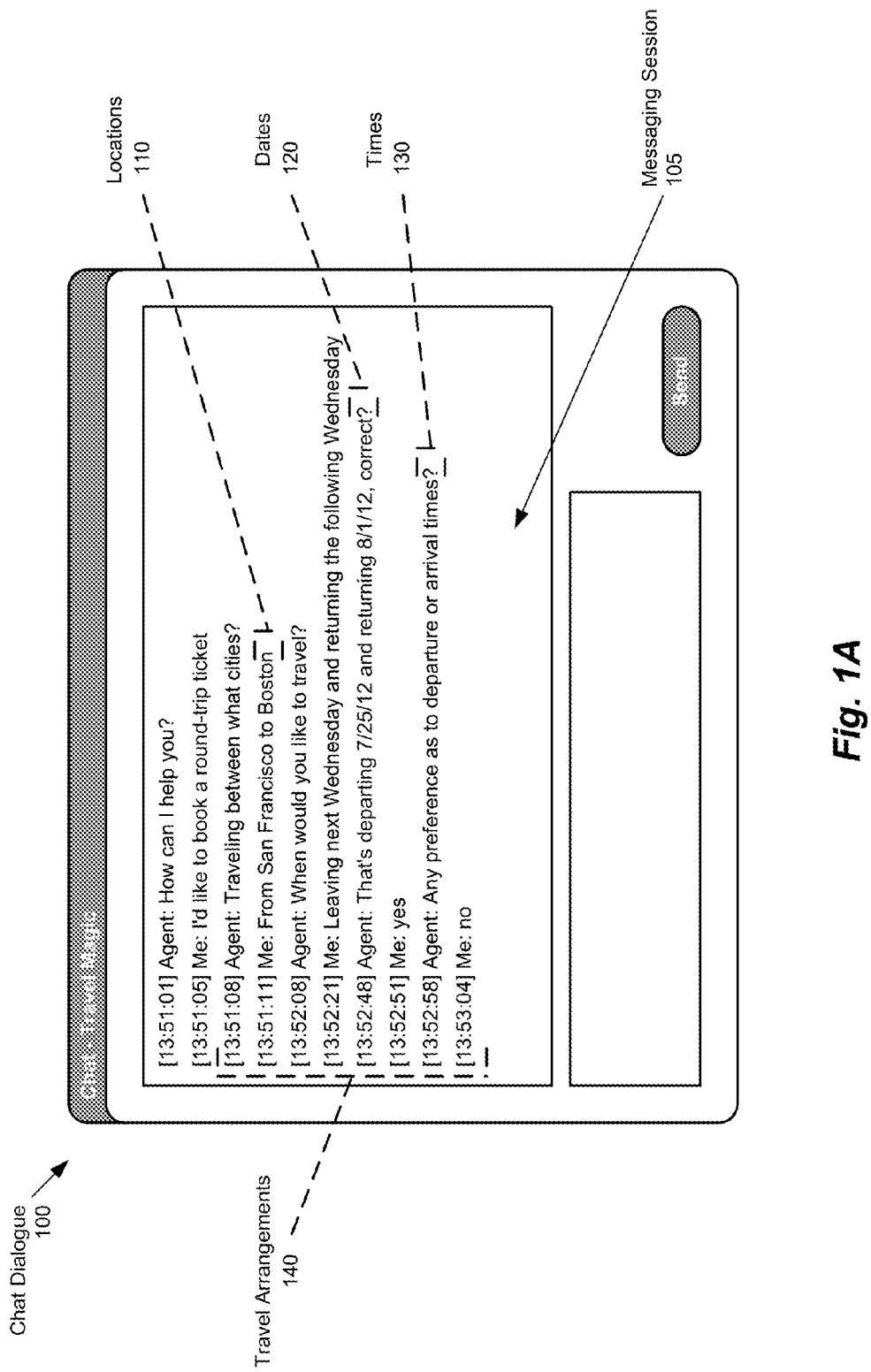
FIG. 1A is a block diagram illustrating an example of a user interface of a messaging system, in which a customer's dialogue with an agent is displayed.

The following is intended to provide a detailed description of an example of the invention and should not be taken to be limiting of the invention itself. Rather, any number of variations may fall within the scope of the invention which is defined in the claims following the description.

INTRODUCTION

As discussed, online (e.g., web-based) messaging systems have become a standard communication channel in social networking, commercial settings, and government applications. For example, in a commercial setting, online messaging is a primary customer contact channel for companies, especially in the sales and customer service arenas. A well-implemented strategy in this regard can transform a business's ability to drive sales, increase productivity, achieve operational savings, and deliver an excellent customer experience.

In such a customer relationship management (CRM) setting, the communication pattern carried out by a customer service agent assisting a customer can be viewed as a Question/Answer/Lookup (QAL) process (though, in fact, the last activity in this paradigm can be any activity in furtherance of or related to the interaction taking place). In the question phase of this paradigm, an agent asks a customer a question. In the answer phase, the customer replies to the agent, providing the agent with the requested information. Finally, in the lookup stage, the agent uses the answer submitted in the messaging session to perform actions such as identifying the customer, locating relevant information, or other such actions.

In order to address the aforementioned problems with usability, security, integration, and other such issues, embodiments of the present invention facilitate messaging communications through the provision of GUI (graphical UI (user interface)) elements such as form widgets (or other comparable constructs) within online messaging conversations. Instead of asking questions in free-form (unstructured) text, an agent is able to send a form to a customer, as a part of a message. The customer is then able to complete the form in the customer's messaging window, and submit the completed form into the messaging session. In so doing, the customer is able to send a response with the completed data from the customer's computing system to that of the agent. Such "inline" forms structure customer input data in the messaging session, such that the information can more easily be interpreted and used by the agent in updating system applications, and can even be used to provide such functionality automatically.

Embodiments of the present invention enjoy a number of advantages over existing approaches. For example, as compared to various of the earlier-mentioned collaborative approaches, a messaging system according to embodiments of the present invention provide the requisite functionality within the user interface presented by the messaging system (i.e., within the messaging session), rather than having to resort to multiple windows, manual cutting-and-pasting, and other such machinations. Further, as a result of the "in-band" approach employed, a messaging system according to embodiments of the present invention is able to provide a single, coherent view of the messaging session for both (or all) participants. Such a messaging system is also able to maintain a record of the communications that occur, including any messages that contain forms and/or associated information. Such an in-band approach also allows messaging sessions employing forms to be conducted using mobile devices. Further still, a messaging system according to embodiments of the present invention facilitates communication through the ability to create and send forms that are created dynamically ("on-the-fly"), rather than being limited to a pre-defined set of message types.

As noted earlier, some messaging systems allow for simple cut-and-paste operations (e.g., communicating information pasted from another application, in order to support joint form filling), but force both parties to use the same form. By contrast, a messaging system according to embodiments of the present invention allow an agent to use applications, web forms, and the like that are geared to the needs of the agent, while presenting the customer with forms that are geared to the customer's needs. Conversely, joint form filling implementations are, by definition, incapable of providing different interfaces to different participants, at least because such joint accessing and completion can only be achieved by the presentation of the same form to both parties. In a messaging system according to embodiments of the present invention, the messaging system creates a new form (e.g., dynamically, using pushed input fields), so that confidential information (e.g., customer rating information) that might be contained in a form in the agent's console isn't visible on the customer's interface.

Further, in implementations of messaging systems according to embodiments of the present invention that provide support for mobile applications, customers employing mobile devices are able view other message communications (e.g., textual portions of a messaging session) when interacting with a form that an agent has submitted into a messaging session. Such interactions are made possible by the "in-band" nature of such a system's communications and user interface. This is in contrast with the need for two separate user interface windows (e.g., a shared web page and a messaging window) mandated by the use of existing technology.

In light of the aforementioned advantages, as well as others discussed subsequently (and still others that will be evident from the present disclosure as a whole), it will be appreciated that a messaging system that allows agents to avoid the need to manually enter or copy-and-paste customer data across different interfaces is both desirable and advantageous. These and other such advantages are illustrated in the examples now and subsequently presented.

FIG. 1A is a block diagram illustrating an example of a user interface of a messaging system, in which a customer's dialogue with an agent is displayed. FIG. 1A depicts a chat dialogue 100 presented to a customer communicating with an agent (in this example, of a fictitious travel agency referred to as "Travel Magic"). Within chat dialogue 100, textual communications between the customer and the agent can be seen. As is often the case in such situations (e.g., a web chat), the agent poses questions to the customer and the customer responds with the requested information. In the example depicted in FIG. 1A, the agent inquires with the customer as to the particulars of arrangements for travel that the customer wishes to book. Information provided by the customer (depicted in FIG. 1A as travel arrangements 140) include information such as the locations between which travel is to occur (depicted in FIG. 1A as locations 110), in this case, San Francisco, Calif., and Boston, Mass. Travel arrangements 140 also include information regarding departure and return dates (depicted as date information 120 in FIG. 1A). Other information that may be needed by the agent can include departure and/or arrival times (depicted in FIG. 1A as times 130), as well as other information, such as the carrier to use, the mode of transportation, and other such information. As will be appreciated, a customer service agent faced with such a situation will have to somehow vet the customer's responses and enter such information into the application in use by the agent (e.g., by cutting-and-pasting the information, typing in the information by hand, or other such machinations).

Figure 1B:
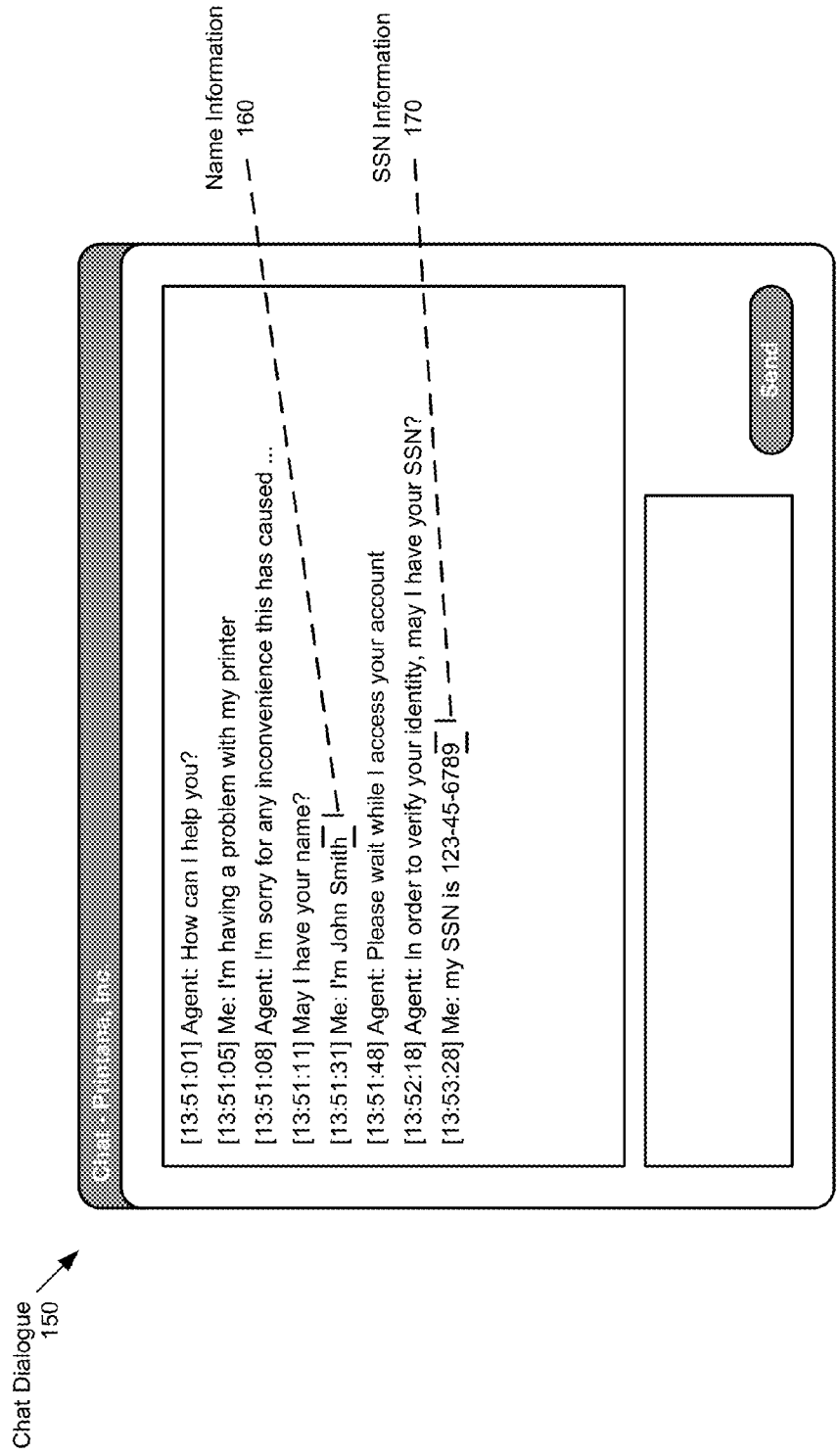
FIG. 1B is a block diagram illustrating an example of a user interface of a messaging system, in which a customer's dialogue with an agent (including confidential customer information) is displayed

Clearly, a user (e.g., agent) employing such a messaging system faces a number of challenges. First, because messaging sessions (e.g., chat transcripts (the text content in the chat session)) are unstructured and not integrated into other system applications, copy-and-paste functionality or duplicated typing across different user interfaces is required, in order to use the data entered by a customer. For example, when identifying a customer, an agent might ask for the customer's name and their company's name. After the customer enters the requisite information and submits that information into the messaging session, the agent must then copy and paste the requisite information (e.g., keywords) from the messaging window to the customer profile management interface. Sometimes, the free-form chat response from a customer must be mentally processed by the agent and then confirmed with the customer. As another example, if a customer indicates that she "should" be available "next Wednesday" for an onsite visit, in order to follow the grammatical rules specified by the agent's company, the agent has to figure out the exact date, confirm that date with the customer, and enter that date into the company's calendar to create an event. Unstructured data that requires re-entry among one or more different interfaces makes the use of such messaging systems inefficient and error-prone. By marked contrast, embodiments of the present invention avoid the aforementioned problems by allowing users to submit one or more forms into the messaging session, providing a flexible solution that provides a single, comprehensive view of the messaging session and information conveyed thereby FIG. 1B is a block diagram illustrating an example of a user interface of a messaging system (of a fictitious printer company, "Printana, Inc."), in which a customer's dialogue with an agent (including confidential customer information) is displayed. Alternatively, as depicted in FIG. 1B, confidential or otherwise sensitive information may be needed by the agent, in order to assist the customer with their needs. A chat dialogue 150 is depicted in FIG. 1B, and reflects the communication of such information between a customer and an agent. In such scenarios, the customer may need to provide confidential, sensitive, or otherwise personal information, in order to allow the agent to assist the customer. Such confidential information may include information such as the customer's name (depicted in FIG. 1B as name information 160), information regarding the customer's social security number (depicted in FIG. 1B as social security number information 170), or other such information. As will be appreciated, a customer may be reluctant to provide such information to a person not known to them, regardless of that other person's ostensible position within the company the customer has contacted.

However, in embodiments of the claimed invention, forms are communicated as messages, which provides numerous and valuable advantages. In the question phase, instead of typing a question in plain text, an agent is able to forward a form to a customer. The form is posted as a message into the messaging session, ready for the customer to complete. In the answer phase, the customer completes the form that appears in the messaging session and then submits the completed form back into the messaging session. The submission generates a new message with a list of (possibly read-only) name-value pairs. The name is the label of individual input fields on the form, and the value is the input data. Treating form forwarding and form submission as separate messages provides a single, complete view of the messaging session to both parties by maintaining a record of such messaging transactions. Because form data is structured, the lookup phase can be automated. At the end of the lookup phase, the lookup results, as well as associated action buttons (if necessary), are appended at the end of the form submission message in the agent view of the messaging session. Form re-submission is also straightforward. Customers can generate a new message by entering different data and re-submitting the form.

One of the advantages of embodiments of the present invention include the availability of form features in the messaging session. In addition to automating the lookup phase without requiring agents to manually "move" data between the messaging application window and other applications, support for the use of forms in messaging sessions enhances the user experience of the QAL paradigm by exploiting the form's features.

First, form widgets, such as a date/time picker, choice list, or input with auto-complete, can be leveraged to improve the input efficiency at the customer side. For example, instead of typing in a long string of the model number of a problematic printer, a customer can choose the model from a choice list populated by the model numbers from all the printers that he has bought. Moreover, the customers need only to type in the required values (for example, "John Smith") without the extra typing to describe what the values are about (for example, "my name is John Smith"). Such input efficiency improvement can be significant to the customers who are using mobile devices to chat since typing in mobile devices is known to be slow and unwieldy. Such features are discussed, for example, in connection with FIGS. 2, 3, 4, and 5, below.

Second, web forms can mask sensitive data submission without specifying patterns to match the specific data types. As a result, the same sense of security gained from a web form submission process can be achieved during a chat session. Based on privacy configurations, sensitive data submissions can be either masked only on the customer side or masked on both sides, automatically launching the system process without revealing sensitive information to the agent, as discussed subsequently in connection with FIG. 6.

Third, data validation supported by forms can automatically detect certain types of input errors from customers and thus prevent invalid data from being submitted, which is impossible with text-based chat. Form-based data validation not only reduces network traffic, but also relieves agents from manually validating customer data, as described, for example, in connection with FIGS. 7 and 8, below.

Figure 2:
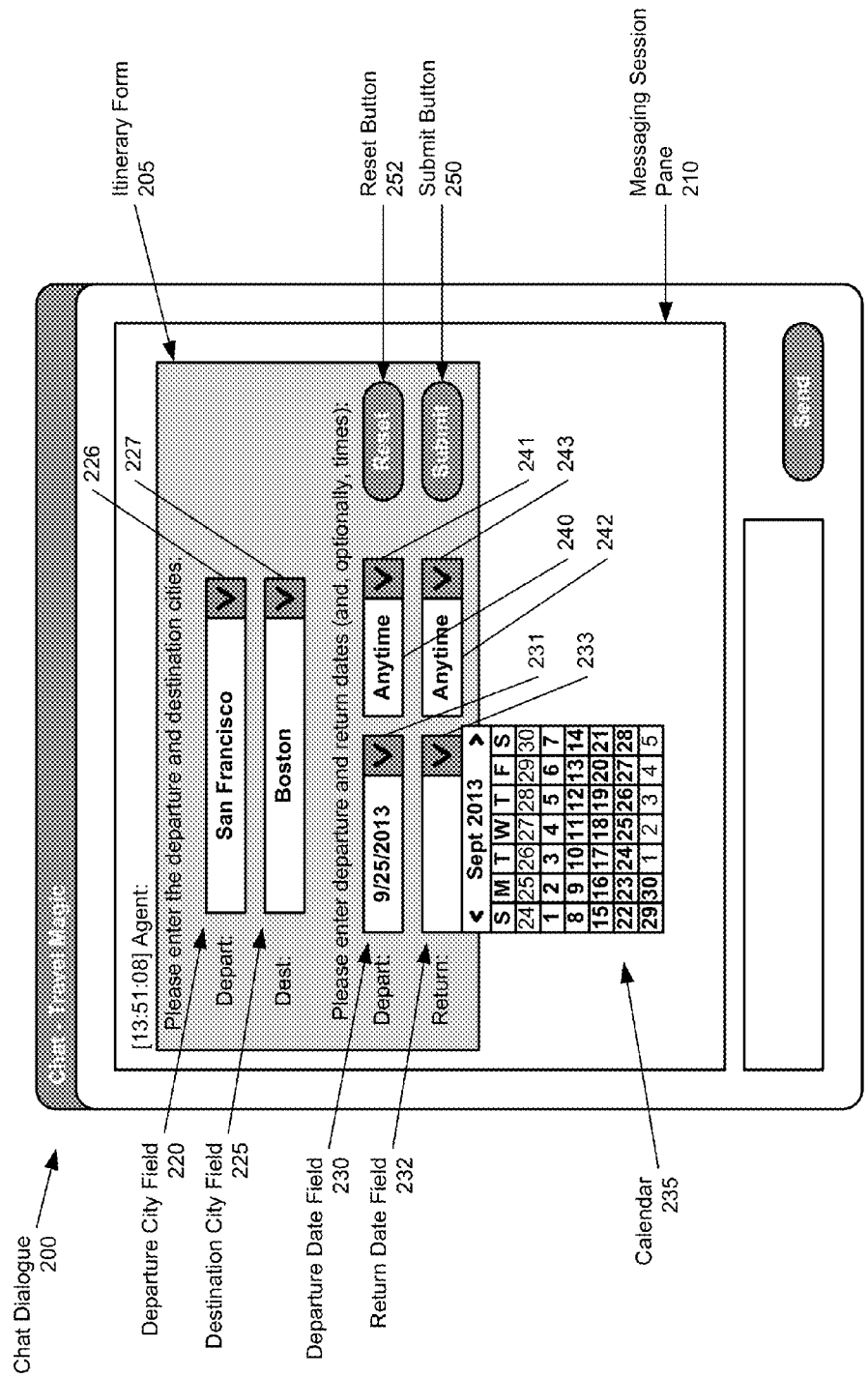
FIG. 2 is a block diagram illustrating an example of a user interface of a messaging system, in which a customer's dialogue with an agent is displayed, according to embodiments of the present invention

FIG. 2 is a block diagram illustrating an example of a user interface of a messaging system according to embodiments of the present invention, in which a customer's dialogue with an agent is displayed. FIG. 2 depicts a chat dialogue 200 that can display, for example, a form submitted ("pushed") into the messaging communications between the agent and the customer, according to embodiments of the present invention. In the example depicted in FIG. 2, chat dialogue 200 includes an itinerary form 205, which appears in messaging session pane 210. Itinerary form 205 includes a departure city field 220 and a destination city field 225. Information regarding the departure and destination cities can be entered into departure city field 220 and destination city field 225 manually, or the customer can avail themselves of drop-down menus (an example of which is depicted in FIG. 2 as drop-down menu icons 226 and 227).

Turning to departure/return dates in itinerary form 205, once this form has been pushed to the customer by the agent's submission of the form into the messaging session, the customer is able to enter the desired departure and return dates (and, optionally, times). Once again, in the manner of using itinerary form 205, the customer can enter and/or return dates and times in itinerary form 205 by manually typing the requisite information into the input fields of itinerary form 205, or by using drop-down menus to enter the information. For example, a user can enter a departure date in a departure date field 230 manually, or by selecting a date from a drop-down menu accessed from a drop-down menu icon 231. Similarly, the user can enter the date of return in a return date field 232, either manually or by selecting a date using a drop-down menu icon 233.

In the example depicted in FIG. 2, the customer has selected drop-down menu icon 233, resulting in the display of a calendar 235. Calendar 235 allows the customer to select the desired date from the dates displayed, and/or scroll through other dates (e.g., months of a given year), and select the desired date from the month and year to which the customer has scrolled. The customer can select the time of day for departure and return by manually entering a time in a departure time field 240, or by selecting a time of day from a drop-down menu (accessed by selecting a drop-down menu icon, an example of which is depicted in FIG. 2 as a drop-down menu icon 241). Similarly, the customer can provide a time at which the customer desires to return by entering the desired time of day in a return time field 242. Alternatively, the customer can select a drop down menu icon 243, and select from the times of day presented in the resulting menu displayed.

In certain embodiments, the messaging system can present the customer with default values in one or more of the aforementioned fields. For example, in itinerary form 205, departure time field 240 and return time field 242 are shown as having been presented to the customer with a default value of "Anytime" (signifying that the customer has no preference as to the time of day for departure/return).

Once the customer is satisfied with the entries in itinerary form 205, the customer selects a submit button 250. If the customer makes a mistake in entering information on itinerary form 205, or wishes to make a change to the information entered therein, the customer can clear the existing entry/entries by selecting (i.e., "clicking on") a reset button 252 (the selection of a button causing the activation of the button's functionality). As will be appreciated, providing the customer with the ability to enter such information directly into a form, which can then be communicated to the agent as single, complete response, greatly simplifies the tasks required of the agent, whether to obtain information necessary to assist the customer or perform some other function. Advantages of this approach include a marked reduction in the efforts required of the agent to query the customer, as well as a reduced risk of errors in the information thus obtained.

Figure 3:
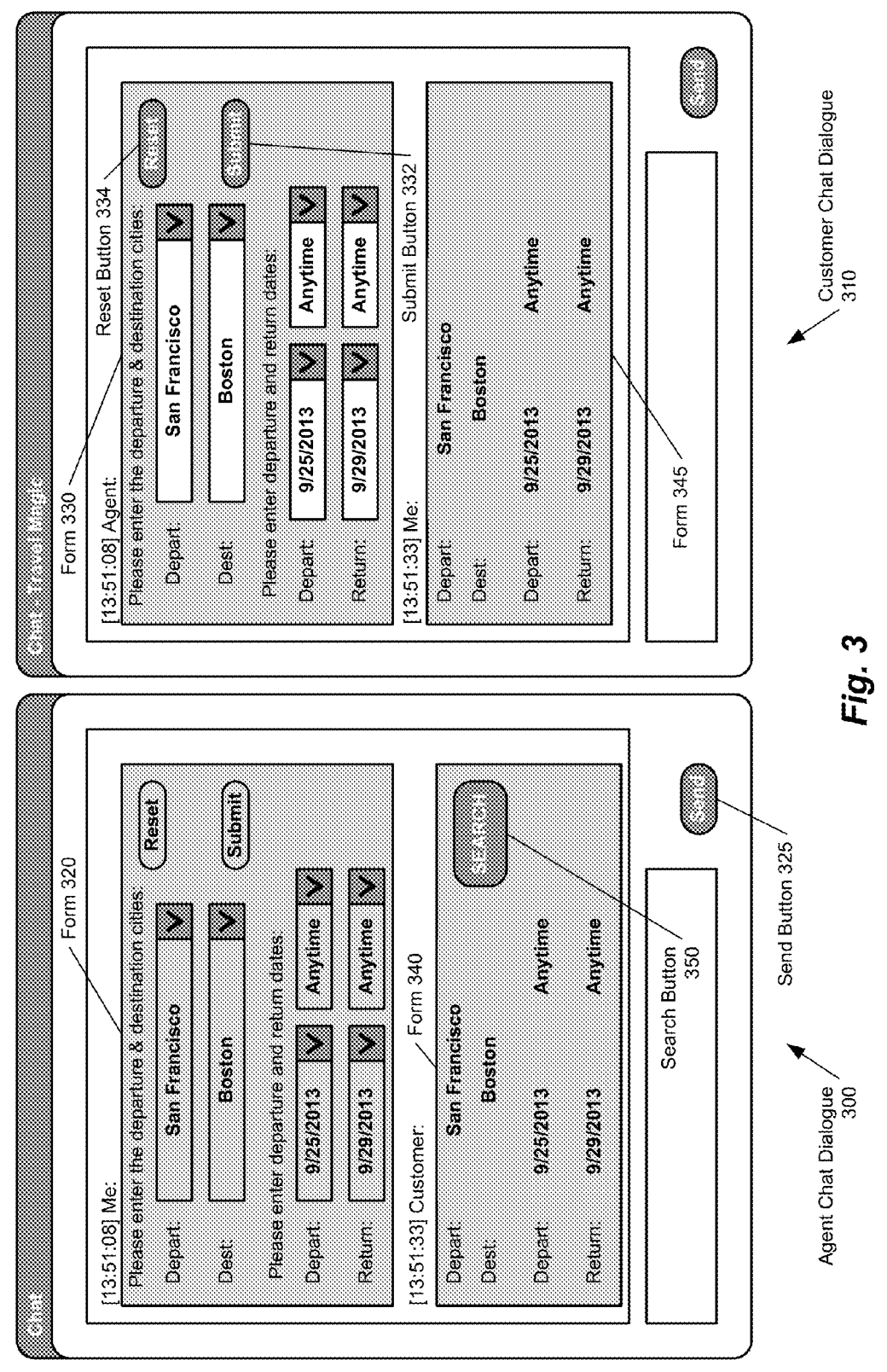

FIG. 3 is a block diagram illustrating an example of an agent dialogue and a customer dialogue presented by a messaging system according to embodiments of the present invention (depicted in FIG. 3 as an agent chat dialogue 300 and a customer chat dialogue 310). As before, in connection with chat dialogue 200, agent chat dialogue 300 depicts a form pushed into the chat by the agent (depicted in FIG. 3 as a form 320). Once the agent sends form 320 to the customer (e.g., by selecting a send button 325 and submitting the form into the messaging session), the customer receives form 320 in customer chat dialogue 310 as a form 330. It will be appreciated that, in the depiction of form 320 in FIG. 3, the various UI elements are depicted as disabled. This represents a configuration in which an agent using agent chat dialogue 300 is able to monitor information as the customer enters the information, but is not permitted to make any changes to the information or effect any actions thereby. As will be appreciated in light of the present disclosure, other alternatives for the presentation of such information and the implementation of such functionality can be realized in a messaging system according to embodiment of the present invention. Such alternatives are discussed subsequently, for example in connection with FIGS. 51, 52, and 53.

In the manner of itinerary form 205, form 330 provides the customer with the ability to enter a departure/destination cities and departure/return times/dates, either manually or by using one or more drop-down menus. As before, form 330 also provides a submit button 332 and a reset button 334, with functionality comparable to that of such earlier-described elements. As will be appreciated in light of the present disclosure (and particularly, discussions in connection with certain subsequent figures), the various elements of form 330 (e.g., submit button 332 and reset button 334) are depicted as remaining enabled, and thus, allow for the re-submission of information via form 330. As will be appreciated in light of the present disclosure, other alternatives for the presentation of such information and the implementation of such functionality can be realized in a messaging system according to embodiment of the present invention. Such alternatives are discussed subsequently, for example in connection with FIGS. 51, 52, and 53.

Upon selection of submit button 332 by the customer, the results of such selection are displayed in agent chat dialogue 300, as well as customer chat dialogue 310. The selection of submit button 332 results in the display of textual information, in a form 340, in agent chat dialogue 300 and textual information, in a form 345, in customer chat dialogue 310. In a manner comparable to the presentation of other such functionality, the messaging system presents a search button 350 in form 340. Search button 350 allows the agent to submit the relevant information provided by the customer (and so appearing in form 340) to one or more application programs used by the agent to provide the requisite information and/or services to the customer (e.g., searching for flights in an online flight reservation system). As will be appreciated in light of the present disclosure (and particularly, discussions in connection with certain subsequent figures), the process of submitting the relevant information to the one or more application programs can, in fact, be performed automatically, upon submission of the information into the messaging session.

Figure 4:
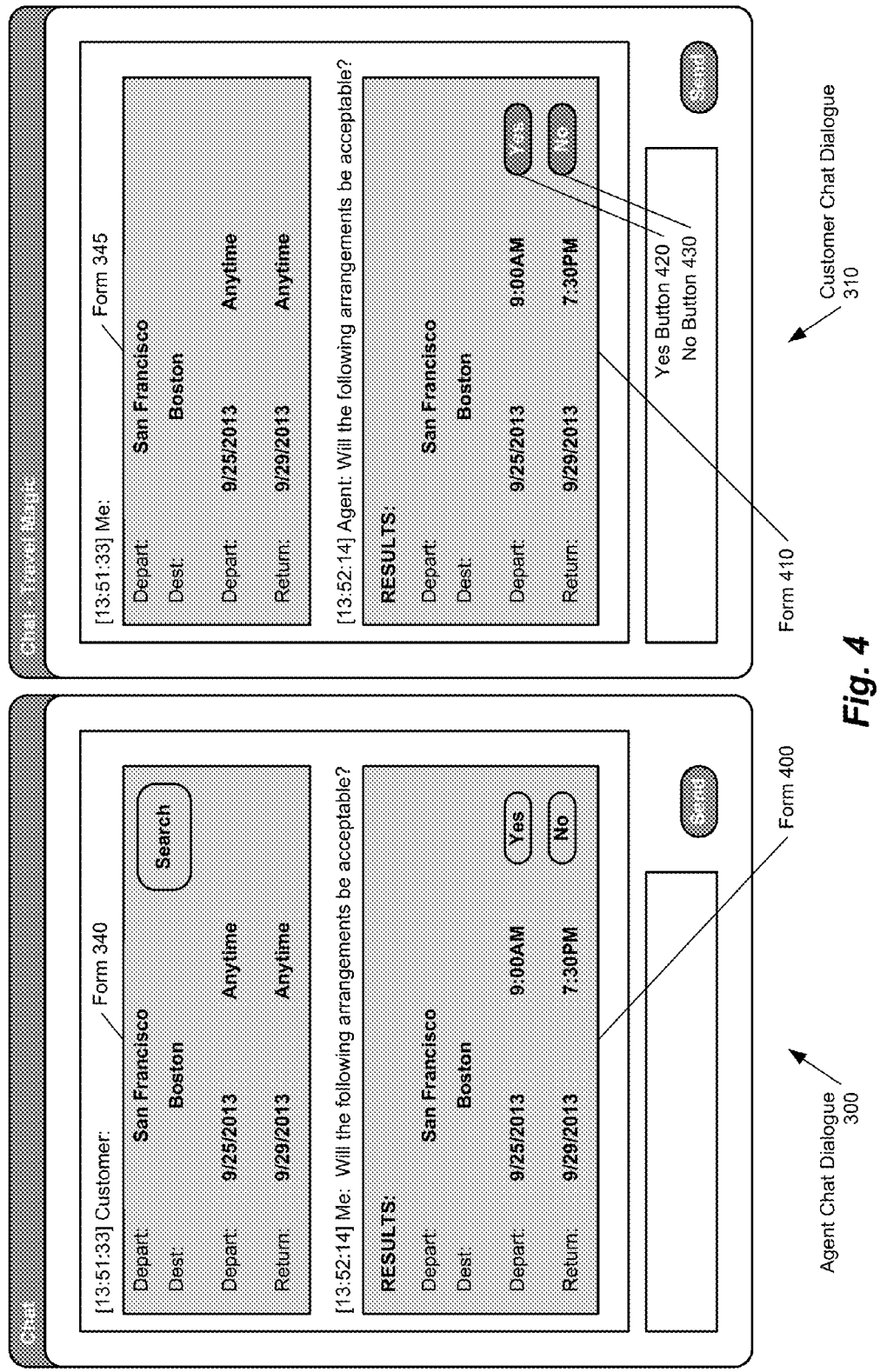
FIG. 4 is a block diagram illustrating an example of an agent dialogue and a customer dialogue presented by a messaging system according to embodiments of the present invention.

FIG. 4 is a block diagram illustrating an example of an agent dialogue and a customer dialogue presented by a messaging system according to embodiments of the present invention. FIG. 4 depicts the state of agent chat dialogue 300 and customer chat dialogue 310 later in their "online conversation" (messaging session). At this point, the agent has submitted information (regarding the customer's desired departure/destination cities and departure/return times/dates) to the enterprise application software using search button 350. The agent then pushes the results of the search to the customer into the messaging session with the customer (depicted in FIG. 4 as a form 400 in agent chat dialogue 300, and as a form 410 in customer chat dialogue 310). As part of pushing this information into the messaging session, a yes button 420 and a no button 430 appear as part of form 410. Yes button 420 and no button 430 allow the customer to accept or decline the reservations proffered by the agent.

As can be seen, the messaging system can be designed to update a form such as form 320 in agent chat dialogue 300 to reflect information entered by the customer and changes made thereto. As can also be seen in FIGS. 3 and 4, once the customer submits the information via the form in question, the information submitted via the form then appears as text (possibly in another form) in agent chat dialogue 300. Also, it will be observed that search button 350 is depicted in FIG. 4 as being disabled, a result of form 340 having been used to submit the information thus received to the online flight reservation system and the desire to prevent the agent from mistakenly resubmitting the information. Alternatively, search button 350 could be configured to remain enabled, thereby allowing for the resubmission of the information in form 340. Further still, such a configuration could be employed to allow the agent to submit the information appearing in form 340 while that information was being entered by the customer (such that, in a given scenario, the agent could "pre-enter" some (or even all) of such information, in order to overlap such operations with the customer's entry thereof, thereby potentially saving time during such interactions). These and other alternatives are discussed subsequently, for example in connection with FIGS. 51, 52, and 53.

Figure 5:
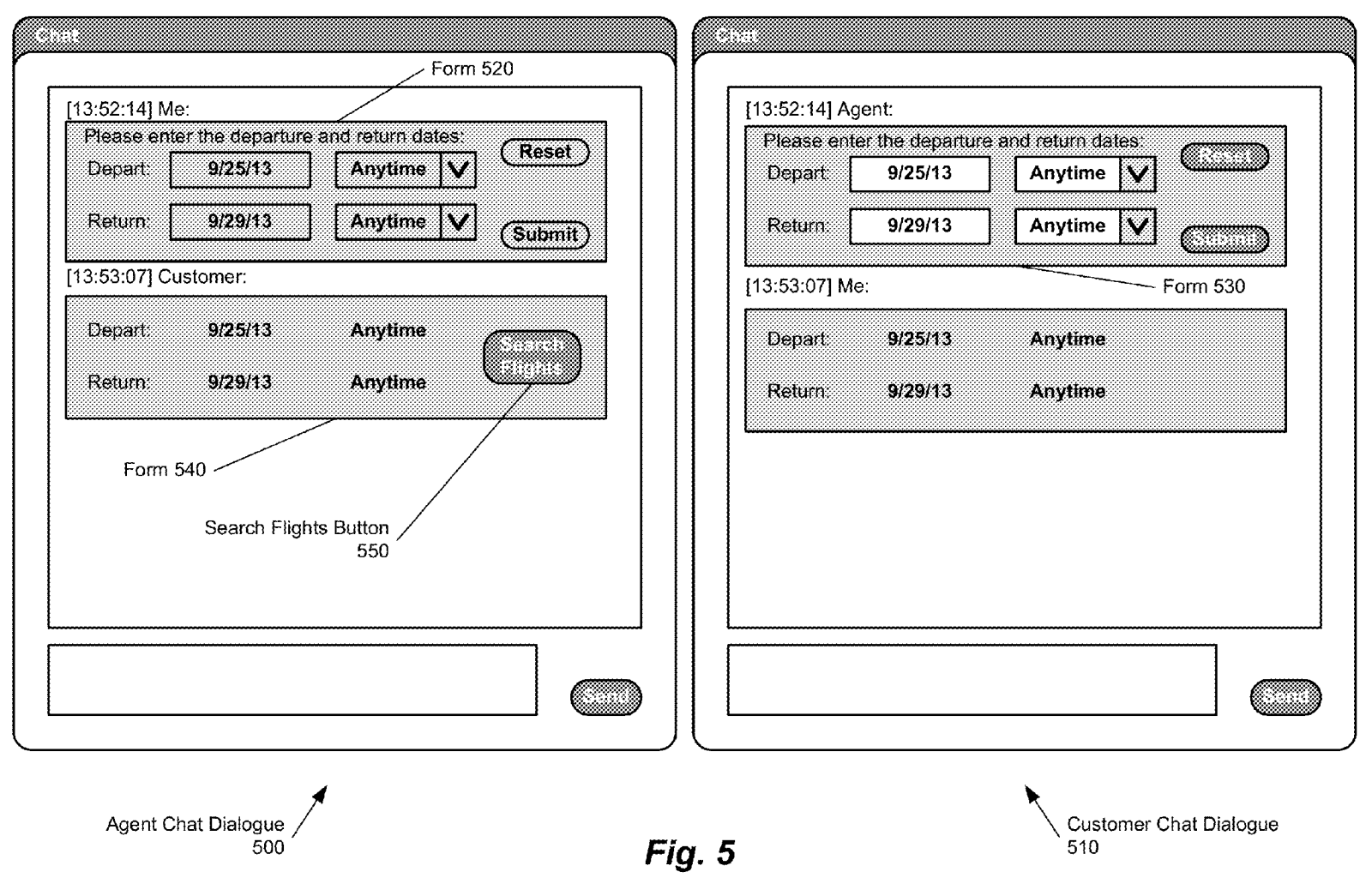

FIG. 5 is a block diagram illustrating another example of an agent dialogue and a customer dialogue presented by a messaging system according to embodiments of the present invention. FIG. 5 depicts an agent chat dialogue 500 and a customer chat dialogue 510, as well as the forms associated with a messaging session between the agent and the customer, in which the customer is able to provide information to the agent that the agent can then use to determine availability of the customer's desired alternative. In the scenario depicted in FIG. 5, the agent searches for flights that meet the customer's requirements, using the dates and times proposed by the customer. In this manner, the agent sends a form comparable to itinerary form 205 of FIG. 2 to the customer (depicted in FIG. 5 as a form 520 in agent chat dialogue 500, and a form 530 in customer chat dialogue 510). It will be appreciated that, in the example depicted in FIG. 5, the departure and destination cities are assumed to have been identified earlier in the messaging session. This can be accomplished using a form comparable to itinerary form 205 of FIG. 2, which can include, for example, information regarding departure and destination cities.

Once the customer submits their desired departure and return dates and times using form 530, this information appears in a form 540 in agent chat dialogue 500. Included in form 540 is a search flights button 550. In certain embodiments, the selection of search flights button 550 by the agent results in information regarding departure and destination cities from form 540, as well as departure and return dates and times from form 530 to be submitted to the application software (e.g., a flight reservation system). As can be seen, then, a messaging system according to embodiments of the present invention can be present agents and customers (among other such users) with actionable items that can cause the associated messaging system (and/or associated enterprise application systems, web application systems, and other such systems) to take single or multiple inputs.

It should be noted that, as depicted in FIG. 5, the reset and submit buttons of form 530 remain enabled, despite the information entered therein having been submitted into the messaging session (and so, appearing as form 540 in agent chat dialogue 500). As will be discussed in further detail in connection with FIGS. 52 and 53 (albeit in a slightly different configuration), such a mechanism allows a customer to re-submit the given form into the messaging session (e.g., a customer accessing the messaging system via customer chat dialogue 510 could change the departure date and resubmit form 530 into the messaging session). Such functionality and associated alternatives are discussed in detail in connection with FIG. 51.

Further, support can also be provided for what is referred to herein as "active monitoring" (the ability of the messaging system to present changes in form 530 in the corresponding form in agent chat dialogue 500. This is depicted in FIG. 5 (as well as other figures herein) by way of the information entered into form 530 also appearing in form 520. This allows the agent to view the information entered by the customer as that information is entered into the form submitted into the messaging session by the agent (e.g., information entered into form 530 appears in form 520, as that information is entered into form 530). Thus, for example, an agent sees the form in the messaging transcript as one to be completed by the customer (also including, typically, the various other elements in the form (e.g., the (disabled) Submit and the Reset buttons depicted in form 520)). In a CRM environment, active monitoring can be extended to the form resubmission, as well, such that the agent is presented with a preview of the form, as the customer completes the form, and so, can stand ready to provide appropriate assistance as necessary. Such functionality and associated alternatives are discussed in detail in connection with FIGS. 52 and 53.

Figure 6:
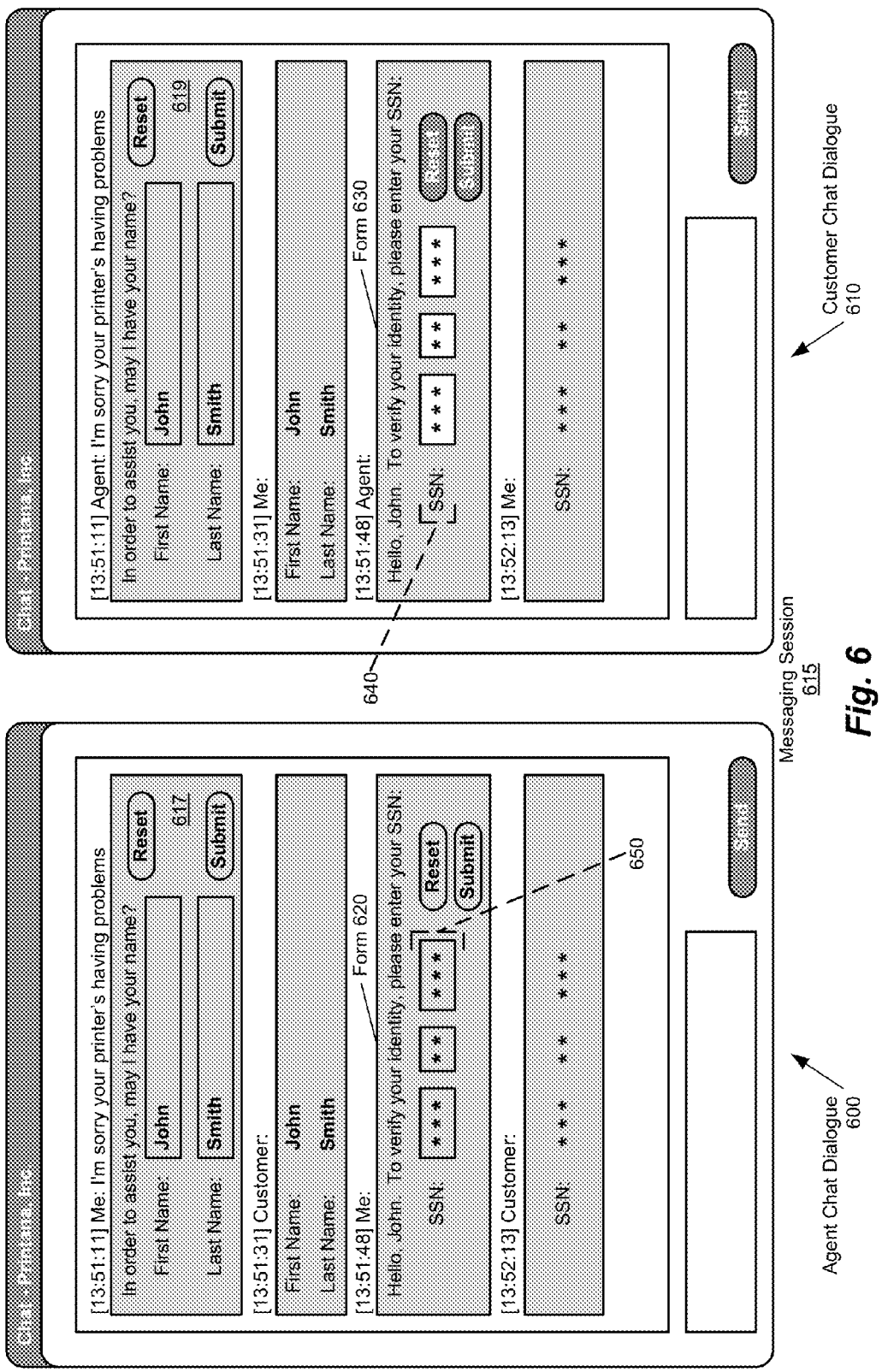
FIG. 6 is a block diagram illustrating an example of an agent dialogue and a customer dialogue presented by a messaging system according to embodiments of the present invention.

FIG. 6 is a block diagram illustrating an example of an agent dialogue and a customer dialogue presented by a messaging system during a messaging session between an agent and a customer, according to embodiments of the present invention. In the messaging session depicted in FIG. 6, an agent, having requested (and received) the customer's name, then inquires as to a user's confidential information (e.g., the customer's social security number), as can be seen in the agent and customer chat dialogues depicted in FIG. 6 (and which are depicted in FIG. 6 as an agent chat dialogue 600 and a customer chat dialogue 610). The communications depicted in FIG. 6, referred to herein as a "messaging session" (and depicted in FIG. 6 as a messaging session 615), include the communications between the agent (using agent chat dialogue 600) and the customer (using customer chat dialogue 610). These communications appear in messaging session 615 a number of text-based and form-based messages, and include a form 617 (in which the agent inquires as to the customer's name) and a corresponding form 619 (in which the customer provides his name in response).

As can be seen in FIG. 6, the elements of forms 617 and 619 are depicted as being disabled. In the aforementioned fashion, this represents a configuration in which an agent using agent chat dialogue 300 is able to monitor information as the customer enters the information, but is not permitted to make any changes to the information or effect any actions thereby. Similarly, the customer using customer chat dialog is prevented from making further changes to the information thus entered (e.g., useful in a situation in which it is preferable not to allow the customer to change/re-enter certain information). In the scenario depicted in FIG. 6, the messaging system is configured to automatically disable such fields upon the submission of the form into the messaging session. As will be appreciated in light of the present disclosure, other alternatives for the presentation of such information and the implementation of such functionality can be realized in a messaging system according to embodiment of the present invention. Such alternatives are discussed subsequently, for example in connection with FIGS. 51, 52, and 53.

Messaging session 615 also includes the provision of a form to the customer that requests the customer's confidential information (depicted in FIG. 6 as a form 620 in agent chat dialogue 600, and a form 630 in customer chat dialogue 610). In a situation similar to that posited earlier, the agent in this example finds him/herself in need of the customer's confidential information (in this scenario, the customer's social security number). Rather than request that the customer type in their social security number "in the clear" (i.e., without masking the actual information with placeholders such as asterisks), as before, the agent can instead send form 630, which is configured to mask the customer's social security number (depicted in FIG. 6 as confidential information 640). Moreover, once the customer submits their social security number using form 630, confidential information 640 can remain masked, and so appear in form 620 as masked confidential information 650. Thus, the customer's confidential information can remain masked throughout the process, and be submitted to the given application without ever having been visible to either party. Further still, form 630 can, via the messaging system, be configured to not only mask confidential information 640 but also to encrypt this information in a manner that protects confidential information 640 and does so in a manner that can only be unencrypted within the given application. As will be appreciated from the present disclosure, in masking the confidential information in both agent chat dialogue 600 and customer chat dialogue 610, the example depicted in FIG. 6 assumes that the confidential information is automatically communicated from the forms in the messaging session to the application in question, by the messaging system.

Figure 7:
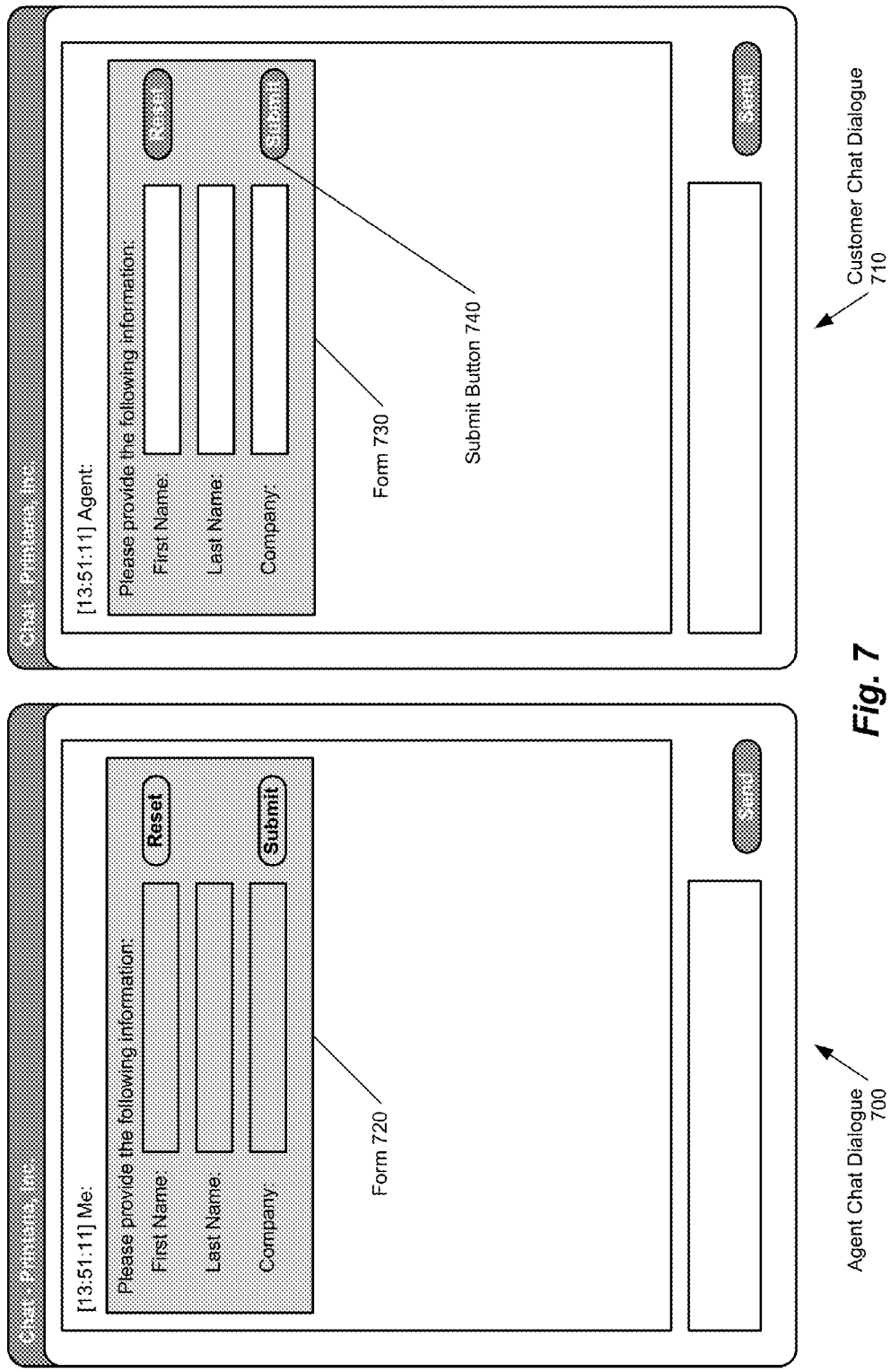
FIG. 7 is a block diagram illustrating an example of an agent dialogue and a customer dialogue presented by a messaging system according to embodiments of the present invention.

FIG. 7 is a block diagram illustrating an example of an agent dialogue and a customer dialogue presented by a messaging system according to embodiments of the present invention. FIG. 7 depicts yet another messaging session between an agent and a customer that is presented in an agent chat dialogue 700 and a customer chat dialogue 710. In this scenario, the agent presents a form to the customer in order to automatically identify the customer's company and name (depicted in FIG. 7 as a form 720 and agent chat dialogue 700, as well as a form 730 in customer chat dialogue 710). As can be seen in FIG. 7, the customer is able to enter their first name, last name, and company in form 730, and can then submit that information to the agent via the messaging session. The results of such an operation are presented in connection with FIG. 8, discussed subsequently.

Figure 8:
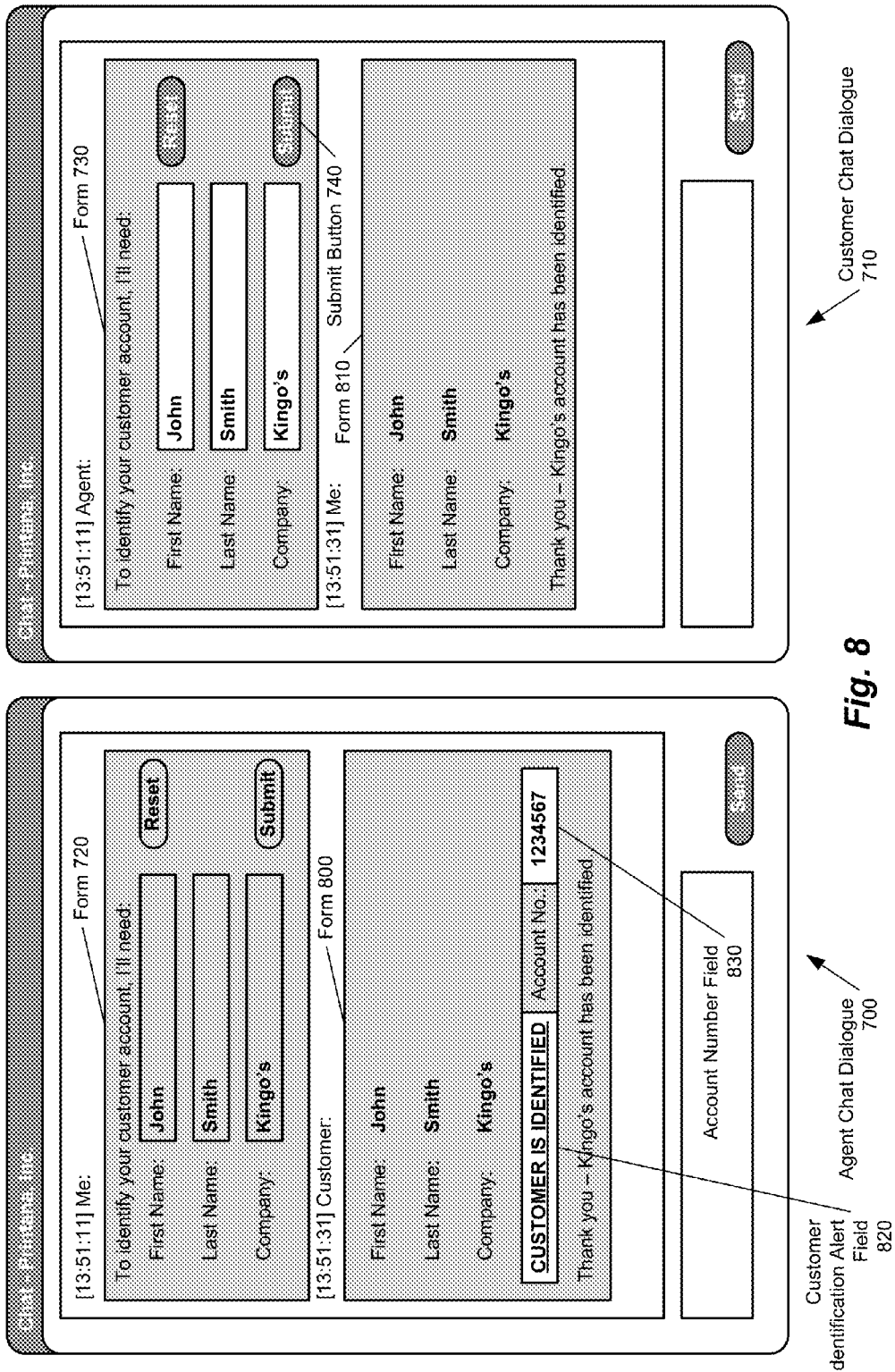
FIG. 8 is a block diagram illustrating an example of an agent dialogue and a customer dialogue presented by a messaging system according to embodiments of the present invention.

FIG. 8 is a block diagram illustrating an example of an agent dialogue and a customer dialogue presented by a messaging system according to embodiments of the present invention. FIG. 8 depicts the messaging session between the agent (in agent chat dialogue 700) and the customer (in customer chat dialogue 710) at a later point and time. At this juncture, the customer has entered their first name, last name, and company name into form 730. Once the customer has entered the requisite information, the customer submits this information to the agent by selecting a submit button 740 on form 730. This information appears in agent chat dialogue 700 as textual information in a form 800, and as textual information in a form 810 displayed in customer chat dialogue 710.

As a result of the messaging system's capabilities and the functionality built into the forms that are generated, operations such as the identification of a customer can be performed as part of the generation in display of a form in agent chat window 700, for example (e.g., form 800). In the scenario depicted in FIG. 8, form 800 includes a customer identification alert field 820 and an account number field 830. Based on the first name, last name, and company name information provided by the customer, the functionality provided by form 830 is able to interact with one or more applications in order to attempt to identify the customer. In the scenario depicted in FIG. 8, the customer ("John Smith" of "Kingo's") is identified, as is reflected by the information presented in customer identification alert field 820. With the customer having been identified, the messaging system (via form 800) presents the agent with the salient information (e.g., the customer's account number (e.g., 1234567), presented in account number field 830).

In the example depicted in FIG. 8, another feature of a messaging system according to embodiments of the present invention is shown, in which such a messaging system is configured not only to interact with an application, but is further capable of presenting information in the messaging session. Using such an approach, the messaging system provides for closer integration of the messaging application and the system application. For example, such integration can be employed not only to automatically initiate application functionalities such as those just discussed, but can also allow the application/messaging system to be configured to automatically submit one or more results from the system function in question (or other such functions) into the messaging session. Thus, the messaging system can be configured to automatically provide a response appropriate to the result of the customer's having submitted the now-completed form into the messaging session (e.g., depicted in FIG. 8 as the sentiment, "Thank you—Kingo's account has been identified."). As will be appreciated, such automation provides the customer with a pleasant, efficient interaction, while reducing the agent's workload. The approach can also be used, as another example, in generating yes button 420 and no button 430 in FIG. 4, in which those UI elements can be automatically generated and submitted (or even the entire form depicted as form 410) into the messaging session depicted in FIG. 4. Other aspects of this latter alternative are discussed in connection, for example, FIGS. 43-48.

Example Messaging System Architectures, Data Models, and Process Flow

Figure 9:
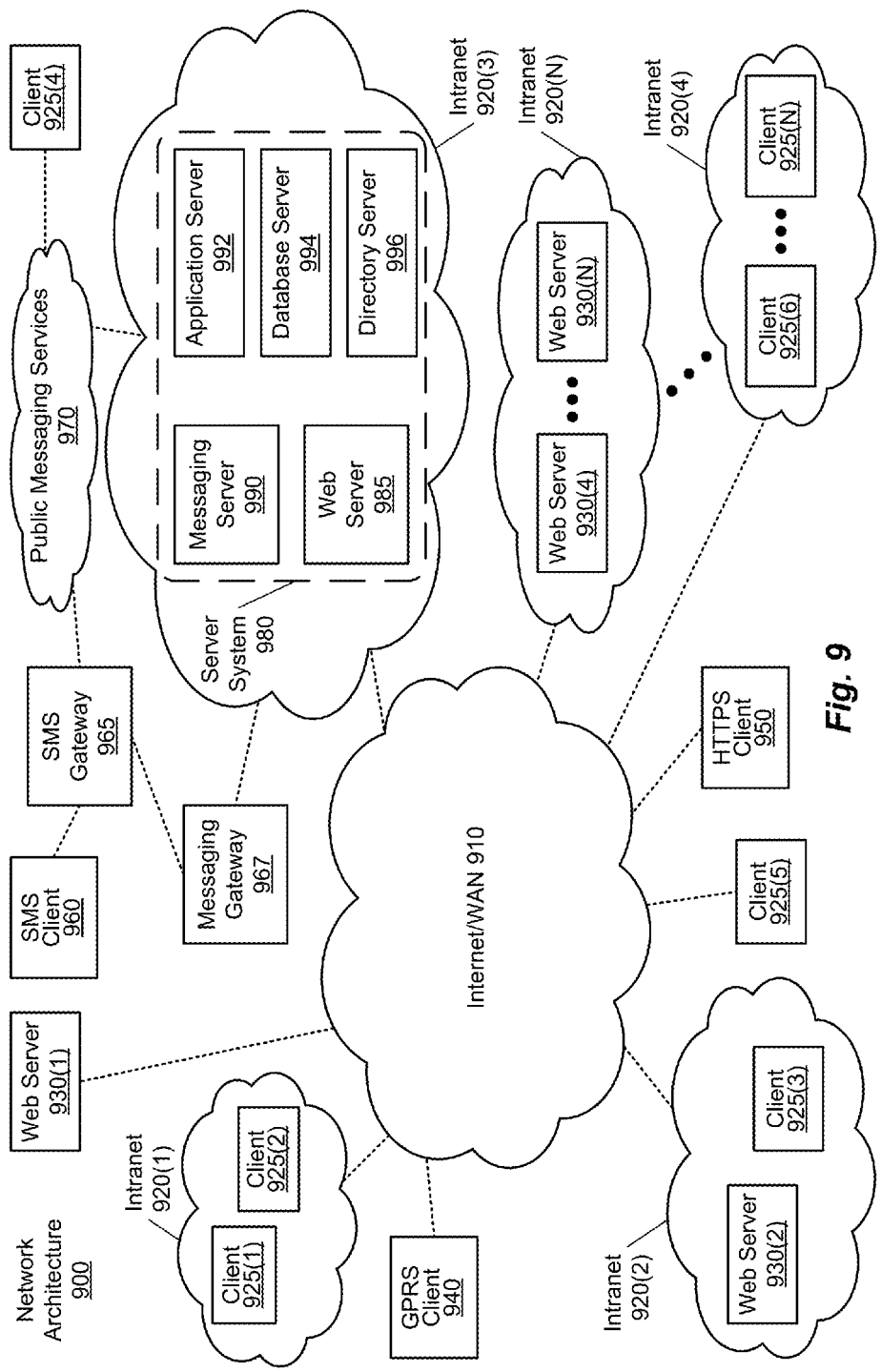
FIG. 9 is a block diagram illustrating an example of a web architecture supporting a messaging architecture according to embodiments of the present invention.

FIG. 9 is a block diagram illustrating an example of a web architecture supporting a messaging architecture according to embodiments of the present invention. FIG. 9 depicts a web architecture 900 that includes an internetwork (depicted in FIG. 9 as an internet/wide area network (WAN) 910), which couples a number of intranets to one another (depicted in FIG. 9 as intranets 920(1)-(N)). Intranets 920(1)-(N), in turn, can include a number of components, such as one or more clients (depicted in FIG. 9 as clients 925(1)-(N)) and/or web servers (depicted in FIG. 9 as web servers 930(1)-(N)). Clients 925(1)-(N) and/or web servers 930(1)-(N) can, for example, be implemented as computer systems such as those described in connection with FIGS. 51 and 52. Internet/WAN 910 thus couples intranets 920(1)-(N) to one another, thereby allowing clients 925(1)-(N) and web servers 930(1)-(N) to communicate with one another. As is depicted in FIG. 9, clients 925(1)-(N) can be communicatively coupled to one another and to web servers 930(1)-(N) as part of one of intranets 920(1)-(N), or directly via internet/WAN 910. Similarly, web servers 930(1)-(N) can be coupled via intranet/WAN 910 via a direct connection to intranet/WAN 910, or as part of one of intranets 920(1)-(N).

Web architecture 900 also provides for communication via intranet/WAN 910 using one or more other devices. Such devices can include, for example, a general packet radio service (GPRS) client 940 (e.g., a "smart phone" or comparable mobile device), a secure web client (depicted in FIG. 9 as a secure hypertext transfer protocol (HTTPS) client 950), and a cellular phone using standard texting protocols (depicted in FIG. 9 as a simple messaging service (SMS) client 960). HTTPS client 950 can be, for example, a laptop computer using the HTTP Secure (HTTPS) protocol. Support for GPRS clients, SMS clients, HTTP clients, and the like thereby provide users with messaging functionality according to embodiments of the present invention in a mobile environment. As is also depicted in FIG. 9, SMS client 960 can communicate via internet/WAN 910 via several channels. SMS client 960 can communicate directly, for example, with an SMS gateway 965, which, in turn, communicates with internet/WAN 910 via a messaging gateway 967 and, optionally, elements within intranet 920 (3), for example. Alternatively, SMS client 960 can, via SMS gateway 965, communicate with intranet 920(3) (and so, internet/WAN 910) via public messaging services 970 to which SMS gateway 965 and intranet 920(3) are connected.

As is also depicted in FIG. 9, a client 925(4) is also able to communicate via internet/WAN 910 by way of public messaging services 970 and intranet 920(3). In order to support such communications, as well as other communications according to embodiments of the present invention, intranet 920(3) includes a server system 980, as well as providing for a number of clients (now shown), in the manner of intranet 920(2). Server system 980 includes a number of elements that allow server system 980 to support messaging communications according to embodiments of the present invention. Among these elements are a web server 985, a messaging server 990, an application server 992, a database server 994, and a directory server 996, among other possible such servers, in communication with one another. Various configurations of the elements of server system 980 are discussed in greater detail, for example, in connection with FIGS. 11, 12, and 34.

It will be appreciated that, in light of the present disclosure, the variable identifier "N" is used in several instances in various of the figures herein to more simply designate the final element of a series of related or similar elements (e.g., intranets 920(1)-(N), clients 925(1)-(N), and web servers 930(1)-(N)). The repeated use of such variable identifiers is not meant to imply a correlation between the sizes of such series of elements. The use of variable identifiers of this sort does not require that each series of elements has the same number of elements as another series delimited by the same variable identifier. Rather, in each instance of use, the variable identified by "N" may hold the same or a different value than other instances of the same variable identifier.

Figure 10:
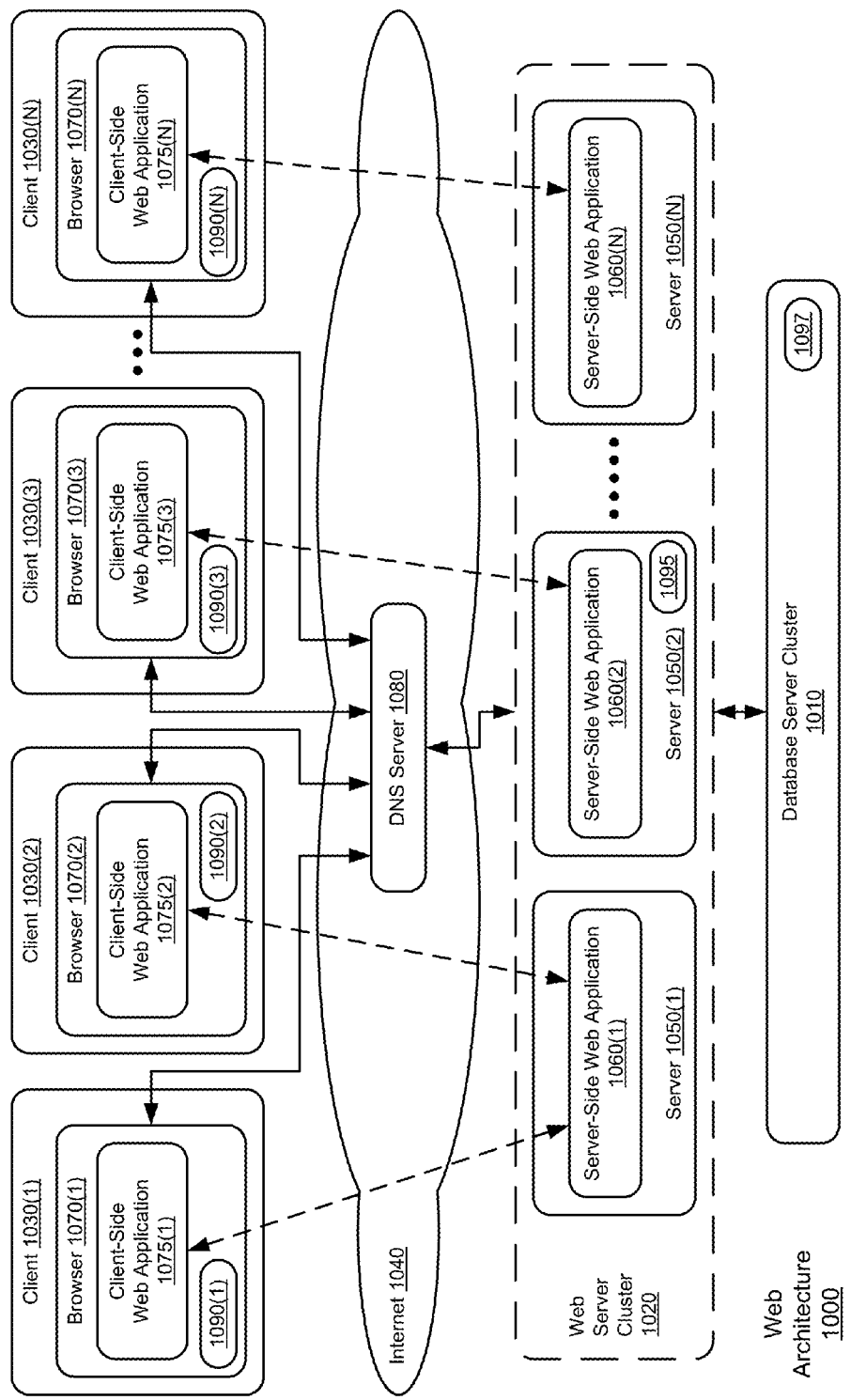
FIG. 10 is a block diagram illustrating an example of a client-server architecture supporting a messaging architecture according to embodiments of the present invention.

FIG. 10 is a block diagram illustrating an example of a client-server architecture supporting a messaging architecture according to embodiments of the present invention. FIG. 10 depicts a web architecture 1000 that includes a database server cluster 1010, a web server cluster 1020, and a number of clients (depicted in FIG. 10 as clients 1030(1)-(N)) communicatively coupled to web server cluster 1020 by an internetwork (depicted in FIG. 10 as internet 1040). As will be appreciated in light of the present disclosure, a server cluster is a group of independent servers that can be managed as a single system, and so provide higher availability, easier manageability, and greater scalability. In the present scenario, database server cluster 1010 is a server cluster providing database facilities, which is architected using clustering techniques. In so doing, database server cluster 1010 is able to provide advantages such as load balancing, high availability, and the like, by breaking up the data to be accessed by the servers of web server cluster 1020 (e.g., breaking a database into "shards"), by allowing separate data sources to be accessed separately, and so on. Similarly, web server cluster 1020 is a group of computer systems executing web server software (e.g., HTTP servers) that collectively provide a web page delivery mechanism, with advantages comparable to those noted above.

In turn, web server cluster 1020 includes a number of servers 1050(1)-(N), each of which support one or more server-side web applications (depicted in FIG. 10 as server-side applications 1060(1)-(N)). As noted, clients 1030(1)-(N) access servers 1050(1)-(N) via internet 1040. More specifically, each of clients 1030(1)-(N) support one or more browsers (depicted in FIG. 10 as browser 1070(1)-(N), which, in turn, each support one or more client-side web applications (depicted in FIG. 10 as client-side web applications 1075(1)-(N)). Each of client-side web applications 1075(1)-(N) is configured to communicate with one or more of server-side web applications 1060(1)-(N), as is depicted in FIG. 10.

In order to support such communications, browsers 1070(1)-(N) can be configured to access one or more servers of web server cluster 1020 via internet 1040, and more specifically, by accessing a Domain Name System (DNS) server 1080. A DNS is a hierarchical, distributed naming system for computers, services, and other resources connected to a network supporting DNS (e.g., the Internet or a private network). A DNS associates various information with domain names assigned to each of the participating entities. For example, browser 1020(3) on client 1030(3) can access DNS server 1080 in order to determine an internet protocol (IP) address of server 1050(2). Use of a DNS also allows for load balancing, referred to as DNS balancing.

DNS balancing is an easy and efficient mechanism for implementing a web site that can process more web traffic than might otherwise be the case. DNS balancing involves executing multiple copies of the site on separate physical servers. The DNS server for the hostname of the site (e.g., www.travelmagic.com) is configured to direct access requests such that different access requests are directed to different ones of those servers. This can be accomplished in a number of ways, such as by having the DNS server return more than one internet protocol (IP) address for the hostname (e.g., return multiple IP addresses for the site, from which the requesting browser can choose) or returning a different IP address for each DNS request received, for example. In any event, this results in the distribution of accesses across the web servers of web server cluster 1020, although from the perspective of a given one of browsers 1070(1)-(N), there is only one web site. Alternative approaches for load balancing include, for example, techniques such as round-robin DNS balancing, hardware-based load balancing, software-based load balancing, reverse proxying, content spreading across hosts, content spreading across outsourced providers, and other such techniques.

Once browser 1020(3) is in communication with server 1050(2), client-side web application 1075(3) is then able to communicate with server-side web application 1060(2). In so doing, client-side web application 1075(3) and server-side web application 1060(2) are able to access information stored in one or more of the databases maintained in database server cluster 1010. In certain embodiments, client-side web applications 1075(1)-(N) can be implemented as an AJAX client (a client supporting an Asynchronous JavaScript and XML (AJAX) framework). AJAX is a group of interrelated web development techniques used on the client-side to create asynchronous web applications. Such client-side web applications can be implemented in JavaScript and extensible markup language (XML) using related web development techniques, including jQuery and Java Script Object Notation (JSON). jQuery is a cross-browser Java Script library designed to simplify the client-side scripting of hypertext markup language (HTML), while JSON is a lightweight, text-base open standard design for human-readable data interchange. On the server side, server-side web applications 1060(1)-(N) can be implemented, for example, using any number of approaches for such server-side support (e.g., including Java, C# and .NET, Ruby on Rails, the PHP Hypertext Processor (or more simply, PHP) scripting language, and/or other such technologies, typically some manner of a general-purpose server-side scripting language). As will be discussed subsequently, embodiments of the present invention can take advantage of the aforementioned mechanisms and facilities, in order to provide additional advantages in their implementation.

In the context of a messaging system according to embodiments of the present invention, a web architecture such as web architecture 1000 can support various features of such a messaging system using a number of mechanisms. For example, support for the transitioning of messaging sessions between servers can be provided by the maintenance of information (e.g., information maintained on a computer system as a type of "cookie" or other small amount of data, sent from a website and stored for access by a web browser), which is depicted in FIG. 10 as a number of cookies (cookies 1090(1)-(N)). Cookies 1090(1)-(N) maintain information regarding the state of a given messaging session (or multiple messaging sessions), allowing the messaging session(s) to be passed from one server to another, and thus, facilitating load balancing and failure recovery.

Alternatively, state information for a messaging session can be kept on the server side (e.g., at one of servers 1050(1)-(N) (depicted in FIG. 10, e.g., as server-side state information 1095)), or maintained in a database used to support the messaging system (e.g., session information can be maintained in a database in database server cluster 1010 (depicted in FIG. 10, e.g., as a session information database 1097)). Server-side maintenance of messaging session information and management thereof can be managed by a particular server tasked with this responsibility, or can be shared among servers (and/or transferred between servers). Another alternative is to configure the DNS server (e.g., DNS server 1080) to manage the messaging sessions by sending accesses to different servers (e.g., the selection of one or more certain URLs/links can be sent to one server, while the selection of other URLs/links are sent to another server; DNS server 1080 can be configured to send such accesses to various ones of servers 1050(1)-(N) according to a round-robin (or other) scheduling paradigm, or by way of some other comparable mechanism). Clearly, the functionalities provided by a messaging system according to embodiments of the present invention support the implementation of a wide array of features that allow users to communicate in a particularly effective and efficient manner.

Figure 11A:
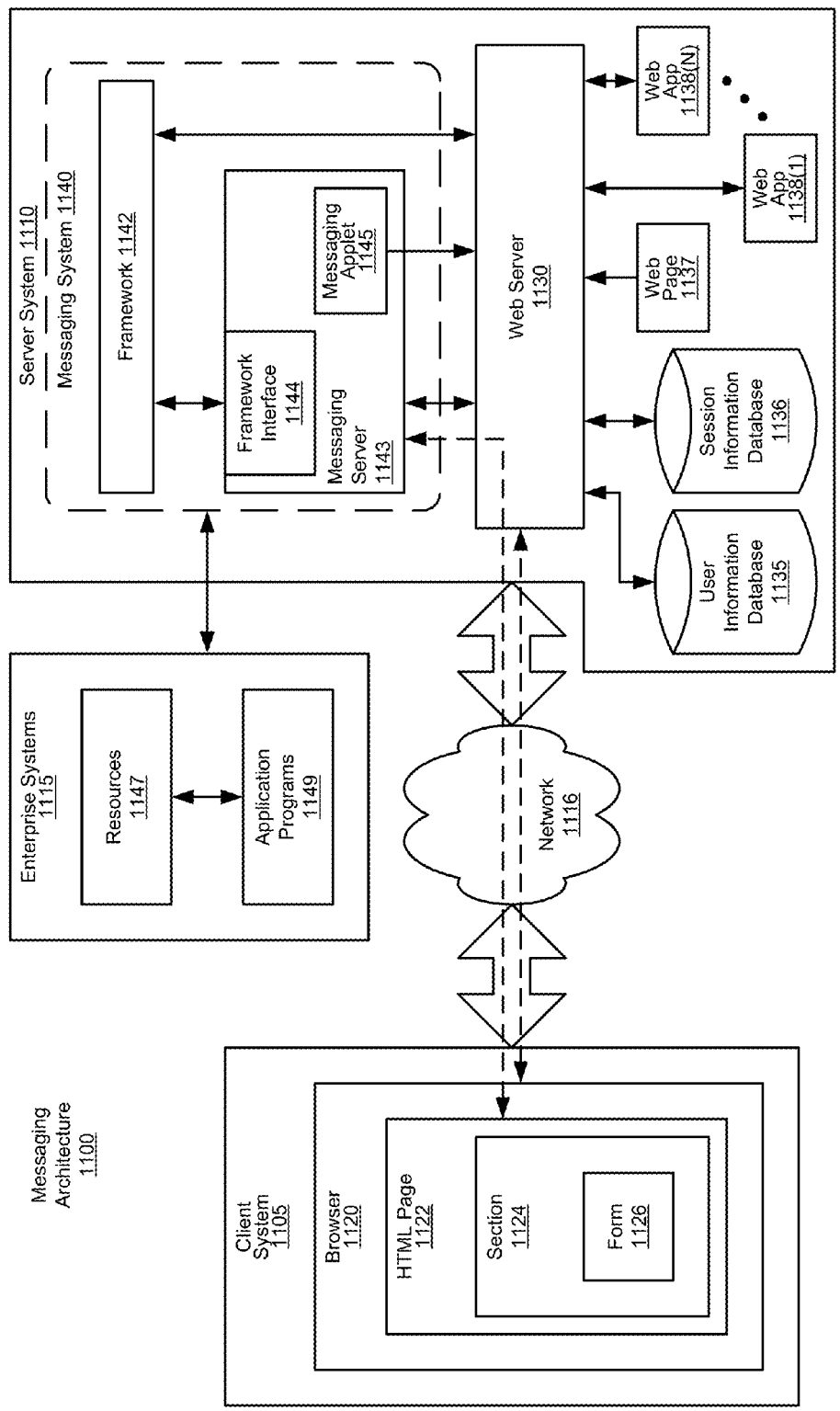
FIG. 11A is a block diagram illustrating an example of a client-server architecture supporting a messaging architecture, depicting features of a client system and a server system, according to embodiments of the present invention.

FIG. 11A is a block diagram illustrating an example of a messaging architecture according to embodiments of the present invention (depicted in FIG. 11A as a messaging architecture 1100). In the implementation shown in FIG. 11A, messaging architecture 1100 employs a client-server architecture, such as, generally, that discussed in connection with FIG. 12. Among other elements, messaging architecture 1100 thus includes a client system 1105 and a server system 1110, as well as one or more enterprise systems (depicted in FIG. 11A as enterprise systems 1115). As can also be seen, client system 1105 and server system 1110 are communicatively coupled to one another by a network 1116.

Client system 1105 serves as an example of various of the clients depicted in FIG. 9 (e.g., one of clients 925(1)-(N), GPRS client 940, HTTPS client 950, SMS client 960, or other such clients). As part of messaging architecture 1100, client system 1105 provides support for a browser 1120, which is capable of presenting a user with, for example, a page employing a generic markup language or the like (depicted in FIG. 11A as an HTML page 1122). HTML page 1122, in turn, presents the user with a section 1124, and more specifically, a form 1126 presented therein. HTML page 1122 receives information regarding form 1126, for display as part of section 1124, from a server within server system 1110 via network 1116.

Server system 1110 can comprehend a number of subsystems, including, for example, a web server 1130, a user information database 1135, and a session information database 1136. Web server 1130 is configured to access user information database 1135 to obtain user identification information, such as mappings between a user's instant messaging (IM) identifier and their user identifier (e.g., user_id). Similarly, session information database 1136 can maintain information such as the messages communicated between users engaged in a messaging session. Server system 1110 also provides web server 1130 with access to web pages (e.g., depicted in FIG. 11A as a web page 1137) and one or more web applications (e.g., depicted in FIG. 11A as web applications 1138(1)-(N)). The foregoing can be implemented, for example, in a manner such as that discussed in connection with FIG. 10.

Server system 1110 also provides support for messaging by way of a messaging system 1140, to which web server 1130 is communicatively coupled. Messaging system 1140, in certain embodiments, includes a framework 1142 and a messaging server 1143. Messaging server 1143 is able to communicate with framework 1142 via a framework interface 1144, and facilitates messaging services by way of supporting the requisite protocols (e.g., Extensible Messaging and Presence Protocol (XMPP)). Similarly, messaging server 1143 supports one or more messaging applets (depicted in FIG. 11A as a messaging applet 1145). In addition to being able to communicate with web server 1130 via various communication paths and mechanisms, messaging system 1140 is able to communicate with the elements of enterprise systems 1115, and more specifically, with the resources (depicted in FIG. 11A as resources 1147) and application programs (depicted in FIG. 11A as application programs 1149) of enterprise systems 1115.

Messaging system 1140, as noted, is also able to communicate with web server 1130 via a variety of communication paths and mechanisms. For example, messaging server 1143 can communicate directly with web server 1130, as well as doing so by way of its support of messaging applet 1145 and the communications between messaging applet 1145 and web server 1130. Framework 1142 can communicate with web server 1130 via messaging server 1143 using framework interface 1144 of messaging server 1143, or by communicating with web server 1130 directly. In this manner, information from application programs 1149 and/or web applications (web apps) 1138(1)-(N) can be communicated to and from browser 1120 in HTML page 1122 via network 1116. By way of further example, the output of messaging applet 1145 (representing information from application programs 1149 and/or web applications 1138(1)-(N)) can be conveyed via web server 1130, and presented in HTML page 1122 as form 1126.

Figure 11B:
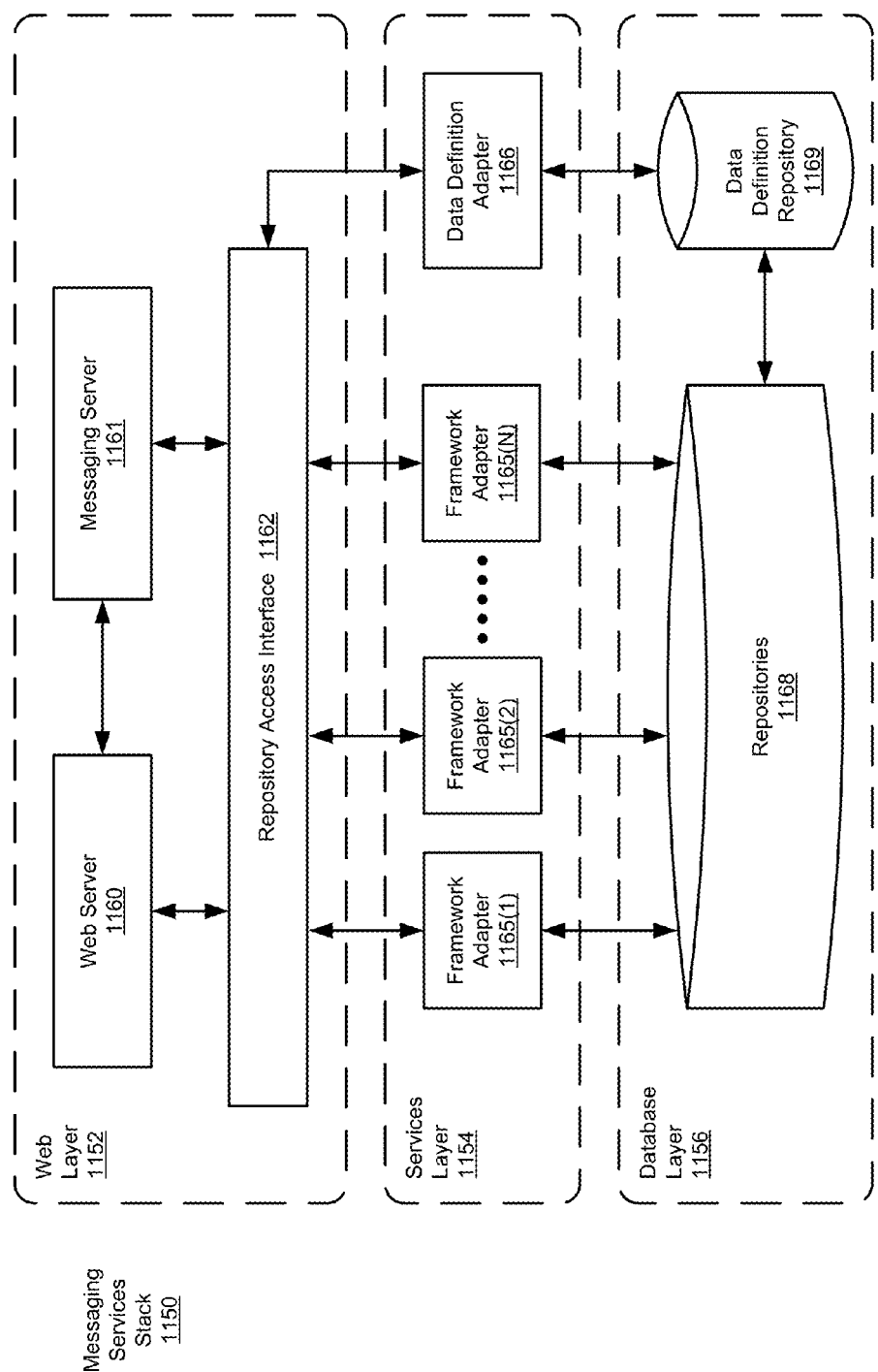
FIG. 11B is a block diagram depicting various layers of a messaging services stack according to embodiments of the present invention.

FIG. 11B is a block diagram depicting various layers of a generic example of a messaging services stack according to embodiments of the present invention. FIG. 11B depicts the elements of a messaging services stack 1150 that is configured to support operations of the aforementioned architectures. As such, messaging services stack 1150 allows for the definition, location, and implementation of the requisite services needed to support the interactions occurring in a messaging architecture according to the embodiments of the present invention. Messaging services stack 1150 includes a web layer 1152, a services layer 1154, and a database layer 1156. These layers reflect the software services provided in an architecture such as web architecture 1000 of FIG. 10, and support a messaging architecture such as messaging architecture 1100 of FIG. 11A.

In turn, web layer 1152 of messaging services stack 1150 includes a web server 1160 and a messaging server 1161. Web server 1160 and messaging server 1161 access the elements of services layer 1154 and database layer 1154 via a repository access interface 1162, which is also a component of web layer 1152 (at least on a conceptual level). Services layer 1154, in turn, provides the elements of web layer 1152 with access to the elements of database layer 1156 via a number of framework adapters (depicted in FIG. 11B as framework adapters 1165(1)-(N)) and a data definition adapter 1166. The elements of services layer 1154 provide a layer of abstraction over the information maintained in database layer 1156 and allow for a generic interface thereto, as well as allowing of a more configurable interface by way of supporting data definition using data definition adapter 1166. Information to be access by the elements of web layer 1152 (e.g., web server 1160 and messaging server 1161), database layer 1156 maintains a number of repositories (depicted in FIG. 11B as one or more repositories 1168), the definition of which can be maintained in a data definition repository 1169, for example, thus providing the aforementioned configurability by way of maintaining information regarding the structure and contents of repositories 1168. A data definition repository such as data definition repository 1169 can include, for example, certain metadata, as well as information regarding data access and analytical engines needed to gain access to the information and perform the necessary operations, when accessing repositories 1168.

Figure 11C:
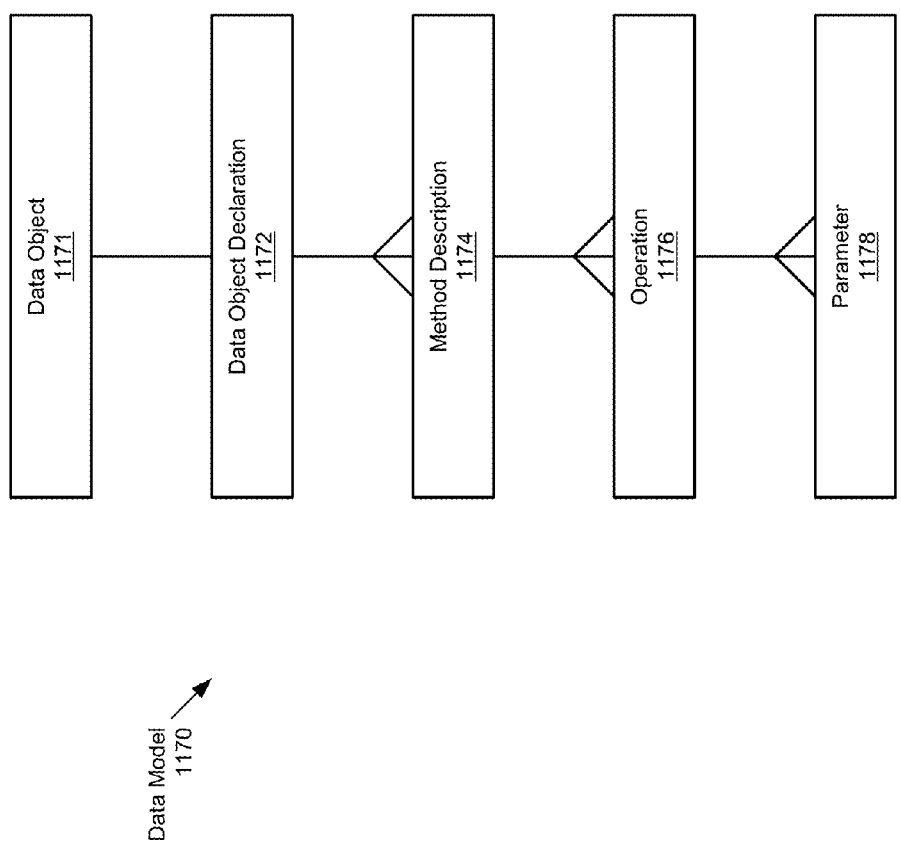
FIG. 11C is a block diagram illustrating an example of a data model according to embodiments of the present invention.

FIG. 11C is a block diagram illustrating a generic example of a data model according to embodiments of the present invention. FIG. 11C is an example of a generic data model, and is depicted in FIG. 11C as a data model 1170. Data model 1170 is appropriate for use in architecting a messaging system according to embodiments of the present invention, for example. Data model 1170 includes a data object 1171, representative of, for example, a structured data object, a dynamic form object, or other such object configured for use in a messaging system according to embodiments of the present invention. Data object 1171 can include, for example, a data object declaration 1172. In data model 1170, data object 1171 and data object declaration 1172 have a one-to-one (1:1) relationship. The single line between data object 1171 and data object declaration 1172 signifies this relationship. In turn, data object declaration 1172 can include one or more method descriptions (depicted in FIG. 11C as a method description 1174). In data model 1170, data object declaration 1172 and method description 1174 have a one-to-many (1:N) relationship, indicating that a data object declaration such as data object declaration 1172 can be associated with one or more method descriptions. Similarly, method description 1174 can be associated with one or more operations (an example of which is depicted in FIG. 11C as an operation 1176). In data model 1170, method description 1174 and operations such as operation 1176 also share a one-to-many (1:N) relationship, as signified by the branching line between method description 1174 and operation 1176. In turn, operation 1176 can include one or more parameters (an example of which is depicted in FIG. 11C as a parameter 1178). In the aforementioned manner, the relationship between operation 1176 and parameter 1178 is a one-to-many (1:N) relationship.

Figure 11D:
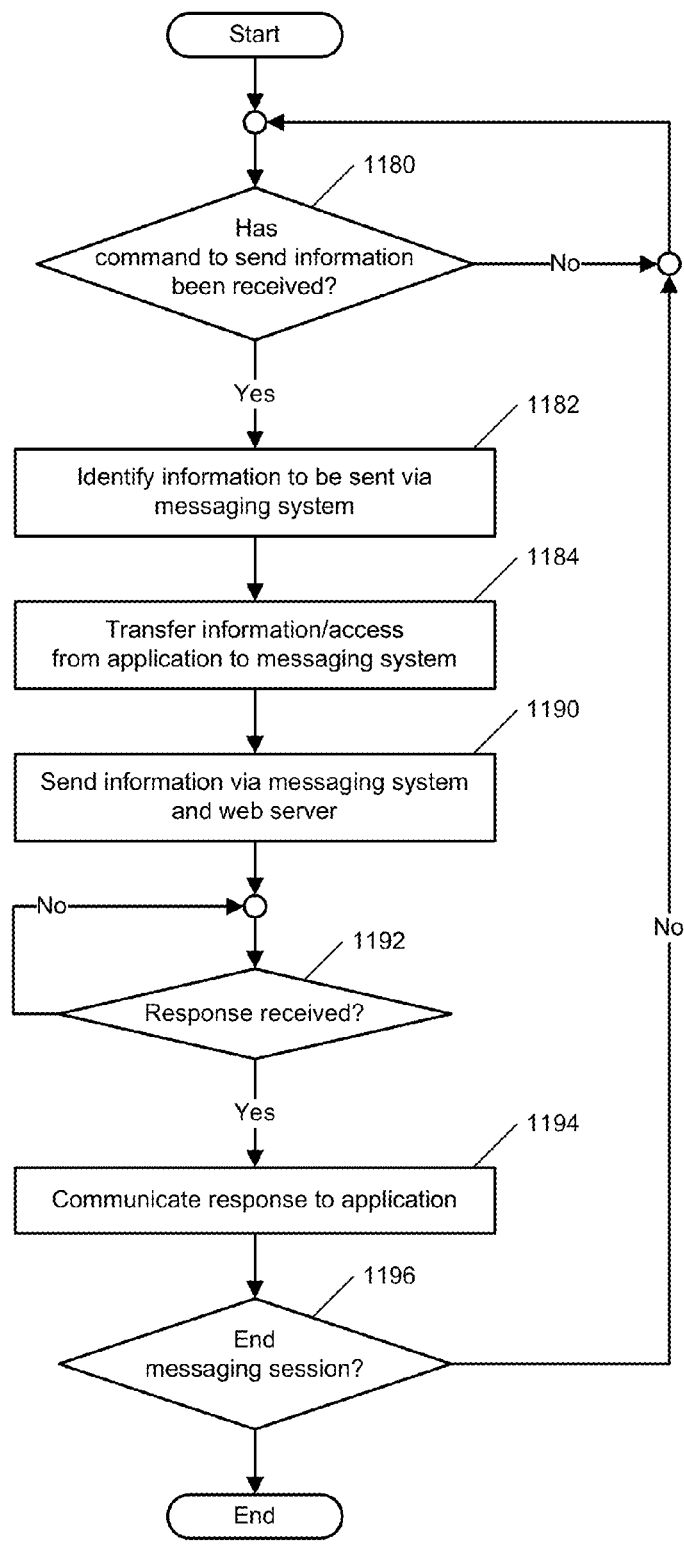
FIG. 11D is a flow diagram illustrating a generic example of operations performed in sending information to/receiving information from a client using a messaging system, according to embodiments of the present invention.

FIG. 11D is a flow diagram illustrating a generic example of operations performed in sending/receiving information to/from a client using a messaging system according to embodiments of the present invention. The process of FIG. 11D begins with a determination as to whether a command to send information via the messaging system has been received (step 1180). While awaiting the receipt of such a command, the process loops (step 1180).

Once the messaging system receives such a command, the messaging system performs processing to identify the information to be sent via the messaging system (step 1182). More detailed examples of such operations are discussed in connection with FIG. 19 (e.g., with respect to a structured data object (SDO)), and FIGS. 37A and 37B (e.g., with respect to a dynamic form object (DFO)).

Having identified the information to be sent, the information (or access thereto) is transferred from the application to the messaging system (step 1184). More detailed examples of such operations are discussed in connection with FIGS. 20, 21 and 22 (e.g., with respect to an SDO), and FIG. 38 (e.g., with respect to a DFO).

The messaging system then submits the information into the messaging session (step 1190). More detailed examples of such operations are discussed in connection with FIG. 23 (e.g., with respect to an SDO) and FIG. 39 (e.g., with respect to a DFO).

The messaging system then awaits a response from the other party (or parties) to the messaging session (step 1192). Once a response is received (step 1192), the messaging system performs the operations necessary to communicate such response to the application (step 1194). More detailed examples of such operations are discussed in connection with FIG. 24 (e.g., with respect to an SDO) and FIG. 40 (e.g., with respect to a DFO). A determination is then made as to whether the messaging session is to end, or to await further commands to push objects and/or their associated information into the messaging session via the messaging system (step 1196).

As will be appreciated in light of the present disclosure, each of the operations of FIG. 11D may be executed by a module (e.g., a software module) or a portion of a module, or a computer system user. Thus, the above-described method, the operations thereof and modules therefor may be executed on a computer system configured to execute the operations of the method and/or may be executed from computer-readable media. The method may be embodied in a machine-readable and/or computer-readable medium for configuring a computer system to execute the method. Thus, the software modules may be stored within and/or transmitted to a computer system memory to configure the computer system to perform the functions of the module.

The software modules described herein may be received by a computer system, for example, from computer-readable media. Such computer readable media may be permanently, removably or remotely coupled to the computer system. Computer-readable media may non-exclusively include, for example, any number of the following: magnetic storage media (including disk and tape storage media); optical storage media such as compact disk media (e.g., CD ROM, CD R, etc.) and digital video disk storage media; nonvolatile memory storage memory including semiconductor-based memory units such as FLASH memory, EEPROM, EPROM, ROM or application specific integrated circuits; and volatile storage media (including registers, buffers or caches, main memory, RAM, etc.). In a UNIX-based embodiment, the software modules may be embodied in a file, which may be a device, a terminal, a local or remote file, a socket, or other such element. Other new and various types of computer-readable media may also be used to store and/or transmit the software modules discussed herein.

Example Messaging System Architectures and Processes Supporting Application Programs In a messaging system (e.g., a CRM agent-customer environment), a user such as a customer service agent can use predefined forms to gather information from other users (e.g., customers or coworkers). A list of frequently asked questions is defined, and a form is designed for each question beforehand. At the front end, appropriate form widgets are chosen with proper input masking (for sensitive data) and validation, while at the back end, the automatic system flow is defined to consume information submitted via the customer form.

During the messaging session, such predefined forms can be inserted into the message input area (e.g., messaging entry pane), either by selecting an insert button or, perhaps more efficiently, by typing a special prompt in the chat input area. When a form is inserted, users can edit the form before submitting the form into the messaging session, such as typing more help text above or below the form. If a user changes their mind, the user can close the form to undo the insertion. The list of predefined forms available for insertion can be dynamic and context sensitive. For example, before a customer is identified, all the customer-specific forms can be hidden. This list can thus serve as helpful guidance for agents to follow (e.g., when assisting customers with specific problems). Eventually, the form and any accompanying text are submitted into the messaging session.

Figure 12:
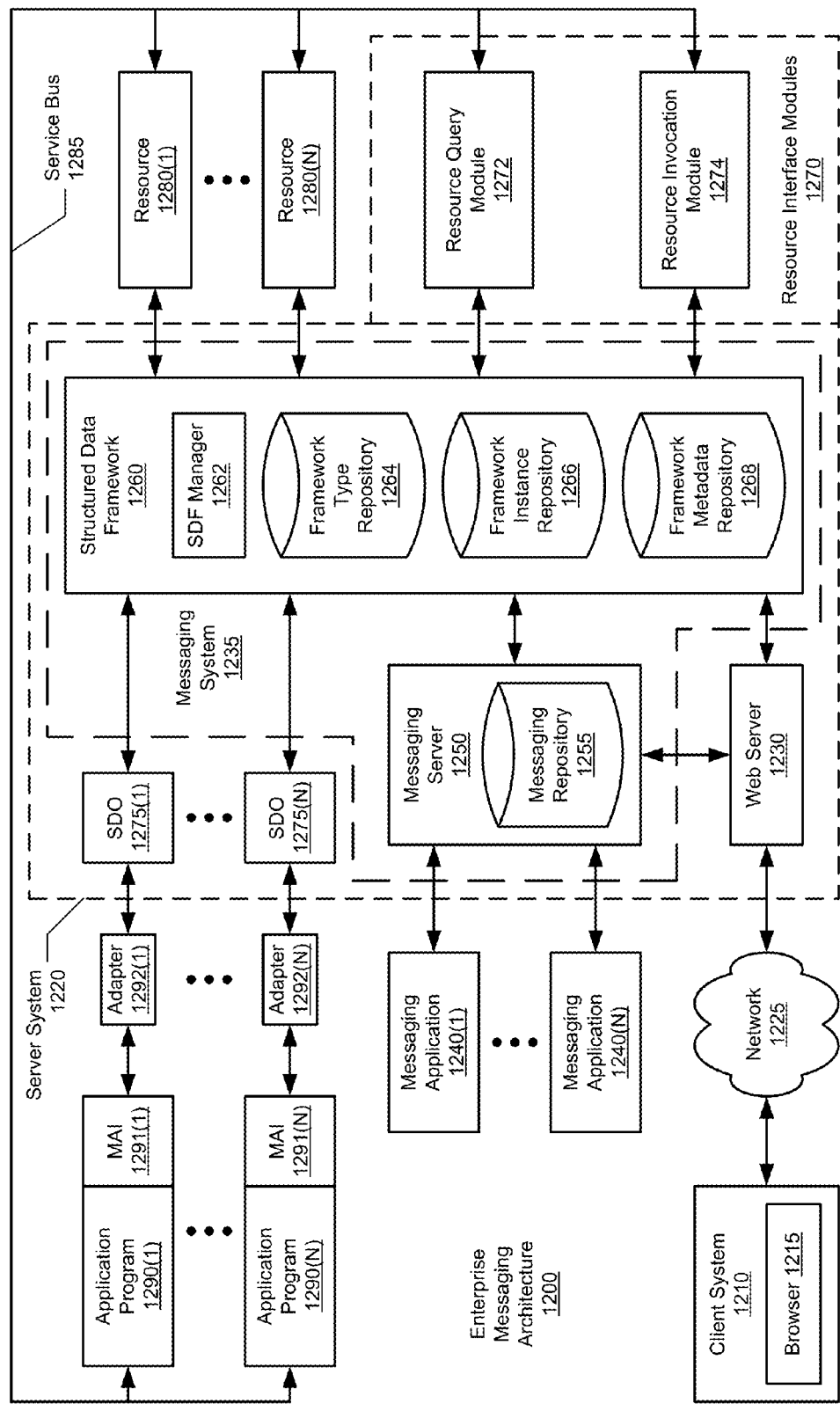
FIG. 12 is a block diagram depicting certain features of a server system and other components of an enterprise messaging architecture, according to embodiments of the present invention.

FIG. 12 is a block diagram depicting certain elements and features of a server system and other components of an enterprise messaging architecture 1200, according to embodiments of the present invention. As will be appreciated from the present disclosure, enterprise messaging architecture 1200 provides greater detail regarding the elements of a server system such as server system 1110 with respect to a implementation in which access by (and to) application programs (e.g., in an enterprise) is provided. In the manner of messaging architecture 1100, enterprise messaging architecture 1200 provides a client system 1210 that supports a browser 1215, and provides browser 1215 with access to a server system 1220 via a network 1225. Server system 1220, in the manner of server system 1110, supports a number of servers and systems, in order to provide the requisite web services and messaging functionality. Among these elements are a web server 1230 and a messaging system 1235.

In enterprise messaging architecture 1200, web server 1230 and messaging system 1235 provide support for one or more messaging applications that allow messaging communications between users accessing server system 1220. Within an enterprise, for example, a user might access server system 1220 (and more specifically, messaging system 1235) through the use of a messaging application such as one or more of messaging applications 1240(1)-(N). In order to support such messaging communications, messaging system 1235 includes a messaging server 1250, which, in turn, includes a messaging repository 1255. Messaging system 1235 can also provide for a structured data framework 1260, which supports a messaging paradigm that includes the ability to push structured data into a message-based messaging session. To support such operations, structured data framework 1250 includes a structured data framework (SDF) manager 1262, a framework type repository 1264, a framework instance repository 1266, and a framework metadata repository 1268, among other such elements.

Server system 1220 supports communications with enterprise systems by direct communication, as well as via constructs such as resource interface modules 1220 (which include, e.g., a resource query module 1272 and a resource invocation module 1274) and structured data objects (SDOs) 1275(1)-(N). As will be appreciated in light of the present disclosure, messaging system 1235 is designed to convey an SDO such as one of SDOs 1275(1)-(N) (or, alternatively, the structured data represented/stored thereby and/or information associated therewith, and/or access thereto) between an application program and/or a messaging application (e.g., one of messaging applications 1240(1)-(N)), and client system 1210, via network 1225 and web server 1230. In so doing, such structured data is conveyed (e.g., in a message) to client system 1210, for presentation in a GUI in which the message is presented (e.g., browser 1215) as a form, for example.

Resource interface modules 1270 support communication between SDF 1260 and one or more resources (depicted in FIG. 12, e.g., as resources 1280(1)-(N)) via a server bus 1285. Resource interface module 1270 and resources 1280(1)-(N) are also able to use service bus 1285 to communicate with one or more application programs (depicted in FIG. 12 as application programs 1260(1)-(N)). Information from application programs 1290(1)-(N) are communicated to structured data objects 1275(1)-(N) via a corresponding one of messaging application interfaces (MAIs) 1291(1)-(N) and adapters 1292(1)-(N), as illustrated in FIG. 12. By providing both messaging system 1235 (and more specifically, structured data framework 1260) and application programs 1290(1)-(N), enterprise messaging architecture 1200 is able to allow users of messaging applications 1240(1)-(N) and users accessing server system 1220 via their browsers (e.g., browser 1215), and thereby communicate structured data from one to the other.

Further, messaging functionality is provided in enterprise messaging architecture 1200, at least in part, by providing messaging system 1235 (and more particularly, SDF 1260) and application programs 1290(1)-(N) (via MAIs 1291(1)-(N) and adapters 1292(1)-(N)) with access to SDOs 1275(1)-(N). To this end, as will be appreciated in light of the present disclosure, SDOs 1275(1)-(N) are depicted in FIG. 12 as being accessed by both SDF 1260 and application programs 1290(1)-(N). In such a scenario, enterprise messaging architecture 1200 can provide messaging system 1235 and application programs 1290(1)-(N) with shared access to SDOs 1275(1)-(N), for example. In another embodiment, messaging system 1235 and application programs 1290(1)-(N) can alternate accessing SDOs 1275(1)-(N) under the control of SDF 1260 or on "a first come, first served" basis, for example. In fact, any one of a number of methods can be used to provide SDF 1260 and application programs 1290(1)-(N) with access to SDOs 1275(1)-(N). Alternatively, SDOs 1275(1)-(N) can be passed between messaging system 1235 and application programs 1290(1)-(N). The foregoing alternatives, as well as other alternatives comparable thereto, are intended to come within the scope of the present disclosure, which is therefore intended to comprehend such alternatives.

Figure 13:
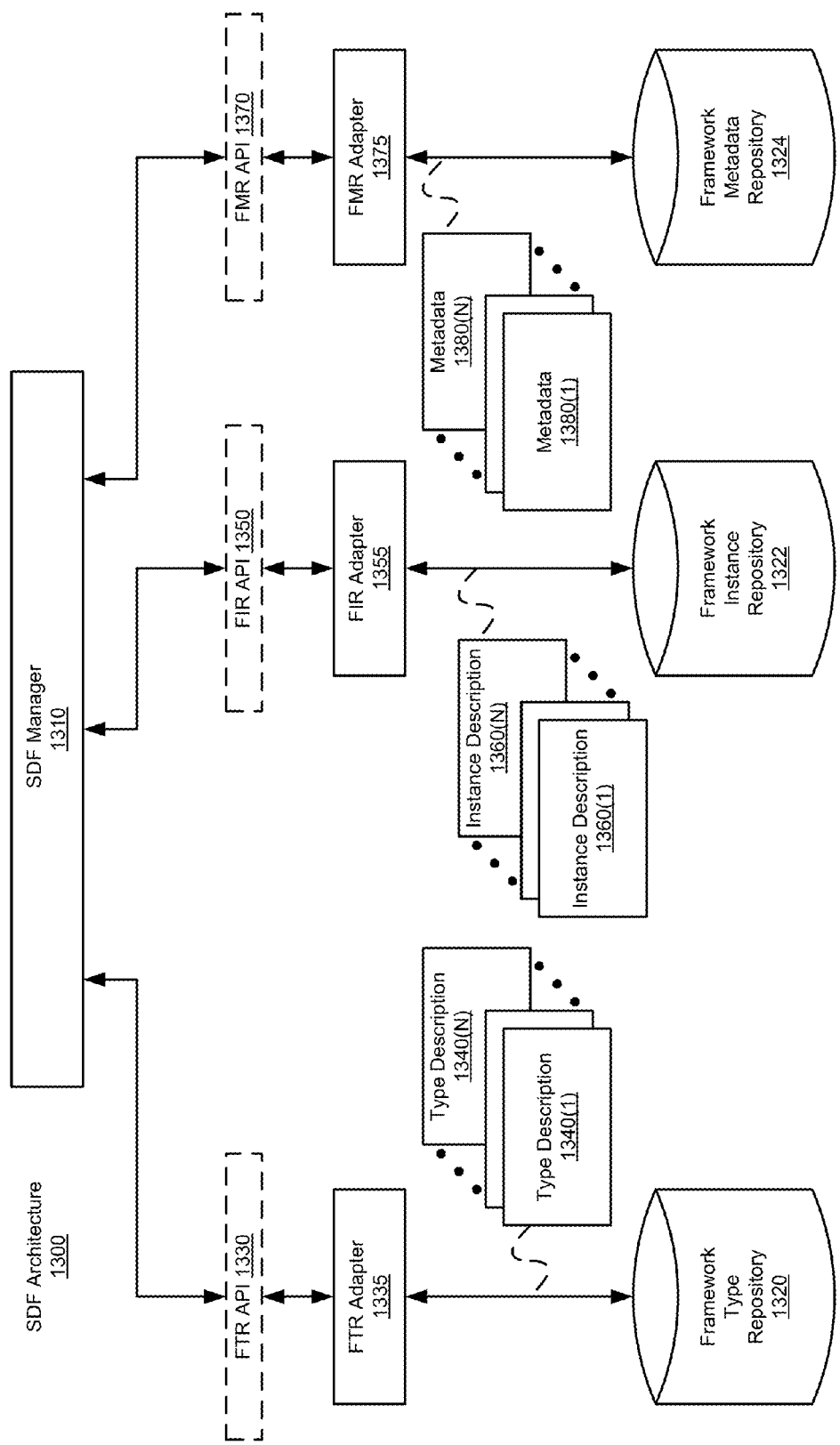
FIG. 13 is a block diagram depicting features of a structured data framework architecture according to embodiments of the present invention.

FIG. 13 is a block diagram depicting certain elements of a structured data framework architecture according to embodiments of the present invention. FIG. 13 depicts a structured data framework (SDF) architecture 1300, which is an example of a data architecture that can be used in a structured data framework according to embodiments of the present invention, such as SDF 1260 of FIG. 12. SDF architecture 1300 provides further detail as to examples of constructs that can be used in creating a structured data framework. Central to SDF architecture 1300 is an SDF manager 1310, which is comparable, in at least certain of its features and functionalities, to SDF manager 1262 of FIG. 12.

In SDF architecture 1300, an SDF manager 1310 (e.g., comparable to SDF manager 1262) is designed to access a framework type repository (FTR) 1320, a framework instance repository (FIR) 1322, and a framework metadata repository (FMR) 1324, among other such constructs. SDF manager 1310 accesses FTR 1320 via a framework type repository (FTR) application programming interface (API) 1330 and an FTR adapter 1335. In so doing, SDF manager 1310 is able to store and retrieve type descriptions such as type descriptions 1340(1)-(N) to and from FTR 1320. Type descriptions 1340(1)-(N) provide information used in the instantiation of SDO instances. An SDO type also allows for the identification of a messaging session to which the SDO type relates, and in so doing, gives participants a common understanding of the information being communicated and its context. In certain embodiments, this relationship can be designed in a manner similar to the programming concept of a class and an object.

In similar fashion, SDF manager 1310 is able to access FIR 1322 via an FIR API 1350, and an FIR adapter 1355. In so doing, SDF manager 1310 is able to store and retrieve instance descriptions such as instance descriptions 1360(1)-(N) to and from FIR 1322. SDO instances are thus stored in FIR 1322. As noted, the instantiation of SDO instances represented by instance descriptions 1360(1)-(N) can employ information maintained in type descriptions 1340(1)-(N).

Similarly, SDF manager 1310 is also able to access FMR 1324 via an FMR API 1370, and an FMR adapter 1375. In so doing, SDF manager 1310 is able to store and retrieve metadata such as metadata 1380(1)-(N) to and from FMR 1324. As will be appreciated form the present disclosure, FMR 1324 stores metadata (e.g., metadata 1380(1)-(N)) that describes SDO instances (e.g., the description of certain aspects of instance descriptions 1360(1)-(N)). Additionally, as can be seen in FIG. 13, the application programming interfaces FTR API 1330, FIR API 1350, and FMR API 1370 are depicted as dashed boxes, in order to demonstrate that, while such APIs may include other software modules, FTR API 1330, FIR API 1350, and FMR API 1370 primarily represent the definition of the interface between SDF manager 1310 and their respective repositories.

Figure 14:
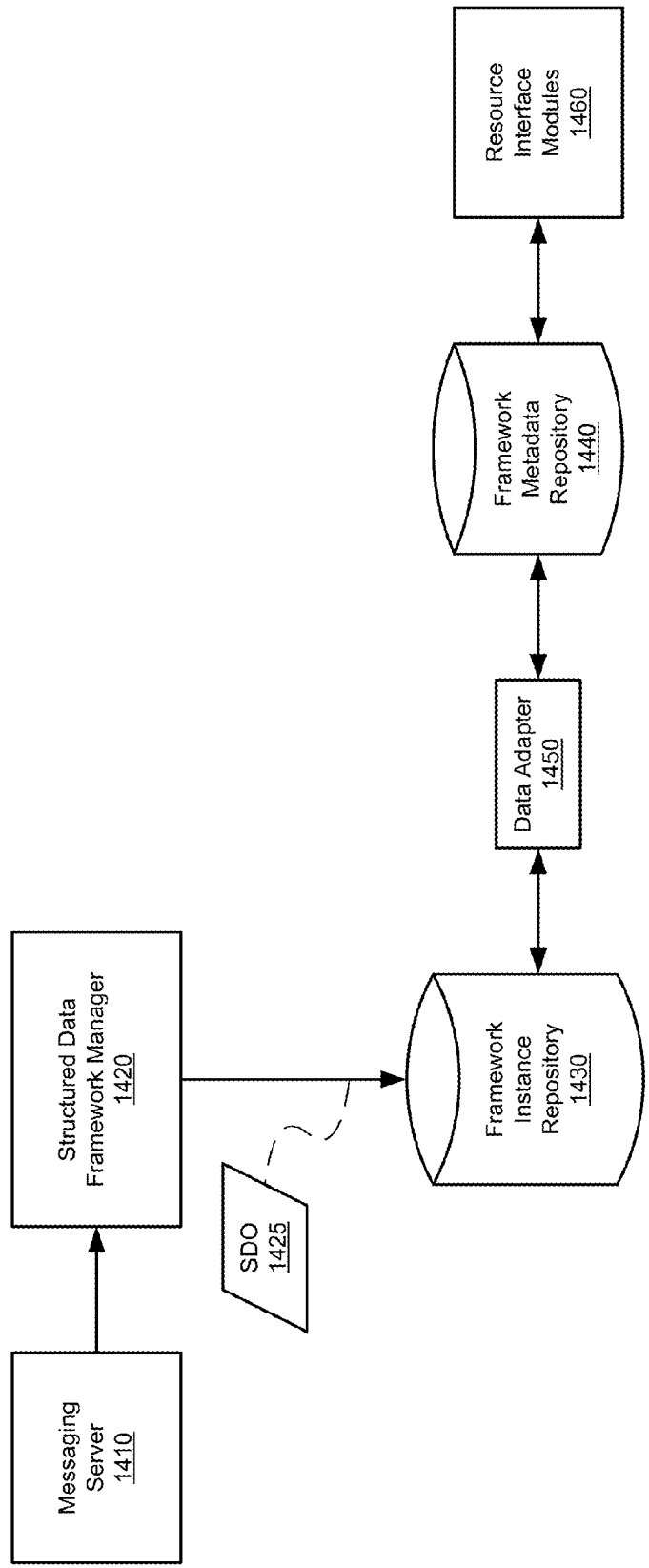
FIG. 14 is a block diagram illustrating an example of an enterprise resource interface architecture according to embodiments of the present invention.

FIG. 14 is a block diagram illustrating an example of an enterprise resource interface architecture according to embodiments of the present invention. FIG. 14 depicts an example of an enterprise resource architecture 1400 and the elements thereof, comparable to certain elements depicted in FIGS. 12 and 13. Enterprise resource architecture 1400 includes a messaging server 1410, a structured data framework manager 1420 (configured to manage an SDO 1425 (e.g., its transfer and use)), a framework instance repository 1430 (configured to manage structured data objects, such as an SDO 1425), a framework metadata repository 1440 (communicatively coupled to framework instance repository by a data adapter 1450), and one or more resource interface modules (depicted in FIG. 14 as resource interface modules 1460). As will be appreciated in light of the present disclosure, messaging server 1410 is comparable to messaging server 1250 of FIG. 12, and structured data framework manager 1420 is comparable to SDF manager 1262 therein. As will be further appreciated, framework instance repository 1430 is comparable to FIR 1266 of FIG. 12, and framework metadata repository 1440 is comparable to FMR 1298 therein. Resource interface modules 1460 are comparable to resource interface modules 1270 of FIG. 12.

Thus, in operation (as well as the manner described in connection with FIG. 13), SDF manager 1420 causes SDO 1425 to be stored in FIR 1430. Further, data adapter 1450 can query FIR 1430 (periodically, if desired, or on an as-needed basis) to determine the state of any recently-updated SDO instances. Such a determination can be made, for example, using metadata retrieved from FMR 1440 (that, possibly, has been retrieved via resource interface modules 1270). This provides agents with the ability to query and track messaging sessions, as well as make such information available to other applications (e.g., via resource interface modules 1270).

Figure 15:
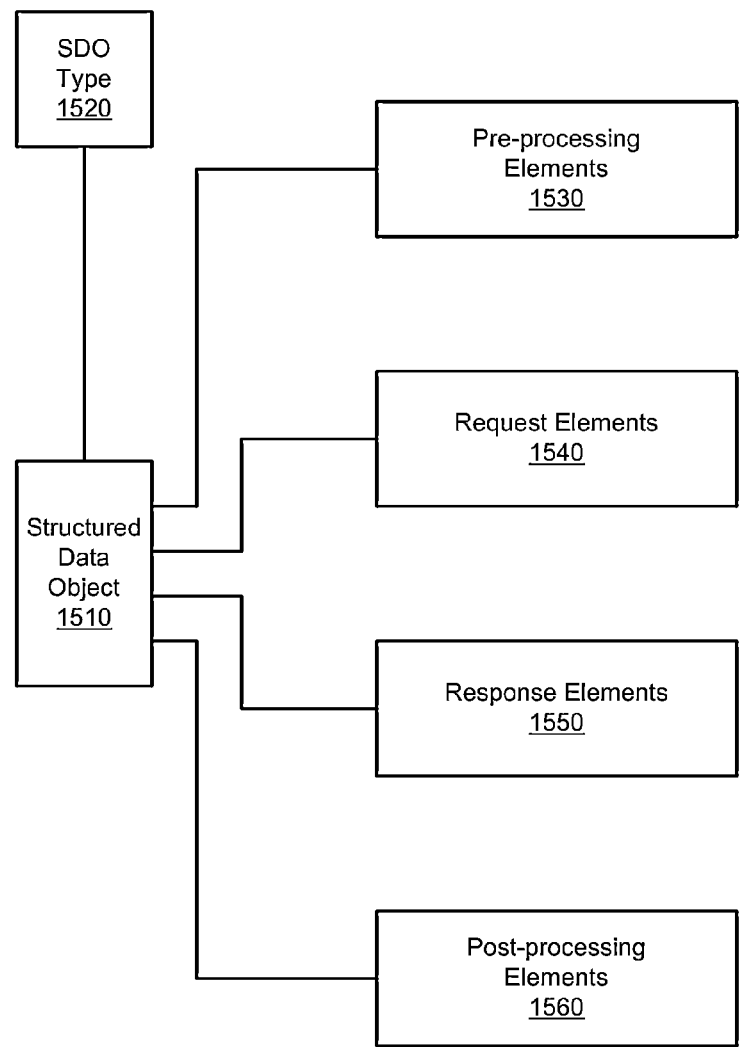
FIG. 15 is a block diagram illustrating an example of a structured data object (SDO) data model set, according to embodiments of the present invention.

FIG. 15 is a block diagram illustrating an example of a structured data object (SDO) data model set, according to embodiments of the present invention. FIG. 15 depicts a SDO data model set 1500, in which a structured data object 1510 is defined. Structured data object 1510 is based on an SDO type 1520, which defines, at least in part, the data object type of SDO 1510. As will be appreciated in light of the present disclosure, the data model of SDO data model set 1500 can be used, for example, in defining structured data objects such as SDOs 1275(1)-(N) of FIG. 12. Further in this regard, information such as SDO type 1520 can be maintained in the data stores within a structured data framework such as SDF 1260 of FIG. 12 (e.g., FTR 1264).

Structured data object 1510 includes various elements, including one or more pre-processing elements 1530, request elements 1540, response elements 1550, and post-processing elements 1560. Pre-processing elements 1530 generally include elements that are used in defining the attributes of the given SDO prior to its use (e.g., if the SDO's use allowed in the given circumstances). Conversely, post-processing elements 1560 provide for operations that are to occur after the given SDO is used (e.g., providing feedback in the given circumstances, interfacing with an application (e.g., a web application), and the like). A comparable relationship exists between request elements 1540 and response elements 1550, which provide for definitions regarding information requests made via the given SDO (e.g., the programmatic constructs used to represent the form sent to the customer by the agent) and the information received in reply (e.g., the programmatic constructs used to represent the information sent in reply thereto).

Figure 16:
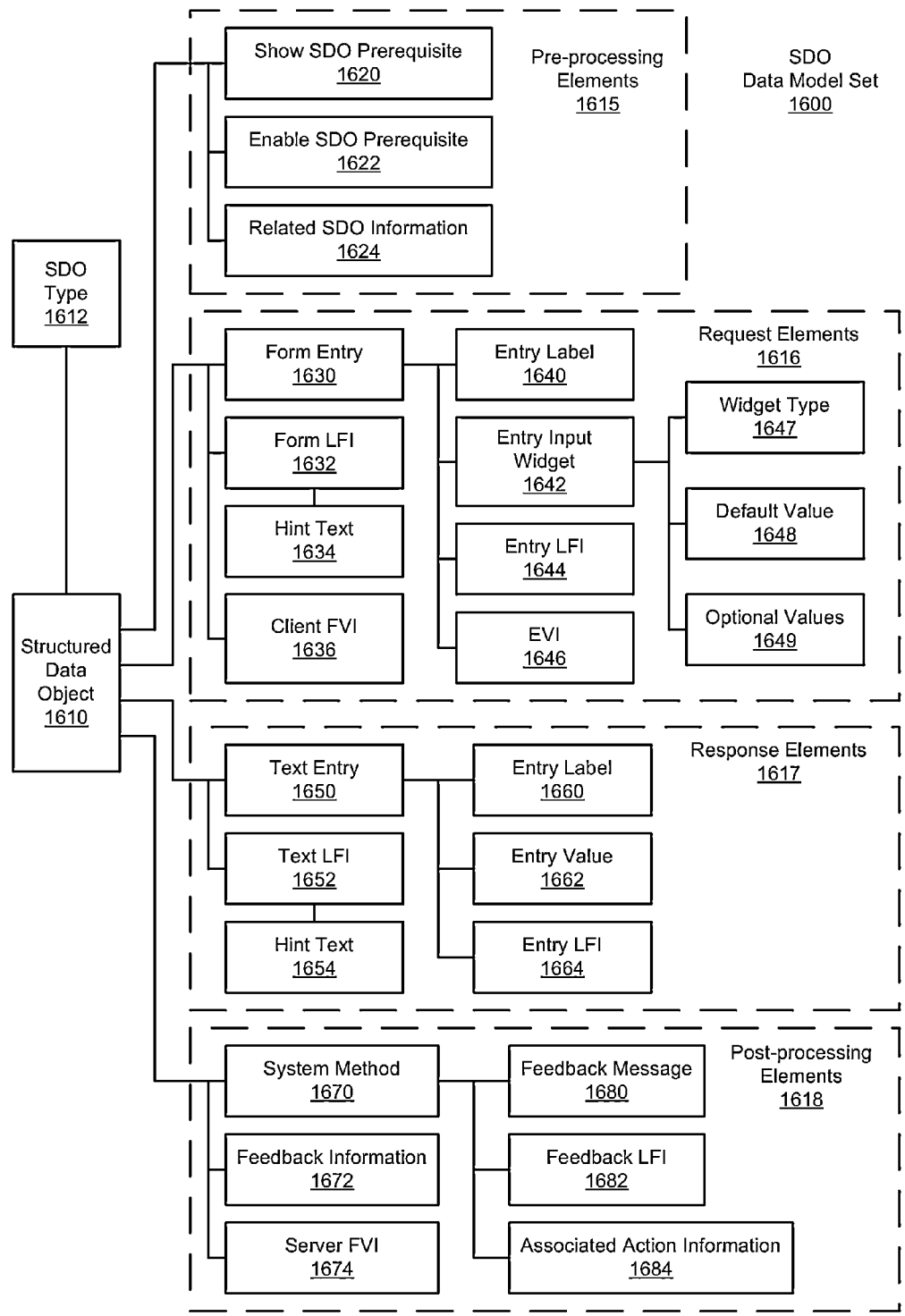
FIG. 16 is a block diagram illustrating an example of an SDO data model set, according to embodiments of the present invention.

FIG. 16 is a block diagram illustrating an example of an SDO data model set, according to embodiments of the present invention. FIG. 16 depicts an SDO data model set, such as that depicted in FIG. 15, in greater detail (and which appears in FIG. 16 as an SDO data model set 1600). SDO data model set 1600 includes a structured data object 1610, which is based on an SDO type 1612. SDO type 1612 defines, at least in part, the data object type of SDO 1610. As will be appreciated in light of the present disclosure, the data model of SDO data model set 1600 can be used, for example, in defining structured data objects such as SDOs 1275(1)-(N) of FIG. 12. Further in this regard, information such as SDO type 1612 can be maintained in the data stores within a structured data framework such as SDF 1260 of FIG. 12 (e.g., FTR 1264).

Structured data object 1610 includes various elements, including one or more pre-processing elements 1615, request elements 1616, response elements 1617, and post-processing elements 1618. Pre-processing elements 1615 generally include elements that are used in defining the attributes of the given SDO prior to its use. To this end, pre-processing element 1615 can include, for example, a show SDO prerequisite 1620 (which determines whether or not a given SDO is visible in the interface (and so, potentially available for use)), an enable SDO prerequisite 1622 (which determines whether or not a visible SDO is actually available for use), and related SDO information 1624. Conversely, post-processing elements 1618 provide for operations that are to occur after the given SDO is used.

A comparable relationship exists between request elements 1616 and response elements 1617, which provide for definitions regarding information requests made via the given SDO and the information received in reply. Thus, request elements 1616 generally include elements that are used in defining the structure, behavior, and attributes of the given form, as well as information requested thereby. To this end, request elements 1616 can include, for example, a form entry 1630. Associated with form entry 1630 is form look and feel information (LFI) 1632 (having associated therewith hint text 1634) and client form validation information (FVI) 1636. As noted, then, form entry 1630 and its associated elements provide definitional information as to the structure and behavior of a given form being pushed into a messaging session. Further, LFI 1632 provides information regarding the appearance of the form, while hint text 1634 allows a form to provide hints as to the values to be entered into a given field. Also included in request element 1616 is an entry label 1640, having associated therewith an entry input widget 1642, entry look and feel information (entry LFI, or ELFI) 1644, and entry validation information (EVI) 1646. Associated with entry input widget 1642 are a widget type 1647 (the type of widget, if any, used as part of the given form), a default value 1648 (which, as its name implies, provides a default value for a given entry), and optional values 1649. EVI 1646 and client FVI 1636 provide information that allows widgets in the form to validate information entered into the form (see, e.g., FIG. 49 and its associated description). Similarly, LFI 1632 and ELFI 1644 can be employed to control the look-and-feel of the form and its elements when requesting information.

In a similar fashion, response elements 1617 generally include elements that are used in defining the structure and attributes of a response to a given form. To this end, response elements 1617 include a text entry 1650. Associated with text entry 1640 is text LFI 1652, which can be used to control the look-and-feel of the form and its elements upon a response being communicated. In turn, hint text 1654 is associated with text look and feel information 1652, and is used to provide a hint as to the given field. Response element 1617 further includes an entry label 1660. Associated with entry label 1660 are an entry value 1662 (which can contain the information responsive to the request) and ELFI 1664 (which can be used to control the look-and-feel of the entry in question).

As noted, post-processing elements 1618 provide for operations that occur after the given SDO is used (e.g., how the SDO is accessed, information regarding the SDO and its use, actions to be taken in light thereof, and so on). Post-processing elements 1618 thus can include a system method 1670, having associated therewith feedback information 1672 and server form validation information 1674. Another of post-processing elements 1618 is a feedback message 1680. Associated with feedback message 1680 are feedback look and feel information 1682 and associated action information 1684.

Figure 17:
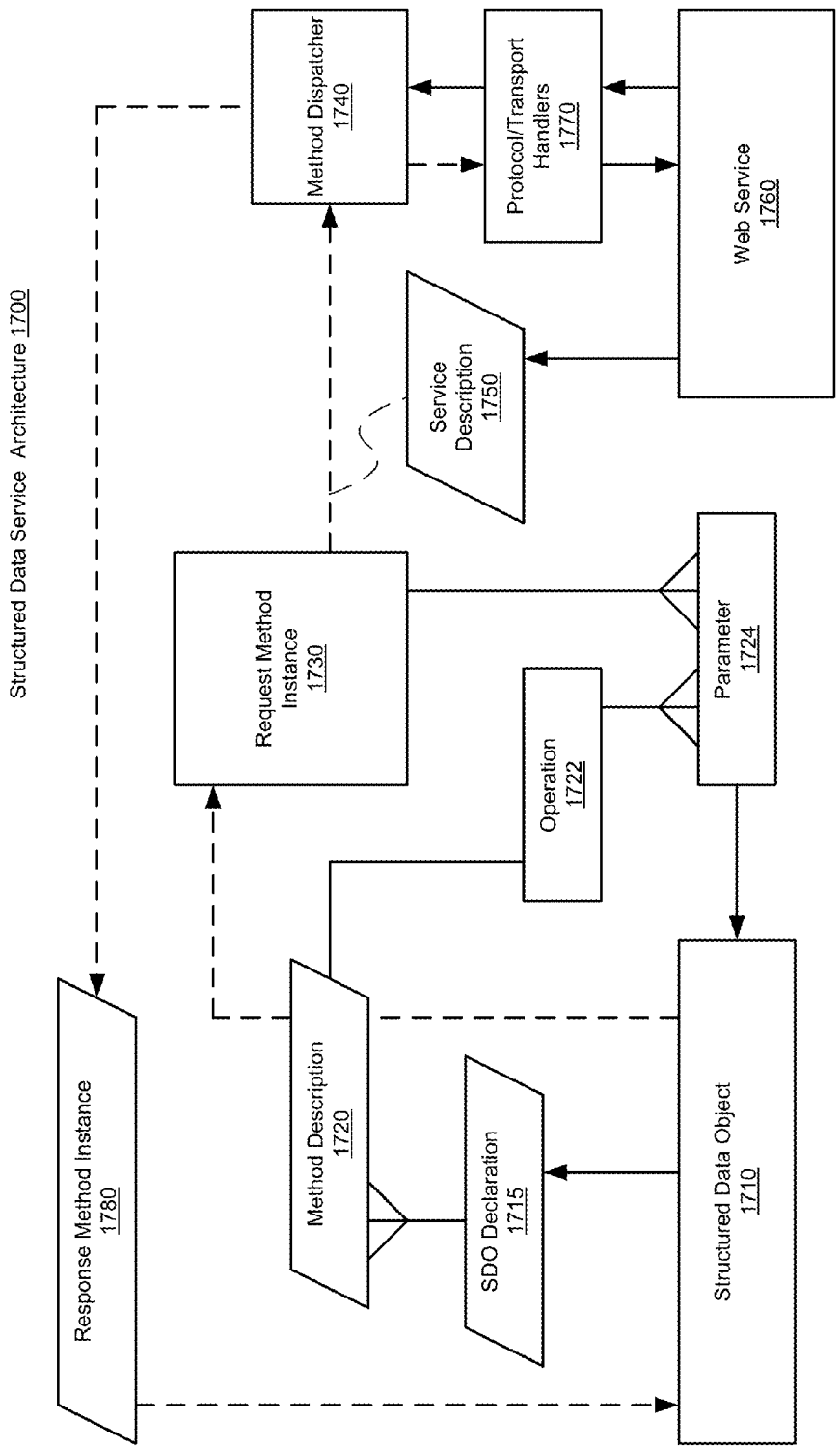
FIG. 17 is a block diagram illustrating an example of a structured data service architecture according to embodiments of the present invention.

FIG. 17 is a block diagram illustrating an example of a structured data service architecture according to embodiments of the present invention. FIG. 17 depicts an example of the structures of, and operations within a structured data service architecture 1700, which are involved in providing support for a message system according to embodiments of the present invention by allowing the invocation of one or more requisite methods. Within structured data service architecture 1700, and as noted generally with regard to data model 1170, a structured data object (depicted in FIG. 17 as structured data object 1710) exists in structured data service architecture 1700 as an instance (i.e., having been instantiated). Structured data object 1710, in the manner data model 1170, refers to an SDO declaration 170 which, in turn refers to a method description 1720. SDO declaration 1715 can be specified, for example, using a description language.

Method description 1720, in turn, refers to one or more operations (an example of which is depicted in FIG. 17 as an operation 1722). In turn, operation 1722 refers to one or more parameters (an example of which is depicted in FIG. 17 as a parameter 1724). Parameters such as parameter 1742 can contain information, one or more references to the contents of one or more fields of structured data object 1710, and/or the like. In a scenario in which the method description is invoked, the then-existing contents of structured data object 1710 are used to create a method instance (depicted in FIG. 17 as a request method instance 1730).

As is shown in FIG. 17, request method instance 1730 may refer to one or more of the parameters of structured data object 1710 (e.g., parameter 1724). Once a request method has been instantiated as a request method instance (e.g., request method instance 1730), a method dispatcher 1740 determines the manner in which to conduct communications with the web service in question (e.g., which protocol and transport mechanism(s) to employ in conducting such communications). Method dispatcher 1740 can, for example, make this determination using the contents of request method instance 1730 and one or more service descriptions (e.g., as depicted in FIG. 17 as a service description 1750). Method dispatcher 1740, having made such a determination, then invokes the requisite web service (depicted in FIG. 17 as a web service 1760) via the appropriate protocol/transport handlers (depicted in FIG. 17 as protocol/transport handlers 1770). Once web service 1760 has been invoked via protocol/transport handler 1770, web service 1760 provides its response to method dispatcher 1740 via protocol/transport handlers 1770. In response to the receipt of this information by method dispatcher 1740, method dispatcher 1740 creates a response method instance 1780, which can then be used to update structured data object 1710.

Figure 18:
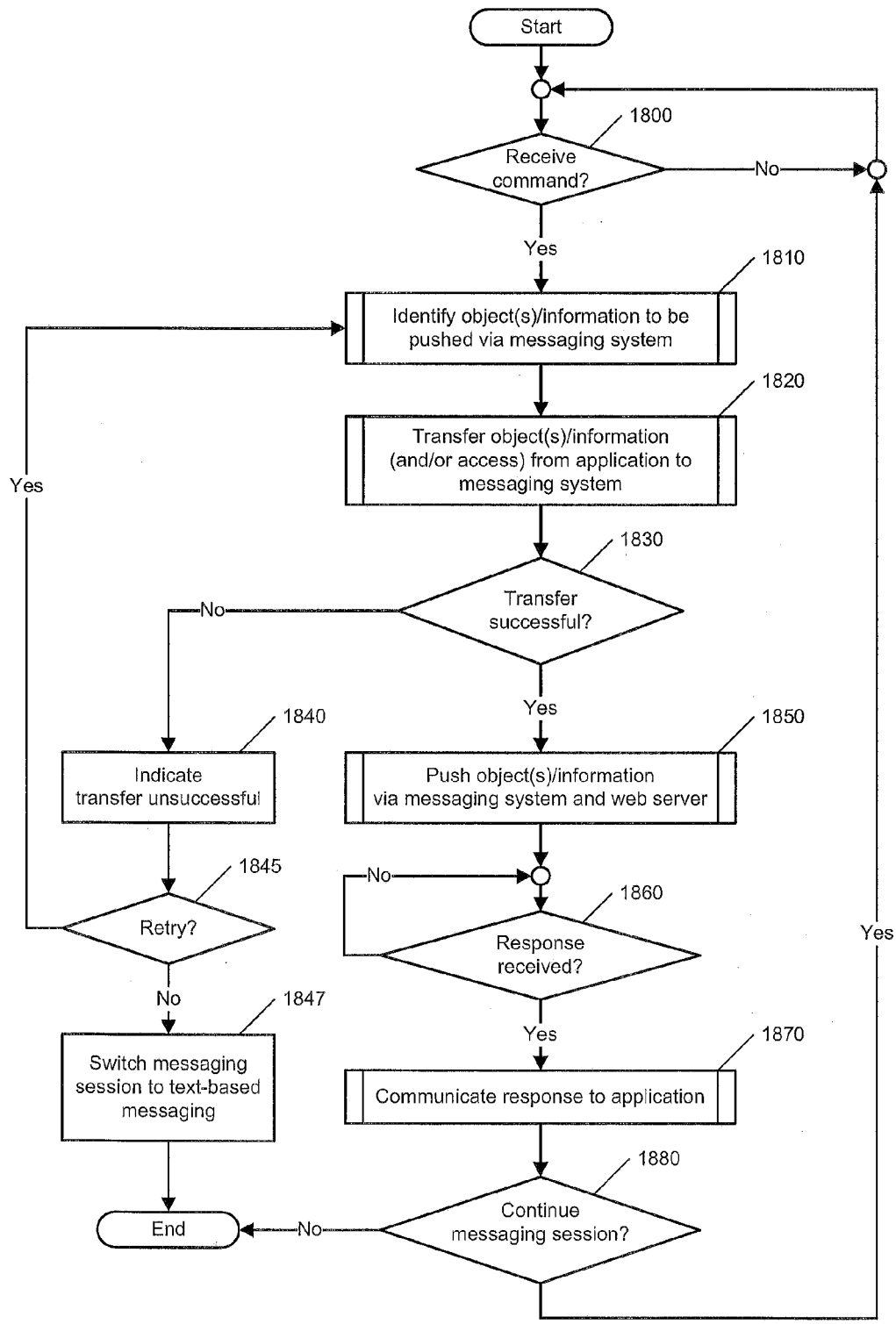
FIG. 18 is a flow diagram illustrating an example of operations performed in pushing an object to and receiving an object from a client using a messaging system, according to embodiments of the present invention.

FIG. 18 is a flow diagram illustrating an example of operations performed in pushing/receiving one or more SDOs (and/or information associated therewith/representative thereof) to/from a client using a messaging system according to embodiments of the present invention. The process of FIG. 18 begins with a determination as to whether a command to push structured data via the messaging system has been received (step 1800). While awaiting the receipt of such a command, the process loops (step 1800).

Once the messaging system receives such a command, the messaging system performs processing to identify the SDO(s)/structured data (and/or information associated therewith) to be pushed via the messaging system (step 1810). The details of such operations are discussed in connection with FIG. 19. Having identified the SDO(s)/structured data and/or associated information to be pushed, the SDO(s) and/or associated information (or access thereto) are transferred from the application software to the messaging system (step 1820). The details of such operations are discussed in connection with FIGS. 20, 21 and 22.

A determination is then made as to whether the SDO(s)/structured data and/or associated information were successfully transferred from the application to the messaging system (step 1830). If the transfer was unsuccessful, an indication that the transfer was unsuccessful is provided to, for example, the messaging system (e.g., for presentation to one or more of the users involved in the messaging session) (step 1840). Once this indication is provided, a determination is then made (step 1845) as to whether the messaging system should restart the process, in an attempt to successfully transfer the SDO(s)/structured data/information from the application to the messaging system, or to switch the messaging session to text-based messaging (step 1847). In the latter case, the messaging session continues, albeit without using the given form. As will be appreciated in light of the present disclosure, the switch to text-based messaging can indicate that only the form in question will not be employed, or that the messaging session will use text-based messaging from that point forward (or until some condition is met). If another attempt to transfer the SDO(s)/structured data/information is to be made, the process loops back to identifying the SDO(s)/structured data/information to be pushed via the messaging system (step 1810). However, if the messaging session is to switch to text-based messaging (step 1847), any operations requisite to switching to such text-based messaging are performed, such that the messaging session can proceed on a text-based messaging basis, and the process (at least with respect to the given SDO(s)/structured data/information) concludes.

As will be appreciated in light of the present disclosure, the messaging session can proceed in a number of ways at this point, including switching to text-based messaging for the remainder of the messaging session. Alternatively, the messaging system can indicate the situation, ignore the given SDO(s)/structured data/information, allow for text-based messaging, and then attempt to support subsequent transfers of further SDO(s)/structured data/information. These and other such alternatives are intended to be within the scope of embodiments of the present invention described herein.

If the transfer of the SDO(s)/structured data/information to the messaging system is successful (step 1830), the messaging system, having received the object and/or object information, pushes the object and/or object information into the messaging session (step 1850). The details of such operations are discussed in connection with FIG. 23.

The messaging system then awaits a response from the other party (or parties) to the messaging session (step 1860). Once a response is received (step 1860), the messaging system performs the operations necessary to communicate such response to the application (step 1870). The details of such operations are discussed in connection with FIG. 24. A determination is then made as to whether the messaging session is to end, or to await further commands to push objects and/or their associated information into the messaging session via the messaging system (step 1880).

Figure 19:
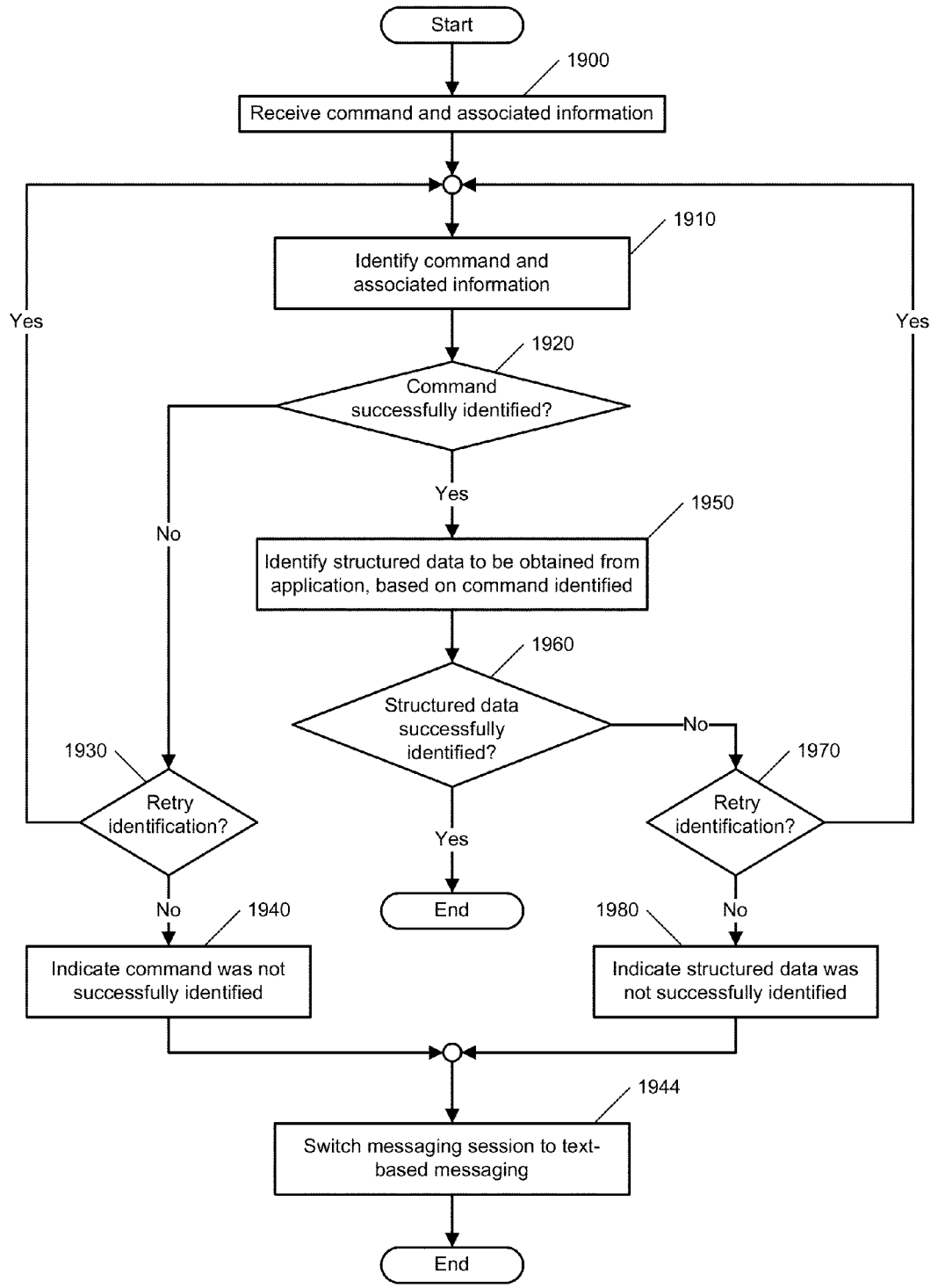
FIG. 19 is a flow diagram illustrating an example of operations performed in identifying structured data to be pushed via messaging system, according to embodiments of the present invention.

FIG. 19 is a flow diagram illustrating an example of operations performed in identifying structured data/information to be pushed via a messaging system according to embodiments of the present invention. FIG. 19 depicts a process in the manner of step 1182 of FIG. 11D with respect to an application program. In this process, a command (and its associated information, if any) and structure data (and/or associated information, SDO, or other information) are identified, in order to push the structured data/information into a messaging session. The process of FIG. 19 begins with the receipt of the command (and its associated information, if any) (step 1900). Once the command and any associated information have been received, the messaging system identifies any structured data received therewith based, at least in part, on the command and any associated information thus received (step 1910), which may include analysis of the command and any associated information. A determination is then made as to whether the command (as well as any associated information) has been successfully identified (step 1920). If such identification has not been successful, a determination is made as to whether the identification process should be retried (step 1930). If the identification process is to be retried, the process loops back to the identification of the command/command information (step 1910). If the identification process is not to be retried, the messaging system indicates that a problem has occurred in the identification of the command (step 1940). In such a situation, typically, the messaging system then switches the messaging session to text-based messaging (step 1944), and the messaging session proceeds. As will be appreciated in light of the present disclosure, one or both users can also be given the option, upon the aforementioned indication, to simply conclude the messaging session in such a situation. In the case in which the given structured data is not sent, but the messaging session will continue, the messaging session simply proceeds. In that event, the process of FIG. 19 concludes, the structured data in question remaining unsent.

However, if the command/command information are successfully identified (step 1920), any structured data needing to be obtained from the application is identified, based at least in part on the command (and, possibly, associated information) thus identified (step 1950). A determination is then made as to whether the structured data to be obtained from the application has been successfully identified (step 1960). If the structured data and command/commend information are successfully identified (steps 1920 and 1960), the structured data is ready for transfer to the messaging system. The process then concludes.

However, if the structured data to be obtained from the application has not been successfully identified (step 1960), a determination is made as to whether the identification process should be retried (step 1970). If the identification process is to be retried, the process loops back to the identification of the command/command information (step 1910). If the identification process will not be retried, the messaging system indicates that the structured data was not successfully identified (step 1980). As before, the messaging system then switches the messaging session to text-based messaging (step 1944) and the messaging session proceeds. In either event, the process of FIG. 19 concludes, the structured data in question remaining unsent.

Figure 20:
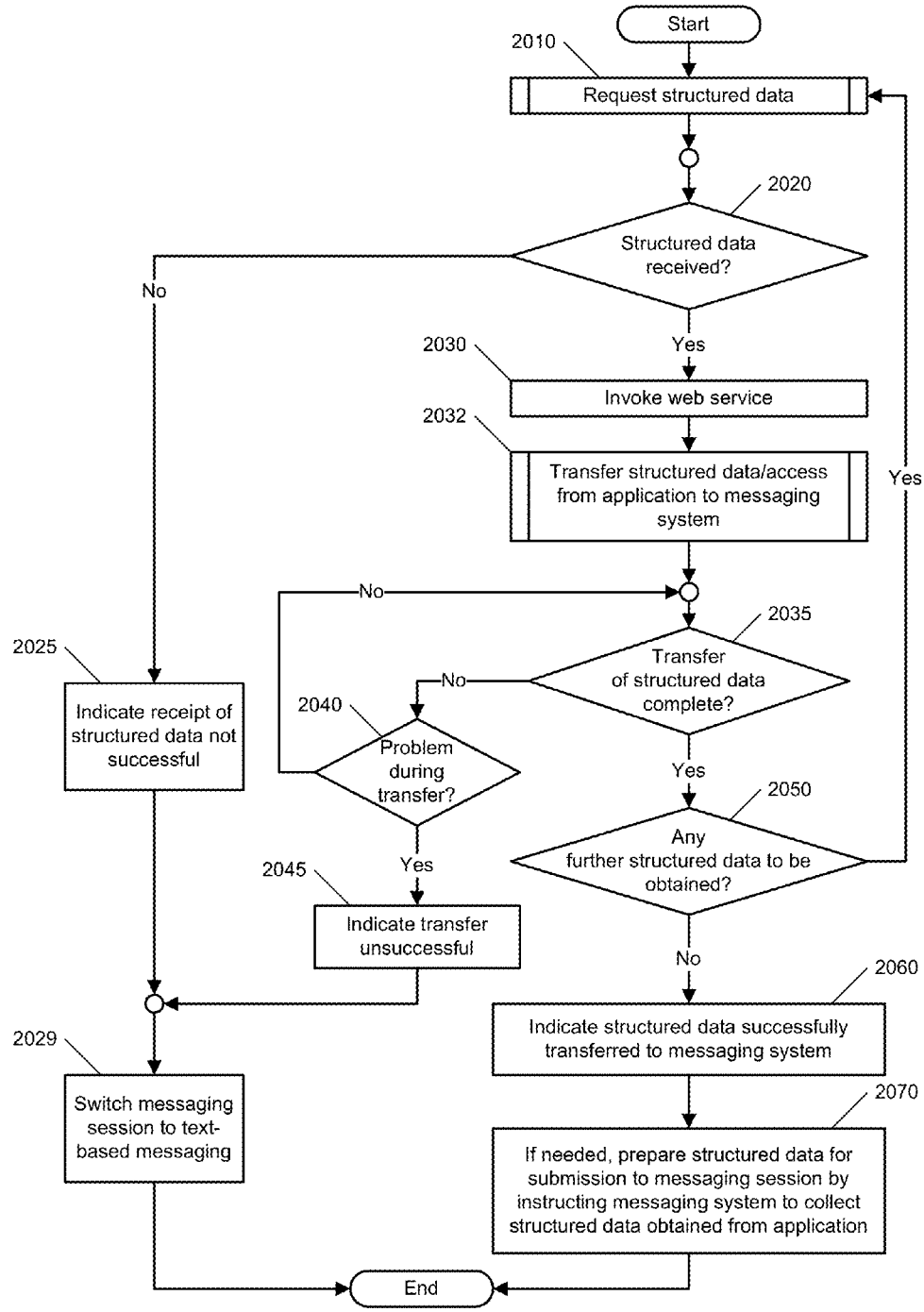
FIG. 20 is a flow diagram illustrating an example of operations performed in retrieving structured data and transferring that structured data from an application program to a messaging system, according to embodiments of the present invention.

FIG. 20 is a flow diagram illustrating an example of operations performed in providing structured data (and/or associated information) to a messaging system, according to embodiments of the present invention. It will be appreciated that, in addition to step 1820 of FIG. 18, the process depicted in FIG. 20 is an example of step 1184 of FIG. 11D with respect to structured data. The process depicted in FIG. 20 provides an example of the operations performed in retrieving structured data/associated information from an application program and transferring that structured data/associated information to the messaging system, using a structured data object.

The process begins with the messaging system requesting the structured data from the application program (step 2010), in order to have such structured data transferred therebetween. The details of such operations are discussed in connection with FIG. 21. Alternatively, while not shown in FIG. 20, it will be appreciated that, in light of earlier discussions and the present disclosure generally, the aforementioned request can be implemented as a request to a control mechanism or, more simply, as access provided by an access sharing scheme, such that access to the SDO in question is transferred from the application program to the messaging system (and so, reflecting an implementation of one of the alternatives discussed earlier in connection with FIG. 12).

A determination is then made as to whether or not the structured data (or access) has been received (step 2020). If necessary, the messaging system waits for the reception of the structured data (or access) to complete (step 2020). Should the structure data not be successfully received from the application, an indication to this effect is provided (step 2025). In such a case, the messaging system can switch the messaging session to text-based messaging, if desired, in the manner noted in connection with FIG. 19 (step 2029). In the case in which this eventuality occurs, the process then concludes.

Alternatively, if the structured data is successfully received (step 2020), the structured data is transferred from the application to the messaging system. In an embodiment of the present invention, this transfer is accomplished by invoking a web service via protocol and transport handlers (step 2030) and then transferring the structured data in question from the application to the messaging system (step 2032). The details of such operations are discussed in connection with FIG. 22. Alternatively, while not shown in FIG. 20, it will be appreciated that, as noted above with regard to the request for an SDO generally, the aforementioned transfer can be implemented as a transfer of access from the application program to the messaging system, as per the corresponding request discussed above.

A determination is then made as to whether the transfer of the structured data has completed successfully (step 2035). While the transfer of structured data is ongoing and no problem has occurred, the process loops (step 2035). However, should a problem occur during the transfer (step 2040), the messaging system provides an indication of such problem's occurrence (step 2045). As before, the messaging system can switch the messaging session to text-based messaging, in the manner noted in connection with FIG. 19 (step 2029). At this point, the process then concludes.

Once the structured data is successfully transferred to the messaging system (step 2035), a determination is then made as to whether any further data remained to be obtained from the application (step 2050). While further data remain to be transferred from the application to the messaging system, the process performs the aforementioned operations, until all such structured data has been transferred to the messaging system (step 2050). Once the requisite structured data has been transferred to the messaging system, an indication is provided that such operations have been completed and the structured data successfully transferred from the application to the messaging system (step 2060). Optionally, the structured data thus transferred can be prepared for submission to the messaging session by having the messaging system collect the structured data obtained from application (step 2070).

Figure 21:
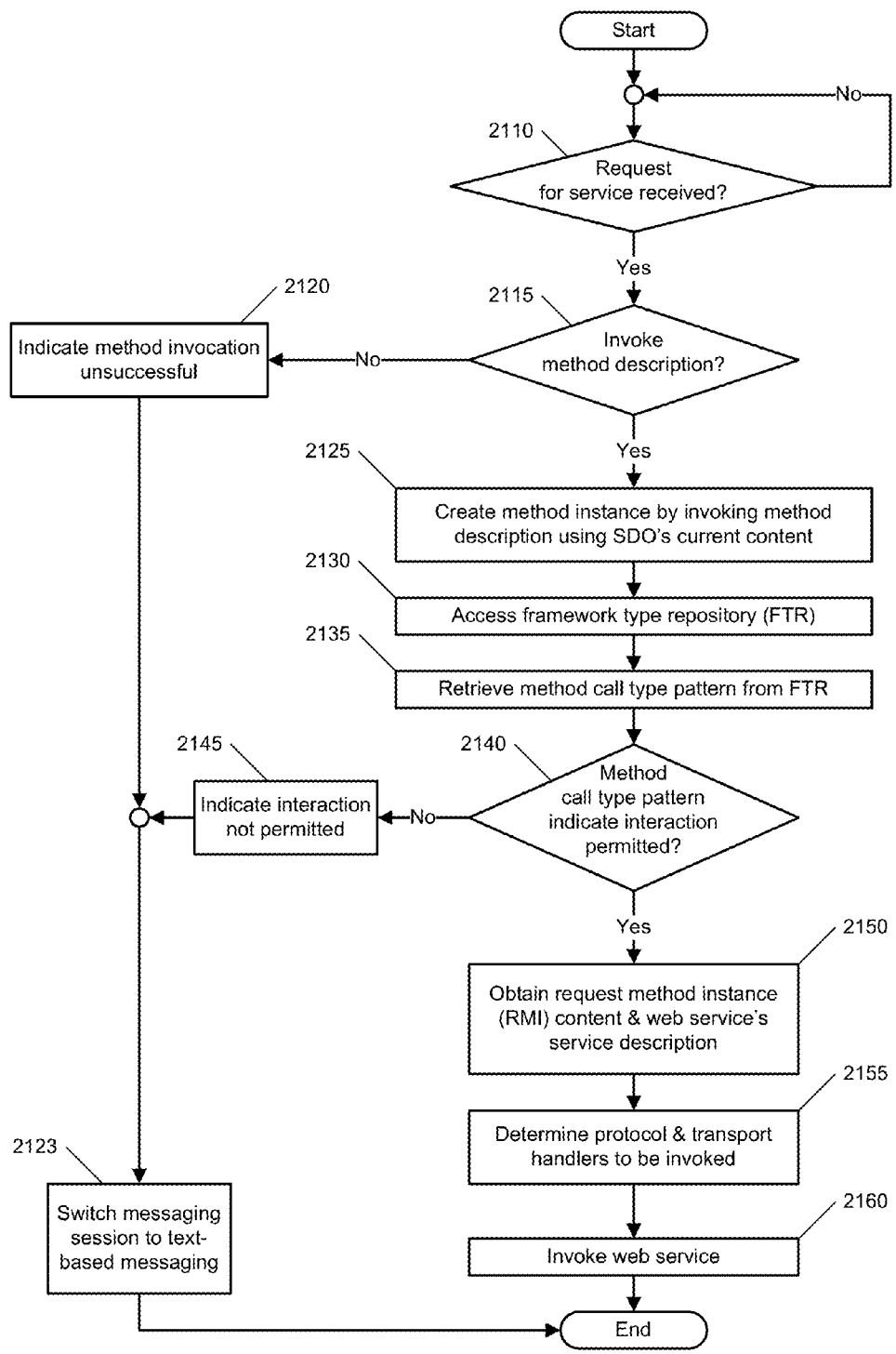
FIG. 21 is a flow diagram illustrating an example of operations performed in requesting structured data from an application program, according to embodiments of the present invention.

FIG. 21 is a flow diagram illustrating an example of operations performed in requesting structured data from an application program, according to embodiments of the present invention. FIG. 21 depicts a process in the manner of step 2010 of FIG. 20. The process of FIG. 21 thus illustrates an example of the operations performed by a messaging system in submitting structured data/SDO and/or associated information into a messaging session, according to embodiments of the present invention. The process begins by awaiting the receipt of the messaging system of a request for service (step 2110). The process loops, awaiting the receipt of such a request (step 2110).

Once such a request has been received, a determination is made as to whether the requisite method description can be invoked (step 2115). If the method invocation is unsuccessful, the messaging system provides an indication to this effect (step 2120). In such a scenario, the messaging system can switch the messaging session to text-based messaging, in the manner noted in connection with FIGS. 19 and 20 (step 2123). At this point, the process then concludes.

However, if the messaging description can be properly be invoked by the messaging system (step 2115), the messaging system creates a method instance by invoking the method description using the structured data object's current content (step 2125). The messaging system then accesses the structured data frameworks framework type repository (FTR) (step 2130), and retrieves a method call type pattern from the FTR (step 2135). A determination is then made as to whether the method call type pattern indicates that such interaction is permitted (step 2140). If the interaction is not permitted, and indication to this effect is provided by the messaging system (step 2145). As before, the messaging system can then switch the messaging session to text-based messaging, in the manner noted in connection with FIGS. 19 and 20 (step 2123). At this point, the process then concludes.

If the interaction is permitted (step 2140), however, the request method instance's (RMI's) content and web service's service description are obtained (step 2150). The service's service description can be formatted using a web services description language (WSDL), for example. Next, the requisite protocol and transport handlers, over which the web service should be invoked, are determined using the RMI content and web service's service description, (step 2155). The web service in question is then invoked via the protocol and transport handlers thus identified (step 2160).

Figure 22:
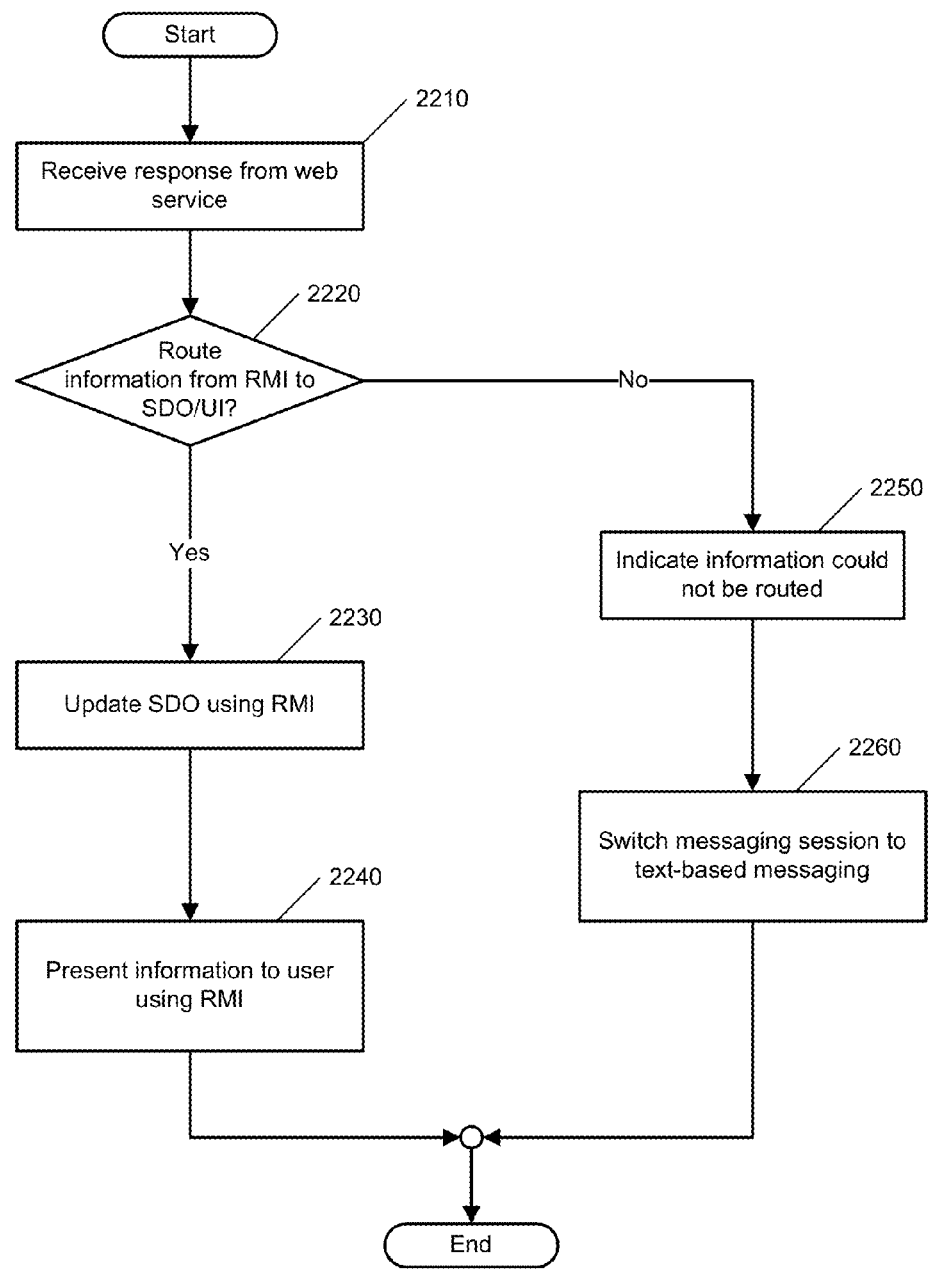
FIG. 22 is a flow diagram illustrating an example of operations performed in transferring structured data from an application program to a messaging system, according to embodiments of the present invention.

FIG. 22 is a flow diagram illustrating an example of operations performed in transferring structured data from an application program to a messaging system, according to embodiments of the present invention. FIG. 22 depicts a process in the manner of step 2031 of FIG. 20. Once the desired web service has been successfully invoked (step 2030 of FIG. 20) and a response method instance created (step 2425 of FIG. 24), the process of FIG. 22 begins with the receipt of a response from the web service (step 2210). A determination is then made as to whether the information in question can be routed from the RMI to the SDO/user interface (UI) (step 2220). If the information can be routed from the RMI to the SDO (step 2220), the SDO is updated using the RMI (step 2230). The information is also routed from the RMI to the user interface, and in so doing, the information is presented to one or more of the users (step 2240).

If none of the aforementioned determinations provide guidance as to the routing of the information from the RMI, the messaging system provides an indication to that effect, indicating that the routing of information from the RMI was not routed (step 2250). In such a scenario, the messaging system can switch the messaging session to text-based messaging, in the manner noted in connection with earlier figures (step 2260). Once the information is routed from the RMI appropriately (or an indication is made as to such routing having not been performed), the process concludes.

Figure 23:
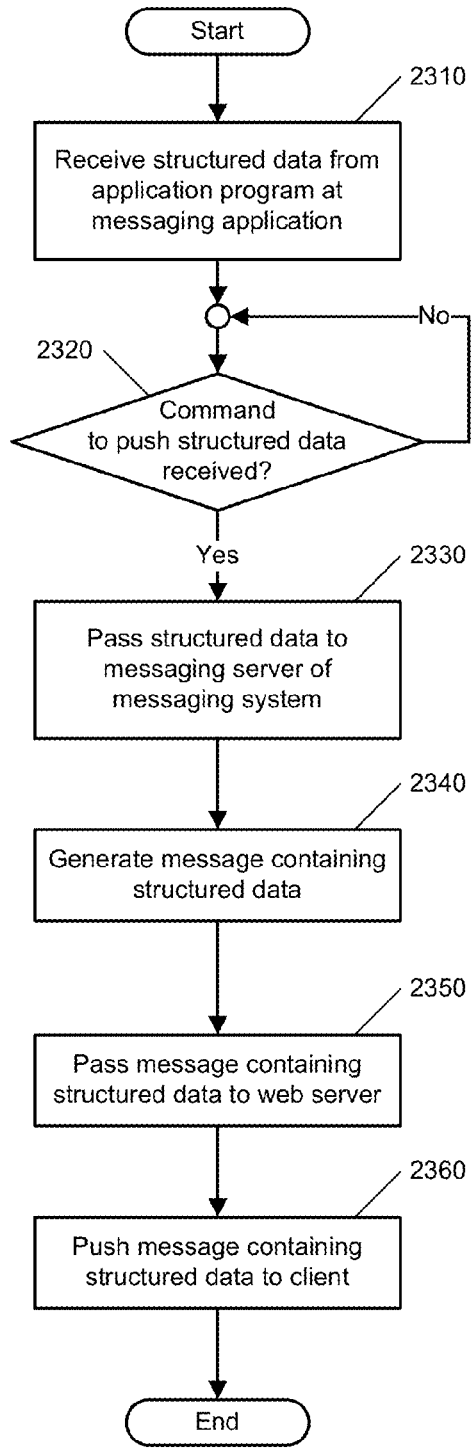
FIG. 23 is a flow diagram illustrating an example of operations performed in pushing structured data via a messaging system, according to embodiments of the present invention.

FIG. 23 is a flow diagram illustrating an example of operations performed in pushing structured data via a messaging system, according to embodiments of the present invention. It will be appreciated that, in addition to step 1850 of FIG. 18, the process depicted in FIG. 23 is an example of step 1190 of FIG. 11D with respect to structured data. The process of FIG. 23 is an example of the operations that can be performed by a messaging system in receiving and presenting structured data via a messaging system. The process of FIG. 23 begins with the receipt of structured data/SDO/related information/access from an application program at a messaging application (step 2310). As noted earlier in connection with FIG. 20, receipt of structured data can, in fact, simply be the messaging application being granted access to the structured data (which can be received as a result of the application program relinquishing its access rights to the structured data, by a control mechanism granting such access, or by some other comparable mechanism).

The messaging system then awaits a command to push the structured data thus received into the messaging session (step 2320). Such a command can take the form of user input provided via a "send" button (e.g., send button 325 of FIG. 3), for example. The process loops until the command is received (step 2320). Once the command has been received (step 2320), the structured data in question is pushed to the messaging server of the messaging system (step 2330). Once in receipt of the structured data thus pushed, the messaging system generates a message containing the structured data (step 2340). The messaging system then passes this message (containing the structured data) to an associated web server (step 2350). The web server then pushes the message contained in the structured data to a client participating in the messaging session via a network coupled there between (step 2360).

Figure 24:
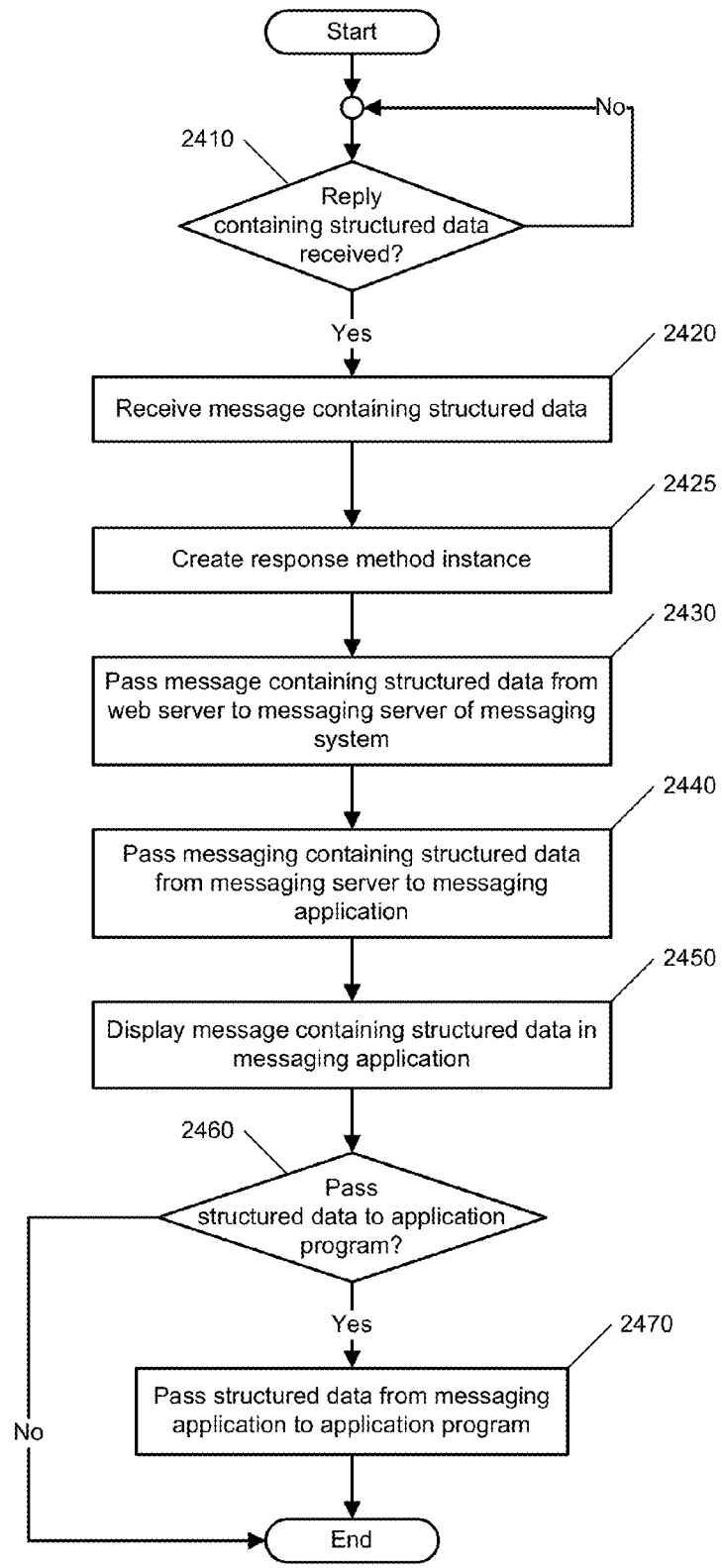
FIG. 24 is a flow diagram illustrating an example of operations performed in conveying a response containing structured data to an application program, according to embodiments of the present invention.

FIG. 24 is a flow diagram illustrating an example of operations performed in conveying a response to a message, containing structured data, to an application program, according to embodiments of the present invention. FIG. 24 depicts an example of a process, comparable to that of step 1194 of FIG. 11D with respect to an application program, in which a messaging system according to embodiments of the present invention receives and processes a message in reply to a message containing structured data. The process of FIG. 24 begins with the receipt of such a reply (step 2410). While no such reply is forthcoming, the process loops (step 2410).

Once such a reply has been received (step 2410), the message containing the structured data is processed at the web server (step 2420). The receipt of this information allows for the creation of a response method instance (step 2425). The web server then passes this message (containing the structured data) to the messaging server of a messaging system associated therewith (step 2430). The messaging system passes the message containing structured data to a messaging application (step 2420). The messaging application, having received the message containing the structured data, then displays the structured data as part of the message thus received (step 2450). A determination is then made as to whether the structured data should also be passed to the application program (or other application software) (step 2460). If the structured data should be passed from the messaging system to the application (step 2460), the messaging system performs the operations necessary to pass the structured data from the messaging application to the enterprise (or other) applications (step 2470). Once the structured data is passed to the appropriate application (or a determination is made that such operations are not to be performed), the process concludes.

In operation, the foregoing mechanisms and facilities allow participants in a messaging session to send and receive forms, and simplify communication via the messaging system, while improving efficiency and accuracy thereof. An example of the communications that might occur in such a system are now presented in Table 1.

TABLE 1

Example messages in HTML format.

| Msg# | Participant | Message |
|------|-------------|---------|
| 1 | Customer | I have an issue |
| 2 | Agent | I am glad to help |
| 3 | Agent | In order to assist you, I'll need your name and your company name:<br>First Name<br>Last Name<br>Company |
| 4 | Customer | First Name Susan<br>Last Name Carron<br>Company Adept Software<br>json162738{"form":"Identity","First_Name":"Susan", "Last_Name":"Carron","Company":"Adept Software"} |
| 5 | Agent | In order to verify your identity, I'll need the Account ID<br>and the Customer PIN:<br>Account ID<br>Customer PIN |
| 6 | Customer | Account ID 23239188<br>Customer PIN 3934<br>json162738{"form":"Verification","Account_ID": "23239188","Customer_PIN":"3934"} |
| 7 | Customer | Account ID 23239189<br>Customer PIN 3934<br>json162738{"form":"Verification","Account_ID": "23239189","Customer_PIN":"3934"} |
| 8 | Agent | In order to find your service request, I'll need the Service Request Number and the Asset Number?<br>Service Request Number<br>Asset Number |
| 9 | Customer | Service Request Number 673426<br>Asset Number xp16438<br>json162738{"form":"Request","Service_Request_Number":"673426","Asset_Number":"xp16438"} |

Table 1 depicts certain portions of the messages being communicated in a graphical format (e.g., as input fields of a form that would be presented to a user receiving such information).

The code that results in the foregoing input fields appears as follows (and is listed in a message-by-message fashion):

```
Message -1 - Customer
<p>
  I have an issue
</p>
<p>
   </p>
Message - 2 - Agent
<p>
  I am glad to help
</p>
<p>
   </p>
Message - 3 - Agent
<div class="chat_form_18253642">
  <p>
    In order to better assist you, I'll need your name and your company
    name:
  </p>
  <div class="form_row">
    <span class="form_row_label"><label>First Name</label>
    </span>
    <input class="form_row_input" name="First_Name" type="text" />
  </div>
  <div class="form_row">
    <span class="form_row_label"><label>Last Name</label></span>
    <input class="form_row_input" name="Last_Name" type="text" />
  </div>
  <div class="form_row">
    <span class="form_row_label"><label>Company</label>
    </span>
    <input class="form_row_input" name="Company" type="text" />
```
```
  </div>
</div>
<div style="clear: both;">
   </div>
<div style="clear: both;">
   </div>
Message - 4 - Customer
<div class="form_submit_in_chat">
  <div class="attribute_row">
    <span class="attribute_label">First Name
    </span>
    <span class="attribute_value">Susan
    </span>
  </div>
  <div class="attribute_row">
    <span class="attribute_label">Last Name
    </span>
    <span class="attribute_value">Carron
    </span>
  </div>
  <div class="attribute_row">
    <span class="attribute_label">Company
    </span>
    <span class="attribute_value">Adept Software
    </span>
  </div>
</div>
<div>
   </div>
json162738{"form":"Identity", "First_Name":"Susan",
"Last_Name":"Carron", "Company":"Adept Software"}
Message - 5 - Agent
<div class="chat_form_18253642">
  <p>
    In order to verify your identity, I'll need the Account ID and the
    Customer PIN:
  </p>
  <div class="form_row">
    <span class="form_row_label">
      <label>
        Account ID
      </label>
    </span>
    <input class="form_row_input" name="Account_ID" type="password"
      /><img class="form_row_img" src="images/lock.png" />
  </div>
  <div class="form_row">
    <span class="form_row_label">
      <label>
        Customer PIN
      </label>
    </span>
    <input class="form_row_input" name="Customer_PIN" type="password" />
    <img class="form_row_img" src="images/lock.png" />
  </div>
</div>
<div style="clear: both;">
   </div>
Message - 6 Customer
<div class="form_submit_in_chat">
  <div class="attribute_row">
    <span class="attribute_label">
      Account ID
    </span>
    <span class="attribute_value">
      23239188
    </span>
  </div>
  <div class="attribute_row">
    <span class="attribute_label">
      Customer PIN
    </span>
    <span class="attribute_value">
      3934
    </span>
  </div>
</div>
<div>
```

-continued

```
       </div>
json162738{"form":"Verification", "Account_ID":"23239188",
"Customer_PIN":"3934"}
Message - 7 - Customer
<div class="form_submit_in_chat">
   <div class="attribute_row">
      <span class="attribute_label">
         Account ID
      </span>
      <span class="attribute_value">
         23239189
      </span>
   </div>
   <div class="attribute_row">
   <span class="attribute_label">
      Customer PIN
   </span>
   <span class="attribute_value">
      3934
   </span>
   </div>
</div>
<div>
    </div>
json162738{"form":"Verification", "Account_ID":"23239189",
"Customer_PIN":"3934"}
Message - 8 - Agent
<div class="chat_form_18253642">
   <p>
   In order to find your service request, I'll need the Service Request
   Number and the Asset Number?
   </p>
   <div class="form_row">
      <span class="form_row_label_long">
         <label>
            Service Request Number
         </label>
      </span>
      <input class="form_row_input" name="Service_Request_Number"
      type="text" />
   </div>
   <div class="form_row">
      <span class="form_row_label_long">
         <label>
            Asset Number
         </label>
      </span>
      <input class="form_row_input" name="Asset_Number" type="text"
/>
   </div>
</div>
<div style="clear: both;">
    </div>
<div style="clear: both;">
    </div>
Message - 9 - Customer
<div class="form_submit_in_chat">
   <div class="attribute_row">
      <span class="attribute_label_long">
         Service Request Number
      </span>
      <span class="attribute_value_short">
         673426
      </span>
   </div>
   <div class="attribute_row">
      <span class="attribute_label_long">
         Asset Number
      </span>
      <span class="attribute_value_short">
         xp16438
      </span>
   </div>
</div>
<div>
    </div>
json162738{"form":"Request", "Service_Request_Number":"673426",
"Asset_Number":"xp16438"}
```

User Interface Examples in a Messaging System Supporting SDOs

Figure 25:
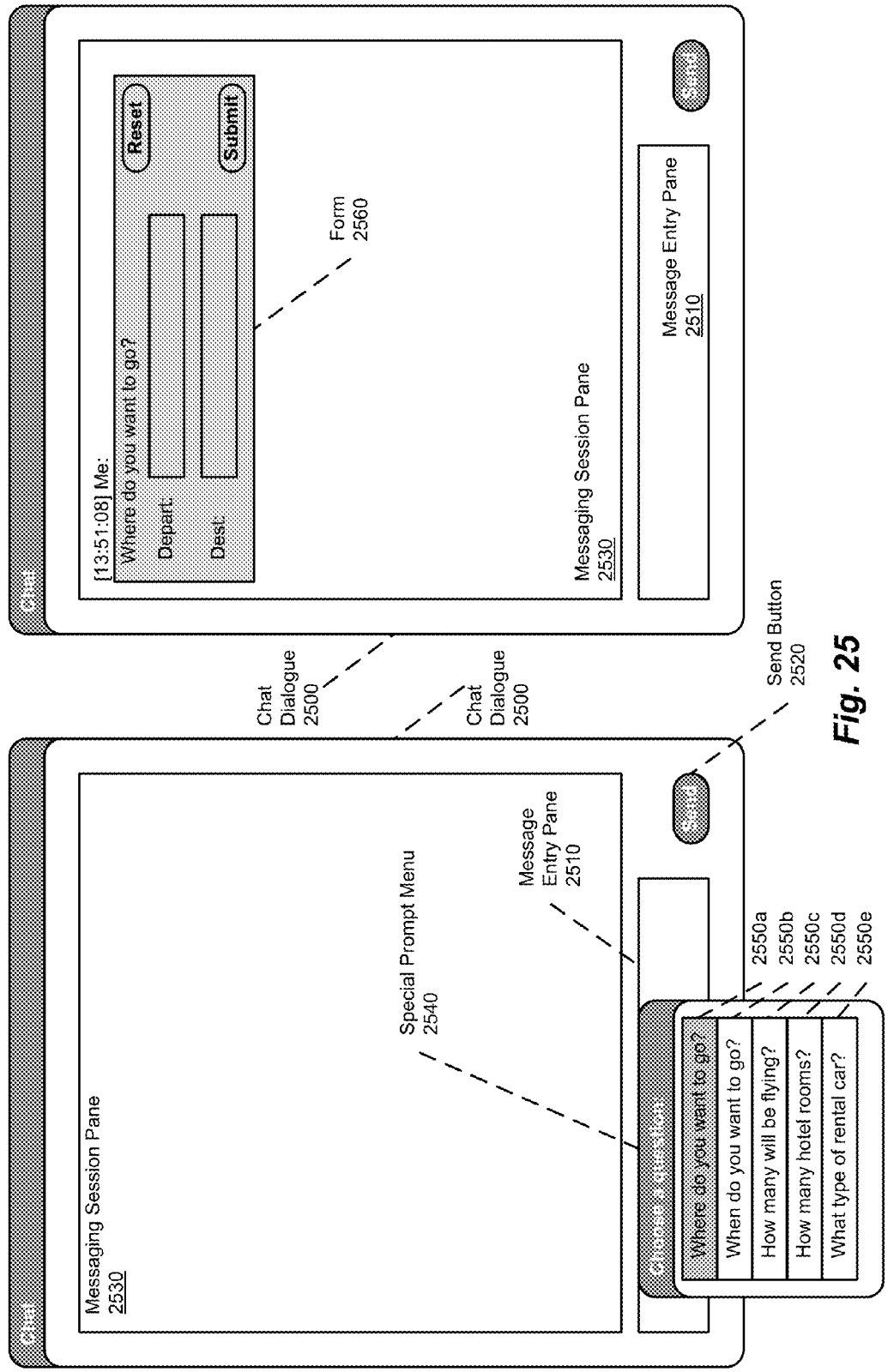
FIG. 25 is a block diagram illustrating examples of an agent dialogue presented by a messaging system according to embodiments of the present invention, in which the insertion of structured data into a web chat is depicted.

FIG. 25 is a block diagram illustrating examples of an agent dialogue presented by a messaging system according to embodiments of the present invention, in which the insertion of structured data into a web chat is depicted. FIG. 25 depicts a chat dialogue 2500 (e.g., such as that which might be used by an agent assisting a customer). In the example depicted in FIG. 25, the user employing chat dialogue 2500 is a customer service agent at a travel agency (the examples of communications presented in FIG. 25 are thus directed to such a scenario). According to certain embodiments, a predefined form is inserted into the messaging session using a special prompt. Such a special prompt can be made accessible, for example, by allowing a user to "right-click" (e.g., select in an area using the right-hand button of a mouse) in a message entry pane 2510. As will be appreciated in light of the present disclosure, a user (e.g., a customer service agent or customer) is presented with a message entry pane in a chat dialogue in order to enter messages for submission to the chat session.

Chat dialogue 2500 supports text-based messaging such as that discussed earlier by allowing a message to be entered into message entry pane 2510, after which the user selects a send button 2520 in order to submit the message into the messaging session. Selection of send button 2520 thus results in the message thus entered being submitted to the messaging session, and so appearing in a messaging session pane 2530, which results in the display of the message not only in messaging session pane 2530, but also in a comparable messaging session pane of the chat dialogue(s) employed by the one or more other users who are parties to the messaging session. In the two examples In the example depicted in FIG. 25, however, the user is able to right-click in message entry pane 2510 in order to access a special prompt, and so display a menu of predefined forms that can be inserted into the messaging session, in the manner noted earlier. The user's action thus results in the display of a special prompt menu 2540. Special prompt menu 2540 provides the user with a number of predefined forms from which the user can choose. In the example depicted in FIG. 25, the selections include several predefined forms (depicted in FIG. 25 as predefined forms 2550a, 2550b, 2550c, 2550d, and 2550e). By selecting one of predefined forms 2550a-2550e, a user can insert the desired form into the messaging session. This is depicted in FIG. 25 with respect to the selection of predefined form 2550a ("Where do you want to go?" and its corresponding predefined form (depicted in FIG. 25 as form 2560)).

As depicted in FIG. 25, the use of a special prompt such as special prompt menu 2540 can be implemented in a number of ways. As depicted in FIG. 25, special prompt menu 2540 is illustrated as being configured to submit the desired predefined form directly into the messaging session upon selection of the requisite predefined form (thereby obviating the need to select send button 2520). Alternatively, the use of special prompt menu 2540 can result in the insertion of the corresponding predefined form in message entry pane 2510. While doing so will then typically necessitate additional actions by the user (e.g., the selection of select button 2520), such an approach also provides for the ability to edit the predefined form prior to its submission into the messaging session.

Further, the selections presented in special prompt menu 2540 can be changed dynamically, presenting the user (e.g., agent) with selections that are particularly pertinent to the given customer, especially likely to be used in the given situation, or driven by other such considerations. For example, a messaging system employing such an approach can be designed to maintain information regarding the forms most commonly used by all agents in a given call center, reflecting the forms in use in an up-to-the-minute fashion. Based on such information, the messaging system can be configured to present an agent with a selection of forms that are the most likely to meet the agent's needs. Further, forms can be listed in special prompt menu 2540 in the order the forms are most likely to be needed, in an alphabetical order, or some other useful and convenient manner. Such a messaging system can also be configured to provide support for scrolling through such forms, allowing the agent access to a larger number of forms than might be able to be displayed. Further still, the selections presented by special prompt menu 2540 can provide a number of "look-and-feel" options for a given form. Indications as to the handling of a given form can also be supported. For example, the agent can be given the ability to choose between submitting the selected form directly into the messaging session (e.g., directly into messaging session pane 2530, by right-clicking on the given selection) or into message entry pane 2510 (e.g., by hitting the "Enter" key).

Figure 26:
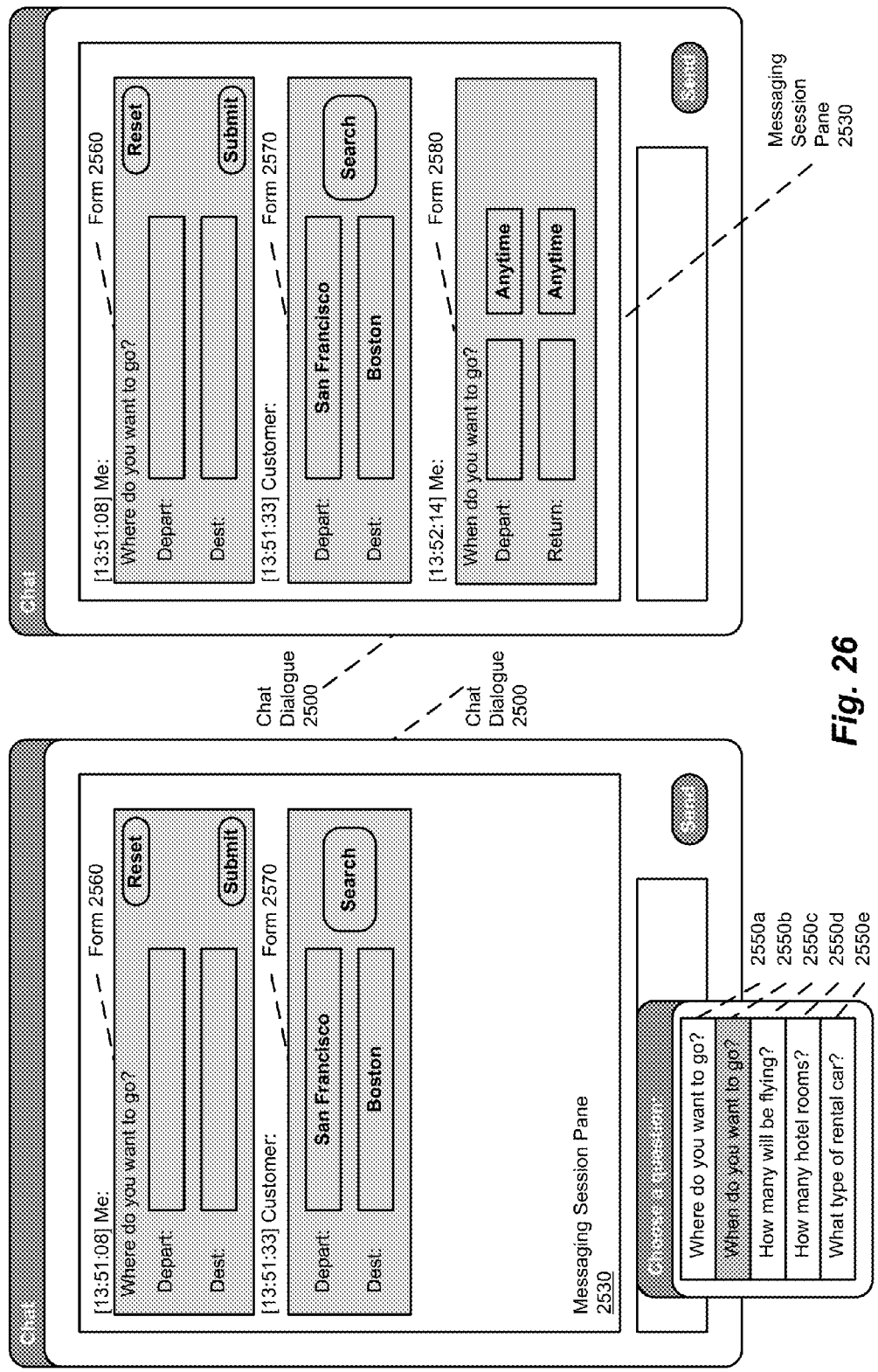
FIG. 26 is a block diagram illustrating examples of an agent dialogue presented by a messaging system according to embodiments of the present invention, in which the insertion of structured data into a web chat is further depicted.

FIG. 26 is a block diagram illustrating examples of an agent dialogue presented by a messaging system according to embodiments of the present invention, in which the insertion of structured data into a web chat is further depicted. In a manner comparable to that discussed in connection with FIGS. 2-8, the customer in the example scenario depicted in FIG. 26 then continues the messaging session by providing the information thus requested by providing a reply to form 2560 that includes the requested information. This reply appears in messaging session pane 2530 as a form 2570. Continuing the messaging session, the agent once again accesses special prompt menu 2540, and then selects predefined form 2550b ("When do you want to go?" and its associated predefined form). Having received the requisite selection of departure and destination cities, and having pushed the departure/return date/time form into the messaging session (depicted in FIG. 25 as form 2580), the agent can now proceed (upon a reply from the customer) to address the customer's needs for travel arrangements based on the information thus provided.

Figure 27:
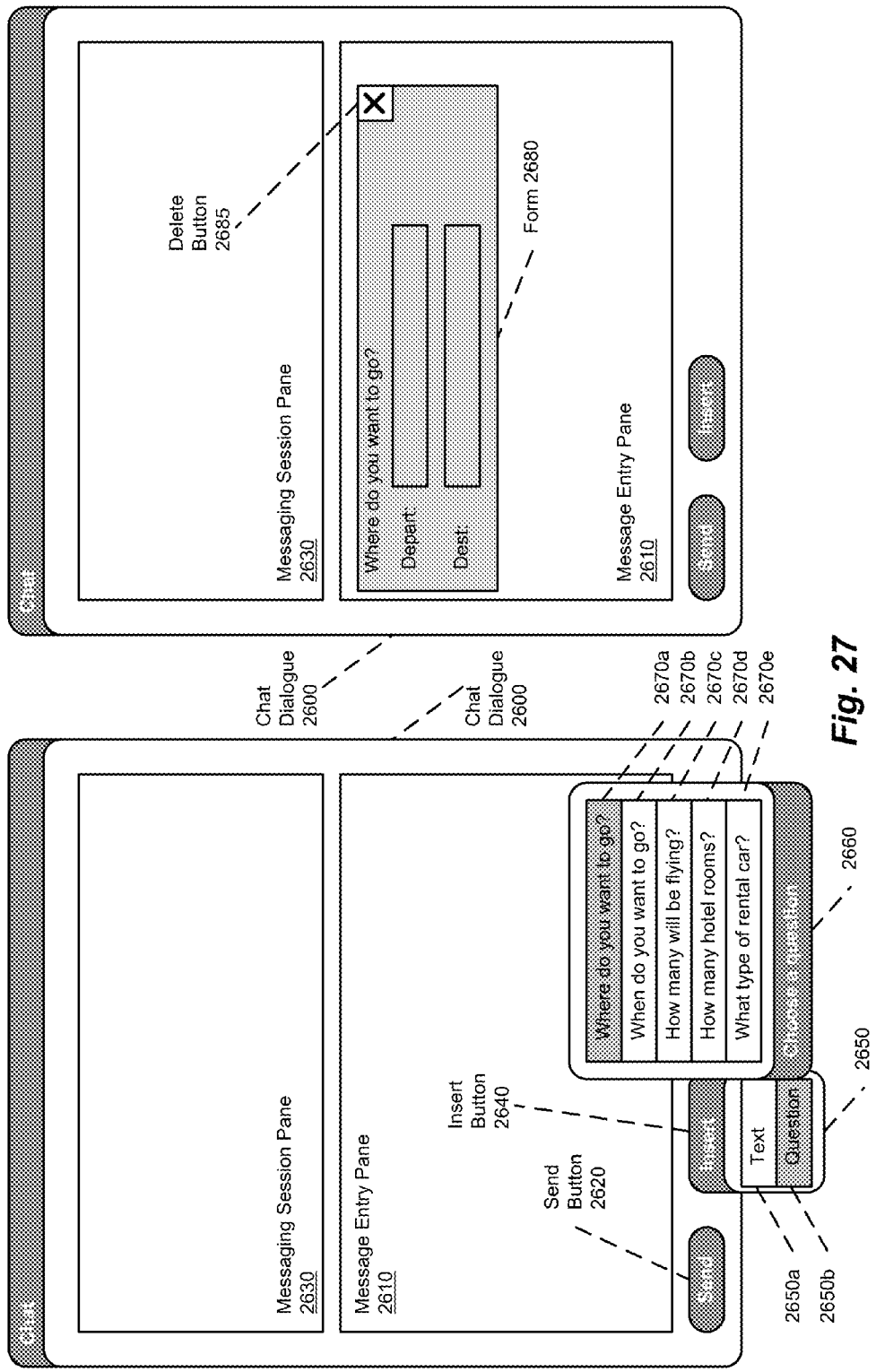
FIG. 27 is a block diagram illustrating examples of an agent dialogue presented by a messaging system according to embodiments of the present invention, in which the insertion of structured data into a web chat is depicted.

FIG. 27 is a block diagram illustrating examples of an agent dialogue presented by a messaging system according to embodiments of the present invention, in which the insertion of structured data into a web chat is depicted. In the example depicted in FIG. 27, a chat dialogue 2600 is shown as including a message entry pane 2610, from which messages entered therein can be sent by the selection of a send button 2620 to a messaging session pane 2630, in a manner comparable to that discussed in connection with earlier figures. Chat dialogue 2600 also includes an insert button 2640 that, when selected, results in the display of a text/question menu 2650. Selections in text/question menu 2650 can include a text selection 2650a and a question selection 2650b, for example. Selection by the user of text selection 2650a presents the user with a number of predefined text entries that the user can submit into the messaging session, in order to save time and reduce the risk of errors. The user's selection of question selection 2650b results in the display of an insert predefined form menu 2660. Insert predefined form menu 2660 can include selections comparable to those of special prompt menu 2540 of FIG. 25 (examples of which are depicted in FIG. 27 as predefined forms 2670a, 2670b, 2670c, 2670d, and 2670e). In addition to allowing a user (e.g., a customer service agent) to insert such predefined forms into the messaging session, an approach according to certain embodiments of the present invention (in which an insert button such as insert button 2640 is employed), allow the user to insert multiple such forms (e.g., into message entry pane 2610) prior to sending those predefined forms into the messaging session, and so to the other user's participating in that messaging session. In the example depicted in FIG. 27, then, once the user (e.g., an agent) has selected a predefined form (e.g., predefined form 2670a), the messaging system enters the form (depicted in FIG. 27 as form 2680) thus selected into message entry pane 2610. Form 2680 can also provide a delete button that is configured to allow the given predefined form to be deleted from message entry pane 2610 (depicted, e.g., in FIG. 27 as a delete button 2685)

Figure 28:
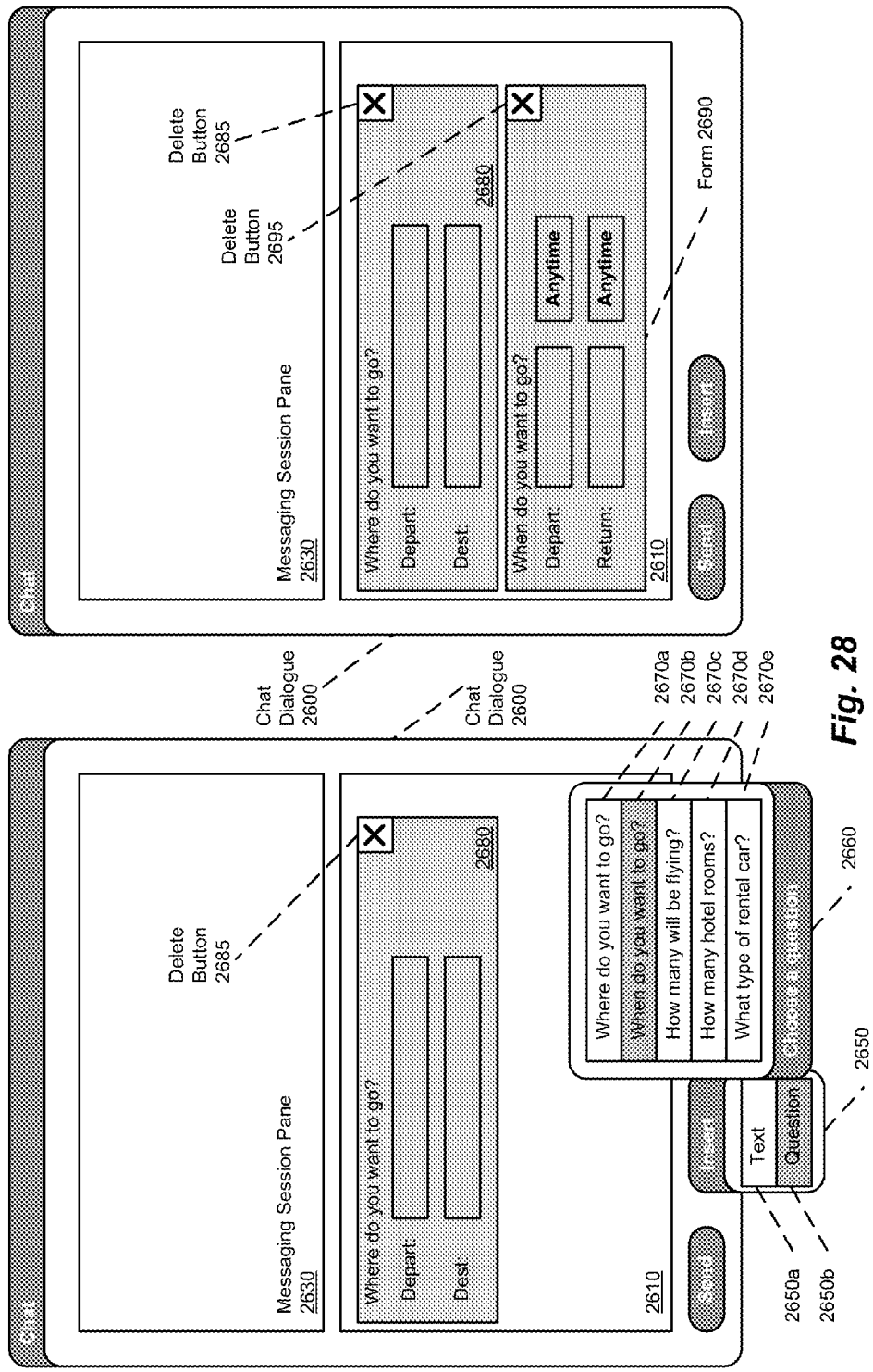
FIG. 28 is a block diagram illustrating examples of an agent dialogue presented by a messaging system according to embodiments of the present invention, in which the insertion of structured data into a web chat is further depicted.

FIG. 28 is a block diagram illustrating examples of an agent dialogue presented by a messaging system according to embodiments of the present invention, in which the insertion of structured data into a web chat is further depicted. In the continuing example of the agent side of the messaging session depicted in FIG. 27, FIG. 28 depicts the insertion of another predefined form into message entry pane 2610, as indicted by the selection of predefined form 2670b selected from insert predefined form menu 2660 by the agent ("when do you want to do?" and its associated predefined form). As can be seen in FIG. 28, upon the selection of predefined form 2670b, the corresponding predefined form (depicted in FIG. 28 as form 2690) is entered into message entry pane 2610. Form 2690 can also provide a delete button that is configured to allow the given predefined form to be deleted from message entry pane 2610 (depicted, e.g., in FIG. 28 as a delete button 2695)

Figure 29:
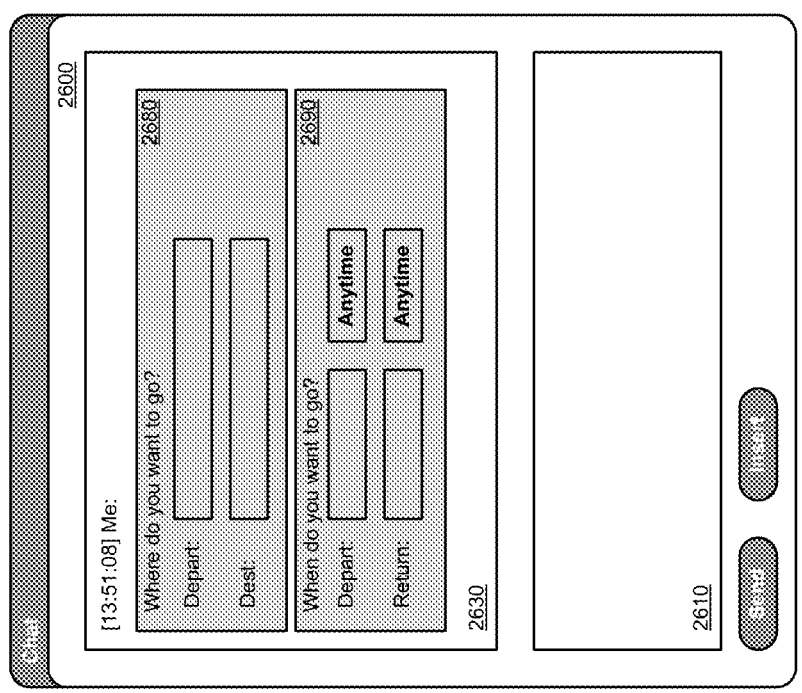
FIG. 29 is a block diagram illustrating examples of an agent dialogue presented by a messaging system according to embodiments of the present invention, in which the insertion of structured data into a web chat is further depicted.

FIG. 29 is a block diagram illustrating examples of an agent dialogue of a messaging system according to embodiments of the present invention, in which the insertion of structured data into a web chat is further depicted. In the continuing example depicted in FIG. 29, the predefined forms associated with predefined forms 2670a and 2670b (depicted in FIG. 29 as forms 2680 and 2690) are submitted into the messaging session from message entry pane 2610. In a manner comparable to that discussed earlier in connection with other figures, the agent selects send button 2620 in order to submit the predefined forms appearing in message entry pane 2610 into the messaging session, causing the predefined forms to appear in messaging session pane 2630.

As the foregoing examples illustrate, access to messaging functionality according to embodiments of the present invention can be provided in a number of ways. As discussed in connection with FIGS. 25 and 26, a special prompt can be provided that can used to display a menu of possible forms for selection. As noted, while a given implementation may be limited to displaying some fixed number of selections, there are any number of mechanisms that can be employed to efficiently and effectively present the agent with more such selections and/or the particular selections needed in a given situation. As discussed in connection with FIGS. 27 and 28, an alternative to the use of a special prompt is the provision of an insert button in the user's messaging window. Here again, any number of variations can be provided to allow the agent access to selections that best meet the agent's needs in the circumstances at hand. Further, it is within the scope of embodiments of the present invention to combine these two approaches, and allow the user (e.g., agent) to use the approach that most effectively addresses their needs. Such a combined approach allows for the greatest flexibility (e.g., by presenting different selections based on the approach used, such as by using a special prompt for customer-centric selections (or situation-centric selections, or other such basis of determining the selections presented) and an insert button for generic selections (e.g., scheduling dates, generic questions as to travel arrangements, and so on)). Thus, based on the selections presented by each alternative, the agent can create a form that allows the most efficient, effective communications to occur by way of quickly creating forms that are closely tailored to the needs of the participants. Further, such predefined form menus can provide for scrolling, allowing the user (agent) to scroll through a number of selections (forms) within the predefined form menu. As noted elsewhere, such efficiency and effectiveness not only makes agents, for example, more efficient and less error prone, but vastly improves the experience of the customer being serviced in this manner. Further to this end, as part of such messaging functionality, a messaging system according to embodiments of the present invention can provide a user (e.g., customer service agent) with the ability to edit forms prior to their submission into the messaging session, as is now discussed in connection with FIGS. 30, 31, 32, and 33.

Figure 30:
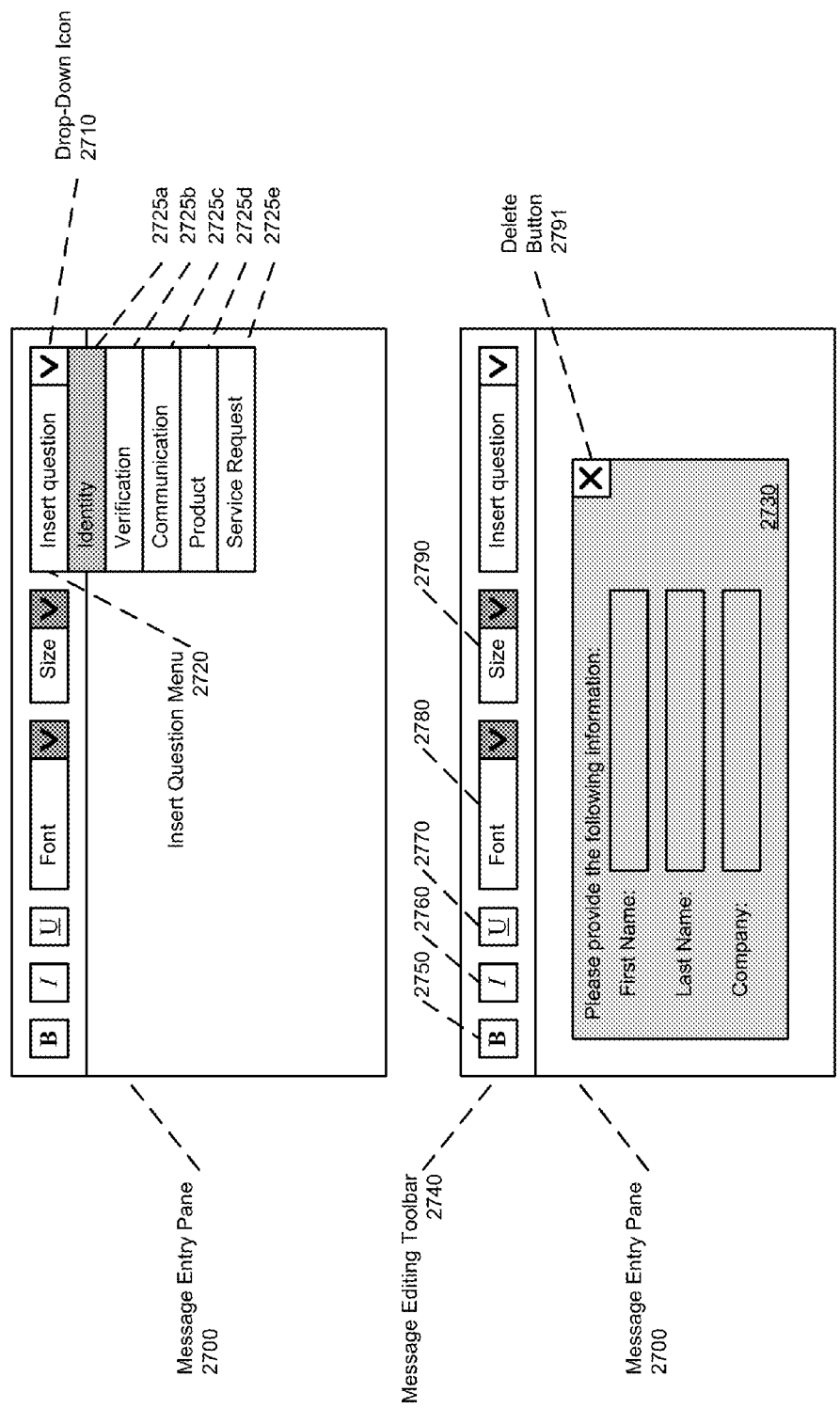
FIG. 30 is a block diagram illustrating examples of a dialogue presented by a messaging system according to embodiments of the present invention, in which the insertion of structured data via a drop-down menu is depicted.

FIG. 30 is a block diagram illustrating examples of a dialogue presented by a messaging system according to embodiments of the present invention, in which the insertion of structured data via a drop-down menu is depicted. FIG. 30 depicts an example of a message entry pane 2700 before and after the insertion of an inquiry form therein. An inquiry form can be inserted into a messaging session by submitting one or more forms from messaging entry pane 2700. To insert such a form into message entry pane 2700, a drop-down icon 2710 is selected by the user, in order to display and insert question menu 2720. As depicted in FIG. 30, insert question menu 2720 includes a variety of selections, including predefined form selections 2775a-2775e. Subsequent to selecting drop-down icon 2710, the user's selection of predefined form selection 2775a ("identity") results in the identification, insertion, and display of a predefined form 2730 in message entry pane 2700.

In certain embodiments, such as that depicted in FIG. 30, message entry pane 2700 provides one or more toolbar commands that permit the user to edit and/or otherwise modify items displayed in message entry pane 2700 (e.g., such as predefined form 2730). Thus, message entry pane 2700 provides a message editing toolbar 2740, which allows the user to modify text and forms displayed in message entry pane 2700 prior to such information being submitted into the messaging session. Message editing toolbar 2740 includes a bold button 2750, an italics button 2760, an underline button 2770, a font menu 2780, and a font size menu 2790. As will be apparent in light of the present disclosure, text and forms can be modified using the functionalities provided by message editing toolbar 2740 in the aforementioned ways, as well as many other not explicitly offered as part of message editing toolbar 2740 or shown in FIG. 30. Form 2790 can also provide a delete button that is configured to allow the given predefined form to be deleted from message entry pane 2700 (or, alternatively, the insertion of the given predefined form "undone," and depicted, e.g., in FIG. 30 as a form deletion button 2791)

Such form modification allows a form to be edited prior to submission to a messaging session, for example, in the message entry pane. Further, there may be instances in which the user receiving such form may want to perform editing (in addition to entering responses in the form thus received), for which certain embodiments may provide. Further, such editing (prior to submission) can include the ability to undo the insertion of the form (e.g., by deleting the form as a whole), typing "help text" above or below the form, modifying the predefined help text in the form, modifying the predefined labels in form if a label is not intuitive to the customer, and other such operations. Further still, the user can elect to drop individual optional input fields in form (e.g., no need for information that is already known).

Figure 31:
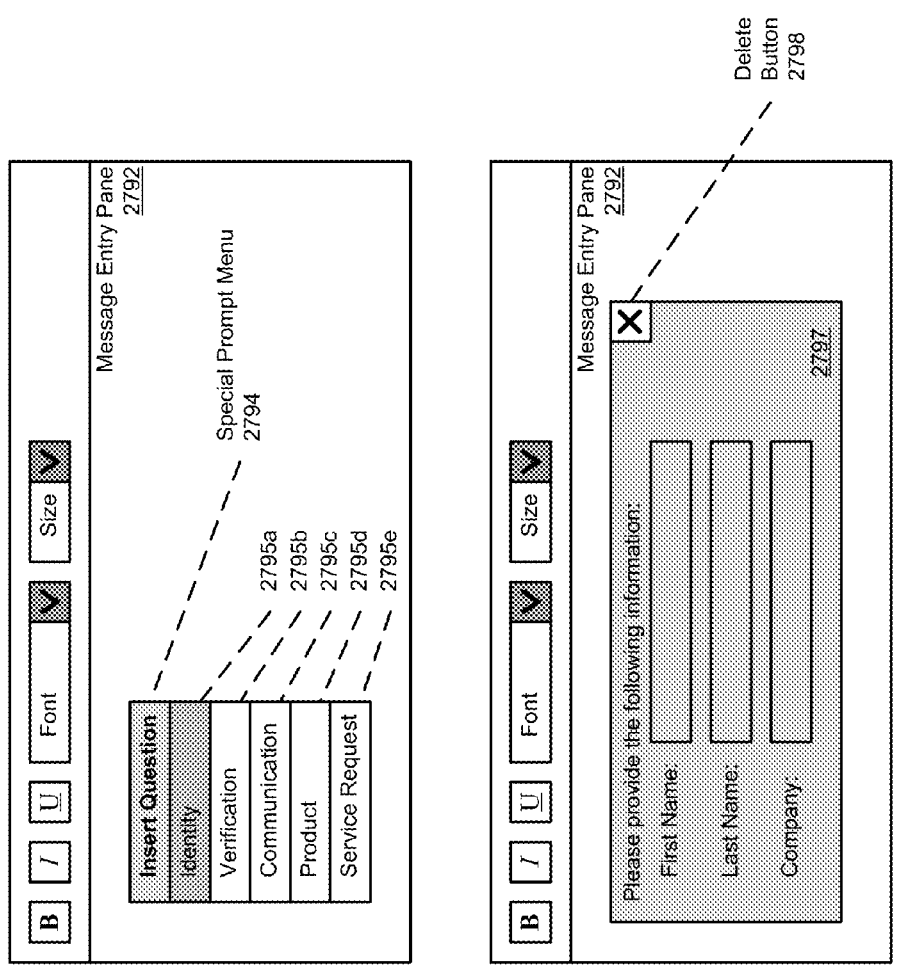
FIG. 31 is a block diagram illustrating examples of an agent dialogue presented by a messaging system according to embodiments of the present invention, in which the insertion of structured data via a special prompt is depicted.

FIG. 31 is a block diagram illustrating examples of an agent dialogue presented by a messaging system according to embodiments of the present invention, in which the insertion of structured data via a special prompt is depicted. FIG. 31 illustrates a message entry pane supporting the use of a special prompt menu. In FIG. 31 a message entry pane 2792 employs functionality of the messaging system that allows for user input that results in the presentation of a selection of predefined forms (e.g., by way of a "right-click" operation). In the example depicted in FIG. 31, message entry pane 2792 displays a special prompt menu 2794, which provides a selection of predefined forms such as those depicted in insert question menu 2720 of FIG. 30 (e.g., ones comparable to predefined forms 2795a-2795e). Once one of predefined forms 2795a-2795e has been selected, the desired predefined form (depicted in FIG. 31 as a form 2797) is inserted into message entry pane 2792, and can then be edited in the manner discussed in connection with FIG. 30. As will be appreciated in light of the present disclosure, a messaging system supporting the presentation of the user interfaces depicted in FIGS. 30 and 31 can also provide the ability to collect multiple ones of such predefined forms for submission into the given messaging session (and so, presentation in the associated messaging session pane). Further, such predefined forms can include a delete button that is configured to allow the given predefined form to be deleted from message entry pane 2792 (e.g., depicted in FIG. 31 as a delete button 2798).

Figure 32:
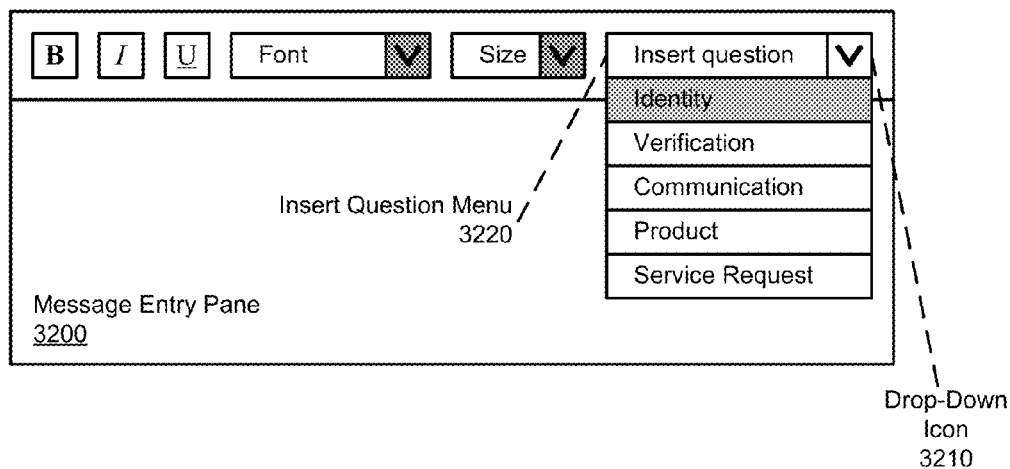
FIG. 32 is a block diagram illustrating examples of an agent dialogue presented by a messaging system according to embodiments of the present invention, in which the results of inserting structured data via a drop-down menu or a special prompt is depicted.
Figure 32:
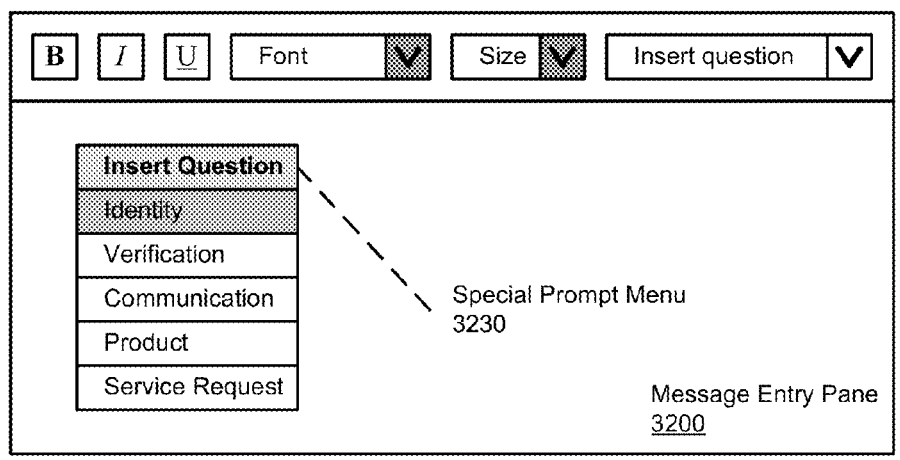

FIG. 32 is a block diagram illustrating examples of an agent dialogue presented by a messaging system according to embodiments of the present invention, in which the results of inserting structured data via a drop-down menu and/or a special prompt is depicted. FIG. 32 depicts an example of message entry pane 3200 that supports the use of both an insert question menu and a special prompt menu. Using message entry pane 3200, a user such as an agent can insert a question into message entry pane 3200 (and so, the messaging session being conducted) by selecting an insert question icon 3210, thereby displaying an insert question menu 3220. Alternatively, the user can indicate their desire to display a comparable menu within message entry pane 3200 (e.g., by right-clicking within message entry pane 3200). By so indicating, the user's action causes the display of a special prompt menu 3230. As before, special prompt menu 3230 presents a set of selections that can be used to insert one or more predefined forms within message entry pane 3200. These selections are typically, though not necessarily, comparable to those displayed in insert question menu 3220.

Figure 33:
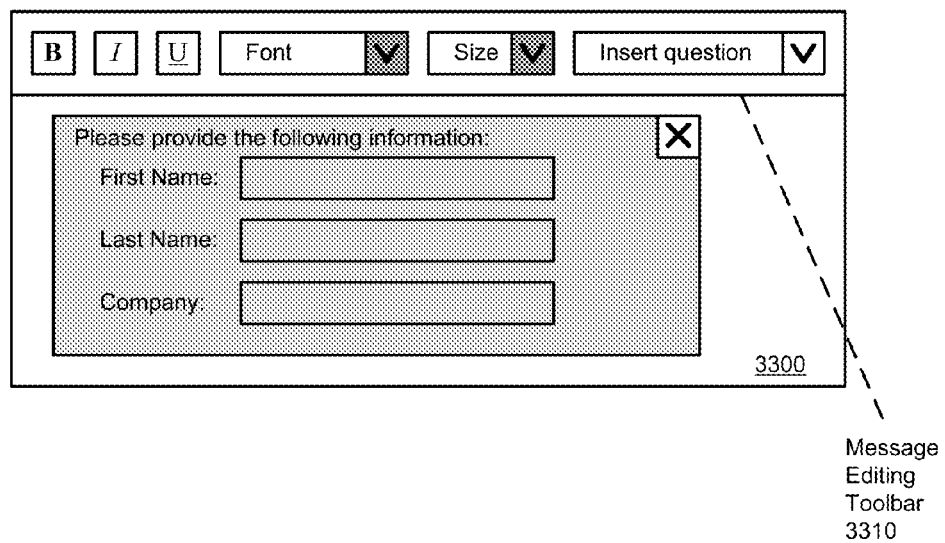
FIG. 33 is a block diagram illustrating examples of an agent dialogue presented by a messaging system according to embodiments of the present invention, in which the editing of structured data entered via a drop-down menu or a special prompt is depicted.

FIG. 33 is a block diagram illustrating examples of an agent dialogue presented by a messaging system according to embodiments of the present invention, in which the editing of structured data inserted via a drop-down menu and/or a special prompt is depicted. In the manner described previously in connection with FIGS. 30 and 31, once the predefined form(s) is (are) displayed in a message entry pane 3300, the user can modify the predefined form using functionalities provided by a message entry toolbar 3310.

When using such approaches, the list of potential questions (from either one or both of an insert button and/or a special prompt) can be configured dynamically (e.g., to be context sensitive). For example, if a customer has already been identified, there is no need to present the agent with an option to submit an identification question, and so the corresponding menu item could be disabled or not presented. Similarly, prior to a customer being identified, there would be no need to present the agent with an option to submit an verification question, and so the corresponding menu item could be disabled or not presented.

Example Messaging System Architectures and Processes Supporting Web Applications An alternative to interfacing with application programs is the use of web applications. In such situations, an approach according to embodiments of the present invention employ the generation of dynamic forms. While providing a number of desirable advantages, the use of predefined forms does require the design of the forms to be used prior to their use. Also, the application programs used typically need to be configured to consume input data automatically from the messaging system, which may not always be possible. In a setting in which the messaging system is to interface with one or more web applications, such web applications can be made "messaging-aware", and so provide messaging-aware inputs. In such a scenario, input fields from such messaging-aware web applications are configured to be pushed into the chat input area. Thus, with embedded online messaging, the input fields of web applications (e.g., web pages) can be made messaging-aware. In such an approach, a form is dynamically composed in response to the input fields that have been pushed into the messaging session. After form submission from the other side, the submitted data is then automatically populated to the corresponding input fields.

Figure 34:
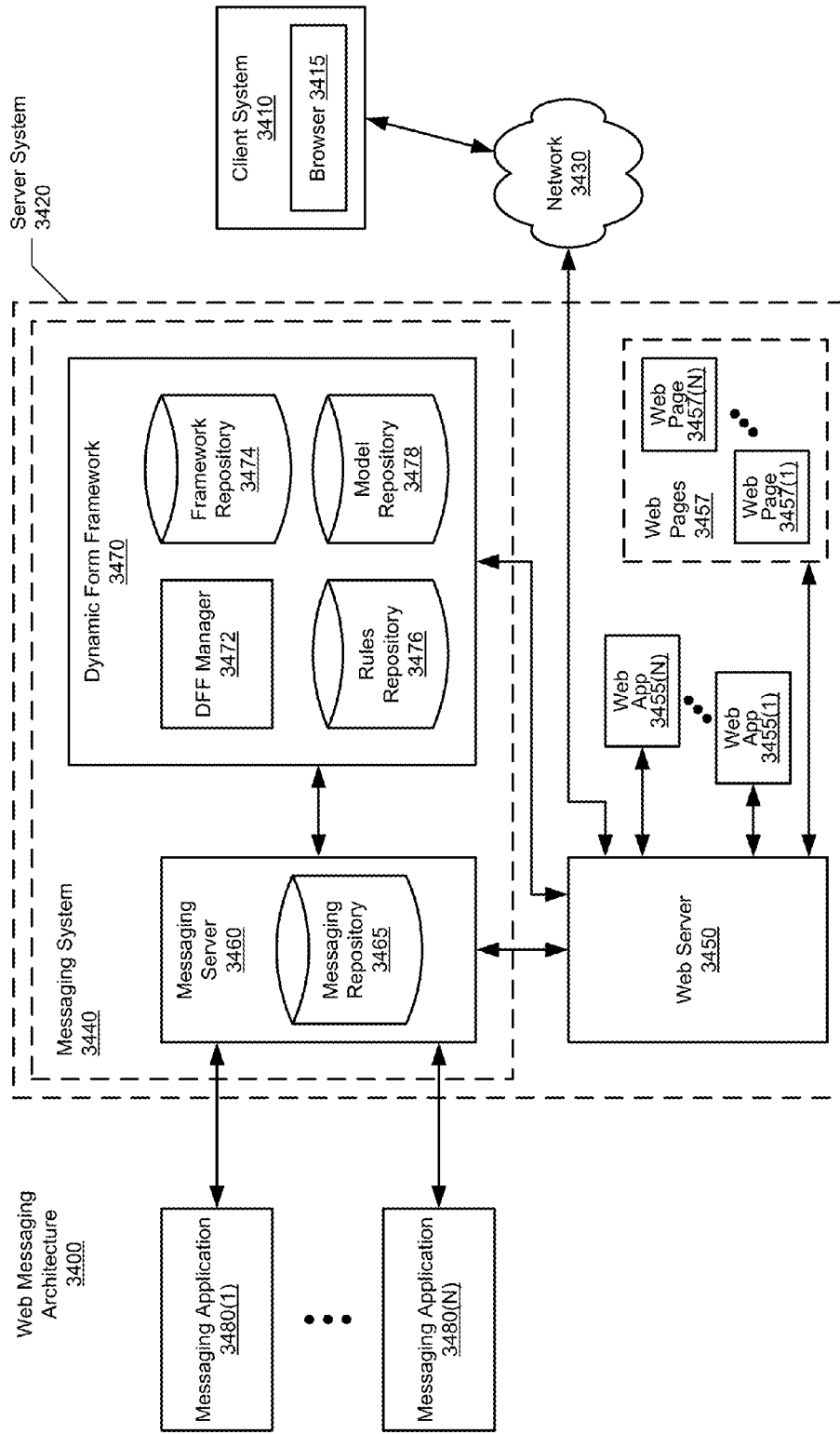
FIG. 34 is a block diagram depicting certain features of a server system and other components of a web messaging architecture, according to embodiments of the present invention.

FIG. 34 is a block diagram depicting certain features of a web messaging architecture according to embodiments of the present invention, including features of a server system and other elements of such a web messaging architecture. A web messaging architecture 3400, including various elements thereof, is thus depicted. As will be appreciated from the present disclosure, web messaging architecture 3400 shows, in greater detail, an architecture that includes elements of a server system such as server system 1110 of FIG. 11A, with respect to an implementation in which messaging functionality according to embodiments of the present invention is provided to one or more web applications. Thus, in the manner of messaging architecture 1100, web messaging architecture 3400 provides support for conducting messaging communications between a client system 3410 (which, in turn, supports a browser 3415) and a server system 3420, via a network 3430. As depicted in FIG. 34, server system 3420 includes a messaging system 3440 and a web server 3450. Associated with web server 3450 are a number of web applications (depicted in FIG. 34 as web applications (web apps) 3455(1)-(N)) and one or more web pages (depicted in the aggregate in FIG. 34 as web pages 3457, and individually, as web pages 3457(1)-(N)). Messaging system 3440, in turn, includes a messaging server 3460 (which maintains information relevant to the one or more messaging sessions supported thereby, in a messaging repository 3465) and a dynamic form framework 3470. Dynamic form framework 3470, in turn, includes a dynamic form framework (DFF) manager 3472, a framework repository 3474, a rules repository 3476, and a model repository 3478. Communicatively coupled to server system 3420, and more particularly messaging server 3460, are a number of messaging applications (depicted in FIG. 34 as messaging applications 3480(1)-(N)).

As will be appreciated from discussions elsewhere herein (e.g., in connection with FIGS. 12, 13, and 14, among others), at least certain of the functionality provided by DFF manager 3472, framework repository 3474, rules repository 3476, and model repository 3478 is comparable to that of comparable elements depicted therein. However, given that web messaging architecture 3400 supports dynamic form object (DFOs), DFF manager 3472, framework repository 3474, rules repository 3476, and model repository 3478 provide additional functionality that supports the dynamic nature of DFOs. Thus, framework repository 3474 maintains information regarding instantiations of the DFOs. Rules repository 3476 maintains information regarding rules that are used to ensure that the information transferred from a form's input field to the corresponding input field in the web page in which the input field is displayed (and back, in fact), is in a form expected by web application in which the web page is displayed. Model repository 3478 stores, among other information, information regarding the data models used in conjunction with the DFOs and their operation (referred to herein as a data model set, and discussed in further detail below, in connection with the discussion of the form builder rules example of FIG. 35).

Figure 35:
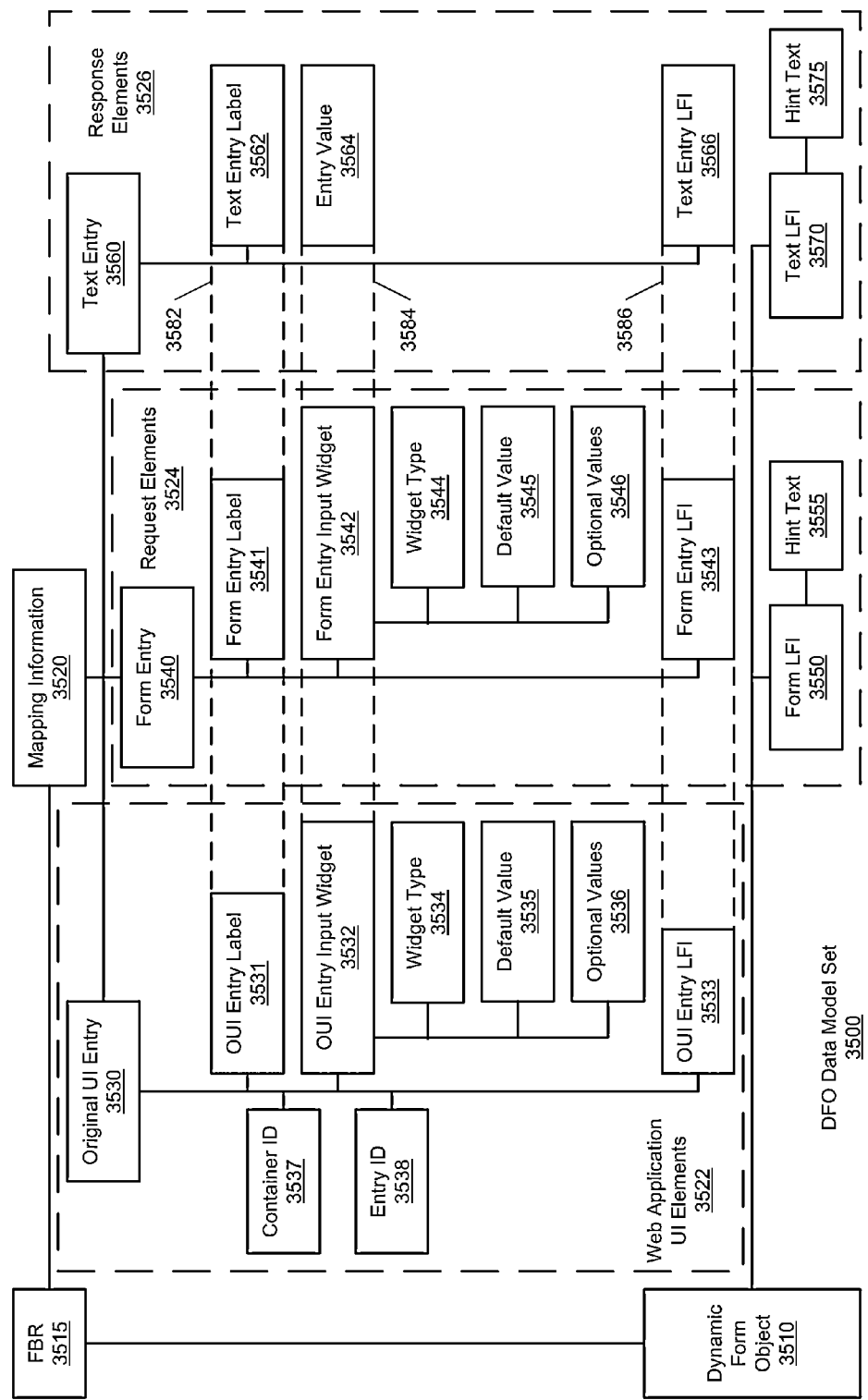
FIG. 35 is a block diagram illustrating an example of a dynamic form object (DFO) data model set, according to embodiments of the present invention.

FIG. 35 is a block diagram illustrating an example of a dynamic form object (DFO) data model set, according to embodiments of the present invention. FIG. 35 depicts an example of a dynamic form object (DFO) data model set 3500 in which a dynamic form object (DFO) 3510 is defined. Dynamic form object 3510 provides for information and definitions regarding the programmatic constructs used to represent the form submitted into the messaging session. DFO 3510 is defined, at least in part, by one or more form builder rules (depicted in FIG. 35 as form builder rules (FBR) 3515), which, in turn, employ mapping information such as mapping information 3520. Mapping information 3520 is associated with web application user interface elements 3522, request elements 3524, and response elements 3526. Mapping information 3520 maintains information regarding the manner in which certain of the elements of web application user interface elements 3522, request elements 3524, and response elements 3526 map to one another, an example of which is discussed subsequently in connection with FIG. 35. As will be appreciated in light of the present disclosure, the data model of DFO data model set 3500 can be used, for example, in defining dynamic form objects such as those discussed in connection with FIGS. 34 and 36. Further in this regard, information such as FBR 3515 can be maintained in the data stores within a dynamic form framework such as DFF 3470 of FIG. 34 (e.g., in rules repository 3476).

As will be appreciated in light of the present disclosure, web application user interface elements 3522, request elements 3524, and response elements 3526 each support one or more aspects of the overall functionality that is used to provide the ability for the transfer of dynamic forms through the messaging system employed, and so allow for the communication of information obtained in this manner to be provided to other applications (e.g., one or more web applications). Thus, web application user interface elements 3522 provide information as to the user interface elements of the web application to which the information thus obtained is to ultimately be provided. Similarly, request elements 3524 provide information as to the form (representing the DFO) that is communicated to the other party (e.g., customer) via the messaging system. In comparable fashion, response elements 3526 provide information as to the information that is communicated from the other party (e.g., customer) to the original party (e.g., agent) via the messaging system, in responding to the communications conducted by way of the form (representing the DFO).

As noted, then, web application user interface elements 3522 generally include elements representing the structure, behavior, and attributes of the entry (or entries) of the web application to which information is to be provided. To this end, web application user interface elements 3522 thus include an original user interface entry 3530. Original user interface entry 3530 represents the original entry in the user interface of the web application, such entry being the entry to receive input from the other party (e.g., customer) via the form submitted into the messaging session. Original user interface entry 3530 and its associated elements provide definitional information as to the structure and behavior of a given entry being pushed into a messaging session. Original user interface entry 3530 references an original user interface (OUI) entry label 3531 (a label that can be used to identify original user interface entry 3530), an original user interface entry input widget 3532 (a widget that provides functionality associated with input field in the original user interface entry 3530 (e.g., in the application that is to receive the input)), and original user interface entry LFI 3533 (which provides information regarding the look-and-feel of the original web application's entry). Original user interface entry input widget 3532, in turn, references a widget type 3534 (the type of widget, if any, used as part of the given form), a default value 3535 (which, as its name implies, provides a default value for a given entry), and optional values 3536.

Also associated with original user interface entry 3530 are a container identifier 3537 and an entry identifier 3538. As will be appreciated, in the generic sense, a container is a class, data structure, abstract data type (ADT), or other such programmatic construct, instances of which are collections of other objects (e.g., widgets). Thus, container identifier 3537 identifies the container that contains, possibly among other objects, the given input widget (original user interface entry input widget 3532). Such a container might, for example, correspond to the web page in which the input widget exists. Similarly, entry identifier 3538 provides information that facilitates the identification of the entry (input field) in question. Thus, container identifier 3537 and entry identifier 3538 allow the messaging system to relate input received via a DFO such as DFO 3510 to the input fields of the web application employed. The operation of DFO elements such as container identifier 3537 and entry identifier 3538 are discussed further in connection with FIG. 35.

In comparable fashion, request elements 3524 define information that will be used in the creation and submission of a form into a messaging session (e.g., the programmatic constructs used to represent the form sent to the customer by the agent), and generally include elements that are used in defining the structure, behavior, and attributes of the given form, as well as one or more entries therein. Such a form is thus designed to obtain and return the information to be provided as input to the original user interface entry, and so make that information available to the corresponding web application.

To this end, request elements 3524 include a form entry 3540, which is comparable in configuration to original user interface entry 3530. Form entry 3540 is depicted in FIG. 35 as referencing a form entry label 3541 (which maintains information regarding a label (e.g., a name) that can be used to identify the form), a form entry input widget 3542 (the input widget, sent as part of the form submitted into the messaging session, that provides functionality to assist in obtaining the requisite input information), and form entry LFI 3543 (which allows for control over the look-and-feel of the form entry). Form entry input widget 3542, in turn, references a widget type 3544 (the type of widget, if any, used as part of the given form), a default value 3545 (which, as its name implies, provides a default value for a given entry), and optional values 3546. With respect to request elements 3524, dynamic form object 3510 also references a portion thereof. More specifically, within request elements 3524, dynamic form object 3510 references form LFI 3550, which, in turn, references hint text 3555. In the manner of other such elements, form LFI 3550 allows for control over the look-and-feel of the form and its elements, while hint text 3555 allows a form to provide hints as to the values to be entered into the given field.

In turn, DFO data model set 3500 includes (as referenced by DFO 3510 and defined, at least in part, by request elements 3524) response elements 3526, which provide information regarding the structure, behavior, and attributes of various structures that allow a user to provide a response to the requests for information presented in a form. To this end, response elements 3526 include a text entry 3560. While text entry 3560 may, in fact, employ any number of programmatic constructs, text entry 3560 typically deals a simple value (e.g., alphanumeric value of some sort) entered an input into the given entry in the form communicated within the messaging session. Text entry 3560 references a text entry label 3562 (which maintains information regarding a label (e.g., a name) that can be used to identify the form), an entry value 3564, and text entry LFI 3566 (which allows for control over the look-and-feel of the text entry). As will be appreciated, entry value 3564 maintains (or, at the least, references) the user's response with regard to the given original user interface entry. As with request elements 3524, dynamic form object 3510 references certain elements within response elements 3526. For example, dynamic form object 3510 can reference text LFI 3570, which, in turn references hint text 3575. In the manner of other such elements, text LFI 3570 allows for control over the overall look-and-feel of text sent in response to the form, while hint text 3575 allows a form to provide hints as to the values to be entered into the given field.

In the embodiment depicted in FIG. 35, it will be noted that each of web application user interface elements 3522, request elements 3524, and response elements 3526 shares certain common element types. These common element types include an entry label element type 3582, an entry input type 3584, and an entry LFI 3586. As noted earlier, information regarding such relationships is maintained, at least in part, by mapping information 3520, which can also serve to maintain information regarding the manner in which these elements relate to one another (and not simply the fact of the relationship's existence). Further, as will be appreciated in light of the present disclosure, the mappings represented by element type 3582, entry input type 3584, and entry LFI 3586 can be governed, to at least some extent, by rules such as those maintained in rules repository 3476.

Figure 36:
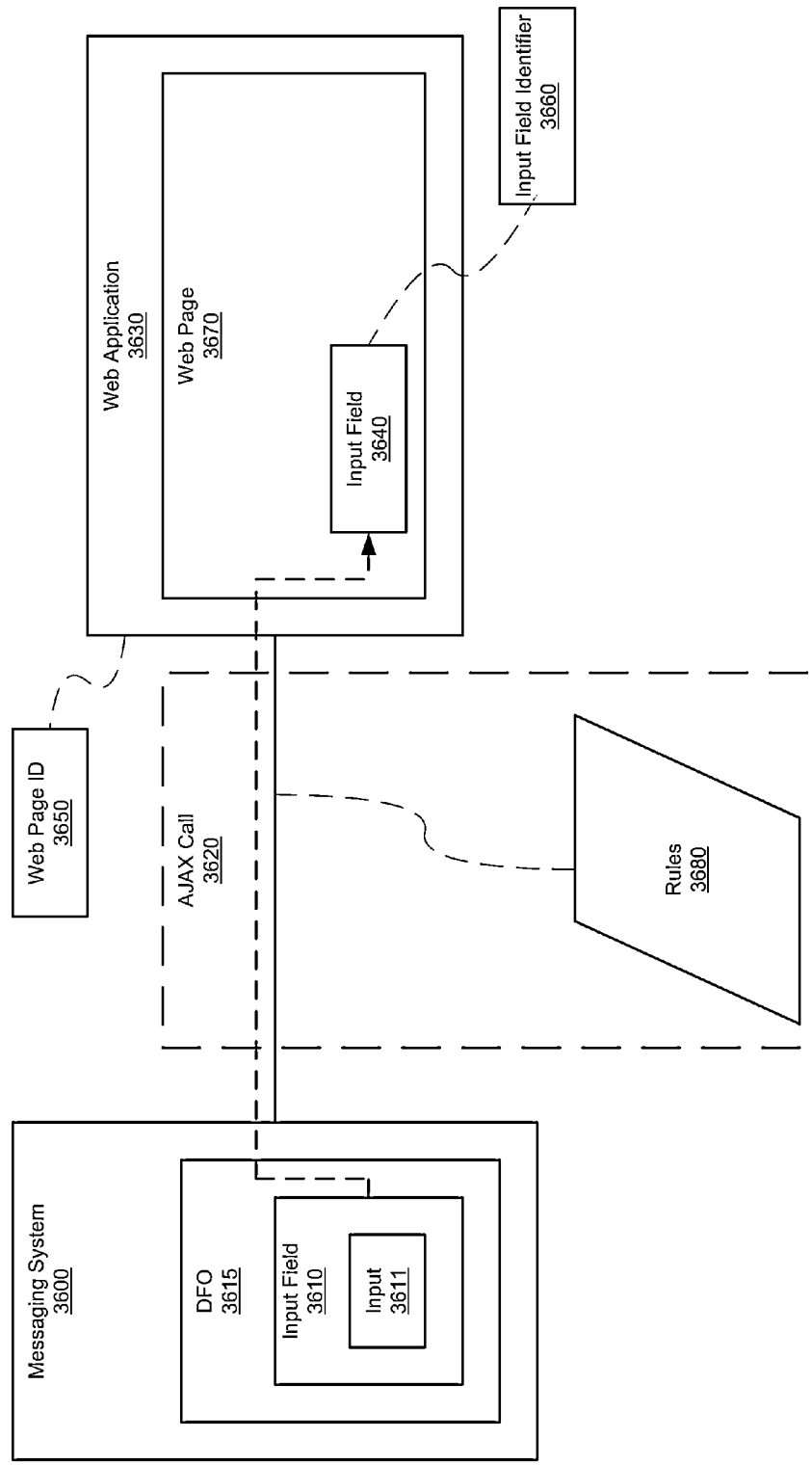
FIG. 36 is a block diagram illustrating an example of the elements and operations involved in implementing a messaging-enabled web application, according to embodiments of the present invention.

FIG. 36 is a block diagram illustrating an example of the elements and operations involved in implementing a messaging-enabled web application, according to embodiments of the present invention, in which a DFO such as that depicted in FIG. 35 is employed. FIG. 36 is an example of a functional diagram of the elements, mechanisms, and operations involved in transferring input data, entered into an input field in a dynamic form object (employed in a messaging session), from the dynamic form object into the appropriate input field of the given web application.

In the scenario depicted in FIG. 36, a messaging system 3600 has received information in an input field 3610 of a dynamic form object 3616 (the information, e.g., being depicted in FIG. 36 as input 3611). Having received this information, messaging system 3600 makes an AJAX call 3620 in order to transfer the information to a web application 3630. Messaging system 3600, via AJAX call 3620 is able to transfer the information in input field 3610 to an input field 3640 of web application 3630 using a web page identifier 3650 (e.g., from an element of DFO 3615 such as container identifier 3537 of web application user interface elements 3522 of DFO 3510) and an input field identifier 3660 (e.g., from an element of DFO 3615 such as entry identifier 3538 of web application user interface elements 3522 of DFO 3510). In the manner previously discussed in connection with container identifier 3537 and entry identifier 3538 of FIG. 34, web page identifier 3650 and input field identifier 3660 facilitate the identification of web page 3670 and input field 3640. As will be appreciated from FIG. 36, web application 3630 includes web page 3670, and, in turn, web page 3670 includes input field 3640 (into which input 3611 is to be entered). In order to properly convey the information in input field 3610 (i.e., input 3611) to input field 3640, in addition to the aforementioned identifying information (web page identifier 3650 and input field identifier 3660), AJAX call 3620 employs one or more rules 3680 (such as those described elsewhere herein, as well as/in the alternative, the mapping represented by entry input type 3584 (which maps, e.g., original user interface entry input widget 3532, form entry input widget 3542, and entry value 3564 to one another) and/or other mappings maintained as mapping information 3520), which ensure that the information is conveyed from input field 3610 to input field 3640 in the manner and form expected by web application 3630.

As will be appreciated in light of the present disclosure, a situation may arise in which the destination of one or more input fields for a given form become unavailable. For example, in certain embodiments in which the messaging system implementation does not support maintenance of such information for subsequent use, the messaging application may be unable to complete the input fields of the given messaging-enable web application dialogue (containing the input widgets originally pushed into the messaging session), if the user navigates away from or closes that messaging-enable web application dialogue. However, even in such a case, the user is able to perform cut-and-paste operations to insert the requisite input data into the input fields, once the user navigates to the messaging-enable web application dialogue again. Preferably, however, the messaging system is configured to maintain the input data thus returned and the input fields to which those input fields correspond. In such a scenario, the messaging system can be configured to convey the input data to the messaging-enable web application dialogue at the next opportunity (e.g., the next time the given web application is executed and the messaging-enable web application dialogue is displayed, the input fields are automatically populated with the input data).

In the situation in which one or more input fields are not available, the issue becomes one of what to do with input data (e.g., when the interface containing the pushed input fields is navigated away or closed, and submitted data cannot be used to auto-populate the original input fields). Such situations can be addressed in several ways. First is to warn users when they are about to navigate way from or close the interface. Alternatively (or in addition), the messaging system can store the input fields in question, as well as the corresponding values, and populate those input fields with their corresponding input values the next time the interface is open. Another alternative is to include a widget with the submitted input data that forces the interface to open.

Figure 37A:
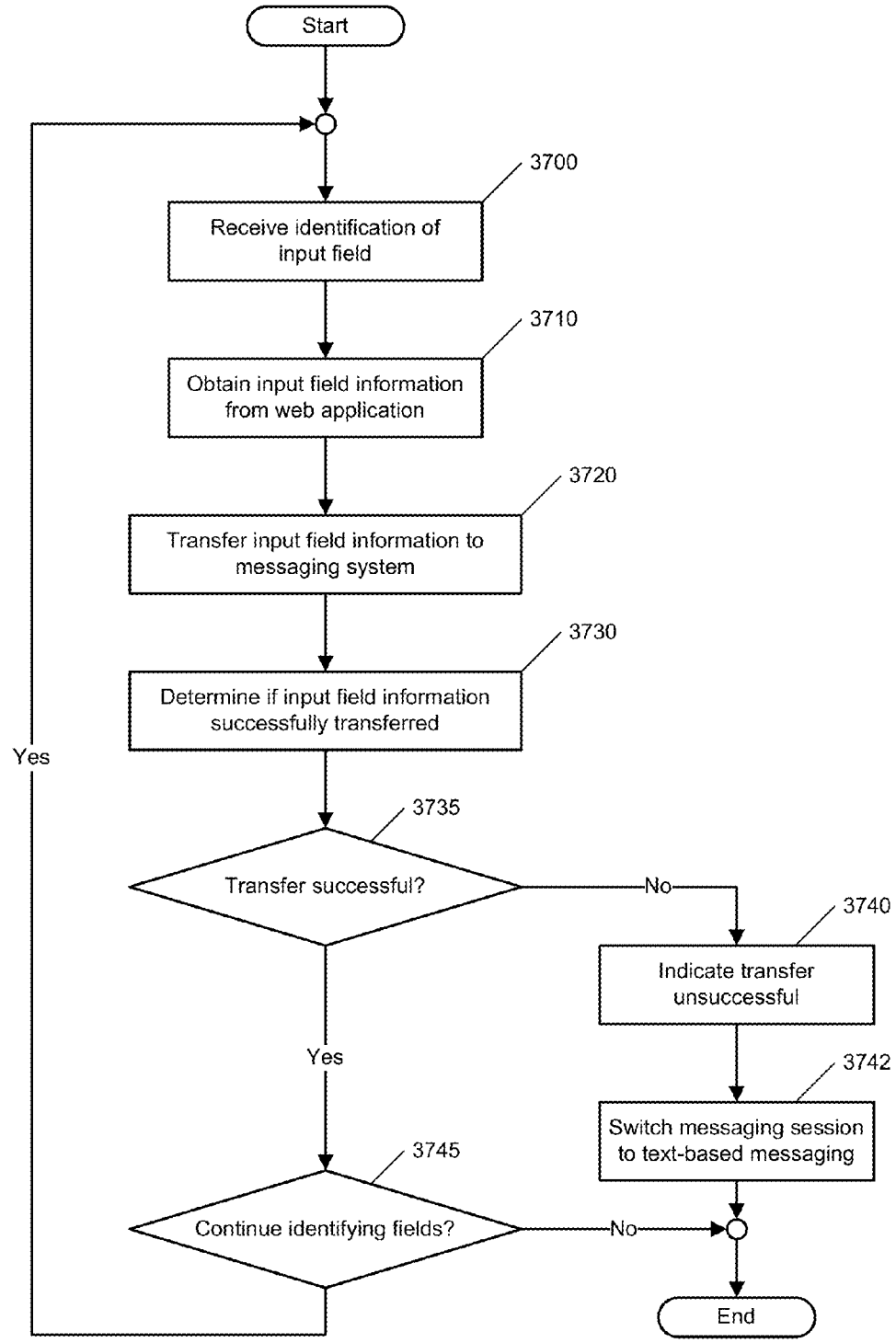
FIG. 37A is a flow diagram illustrating an example of operations performed in identifying an input field for a DFO to be pushed via messaging system, according to embodiments of the present invention.

FIG. 37A is a flow diagram illustrating an example of operations performed in identifying an input field for a DFO to be pushed via messaging system, according to embodiments of the present invention. FIG. 37A depicts a process in the manner of step 1182 of FIG. 11D with respect to a web application. The example process depicted in FIG. 37A provides the description of operations that can be performed in the identification of an object (e.g., associated with an input field) that is to be pushed into a messaging session. The process of FIG. 37A begins with the messaging server's receipt of an input field's identification (step 3700). As will be appreciated in light of the present disclosure, the process depicted in FIG. 37A is directed to a scenario in which a form to be submitted into a messaging session represents a single field (or group of fields taken as a whole). Next, the messaging system obtains input field information from the web application for which responses are to be obtained from one or more other users (step 3710).

Once the requisite input field information has been obtained, the input field information is transferred to the messaging system from the web application (step 3720). Next, a determination is made as to whether the input field information has been successfully transferred from the web application to the messaging system (step 3730). If the aforementioned determination indicates that the transfer was not successful (step 3735), the user attempting to send the form is provided with an indication that a problem occurred during the transfer of input field information from the web application to the messaging system (step 3740). In such a case, the messaging system can switch the messaging session to text-based messaging, if desired, in the manner noted in connection with FIG. 19 (step 3742). In the case in which this eventuality occurs, the process then concludes.

However, if the transfer of input field information from the web application to the messaging system was successful (step 3735), a determination is then made as to whether further input fields are to be identified (step 3745). If further input fields remain to be identified (step 3745), the process loops to its beginning, in order to receive identification of the next input field to be identified (step 3700). If no further input fields remain to be identified (step 3745), the process concludes.

Figure 37B:
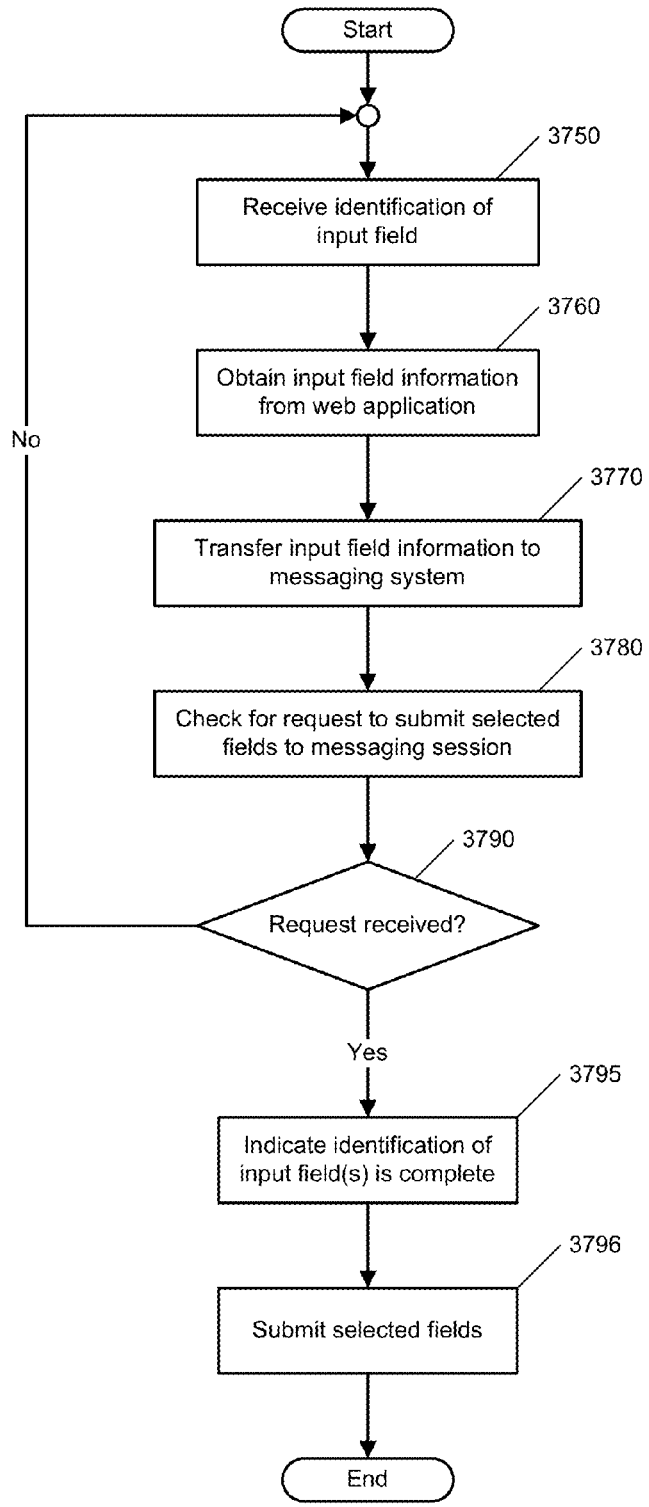
FIG. 37B is a flow diagram illustrating an example of operations performed in identifying multiple input fields for a DFO to be pushed via messaging system, according to embodiments of the present invention.

FIG. 37B is a flow diagram illustrating an example of operations performed in identifying multiple input fields for a DFO to be pushed via messaging system, according to embodiments of the present invention. An alternative to the process of FIG. 37A, FIG. 37B depicts a process in the manner of step 1182 of FIG. 11D with respect to a web application. The process depicted in FIG. 37B is an example of the operations performed in a messaging system that supports the selection of multiple input fields (and the subsequent assembly thereof) into a form suitable for submission into a messaging session.

The process of FIG. 37B begins with the messaging system's receipt of information regarding the input field to be identified (step 3750). Next, the messaging system obtains input field information for the given input field from the web application (step 3760). Having obtained the input field information from the web application, the input field information is transferred to the messaging system (step 3770). A determination is then made as to whether the user has requested that the selected input field(s) are ready to be submitted to the messaging session (step 3780). If a request (indicating that the selected in put fields are to be pushed into the messaging session) has not been received (step 3790), the process loops and performs the aforementioned operation once again with respect to one or more additional input fields (that will be assembled with the other input fields for assembly into a form and subsequent submission into the messaging session). If a request to submit the selected input fields has been received (indicating that no further input fields are to be identified) (step 3790), an indication that the identification of input field(s) is complete, is provided (step 3795). The selected fields are then submitted (step 3796). The process then concludes. As will be appreciated from the present disclosure, the information in the selected fields can be sent either by way of an automatic communications between the messaging server (e.g., an XMPP server) and the customer's interface (i.e., browser), or the communication can be performed as a result of the agent's selection of a submission button, as discuss elsewhere herein.

Figure 38:
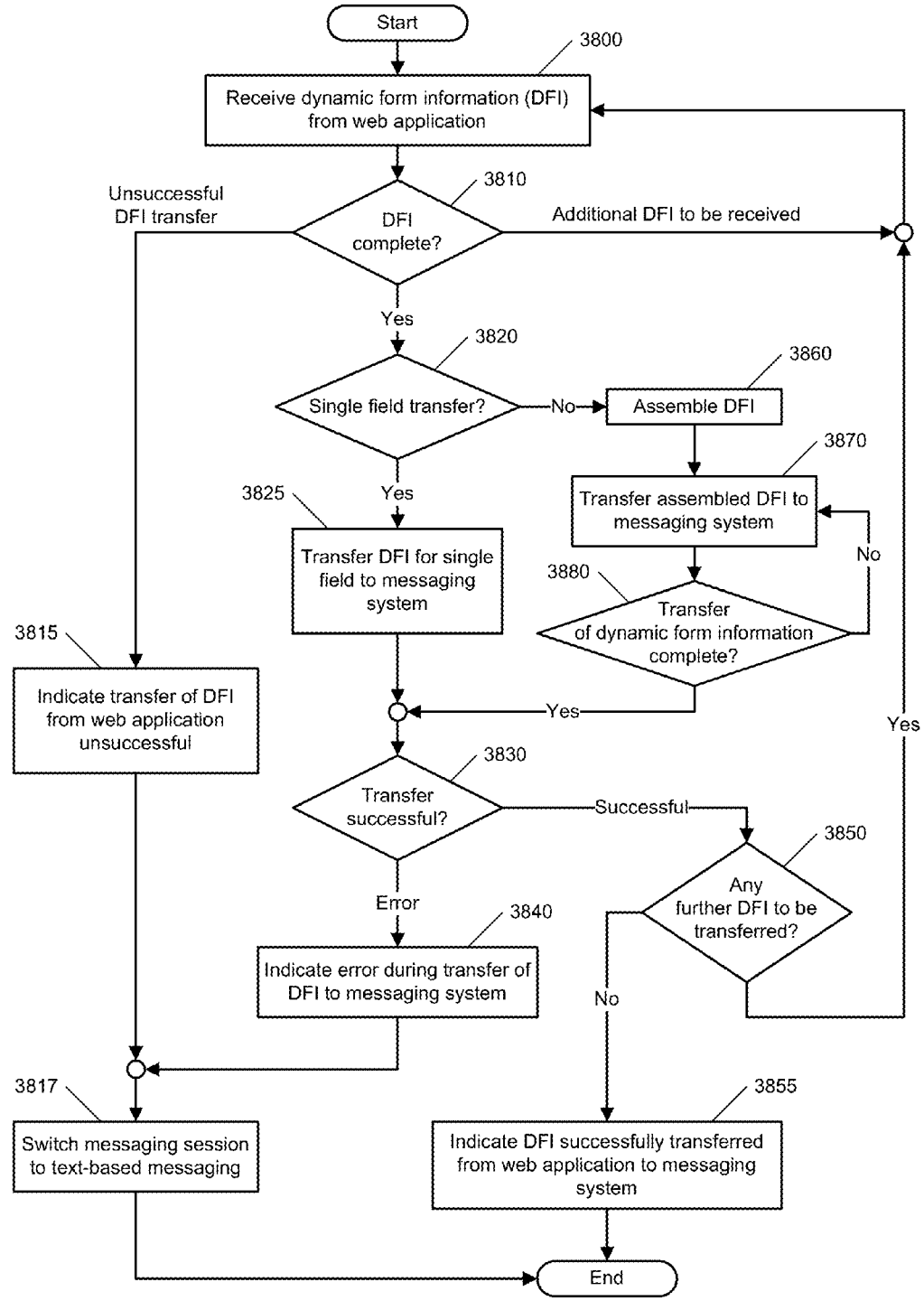
FIG. 38 is a flow diagram illustrating an example of operations performed in transferring a dynamic form from a web application to a messaging system, according to embodiments of the present invention.

FIG. 38 is a flow diagram illustrating an example of operations performed in transferring a dynamic form from a web application to a messaging system, according to embodiments of the present invention. FIG. 38 depicts a process in the manner of step 1184 of FIG. 11D with respect to a web application. The process depicted in FIG. 38 is an example of the operations that can be performed in transferring an object and/or object information from a web application to a messaging system. The process of FIG. 38 begins with the receipt of dynamic form information (DFI) from the web application (step 3800). Initially, a determination can be made as to whether the DFI received is complete (step 3810). If the DFI was not successfully transferred for some reason, the messaging system provides an indication to this effect (step 3815). Such a problem can be, for example, the receipt of an incomplete DFI, a problem occurring during the transfer of the DFI, or some other unexpected event. As part of indicating the occurrence of such a failure, the type of problem having occurred (e.g., the previous examples) can also be provided. Further, in a manner comparable to that described earlier in such situations, the messaging system can then switch the messaging session to text-based messaging, in the manner noted in connection with earlier figures (step 3817). At this point, the process of FIG. 38 then concludes (though a text-based messaging session can proceed in the earlier-described manner).

If the DFI is successfully received (e.g., is complete) (step 3810), a determination is made as to whether the transfer of the object and/or object information is a single field transfer of a multiple field transfer (step 3820). If the transfer is a single field transfer (step 3820), the DFI for the single field is transferred to the messaging system (step 3825). A determination is then made as to whether the single field transfer was successful (step 3830). If a problem has occurred, an indication of this problem is provided, signifying an problem during the transfer of the DFI to the messaging system (step 3840). In that case, the messaging session can be switched to a text-based messaging session (step 3817).

However, if the transfer was successful (step 3830), a determination is then made as to whether any other DFI's remained to be transferred to the messaging system (step 3850). As will be appreciated in light of the present disclosure, this determination allows for multiple DFO elements to be aggregated into the form that will ultimately be submitted into the messaging session. The set of operations that make up this loop are an example of a concept referred to herein as assembly operations. If no further DFI's remain to be transferred (step 3850), an indication is provided as to the successful transfer of the DFI (object and/or object information) from the web application to the messaging system (step 3855).

Returning to the determination as to whether the transfer is a single field transfer or a multiple field transfer (step 3820), if the transfer is a multiple field transfer, the input fields involved are assembled in order to create the desired form (step 3860). In certain embodiments, such assembly involves the assembly of the DFI for each of the input fields. Once the input fields have been assembled in this manner (step 3860), the now-assembled DFI is transferred to the messaging system (step 3870). The process then loops, waiting for the transfer of the dynamic form information to complete (step 3880). Once the transfer of the assembled DFI has completed (step 3880), a determination is made as to whether the transfer was successful (step 3830). If a problem occurs during the transfer, an indication is provided as to the occurrence of a problem during the transfer of the assembled DFI to the messaging system (step 3840), and the process concludes.

If the transfer is successful (step 3830), a determination is made as to whether any DFI (whether single field transfers or multiple field transfers) remain (step 3850). If further DFI's remain to be transferred, the process loops to the receipt of such DFI's from one or another of the web applications (step 3800). If no further DFI's remain to be transferred (step 3850), an indication of the successful transfer of the DFI's in question from the web application to the messaging system is provided (step 3855). The process then concludes.

Figure 39:
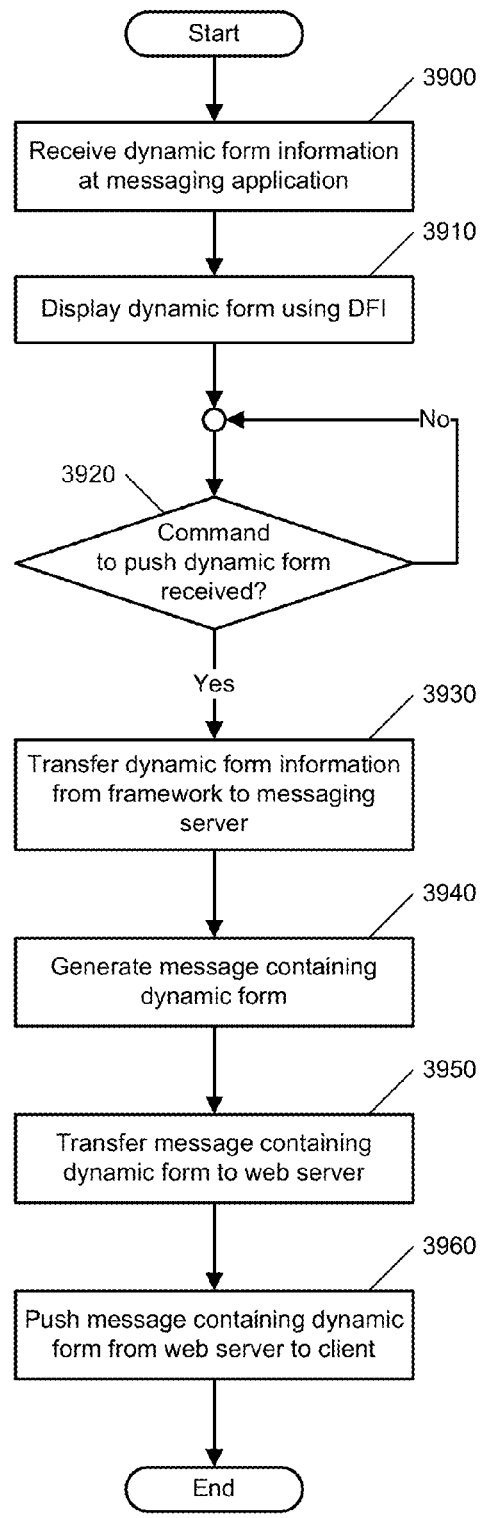
FIG. 39 is a flow diagram illustrating an example of operations performed in pushing a dynamic form via a messaging system, according to embodiments of the present invention.

FIG. 39 is a flow diagram illustrating an example of operations performed in pushing a dynamic form via a messaging system, according to embodiments of the present invention. FIG. 39 depicts a process in the manner of step 1190 of FIG. 11D with respect to a web application. The process depicted in FIG. 39 is an example of the operations performed in pushing an object and/or object information (e.g., a dynamic form and/or dynamic form information) to a client via a web server and network coupled there between.

The process of FIG. 39 begins with the receipt of dynamic form information at a messaging application (step 3900). The messaging application then displays a dynamic form using the dynamic form information (step 3910). The messaging application then awaits a command to push the dynamic form thus received to a client (step 3920). Such an event can be, for example, a user's selection of a send button (step 3920). Upon receiving a command to push the dynamic form to the client (step 3920), the dynamic form framework sends the dynamic form information to the messaging server (step 3930). A message including the dynamic form is then generated by the messaging server using the dynamic form information (step 3940). A message containing the dynamic form, having now been generated, is then transferred from the messaging server to the web server (step 3950). Once the web server has received the message, the web server pushes the message to the client (step 3960).

Figure 40:
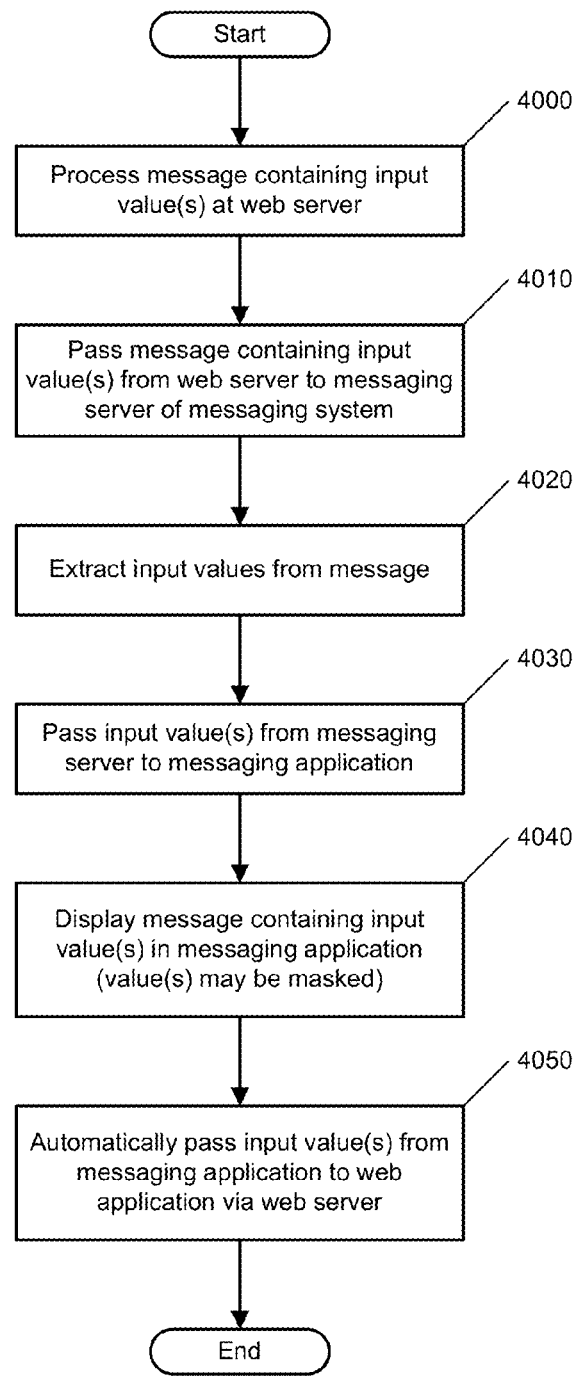
FIG. 40 is a flow diagram illustrating an example of the operations performed in receiving a dynamic form at a messaging system, according to embodiments of the present invention.

FIG. 40 is a flow diagram illustrating an example of operations performed in receiving a dynamic form at a messaging system, according to embodiments of the present invention. FIG. 40 depicts a process in the manner of step 1194 of FIG. 11D with respect to a web application. The process depicted in FIG. 40 is an example of the operations performed upon the receipt of a response from a client system to its receipt of a message including a dynamic form.

The process of FIG. 40 begins with the processing of the message (containing one or more input values) by the web server (step 4000). Once this message has been processed by the web server, the message is passed from the web server to the messaging server of the messaging system (step 4010). The messaging server extracts the input value(s) from the message (step 4020) and passes the input value(s) thus extracted from the messaging server to the messaging application (step 4030). Once the messaging application has received the input value(s), the messaging application displays the message and input value(s) contained therein (step 4040). As will be appreciated in light of the present disclosure, the actual value(s) of the such input value(s) may be masked, in order to maintain the confidentiality of the information conveyed thereby. Further, such values may be maintained in an encrypted (or otherwise secure state) while being conveyed through the messaging system, in order to provide enhanced security thereof while transiting the messaging system. In addition to passing the input value(s) to the appropriate messaging application, the messaging server in the present example is configured to automatically pass the input value(s) thus received, from the messaging application to the web application via the web server (step 4050).

User Interface Examples in a Messaging System Supporting Web Applications

Figure 41A:
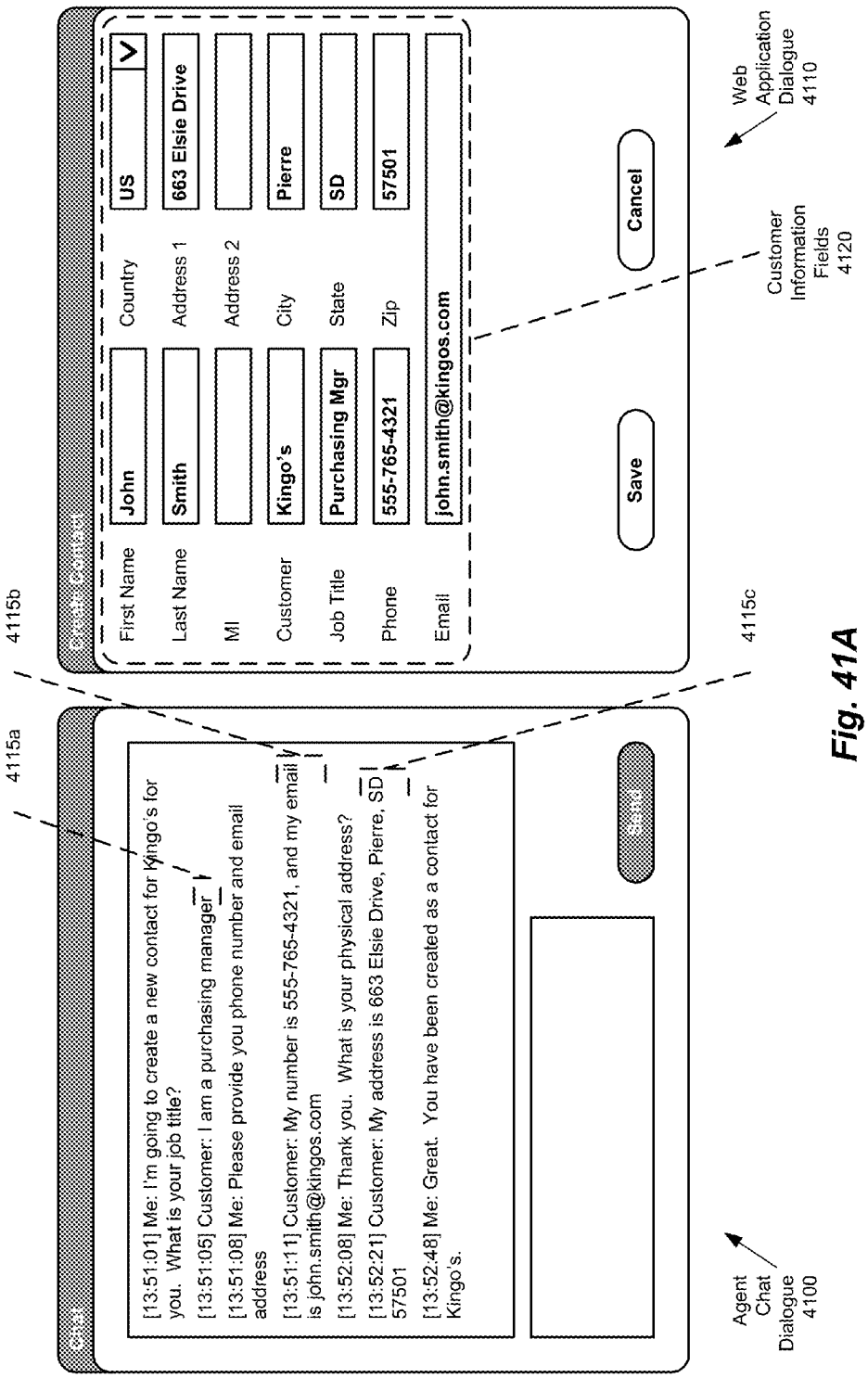
FIG. 41A is a block diagram illustrating an example of an agent dialogue presented by a messaging system and a user interface of a web application, in which customer information is depicted.

FIG. 41A is a block diagram illustrating an example of an agent dialogue presented by a messaging system and a user interface of a web application, in which customer information is depicted. FIG. 41A depicted examples of an agent chat dialogue 4100 and a web application dialogue 4110, and so provides an example of the information that a customer service agent might be presented with, during a messaging session. Also illustrated is a user interface for entering such information into a web application that the agent might employ in providing assistance to a customer.

As illustrated in FIG. 41A, agent chat dialogue 4100 reflects such customer information (depicted in FIG. 41A as customer information 4115a, 4115b, and 4115c (corresponding to a customer's job title, contact information, and physical address, in the example of FIG. 41A). Correspondingly, web application dialogue 4110 includes a variety of customer information fields 4120, which facilitate the entry of such information into a web application (not shown). In the example presented in FIG. 41A, the customer service agent must somehow convey customer information 4115a, 4115b, and 4115c into customer information fields 4120, in order to be able to enter that information into and work with the given web application.

Figure 41B:
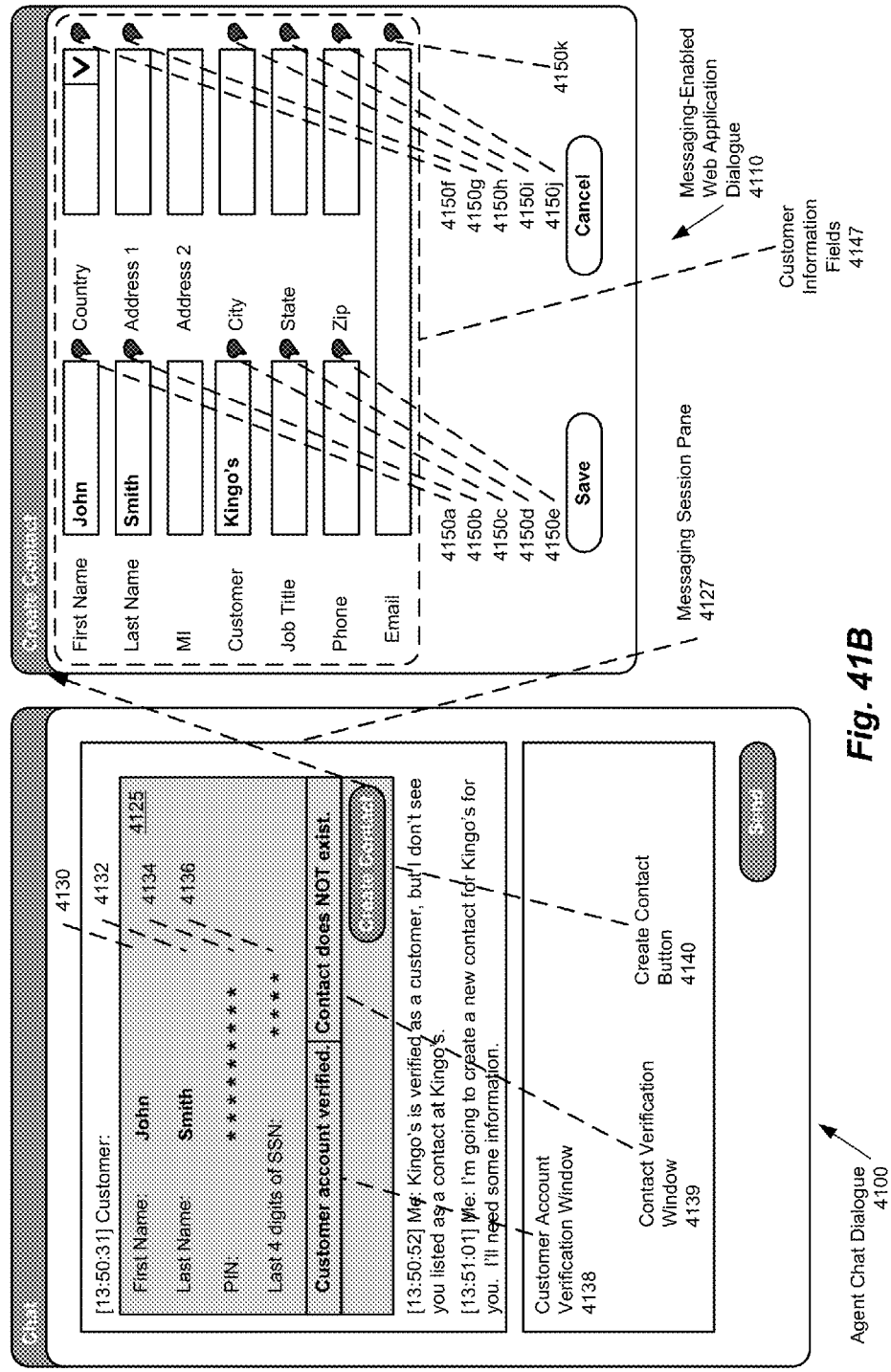
FIG. 41B is a block diagram illustrating an example of an agent dialogue presented by a messaging system and a user interface of a web application, according to embodiments of the present invention.

FIG. 41B is a block diagram illustrating an example of an agent dialogue presented by a messaging system and a user interface of a web application, according to embodiments of the present invention. FIG. 41B depicts an example of the use of a form (e.g., based on an approach employing a structured data object, a dynamic form object, or the like). In this example, a form 4125 has been pushed into the given messaging session, and so appears in a messaging session pane 4127 of agent chat dialogue 4100. As illustrated, the customer ("John Smith") has entered his first and last name (e.g., in a first name field 4130 and a last name field 4132, respectively). The customer has also entered his person identification number (PIN) (e.g., in a PIN field 4134, which has been masked in a manner comparable to that discussed elsewhere herein), as well as the last four digits of the customer's social security number (SSN) (e.g., in an SSN field 4136, also masked).

At this point, the customer having entered and submitted this information to the customer service agent via the messaging session, form 4125 initiates verification of the customer account and contact information. In the example depicted in FIG. 41B, the results of the verification are displayed in a customer account verification window 4138 (e.g., in the example of FIG. 41B, indicating that the customer account has indeed been verified) and a contact verification window 4139 (e.g., indicating in the example of FIG. 41B that John Smith does not exist as a contact associated with the given customer account). Given that John Smith does not exist as a contact for this customer account (in the example of FIG. 41B, a fictitious company referred to as "Kingo's"), form 4125 presents the customer service agent with a create contact button 4140.

By selecting create contact button 4140, the customer service agent can cause a web application dialogue to be displayed. Alternatively, it will be appreciated that, in light of the present disclosure, the actions set in motion by the agent's selection of create contact button 4140 can also be performed automatically, for example, upon an indication in contact verification window 4139 that the contact does not exist (e.g., for the given customer). In the example depicted in FIG. 41B (in which the contact does not exist and the agent has selected create contact button 4140), the web application dialogue thus displayed is messaging-enabled, and so is referred to as a messaging-enable web application dialogue 4145. As before, messaging-enabled web application dialogue 4145 includes a number of customer information fields 4147. However, in the example depicted in FIG. 41B, certain ones of customer information fields 4147 are messaging-enabled. In this example, the messaging-enabled ones of customer information fields 4147 have associated with them a push-to-messaging-session (PTMS) button (depicted in FIG. 41B as PTMS buttons 4150a-4150-k). PTMS buttons 4150a-4150k allow a user (e.g., a customer service agent) to select one of PTMS buttons 4150a-4150k in order to push a corresponding one of customer information fields 4147 into the agent's message entry pane, and ultimately, into the given messaging session. In the example depicted in FIG. 41B, fields for the contact's first name, last name, and customer's name in customer information fields 4147 of web application dialogue 4110 are auto-completed from information appearing in form 4125 (though, as will be appreciated in light of the present disclosure, such information need not actually be displayed in such a form in order to be made available to other applications, as the customer's name in this example and other information in subsequent examples demonstrate).

Figure 41C:
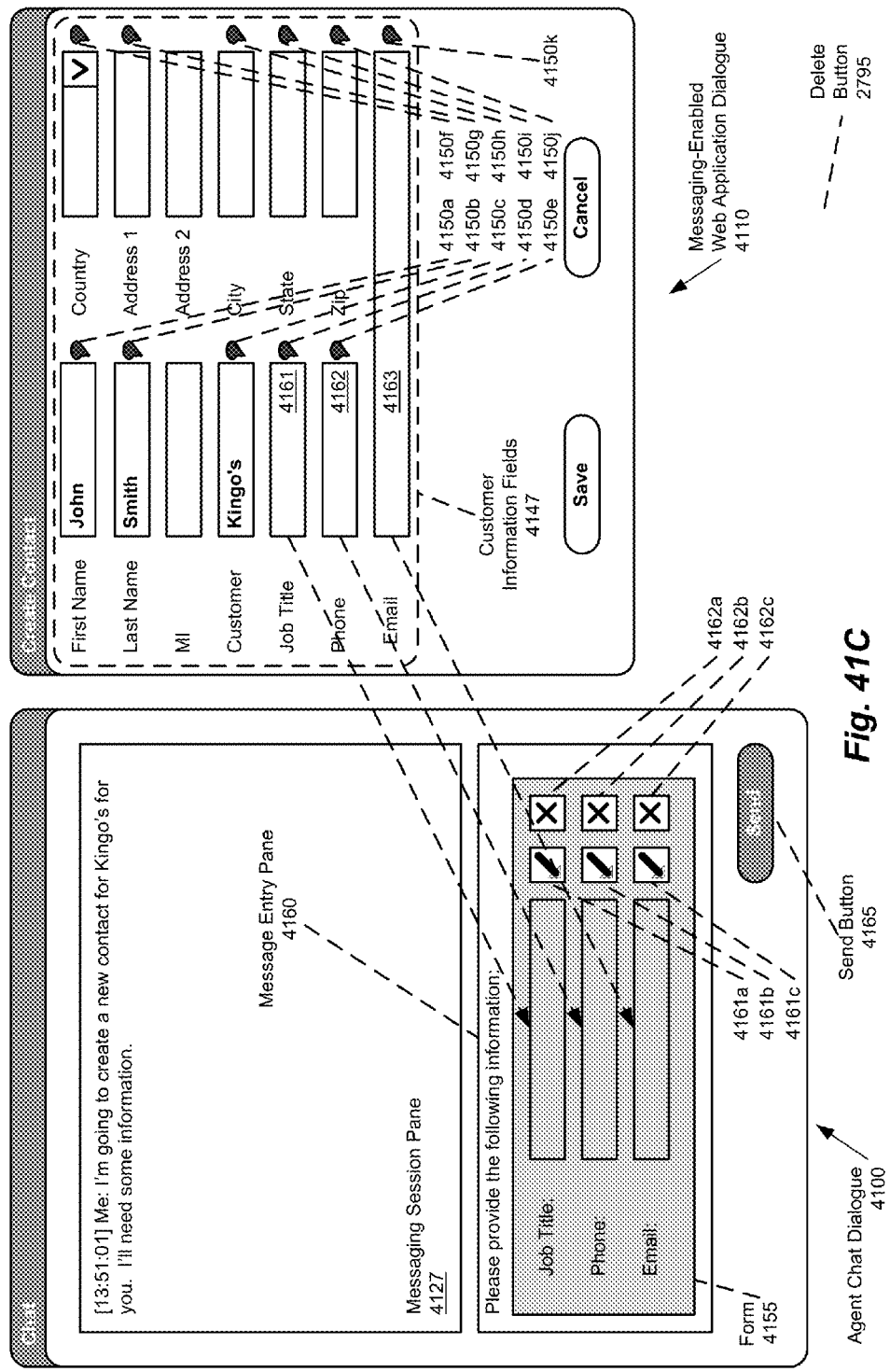
FIG. 41C is a block diagram illustrating an example of an agent dialogue presented by a messaging system and a user interface of a web application, according to embodiments of the present invention, in which the creation of a dynamic form is depicted.

FIG. 41C is a block diagram illustrating an example of an agent dialogue presented by a messaging system and a user interface of a web application, according to embodiments of the present invention, in which the creation of a dynamic form is depicted. FIG. 41C depicts an example of the use of a message-enabled web application supports push-to-messaging-session (PTMS) functionality, thereby allowing a user (e.g., a customer service representative) to dynamically build one or more forms for submission into a messaging session.

In the example depicted in FIG. 41C, the customer service representative (agent) has accessed a message-enabled web application, resulting in the display of a messaging-enabled web application dialogue (as before, messaging-enabled web application dialogue 4145), which includes a number of customer information fields, for example (as before, depicted in FIG. 41C as customer information fields 4147) and their corresponding PTMS buttons (as before, depicted in FIG. 41C as PTMS buttons 4150a-4150k). As noted, the agent is able to select or more of PTMS buttons 4150a-4150k, in order to insert the corresponding one of customer information field 4147 into a form 4155 in a message entry pane 4160 of agent chat dialogue 4100. In the example depicted in FIG. 41C, the agent has selected PTMS buttons 4150d, 4150e, and 4150k, corresponding to a job title field 4161, a telephone number field 4162, and an email address field 4163. By selecting these fields, the agent is able to build form 4155 in message entry pane 4160. In terms of the constructs depicted in FIG. 34, these operations are the result of the given web application transferring information (e.g., elements of the DFO's structured data) to the messaging system, which, in turn, assembles this information (e.g., elements) into the form presented to the agent in the messaging application.

As will be appreciated from the present disclosure (e.g., FIGS. 30 and 31 and their associated descriptions), the messaging application/messaging system may provide the agent with the ability to edit the information in a form such as form 4155 as a whole, including, for example, the ability to delete one or more input fields presently in the form, change fonts, change font size, change shading, re-order input fields, and make other such revisions to the form. Further, in the case in which one or more fields (e.g., such as those depicted in FIGS. 41B-41F) are selected and appear in message entry pane 4160 (e.g., form 4155), each such element can be individually modified and/or deleted. To this end, form 4155 provides a number of field edit buttons (depicted in FIG. 41C as field edit buttons 4161a-4161c) and field deletion buttons (depicted in FIG. 41C as field deletion buttons 4162a-4162c). Thus, the functionality in this regard can be provided in a manner comparable to that discussed with regard to FIGS. 30 and 31, as noted, except that such functionality can be provided on a per-field basis (and can even be combined therewith). Further still, such functionality can be configured to allow modification/editing of the labels used to identify each field (e.g., if a label is not intuitive to the customer (e.g., due to its implementation as an agent-side application), the agent can edit the field to be more intuitive and useful to the customer.

Once the agent has selected the desired fields for form 4155, the agent can then select a send button 4165, which submits form 4155 into the agent's messaging session pane (as before, messaging session pane 4127) in agent chat dialogue 4100. In terms of the constructs depicted in FIG. 34, these operations result in the messaging system packaging the given form into a message, and providing the message to the client system for display in the client system's browser.

Figure 41D:
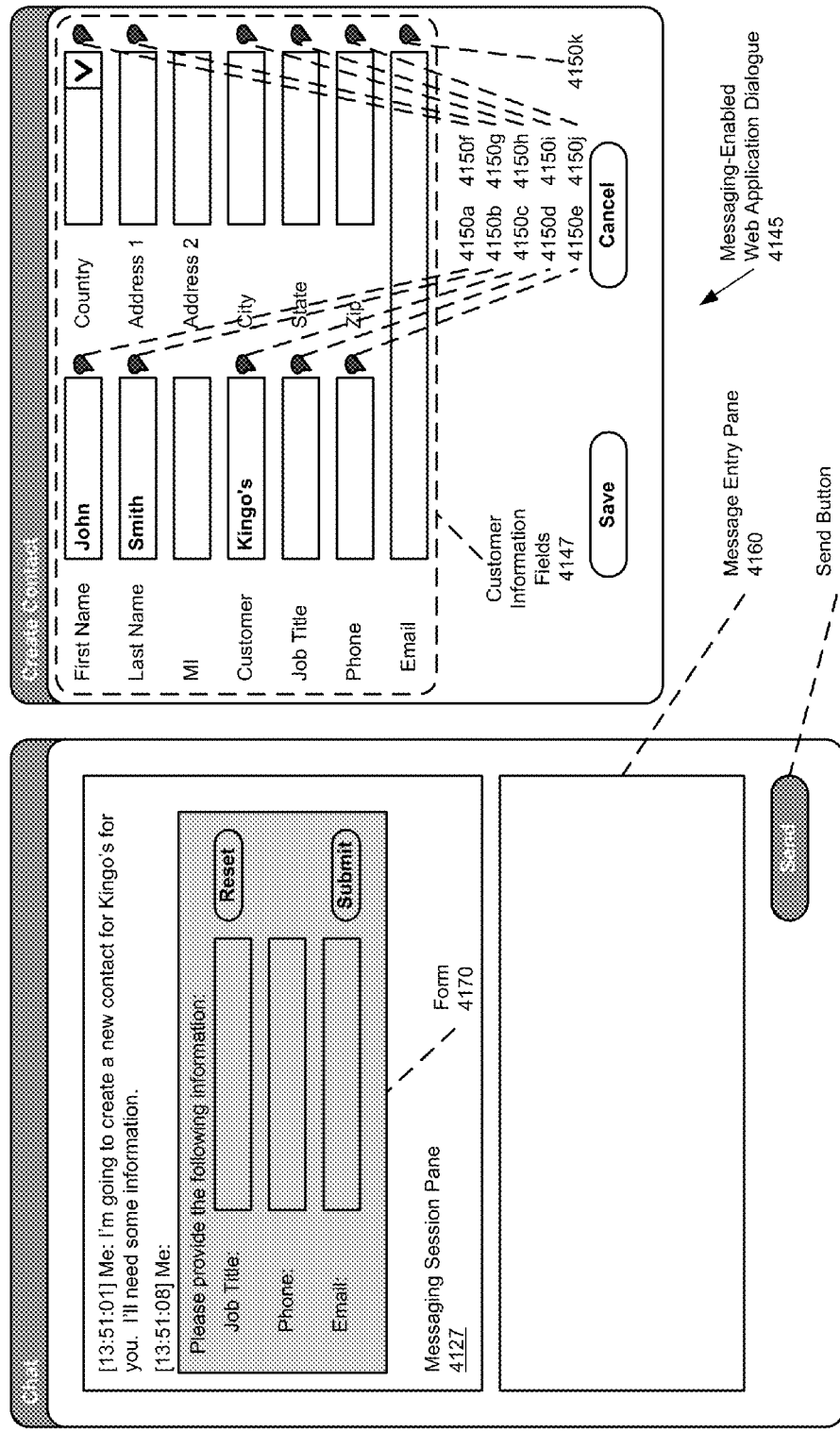
FIG. 41D is a block diagram illustrating an example of an agent dialogue presented by a messaging system and a user interface of a web application, according to embodiments of the present invention, in which the insertion of a dynamic form into a web chat is depicted.

FIG. 41D is a block diagram illustrating an example of an agent dialogue presented by a messaging system and a user interface of a web application, according to embodiments of the present invention, in which the insertion of a dynamic form into a web chat is depicted. FIG. 41D illustrates an example in which agent chat dialogue 4100 and messaging-enabled web application dialogue 4145 are in a state subsequent to the agent's selection of send button 4165. In the scenario depicted in FIG. 41D, form 4155 has been submitted into the given messaging session, and so transferred from message entry pane 4160 form display in messaging session pane 4127 as a form 4170. As can be seen therein, form 4170 includes a request for the contact's job title, telephone number, and email address. A form comparable to form 4170 is also presented to the other messaging session participant(s), who then complete that form and submit the completed form back into the messaging session.

Figure 41E:
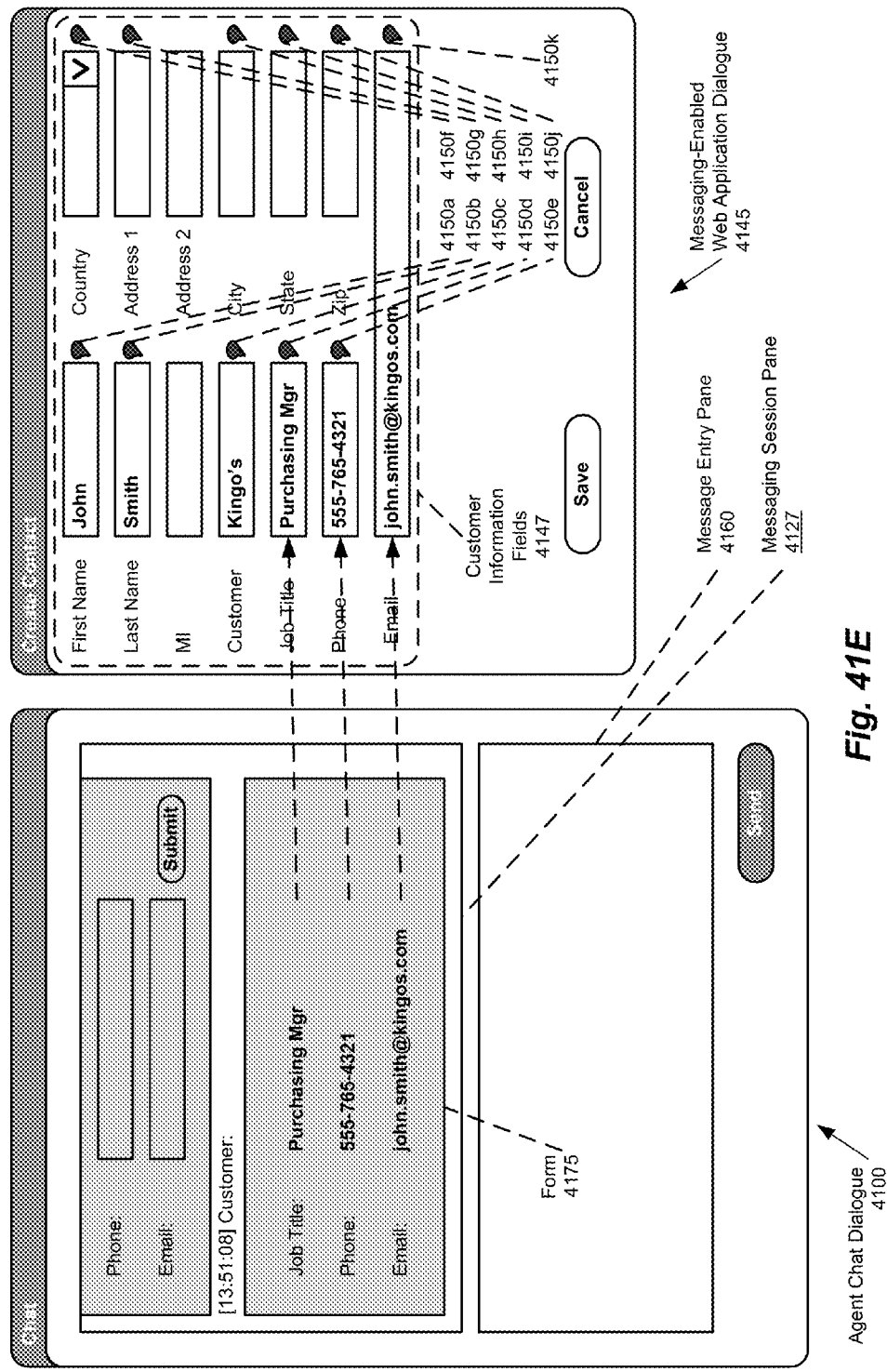
FIG. 41E is a block diagram illustrating an example of an agent dialogue presented by a messaging system and a user interface of a web application, according to embodiments of the present invention, in which information from a dynamic form automatically populates certain fields of the web application's user interface.

FIG. 41E is a block diagram illustrating an example of an agent dialogue presented by a messaging system and a user interface of a web application, according to embodiments of the present invention, in which information from a dynamic form automatically populates certain fields of the web application's user interface. FIG. 41E depicts the next phase of the example, in which agent chat dialogue 4100 and messaging-enabled web application dialogue 4145 reflect the results of a customer's completion of a form and submission of that completed form into the messaging session. At this point, the other user (e.g., the customer) has completed the version of form 4170 displayed in their chat dialogue, and has submitted the completed form into the messaging session. This submitted form appears in messaging session pane 4127 as a form 4175. The messaging system then transfers the information thus provided to the appropriate customer information fields of messaging-enabled web application dialogue 4145, and more specifically, to job title field 4161, telephone number field 4162, and email address field 4163.

Figure 41F:
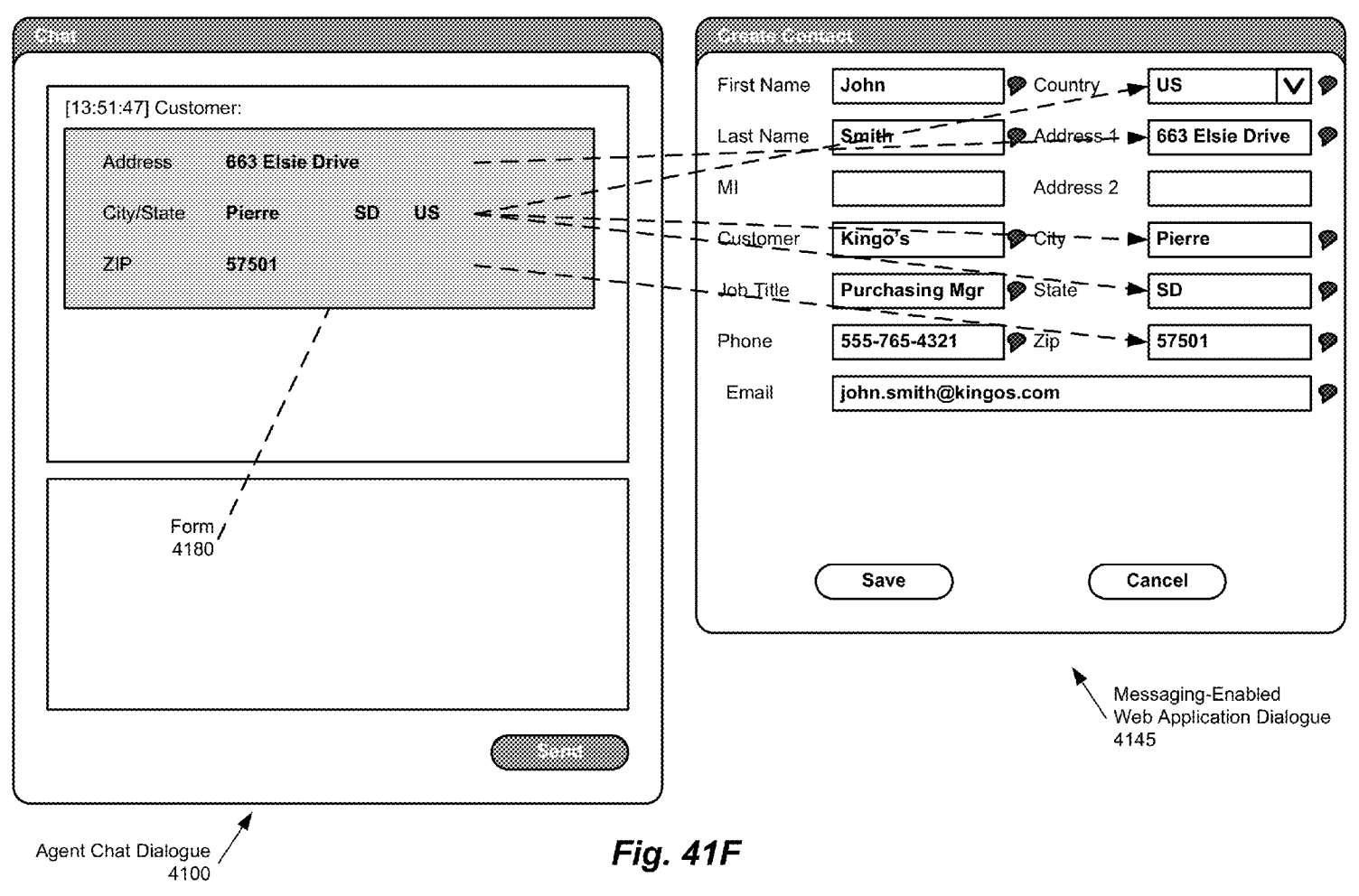

FIG. 41F is a block diagram illustrating another example of an agent dialogue presented by a messaging system and a user interface of a web application, according to embodiments of the present invention, in which information from a dynamic form automatically populates certain fields of the web application's user interface. In the scenario depicted in FIG. 41F, the example continues with the provision by the customer of the information (address information) depicted in form 4180 of FIG. 41F. A form soliciting such information from the customer is built by the agent by selecting the appropriate ones of PTMS buttons 4150f-4150j.

The foregoing operations, in the aggregate, are referred to herein as dynamic form generation (e.g., as depicted in FIGS. 41A, 41B, 41C, 41D, 41E, and 41F). As will be appreciated in light of the present disclosure, such dynamic form generation can be combined with the use of pre-defined forms (e.g., as depicted in FIGS. 27, 28, and 29). For example, in the CRM context, dynamic form generation can be combined with predefined forms by using various criteria (e.g., historical usage for a given agent, agents in a given area, and the like) to determine the configuration of the pre-defined forms presented to an agent. In such an approach, an agent's repetitively pushing certain input fields into a messaging session with a given customer may be used to suggest new pre-defined forms that the messaging system can present to the agent whenever the given customer is being assisted. Further, as will be appreciated in light of the aforementioned figures, the agent is also at liberty to create a form that includes all the fields needed to complete the corresponding fields of messaging-enable web application dialogue 4145 (or other alternative combinations thereof, based on relationships therebetween, ease of use for the customer, and/or other such considerations), demonstrating the flexibility of a messaging system according to embodiments of the present invention.

Figure 42A:
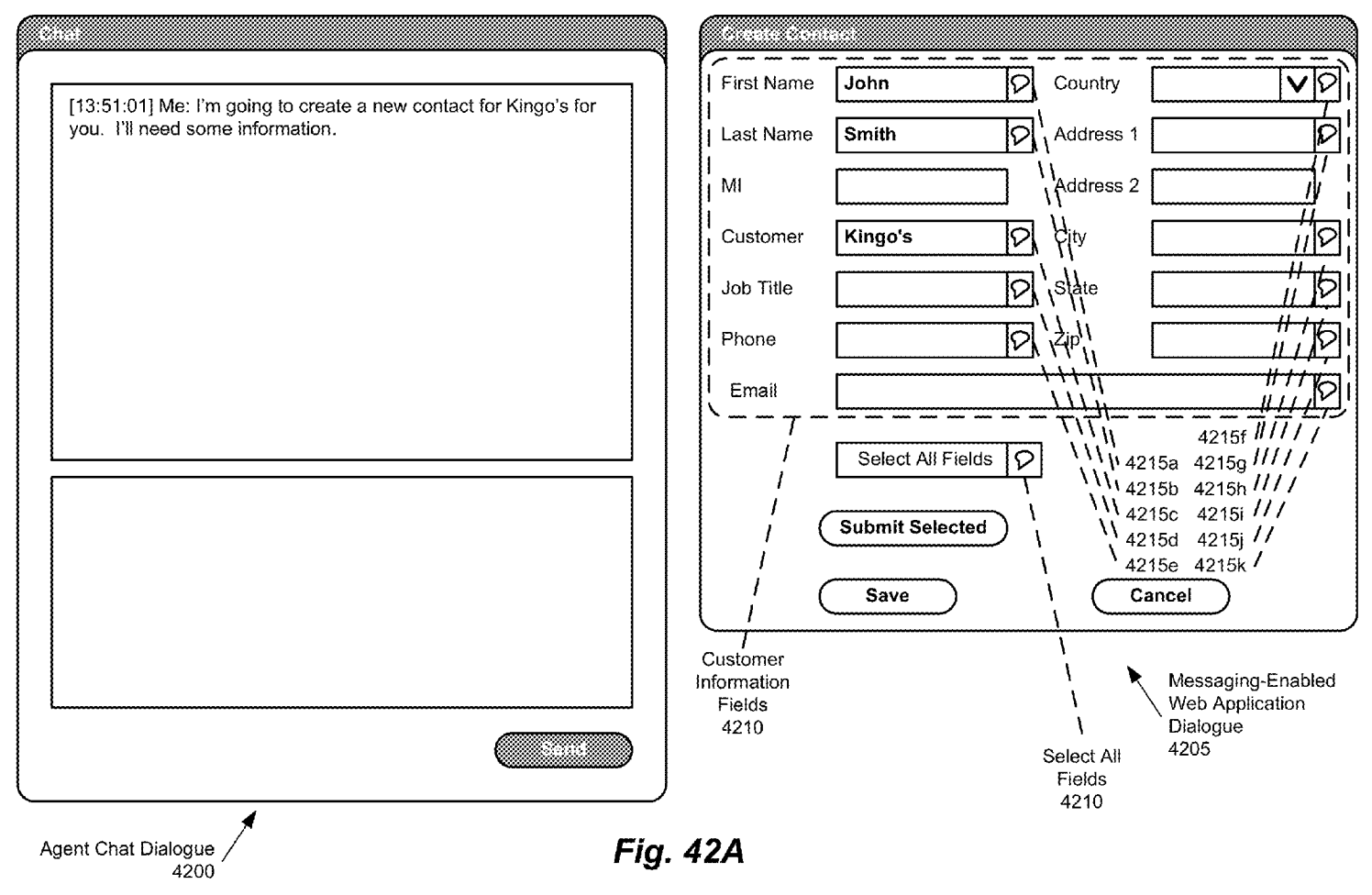

FIG. 42A is a block diagram illustrating an example of an agent dialogue presented by a messaging system and a user interface of a web application, according to embodiments of the present invention, in which the web application's user interface provides support for input field selection/submission functionality. FIG. 42A depicts a scenario in which an agent chat dialogue 4200 and a messaging-enabled web application dialogue 4205 are employed by a user such as an agent to solicit information from another user (e.g., such as a customer). In the example depicted in FIG. 42A, messaging-enabled web application dialogue 4205 includes a number of customer information fields (depicted in FIG. 42A as customer information fields 4210). Corresponding to certain ones of customer information fields 4210 are PTMS buttons 4215a-4215k. PTMS buttons 4215a-4215k can be selected by a user such as the agent in order to indicate that the input field(s) corresponding thereto should be added to a form being generated in a message entry pane of agent chat dialogue 4200. In the scenario depicted in FIG. 42A, PTMS buttons 4215a, 4215b, and 4215c have been selected by the agent. Such selection is signified in FIG. 42A by the darkening of the aforementioned PTMS buttons.

Moreover, a "select all" button (depicted in FIG. 42A as a select all fields button 4216) can be provided in order to simplify the agent's work in preparing and submitting a form including the desired fields. In fact, once such an operation is performed (having prepared a "draft" of the form by submitting all the fields, e.g.), the agent can then edit the form thus created in a manner such as that described elsewhere herein. As will be appreciated in light of the present disclosure, a variety of groupings can be employed in order to simplify the agent's work in preparing and submitting a form into a given messaging session (e.g., an address PTMS button to push the requisite address fields into a given form), after which editing of the form can be performed, as may be necessary and/or desired. Further still, historical information can serve as the basis for creating such forms (e.g., a PTMS button that allows the agent to create a form like the last one created, or the last one create for a given client/situation, or the like). As will be appreciated in light of the present disclosure, a wide variety of such alternatives are possible, and are intended to come within the scope of the present disclosure.

Figure 42B:
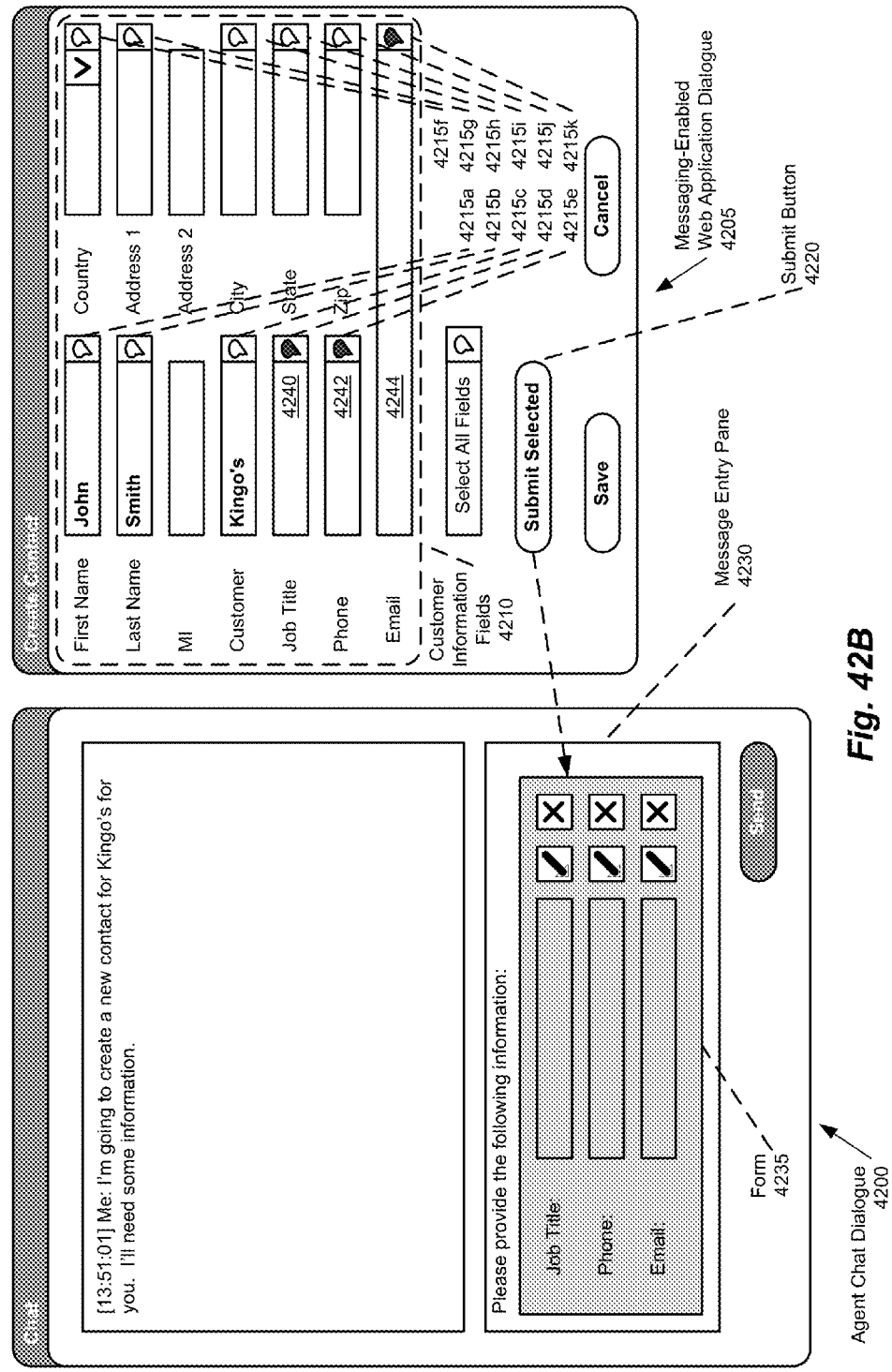
FIG. 42B is a block diagram illustrating an example of an agent dialogue presented by a messaging system and a user interface of a web application, according to embodiments of the present invention, in which the use of selection/submission functionality is depicted.

FIG. 42B is a block diagram illustrating an example of an agent dialogue presented by a messaging system and a user interface of a web application, according to embodiments of the present invention, in which the use of selection/submission functionality is depicted. Once the user has selected the desired PTMS buttons, the agent can select a submit button 4220, in order to submit the input fields selected using the PTMS buttons, into a message entry pane 4230 as a form 4235. In the present example, PTMS buttons 4215d, 4215e, and 4215k have been selected (given that the contact's first and last names, as well as customer name, have been auto-completed in the manner described in connection with FIGS. 41A-41F), and thus, upon selection of submit button 4220, the messaging system submits a job title field 4240, a telephone number field 4242, and an email address field 4244 of customer information field 4210. Job title field 4240, telephone number field 4242, and email address field 4244 are then used by the messaging system to generate form 4235.

Figure 42C:
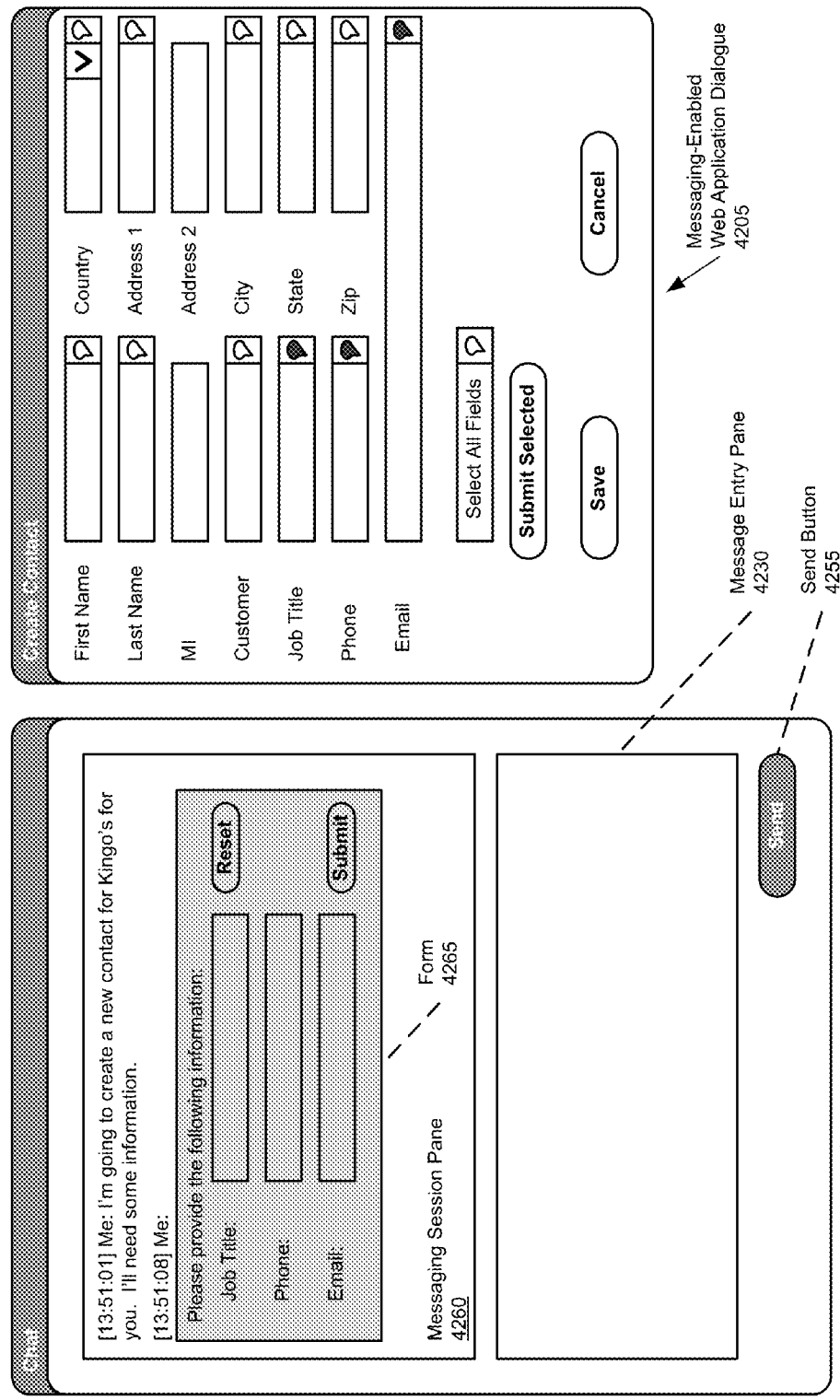
FIG. 42C is a block diagram illustrating an example of an agent dialogue presented by a messaging system and a user interface of a web application, according to embodiments of the present invention, in which the use of selection/submission functionality is further depicted.

FIG. 42C is a block diagram illustrating an example of an agent dialogue presented by a messaging system and a user interface of a web application, according to embodiments of the present invention, in which the use of selection/submission functionality is further depicted. FIG. 42C depicts the state of agent chat dialogue 4200 subsequent to the submission of form 4235 into the messaging session. Once the messaging system presents form 4235 in message entry pane 4230, the agent can submit form 4235 into the messaging session by selecting a send button 4255. Form 4235 then appears in a messaging session pane 4260 as a form 4265. A form corresponding to form 4265 also appears in the customer's chat dialogue, allowing the customer to enter the requested information. Once the customer has entered the requested information, the customer can submit the now-completed form back into the messaging session.

Figure 42D:
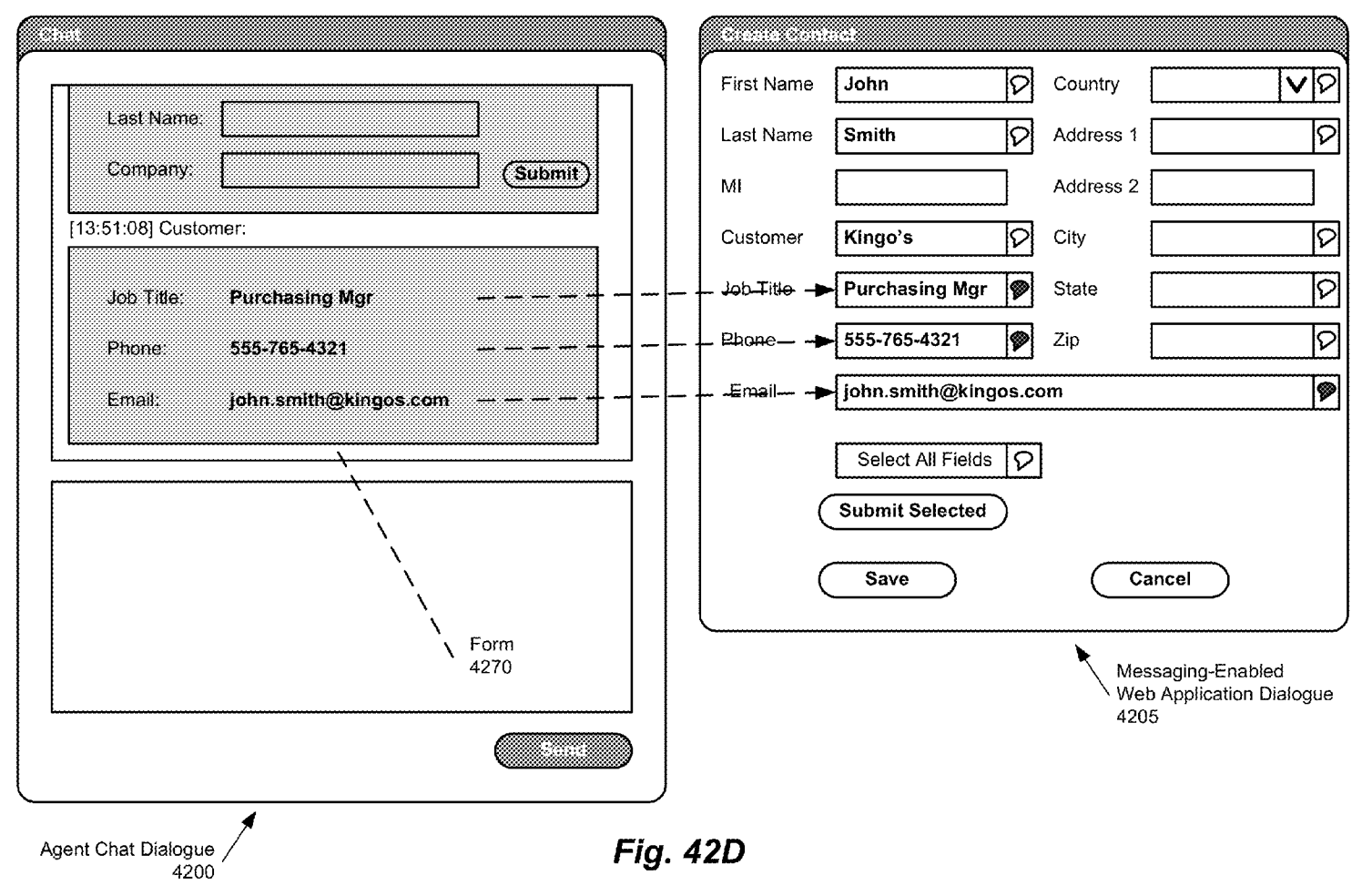

FIG. 42D is a block diagram illustrating an example of an agent dialogue presented by a messaging system and a user interface of a web application, according to embodiments of the present invention, in which information from a dynamic form automatically populates certain fields of the web application's user interface. FIG. 42D illustrates a point in the present example in which a customer has completed the form thus presented, and submitted the completed form back into the messaging session. This completed form then appears in the messaging session pane of the agent's chat window (e.g., messaging session pane 4260) as a form 4270. At this juncture, the information provided in form 4270 is available to the messaging system. The messaging system can then automatically populate the appropriate fields of messaging-enabled web application dialogue 4205 (e.g., certain of customer information fields 4210). In the present example, the contact's job title ("Purchasing Mgr") is automatically obtained from form 4270 and used to populate job title field 4240. Similarly, the contact's telephone number ("555-765-4321") is used to automatically populate telephone number field 4242, and the contact's email address ("john.smith@kingos.com") is transferred from form 4270 and used to populate email address field 4244

Figure 43:
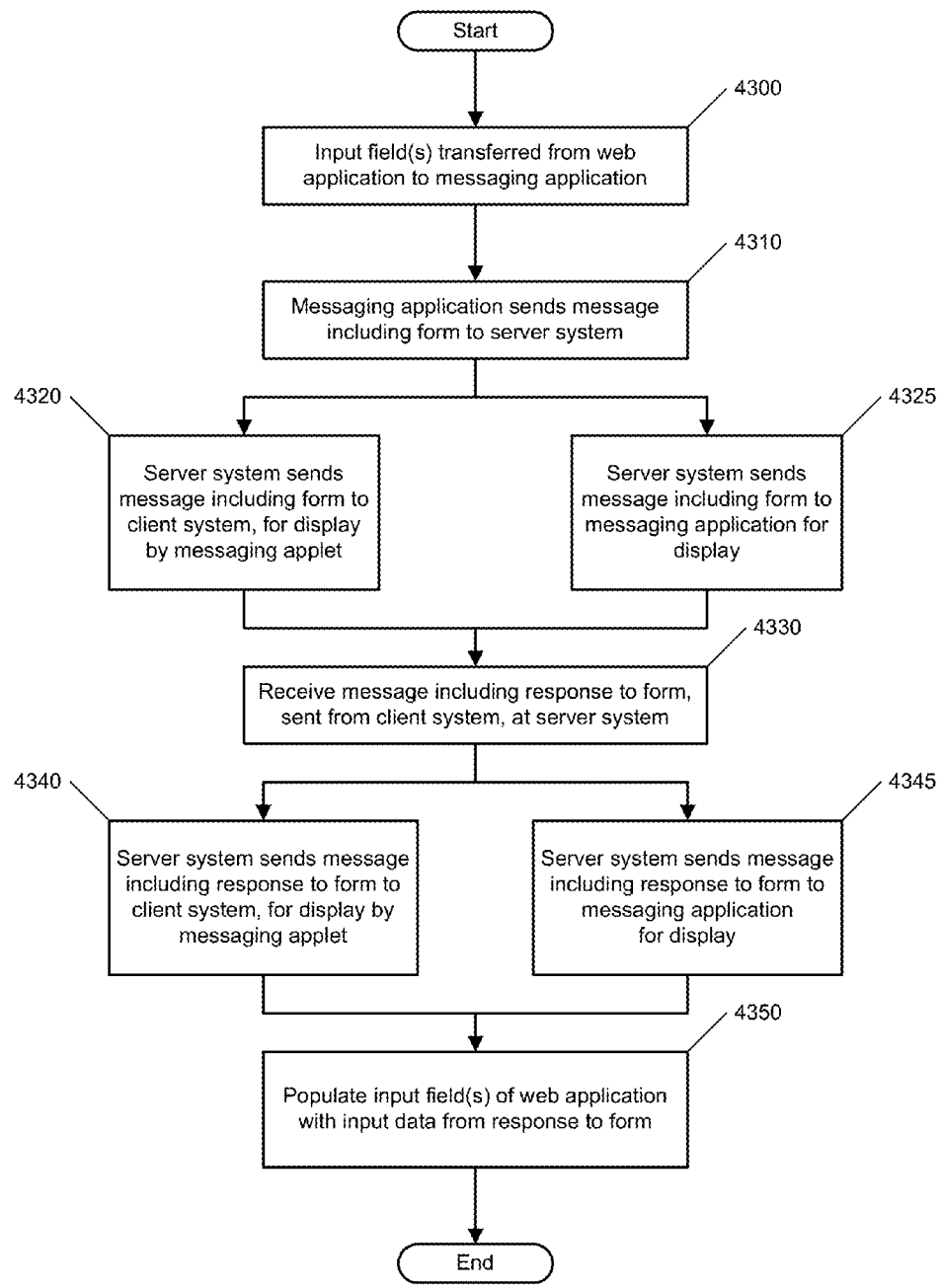
FIG. 43 is a flow diagram illustrating an example of the operations performed in conducting a messaging session according to embodiments of the present invention.

Example Messaging System Communications Supporting Auto-Population of Input Fields FIG. 43 is a flow diagram illustrating an example of the operations performed in submitting a form (e.g., a dynamic form object and/or dynamic form object information) into a messaging session, receiving a response thereto, and auto-populating certain input fields of a web application. Also illustrated are the operations involved in automatically populating one or more input fields of a web application dialogue.

The process depicted in FIG. 43 begins with a user (e.g., a customer service agent) selecting one or more input fields to be used in creating a form to be pushed into the messaging session (step 4300). Once the requisite input fields have been assembled, the form thus generated is submitted into the messaging session, for example, by the messaging application sending the message (including the form) to the server system (step 4310).

Once the server system has received the message, as part of processing the message and forwarding the requisite information to the other participant(s) in the messaging session, the server system sends the message (including the form) to the client system, for display by a messaging applet executed thereon (step 4320). The server system also sends a message (including the form) back to the messaging application for display on the sender's messaging dialogue (step 4325). The server system then waits for a reply to this message, which will be received from the client system (not shown). Once a message is sent from the client system in response to the original message, the reply message (including a response to the form) is received at the server system (step 4330).

In a manner comparable to that described earlier with regard to the original message, the server system then sends a message (including the response to the form) to the client system, for display by the messaging applet (step 4340). At substantially the same time (or thereafter), the server system sends the message (including the response to the form) to the messaging application for display in the messaging session pane of the messaging application's window (step 4345). Once this information has been sent to the client system and messaging application (at substantially the same time or thereafter) (steps 4340 and 4345), the input data corresponding to each of the one or more input fields is used to automatically populate the corresponding input fields of the web application dialogue (step 4350). Once the input fields of the web application dialogue have been populated, the process concludes.

Figure 44:
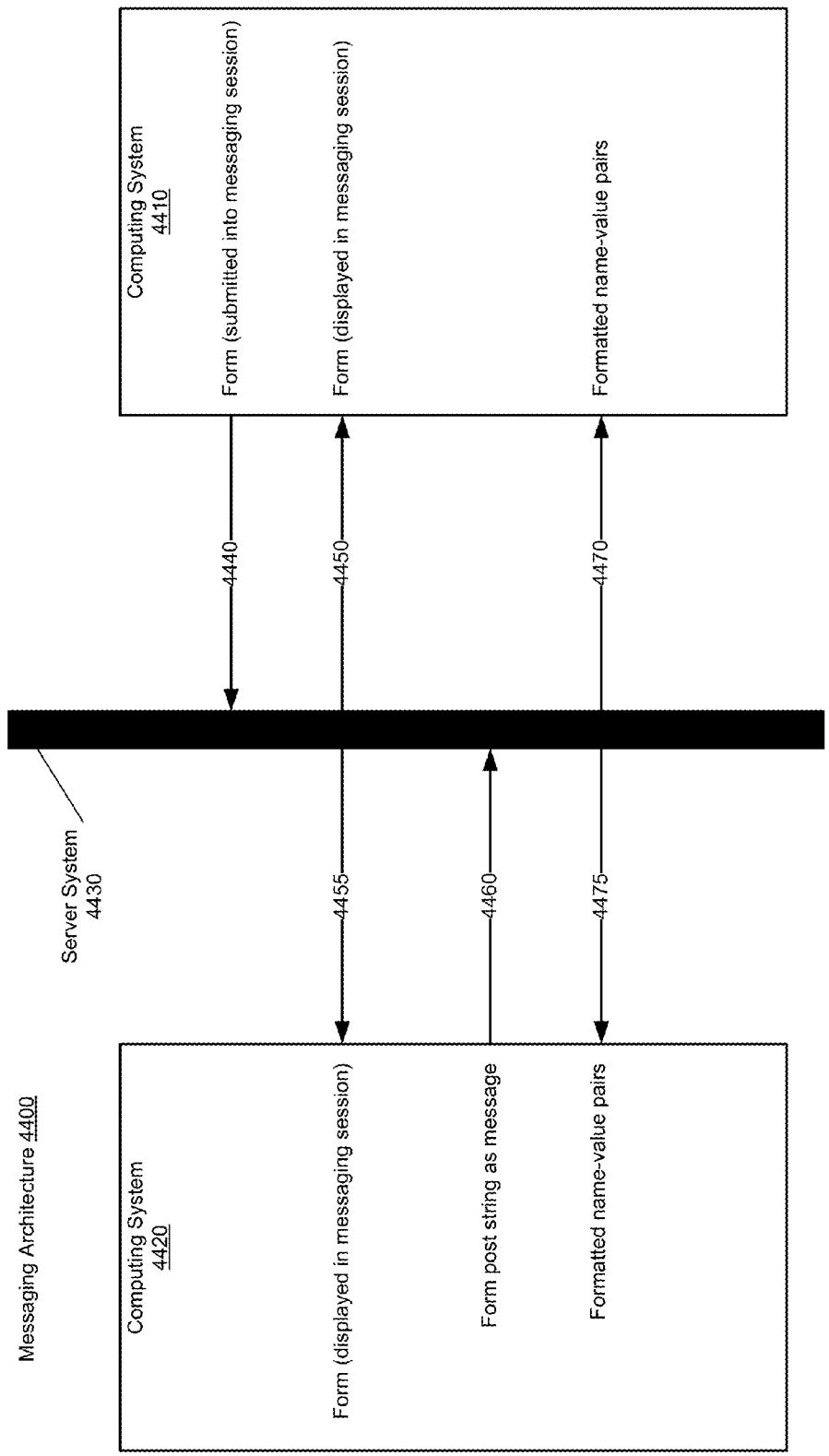
FIG. 44 is a block diagram illustrating an example of the operations and messages involved in conducting a messaging session according to embodiments of the present invention.

FIG. 44 is a block diagram illustrating example communications that can take place in a messaging architecture according to embodiments of the present invention. As depicted in FIG. 44, a messaging architecture 4400 is depicted as including a computing system 4410 and a computing system 4420. Computing system 4410 and computing system 4420 communicate with one another via a server system 4430. Server system 4430 can be implemented, for example, by one or more servers (e.g., messaging system 1140 of FIG. 11A, messaging system 3440 of FIG. 34, or the like), which can include, for example, an online chat server (e.g., an eXtensible Messaging and Presence Protocol (XMPP) server).

In operation, computing system 4410 submits a form into the current messaging session (depicted in FIG. 44 as a message 4440). This can be accomplished using one of the approaches described herein, for example. Server system 4430 then sends messages to computing system 4410 and computing system 4420 (depicted in FIG. 44 as a message 4450 and a message 4455, respectively), which are messages that include information regarding the form to be displayed in the messaging session pane displayed by each of computing systems 4410 and 4420.

Thus, message 4450 can be generated (and so displayable in the messaging session), for example, as follows:

```
<form>
  <label for="...">Promotion Code</label>
  <input type="text".../>
  ...
  <input type="submit" ... onclick="submitInChat"/>
  ...
</form>
```

Similarly, message 4455 can be generated (and so displayable in the messaging session), for example, as:

```
<form>
  <label for="...">Promotion Code</label>
  <input type="text".../>
  ...
</form>
```

In turn, a user employing computer system 4420 is then able to complete the form in question, and submits their response into the messaging session. This communication is depicted in FIG. 44 as a message 4460 sent from computing system 4420 to server system 4430. The form in message 4450 can be generated and posted (and so displayable in the messaging session), for example, using a format such as: Promotion+code=75starter&Referral+code=1es1267& . . .

Upon receipt of message 4460 (including the form post string), server system 4430 proceeds with providing the results thereof to computing systems 4410 and 4420. Such results (the user's reply) are provided by way of messages that include formatted name-value pair (depicted in FIG. 44 as a message 4470 and a message 4475).

Thus, message 4470 can be generated (and so displayable in the messaging session) using, for example, formatted name-value pairs, in a manner such as:

```
<div class="...">
  <div class="pair">
    <span class="name">...</span>
    <span class="value">...</span>
  </div>
</div>
```

Similarly, message 4475 can be generated (and so displayable in the messaging session) using, for example, formatted name-value pairs, such as:

```
<div class="...">
    <div class="pair">
  <span class="name">...</span>
  <span class="value">...</span>
    </div>
</div>
```

Figure 45:
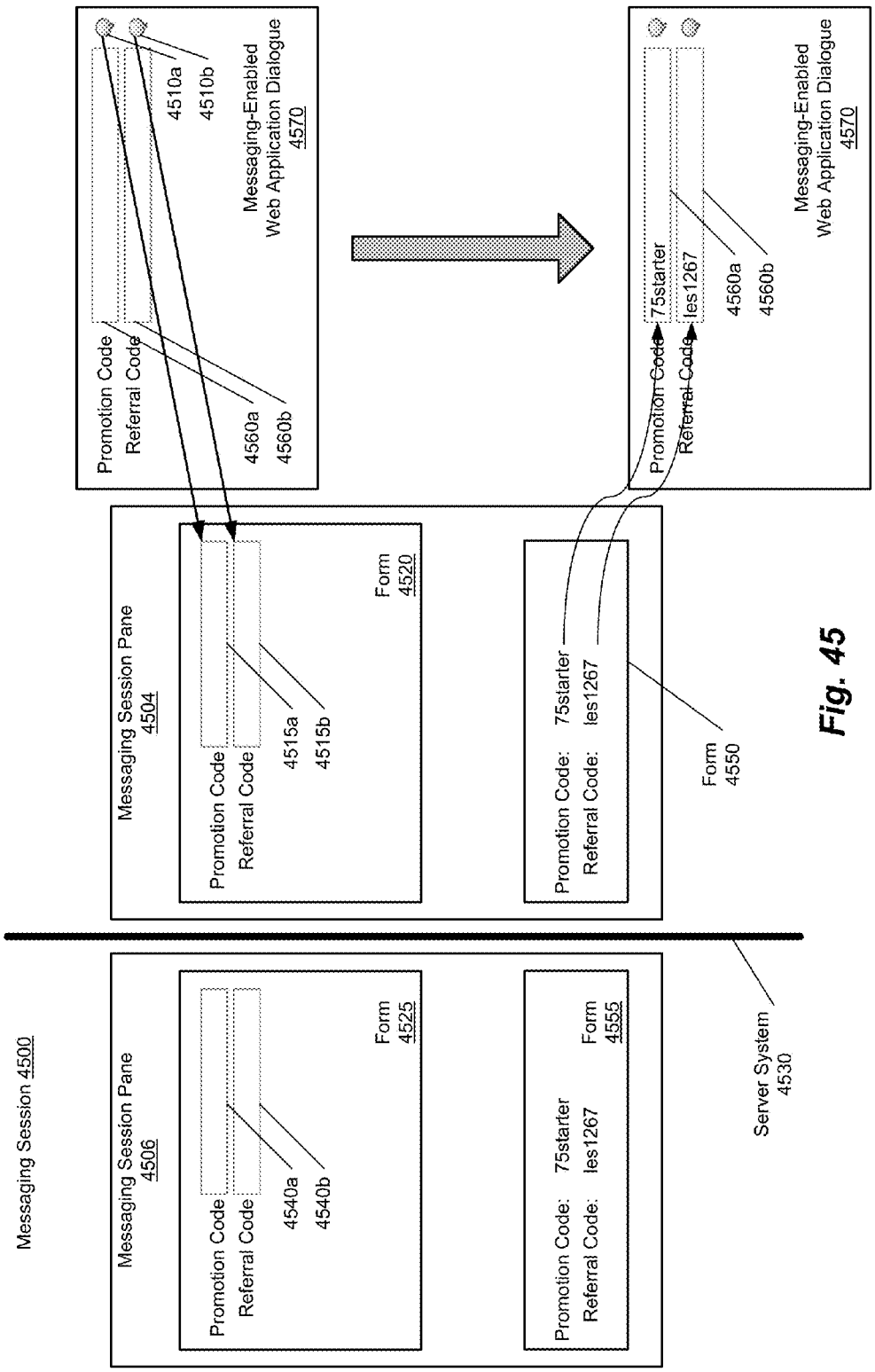
FIG. 45 is a block diagram illustrating example user interfaces displayed during a messaging session according to embodiments of the present invention.

FIG. 45 is a block diagram illustrating example user interfaces displayed during the creation of a form, submission of the newly-created form into a messaging session (depicted in FIG. 45 as a messaging session 4500), receipt of input data corresponding to the input fields of that form, and auto-population of the corresponding input fields of a messaging-enabled web application dialogue, according to embodiments of the present invention. As depicted in FIG. 45, a first user's messaging session pane (depicted in FIG. 45 as a messaging session pane 4504) displays the communications between the first user and a second user who employs another messaging session pane (depicted in FIG. 45 as a messaging session pane 4506) to communicate with the first user.

In operation, the communications conducted in the architecture depicted in FIG. 45 begin with the creation of a form (e.g., a dynamic form object), which is accomplished by the first user selecting one or more push-to-messaging-session (PTMS) buttons (such selections being depicted in FIG. 45 by the selection of PTMS buttons 4510a and 4510b). The selection of PTMS buttons 4510a and 4510b result in the insertion of the corresponding input fields into a form (depicted in FIG. 45 as an input field 4515a and an input field 4515b), which are ultimately submitted into the messaging session between the first and second users. As part of creating the form for submission into the messaging session, the JavaScript hash table is updated to associate the label/name in the messaging session and the input identifier for the input field in the web application's web page. This association allows information supplied by the customer for these fields to be associated with the proper corresponding input fields.

As is depicted in FIG. 45, the form containing input fields 4515a and 4515b appear in the first user's messaging session pane (messaging session pane 4504) as part of a form 4520. Form 4520, having been submitted into the messaging session, also appears in messaging session pane 4506 (of the second user) as a form 4525, having been conveyed via a server system 4530.

Having receiving form 4525, the second user provides the requested information by entering input data in input fields 4540a and 4540b. The second user then submits this information into the messaging session, which appears as a form 4550 in messaging session pane 4504 and a form 4555 in messaging session pane 4506. At this juncture, information identifying input fields 4510a and 4510b are used to auto-populate input fields 4510a and 4510b with the input data provided by the second user. This is accomplished by the JavaScript code using the aforementioned label/name in the messaging session to identify the hash table entries that contain the corresponding input identifiers, and so determining which input fields in messaging-enabled web application dialogue 4570 to auto-populate. This operation is depicted in FIG. 45 by the auto-population of input fields 4560a and

4560b, and is reflected in the changes to messaging-enabled web application dialogue 4570.

Example Messaging System Communications Supporting Auto-Execution of Commands

Figure 46:
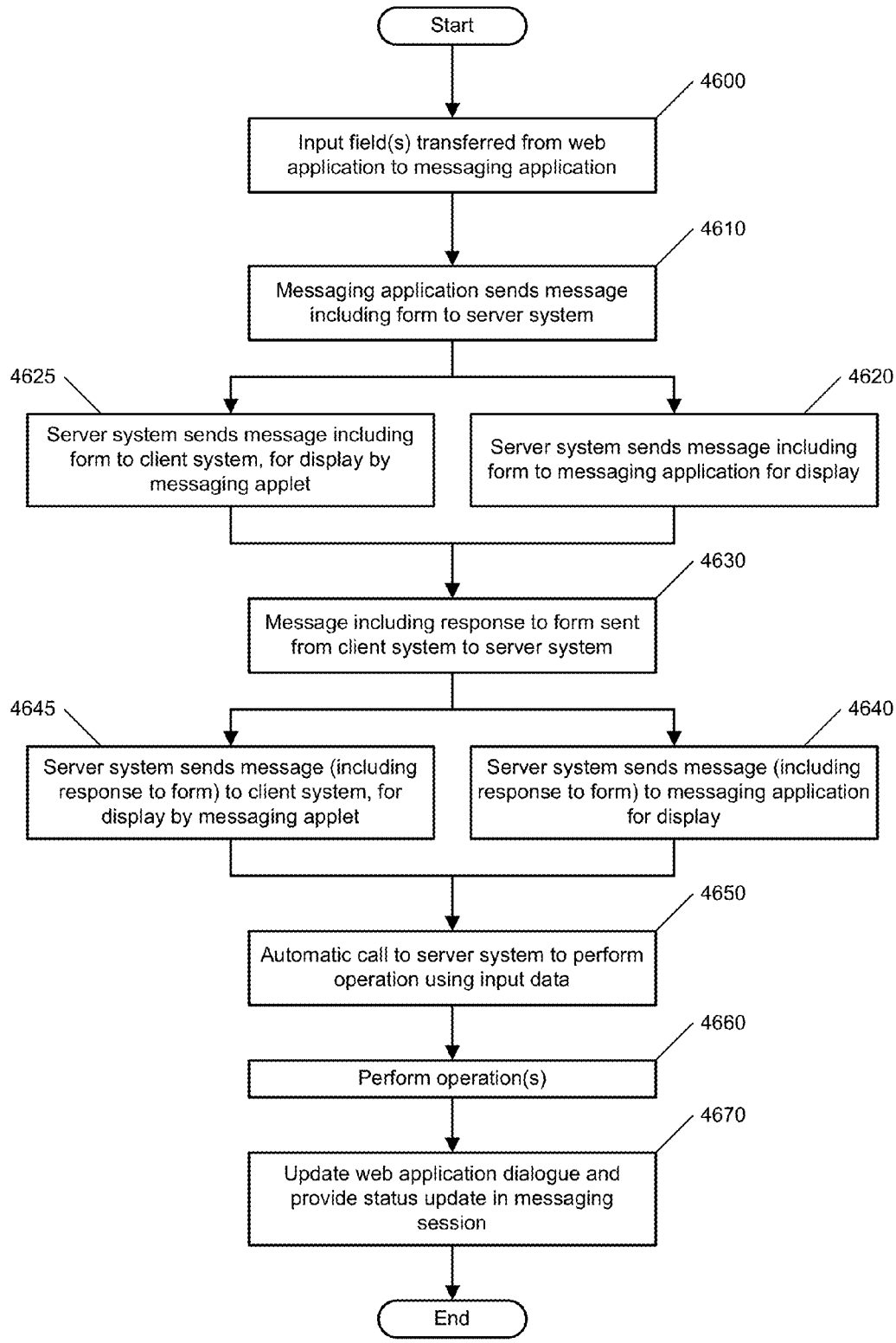
FIG. 46 is a flow diagram illustrating an example of the operations performed in conducting a messaging session according to embodiments of the present invention.

FIG. 46 is a flow diagram illustrating an example of the operations performed in conducting a messaging session according to embodiments of the present invention. The operations depicted in FIG. 46 include the submission of a form into a messaging session, the receipt of a response thereto, and the auto-population of certain input fields of an application, in which support for operational functionality is provided to a second user (e.g., a customer).

The process depicted in FIG. 46 begins with the transfer of one or more input fields from an application (e.g., a messaging-enabled application dialogue) to a messaging application (e.g., a messaging application used by a customer service agent (or more simply, an agent)) (step 4600). Next, the agent's messaging application sends a message (including the form in question) to the server system providing communications between the agent and the customer (step 4610). At this juncture, the server system sends a message (including the form in question) back to the messaging application for display (step 4620). At approximately the same time (or thereafter), the server system sends a message (also including the form in question) to the client system being used by the customer, for display by a messaging applet for display on the client system (step 4625).

Once the customer has entered the requested information into the form, the customer then submits the completed form into the messaging session. In turn, this message (including input data provided in response to the form) is sent from the client system to the server system (step 4630). As will therefore be appreciated, an element presented to a customer in a form in this manner is referred to herein as an "execution-enabled element." This indicates that selection of the GUI element not only results in the performance of one or more operations within the messaging system, but also initiates one or more operations within one or more applications (e.g., one or more enterprise or web applications). The server system then sends a message (including the aforementioned response) to the agent's messaging application for display by the agent's computer system (step 4640). At approximately the same time (or thereafter, of course), the server system sends a message (including the aforementioned response) back to the client system for display by the client system via the messaging applet (step 4645). At approximately the same time (or thereafter), a call is automatically made to the server system to perform one or more operations using the input data provided by the customer (step 4650). The requisite operation(s) are then performed (step 4660). Once the server system has performed the desired operations (e.g., searching a help database for a solution to a problem) the server system sends an update to the application dialogue and provides a status update in the messaging session (step 4670). Once the input fields of the application dialogue have been populated and the requisite operations performed, the process concludes.

Figure 47:
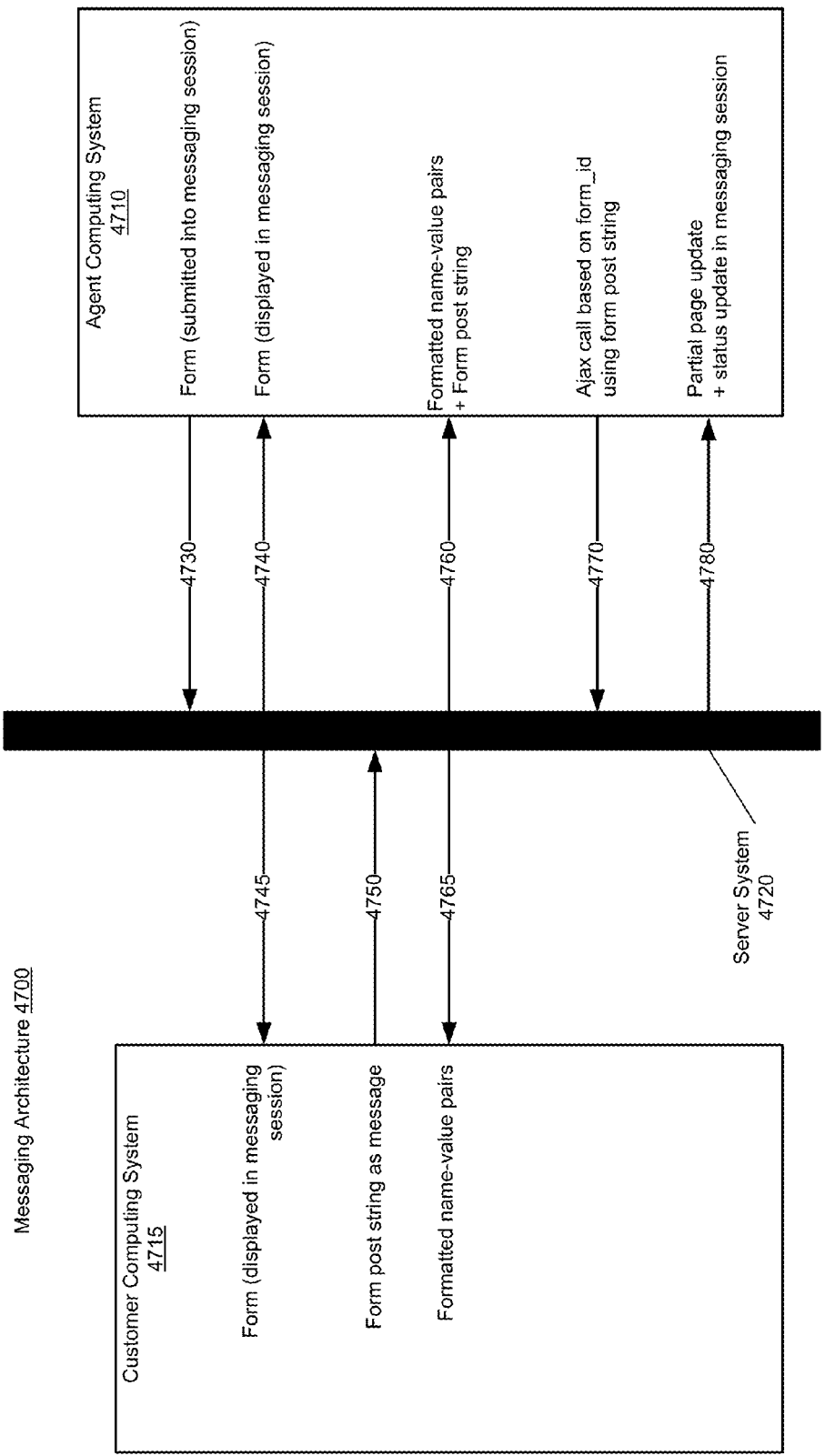
FIG. 47 is a block diagram illustrating an example of the operations and messages involved in conducting a messaging session according to embodiments of the present invention.

FIG. 47 is a block diagram illustrating an example of the operations and messages involved in conducting a messaging session according to embodiments of the present invention. FIG. 47 thus depicts an example of communications in a messaging architecture, such as a messaging architecture 4700, according to embodiments of the present invention. In messaging architecture 4700, an agent computing system 4710 and a customer computing system 4715 communicate with one another via a server system 4720.

Server system 4720 supports various mechanisms to provide the requisite functionality to support a messaging system according to embodiments of the present invention. As before, server system 4720 can be implemented, for example, by one or more servers (e.g., messaging system 1140 of FIG. 11A, messaging system 3440 of FIG. 34, or the like). However, server system 4720 provides not only servers that include, for example, an online chat server (e.g., an XMPP server), but also support for one or more applications (e.g., via the provision of a web server (e.g., a Hyper-Text Transfer Protocol (HTTP) Server)). Software modules supported by server system 4720 can include, for example, a Cascading Style Sheet (CSS) form (e.g., "form.css"), a JavaScript module for processing the form (e.g., "form_process.js"), and a JavaScript module supporting functionality in the agent's console executed on agent computing system 4710 (e.g., "agent_console_process.js").

In operation, agent computing system 4710 submits a form into the current messaging session, which can be accomplished using one of the approaches described herein, for example. The form is communicated from agent computing system 4710 to customer computing system 4715 via server system 4720. In the scenario depicted in FIG. 47, the customer's response is used to not only auto-populate the input fields of a messaging-enabled application dialogue, but also to cause such submission to initiate the corresponding operation(s).

The process depicted in FIG. 47 thus begins with the submission of a form into the current messaging session as part of a message sent from agent computing system 4710 to server system 4720 (depicted in FIG. 47 as a message 4730). In turn, server system 4720 sends a message 4740 to agent computing system 4710 and a message 4745 to customer computing system 4715, thereby displaying the given form in the messaging session displayed by agent computing system 4710 and customer computing system 4715, respectively.

Message 4740 can be generated (and so displayable in the messaging session) using a predefined form structure with a form identifier (form_id), for example, as follows:

```
<form>
   <label>Printer...</label>
   <select>...</select>
   ...
   <input type="hidden" name="form_id" value="solution_form"/>
   <input type="submit" ... onclick="submitInChat"/>
   ...
</form>
```

Message 4745 can be generated (and so displayable in the messaging session) using a predefined form structure with a form identifier (form_id), for example, as follows:

```
<form>
   <label>Printer...</label>
   <input type="text".../>
   ...
   <input type="hidden" name="form_id" value="solution_form"/>
   <input type="submit" ... disabled="disabled"/>
   ...
</form>
```

The customer then enters the requested information into the form, and submits the completed form into the messaging session. This submission can be accomplished by sending a form post string as a message 4750 from customer computing system 4715 to server system 4720. The form in message 4750 can be generated and posted (and so displayable in the messaging session), for example, using a format such as:
Printer+Model=PX1260S&Problem+Type=Driver+ Issue&Problem+Details=The+printer+stops+working+after+driver+update&form_id=solution_form& . . .

Once in receipt of message 4750, server system 4720 communicates the information thus received to agent computing system 4710 as a message 4760, and to customer computing system 4715 as a message 4765. Message 4760 includes one or more formatted name-value pairs as well as a form post string; message 4765 includes one or more formatted name-value pairs. Thus, message 4760 can be generated (and so displayable in the messaging session) using, for example, formatted name-value pairs, in a manner such as:

```
<div class="...">
    <div class="pair">
        <span class="name">...</span>
        <span class="value">...</span>
    </div>
</div>
```

Similarly, message 4765 can be generated (and so displayable in the messaging session) using, for example, formatted name-value pairs, such as:

```
<div class="...">
    <div class="pair">
        <span class="name">...</span>
        <span class="value">...</span>
    </div>
</div>
```

Once in receipt of message 4760, agent computing system 4710 makes a program call (e.g., an AJAX call) to server system 4720 (depicted in FIG. 47 as an AJAX call 4770), as a result of having received message 4760. In the case of AJAX call 4770, such a call can be based, for example, on the form identifier (e.g., form_id), using the form post string. As will be appreciated in light of the present disclosure, in certain embodiments, AJAX call 4770 is the same as (or comparable to) the form post string that can be launched in the agent's console on agent computing system 4710.

Once server system 4720 has received AJAX call 4770, the requested operations are performed (e.g., using the input data received in the form communicated in message 4760), and the results provided as a message 4780. Message 4780 can include, for example, information such as a partial page update, and can also be configured to result in a status update in the given messaging session.

Figure 48:
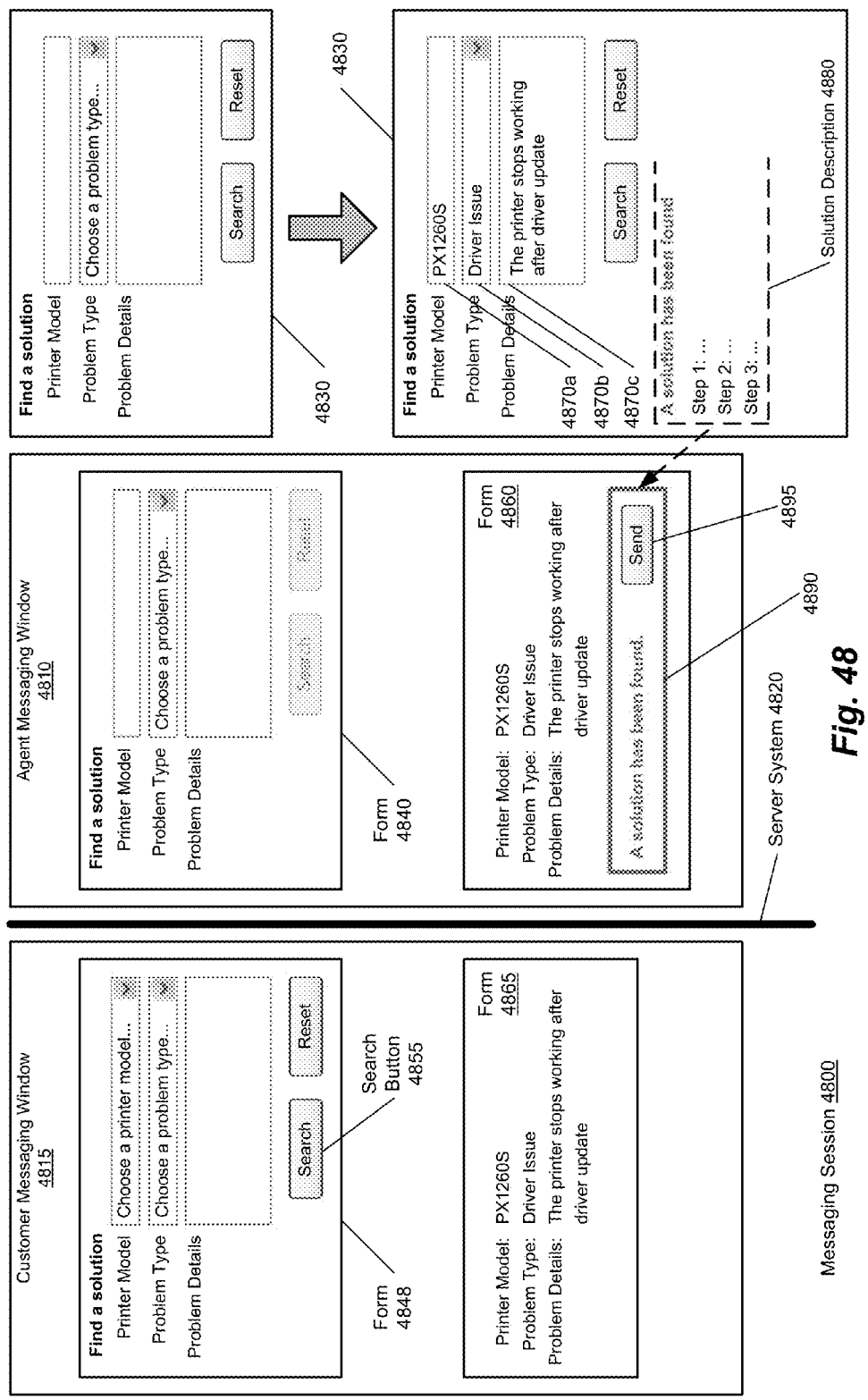
FIG. 48 is a block diagram illustrating example user interfaces displayed during a messaging session according to embodiments of the present invention.

FIG. 48 is a block diagram illustrating example user interfaces displayed during a messaging session according to embodiments of the present invention. The example depicted in FIG. 48 thus illustrates various communications (including various messages and forms) and changes resulting therefrom. The scenario depicted in FIG. 48 illustrates a messaging session 4800 that includes an agent messaging window 4810 and a customer messaging window 4815, which are communicatively coupled via a server system 4820. Also depicted is a messaging-enabled application dialogue 4830.

In a manner comparable to that discussed elsewhere herein, a user (e.g., a customer service agent) selects a form for submission into the messaging session, which can then be submitted into the given messaging session. In the example depicted in FIG. 48, the agent submits a form with fields corresponding to the fields of messaging-enabled application dialogue 4830 into messaging session 4800, as a form that appears in agent messaging window 4810 as a form 4840. In so doing, a form is also communicated to the customer's computing system via server system 4820, and is thus displayed in customer messaging window 4815 as a form 4850.

Once in receipt of the form, the customer can enter the requested information into the appropriate input fields of form 4850. However, rather than being presented with the ability to simply submit the now-completed form into the messaging session, the customer is presented with one or more buttons that allow the customer to actually initiate the operations for which the information was requested. For example, as depicted in FIG. 48, the customer is presented with a search button 4855, which (once the requisite fields of form 4850 have been completed) allows the customer to initiate a search using the information thus entered. As will be appreciated in light of the present disclosure, search button 4855 is an example of the aforementioned execution-enabled element, the selection of which, in the example of FIG. 48, not only sends the completed form from the customer (i.e., customer messaging window 4815) to the agent (agent messaging window 4810), but also causes a search to be performed by the given application (in the example, the results of which appear in messaging-enabled application dialogue 4830). As will be further appreciated in light of the present disclosure, providing such functionality to the party requesting service (e.g., in this case, the customer) relieves the party providing the service (e.g., in this case, a customer service agent) of the task of initiating such operations.

Thus, in the manner noted with regard to the example depicted in FIG. 48, the customer's selection of search button 4855 not only results in the provision of the entered information to the customer service agent (e.g., depicted as the display of such information in agent messaging window 4810 as a form 4860 and in customer messaging window 4815 as a form 4865), but also results in not only the auto-population of input fields 4870a, 4870b, and 4870c of messaging-enabled application dialogue 4830, but also the operations involved in actually using the information thus provided in effecting the desired operations. In the process depicted in messaging session 4800, the customer's selection of search button 4855 also results in the identification of a solution and its description (depicted in FIG. 48 as a solution description 4880), but also in the provision of an alert 4890 within form 4860 in agent messaging window 4810. As can be seen, alert 4890 presents the customer service agent with a send button 4895 within alert 4890, which allows the customer service agent to send the solution this identified (solution description 4880) to the customer simply by selecting send button 4895. Moreover, such functionality can simply (though optionally) provide the agent with just an alert, and proceed with sending the requisite information (e.g., solution description 4880) to the customer, without any intervention by the agent. As will be appreciated in light of the present disclosure, the automation of such operations greatly simplifies the tasks that need to be accomplished by the customer service agent, and thereby also provide the customer with faster and more efficient service.

Examples of User Interface Features

As noted throughout the foregoing discussions, the use of SDOs, DFOs, and other such constructs according to embodiments of the present invention, allow for a number of useful and advantageous user interface features. Examples of such user interface features are now presented, along with discussions thereof.

Figure 49:
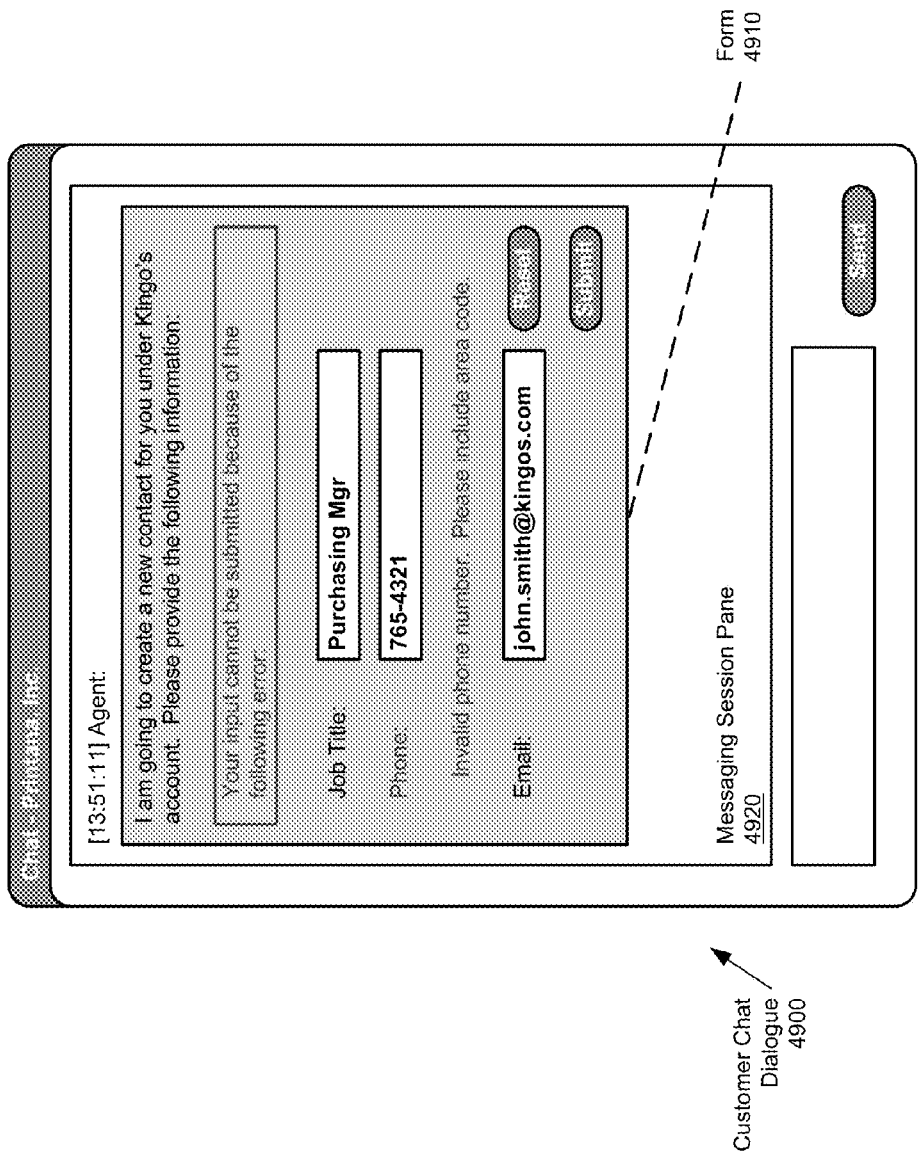
FIG. 49 is a block diagram illustrating an example of a customer dialogue presented by a messaging system according to embodiments of the present invention, in which an example of input validation is depicted.

FIG. 49 is a block diagram illustrating an example of a customer dialogue presented by a messaging system according to embodiments of the present invention, in which an example of input validation is depicted. FIG. 49 depicts an example of a customer chat dialogue (depicted in FIG. 49 as a customer chat dialogue 4900). Customer chat dialogue 4900 displays a form 4910, which is configured to perform input validation on the information entered by, in this case, the customer (or other user entering information into such a form). In the example depicted in FIG. 49, a customer service agent has submitted form 4910 into the messaging session, resulting in the display of form 4910 in a messaging session pane 4920 of customer chat dialogue 4900. In this example, the user (e.g., a customer) has entered certain information into form 4910, including the customer's job title, telephone number, and email address. However, as a result of the input validation operations performed by form 4910, and upon the customer's entry of information into the fields of form 4910, the object's (and/or) information and functionality associated therewith perform input validation on the information thus entered. In the example depicted in FIG. 49, the customer has entered an invalid phone number (by failing to provide an appropriate area code). The functionality provided in form 4910 has detected the error and provided an indication thereof. Such functionality can be effected upon entry of the information into the field in question by either moving focus away from that field or via an attempt to submit the information in form 4910.

Figure 50:
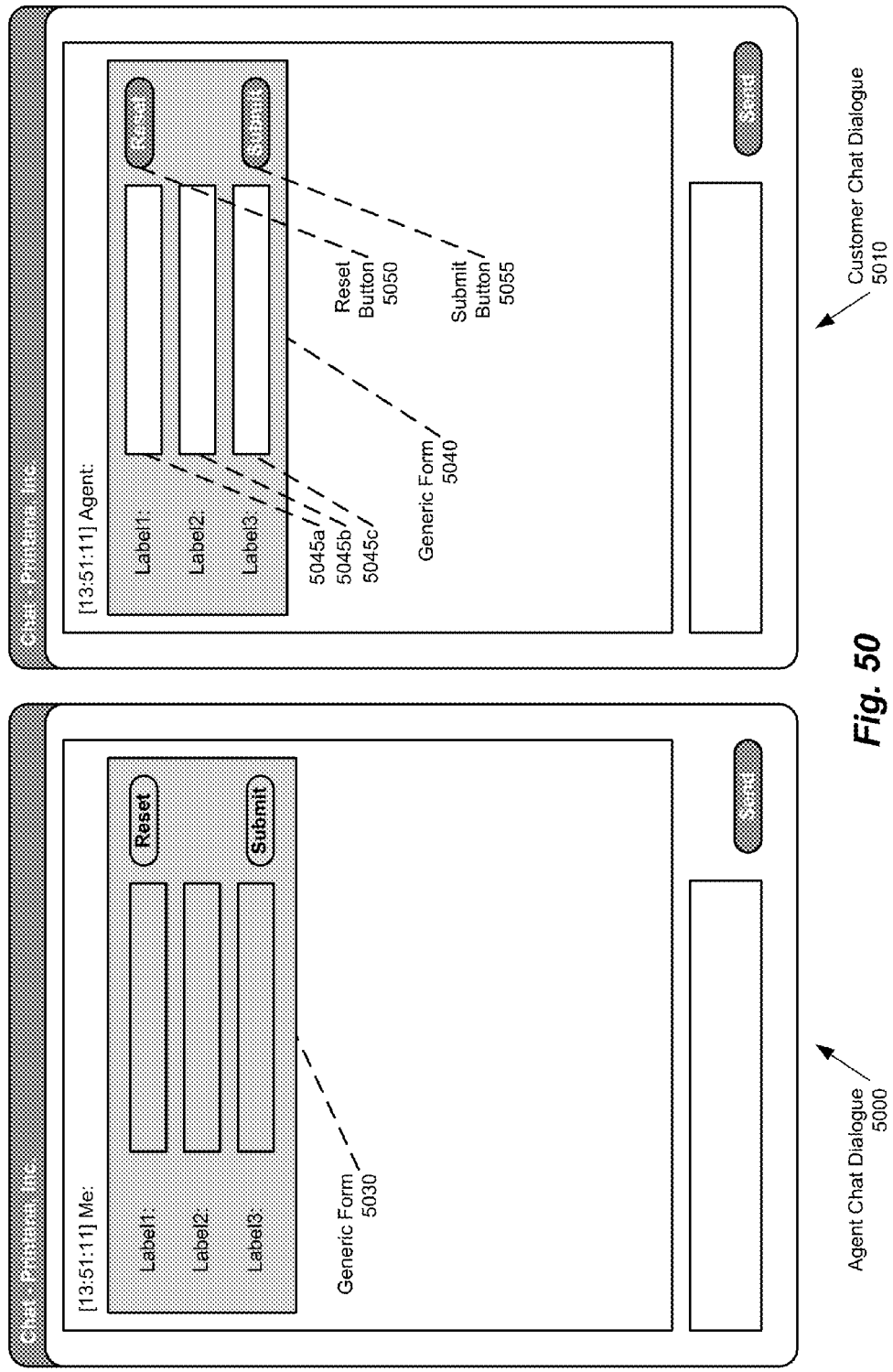
FIG. 50 is a block diagram illustrating an example of an agent dialogue and a customer dialogue presented by a messaging system according to embodiments of the present invention, in which the insertion of structured data into a web chat, by an agent, is depicted.

FIG. 50 is a block diagram illustrating an example of an agent dialogue and a customer dialogue presented by a messaging system according to embodiments of the present invention, in which the insertion of structured data into a web chat, by an agent, is depicted. FIG. 50 depicts an example of a messaging session from the perspective of a customer service agent (viewing an agent chat dialogue 5000) and a customer (viewing a customer chat dialogue 5010). In the scenario depicted in FIG. 50, the customer service agent has submitted a form into the messaging session (represented in FIG. 50 by a generic form 5030), which appears in customer chat dialogue 5010 as a generic form 5040. Generic form 5040, in addition to presenting the customer with input fields 5045a-5045c, allows the customer to reset the values in input fields 5045a-5045c via the selection of a reset button 5050. Once the customer is satisfied with the information they have provided in input fields 5045a-5045c, the customer can select a submit button 5055 in order to "reply" to the customer service agent by sending the requisite information to the customer service agent in the messaging session.

Figure 51:
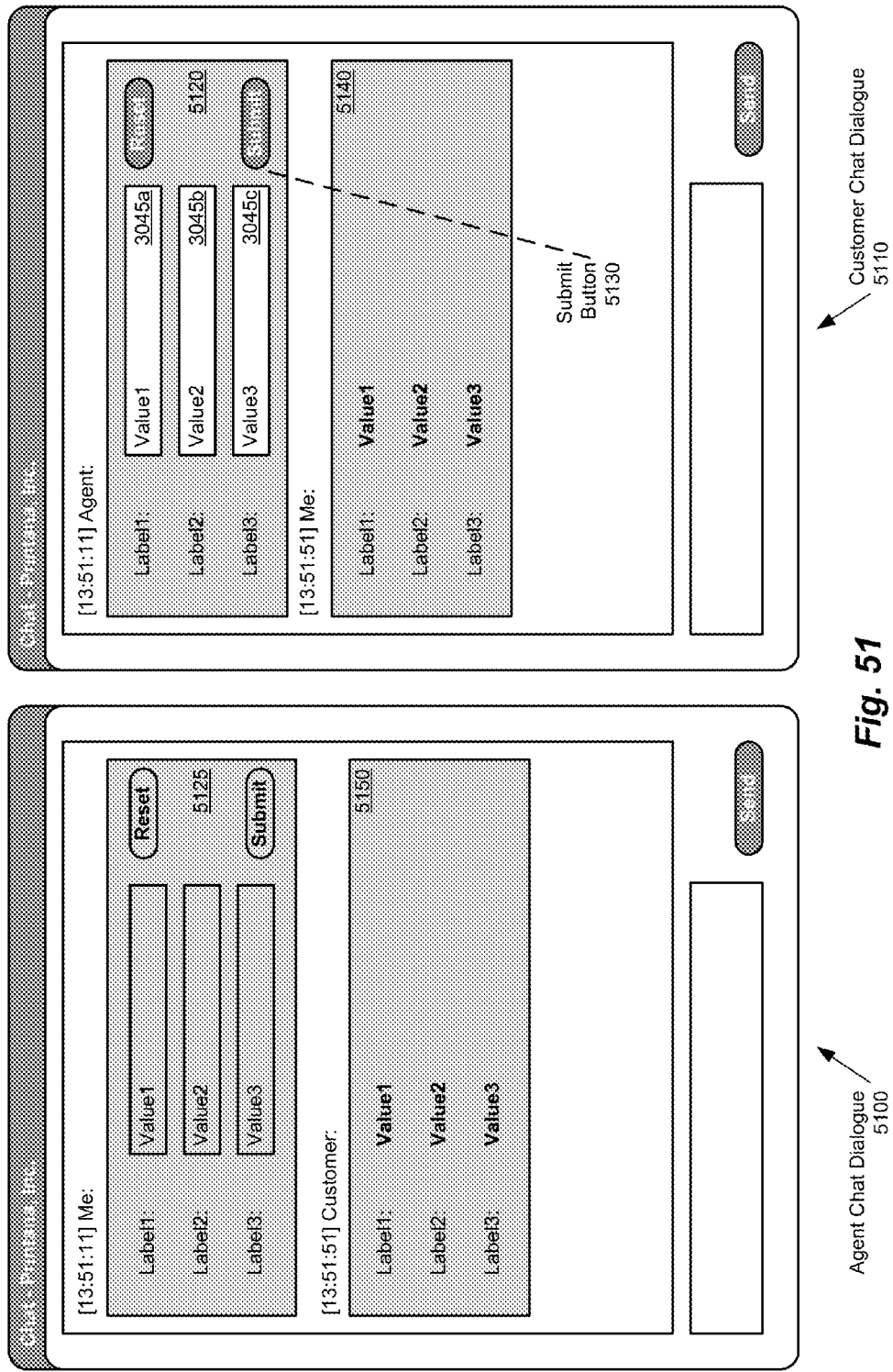
FIG. 51 is a block diagram illustrating an example of an agent dialogue and a customer dialogue presented by a messaging system according to embodiments of the present invention, in which a reply by a customer, via structured data, is depicted.

FIG. 51 is a block diagram illustrating an example of an agent dialogue and a customer dialogue presented by a messaging system according to embodiments of the present invention, in which a reply by a customer, via structured data, is depicted. Continuing the example of FIG. 50, the customer has submitted various values or other information to the customer service agent in response to having received generic form 5040. In FIG. 51, a customer service agent (viewing an agent chat dialogue 5100) and a customer (viewing a customer chat dialogue 5110) conduct communications in a messaging session therebetween. At the point in the message session depicted in FIG. 51, the customer has received a customer form 5120 (a now-completed version of generic form 5040 of FIG. 50), submitted by the agent into the messaging session (and which appears in agent chat dialogue 5100 as an agent form 5125). To this end, input fields 5115a-5115c are comparable to input fields 5045a-5045c of FIG. At the point in time depicted in FIG. 51, however, the customer has entered a value "Value1" into an input field 5115a, a value "Value2" into an input field 5115b, and a value "Value3" into an input field 5115c. In certain embodiments, the messaging system supporting agent chat dialogue 5100 and customer chat dialogue 5110 conveys these values from customer form 5120 to an agent form 5125, updating the information displayed in agent form 5125 as this information is being entered into input field 5115a-5115c of customer form 5120 by the customer. Once the customer is satisfied with the information entered into input fields 5115a-5115c, the customer selects a submit button 5130. The selection of submit button 5130 submits the completed form into the messaging session, and results in the display of the aforementioned information in a customer results form 5140 in customer chat dialogue 5110 and in an agent results form 5150 in agent chat dialogue 5100.

Figure 52:
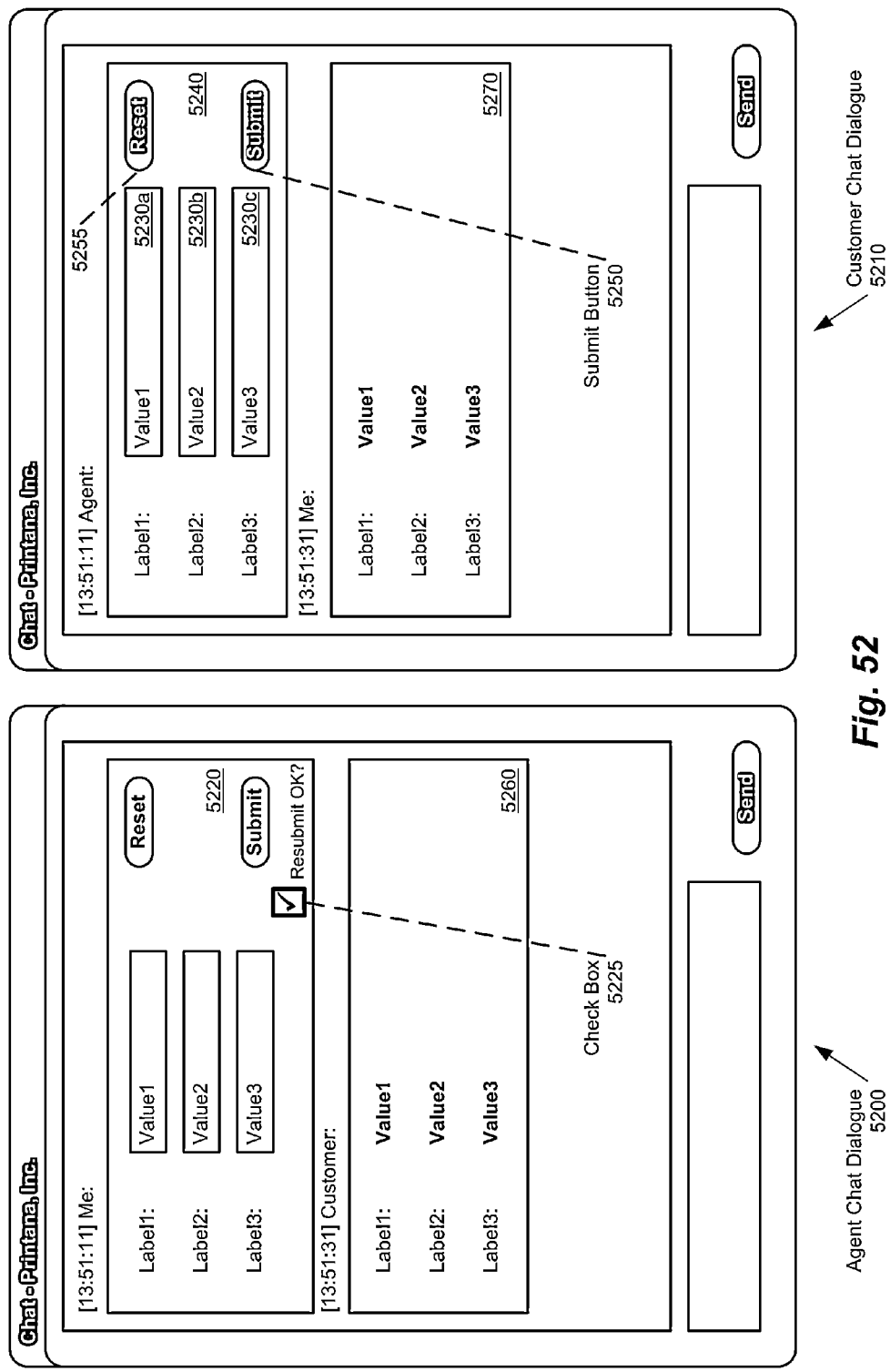
FIG. 52 is a block diagram illustrating an example of an agent dialogue and a customer dialogue presented by a messaging system according to embodiments of the present invention, in which the structured data inserted data into a web chat supports resubmission of the data entered thereby.

FIG. 52 is a block diagram illustrating an example of an agent dialogue and a customer dialogue presented by a messaging system according to embodiments of the present invention, in which the structured data inserted data into a web chat supports resubmission of the data entered thereby. As described in connection with FIG. 51, certain embodiments provides for a user's entry (and possible editing) of information in a given form. However, in certain embodiments, a user can be allowed to revise information in a given form, and resubmit that information via the form, after having already sent that information previously using that form. FIG. 51 depicts an example in which such resubmission is always allowed (indicated by input fields 5045a-5045c, reset button 5050, and submit button 5055 remaining enabled after submission of the requisite information), while the example depicted in FIG. 52 illustrates explicit control over this feature, in a comparable scenario.

In the example depicted in FIG. 52, a customer service agent (viewing an agent chat dialogue 5200) and a customer (viewing a customer chat dialogue 5210) communicate with one another in a messaging session. As can be seen, an agent form 5220 in agent chat dialogue 5200 includes a checkbox 5225, allowing the agent to indicate whether or not the re-submission of agent form 5220 from the customer (via customer chat dialogue 5210) is allowed. In this scenario, the user has entered the requested information into the various input fields (depicted in FIG. 52 as input fields 5230a, 5230b, and 5230c of a customer form 5240). At the point in time depicted in FIG. 52, however, the customer has entered a value "Value1" into an input field 5230a, a value "Value2" into an input field 5230b, and a value "Value3" into an input field 5230c. In the scenario depicted in FIG. 52, the customer replies to the agent by completing input fields 5230a-5230c of customer form 5240 and selecting a submit button 5250 (the fields of customer form 5240 can also be reset via the selection of a reset button 5255). This results in the requested information being returned to the messaging system, as well as the display of that information in a form 5260 in agent chat dialogue 5200 and form 5270 in customer chat dialogue 5210.

As will be appreciated in light of the present disclosure, the depiction of checkbox 5225 in FIG. 52 being "checked" (i.e., selected) allows a customer inputting information via customer chat dialogue 5210 to change information entered in one or more of input fields 5230*a*, 5230*b*, and 5230*c*, and re-submit the revised information into messaging session, as noted. In such case, input fields 5230*a*, 5230*b*, and 5230*c* of customer form 5240 are enabled (as depicted in FIG. 52). Alternatively, if checkbox 5225 is "unchecked" (i.e., not selected), the customer cannot enter new information in any of input fields 5230*a*, 5230*b*, and 5230*c*. In that case, input fields 5230*a*, 5230*b*, and 5230*c* would be disabled ("grayed out") upon the original information being submitted into the messaging session (and so, the customer would be prevented from entering any further information in these fields). Further, in such a case, the messaging system will typically also disable submit button 5250, as well as reset button 5255, upon submission of information via customer form 5240.

Figure 53:
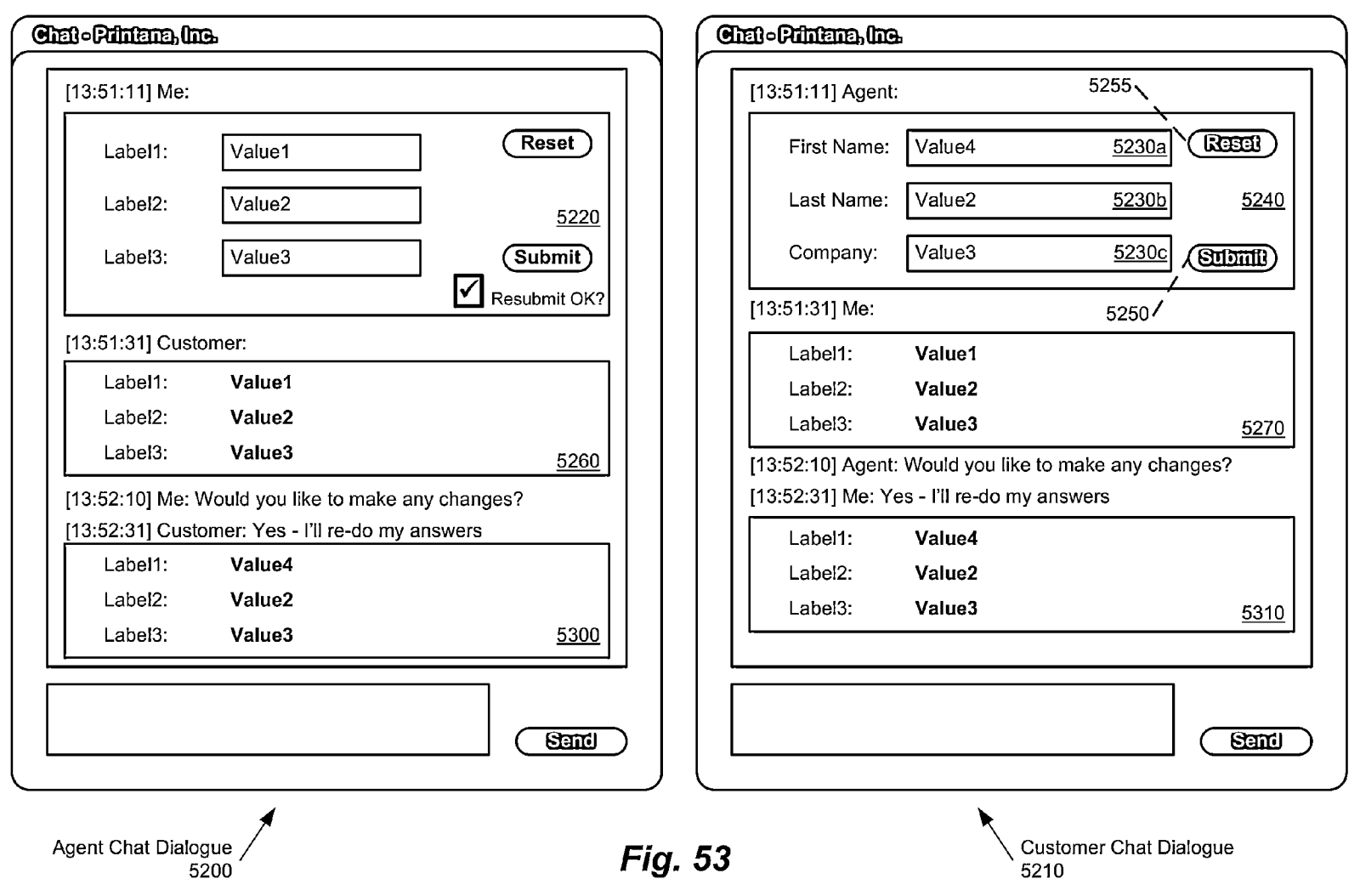

FIG. 53 is a block diagram illustrating an example of an agent dialogue and a customer dialogue presented by a messaging system according to embodiments of the present invention, in which an example of the submission/resubmission of data are depicted. FIG. 53 depicts the messaging session of FIG. 52 at a later point in the interactions between the agent and the customer. Having entered the requisite information into the corresponding input fields (in a manner comparable to that depicted in FIG. 51), the customer is queried as to whether they would like to make any changes to the information thus submitted. In the scenario depicted in FIG. 53, the customer does, in fact, wish to make such changes, and thus is prompted by the agent to do so. In a manner comparable to that of the submission and display of the original information entered by the customer (e.g., such as the scenario depicted in FIG. 51), the customer then makes changes to that information. The customer accomplishes this by modifying, re-entering, or performing other such modifications (e.g., resetting the entire form by selecting reset button 5255, as noted). In the example depicted in FIG. 53, the customer has revised the information entered in input field 5230*a*, from "Value1" to "Value4". After making such revisions, the customer is then able to (re-)submit the now-revised input information in the completed form (e.g., by selecting submit button 5250) into the messaging session. The revised information then appears in agent chat dialogue 5200 and in customer chat dialogue 5210. In the example depicted in FIG. 53, the revised information appears in agent chat dialogue 5200 as an agent form 5300, and in customer chat dialogue 5210 as a customer form 5310, both of which reflect the change from "Value1" (as reflected in forms 5260 and 5270) to "Value4" (as reflected in agent form 5300 and customer form 5310).

As the foregoing examples presented by FIGS. 51, 52, and 53 demonstrate, a messaging system according to embodiments of the present invention offer a variety of features and alternatives thereto, with respect to a number of aspect of such a messaging system, including, for example, control over input to the system by the messaging session's participants. For example, as observed elsewhere herein, a variety of interactions can be made available to the remote user (e.g., customer) when dealing with a form submitted to that user, after submission of the form. In one embodiment, elements of such a form (or an entire form) can have three different states:

1. Enabled (this is the basic case);
2. Disabled on the customer-side, with a checkbox on the agent side that allows for resubmission of the elements/entire form thus enabled; and
3. Disabled (submit only once).

The first case is the basic case, in which the customer is provided with the ability to resubmit information using the form. The second case (as depicted in the preceding figures) allows the agent to control whether or not the customer is able to resubmit the given form (though such control can also be made the purview of the messaging system). As will be appreciated from the present disclosure, this includes the ability not only to enable (or disable) resubmission presently, but also to do so subsequently. In the latter case, this means that the agent is able to allow the user to submit the form only once, but is then subsequently able to change the setting and so permit the user to resubmit information by way of the now-enabled form. Thus, for example, if the agent later determines that information that should not be changed during the messaging session was entered incorrectly (e.g., credit card information), the agent can allow the customer to re-enter/resubmit such information. An example of the last case would be login information (which would typically not change during a messaging session). Such one-time-only entries could be put under the control of the agent, or mandated by the messaging system's configuration.

Similarly, active monitoring can be provided not only to allow an agent to follow along with the customer as they enter information (e.g., in order to point out errors, work ahead, and so on; as discussed in connection with FIG. 5), but can actually provide the agent with the ability to enter/act on information as that information is entered by the customer. Thus, on the "agent side," a form according to embodiments of the present invention can, for example, provide functionality such as:

1. Disabled fields and disabled buttons;
2. Enabled fields, but the agent can only monitor the contents of the field; and
3. Enabled fields and the agent can actively set the value of one or more input fields.

The first case is the basic case, in which the agent is provided with the ability to submit the form, but cannot see any changes to the form made by the customer or interact with any of the form's functionality (e.g., reset and submit buttons). The second case allows the agent to view one or more of the fields of the given form, while leaving the functionality of the form that results in actual entries being made, disabled, as to the agent. An example of such a scenario's application is a case in which the agent is able to review all options (including hidden options) from a drop-down list, to ensure that the selections therein are understandable to the customer. The third case allows the agent to fully interact with one or more of the fields of the given form, and so make changes thereto. An example of the last case would be a form having some number of text fields to be completed by the customer, which the agent could also edit, thereby providing a limited joint form-filling feature (e.g., allowing the agent to fix typos made by the customer).

An example of a mechanism for allowing an agent to view information entered by a customer now follows. In one embodiments, as will be appreciated in light of the present disclosure, input text can change as the result of a number of actions, including keypresses, copy-and-paste operations, modification (e.g., by JavaScript), auto-completed entries, and the like. In such situations, such information can be obtained in a number of ways, including, for example, a JavaScript function that is called (with the current input value) any time that input value changes, which can be achieved, for example, by the following operations:

```
<input type=text id=input_id />
<script>
setInterval (function( ) { ObsInVal($('#inp_id').val( )); }, 100);
</script>
```

As will be further appreciated, the foregoing is merely an example, the functionality of which can be implemented in any number of ways, in light of the present disclosure.

Figure 54A:
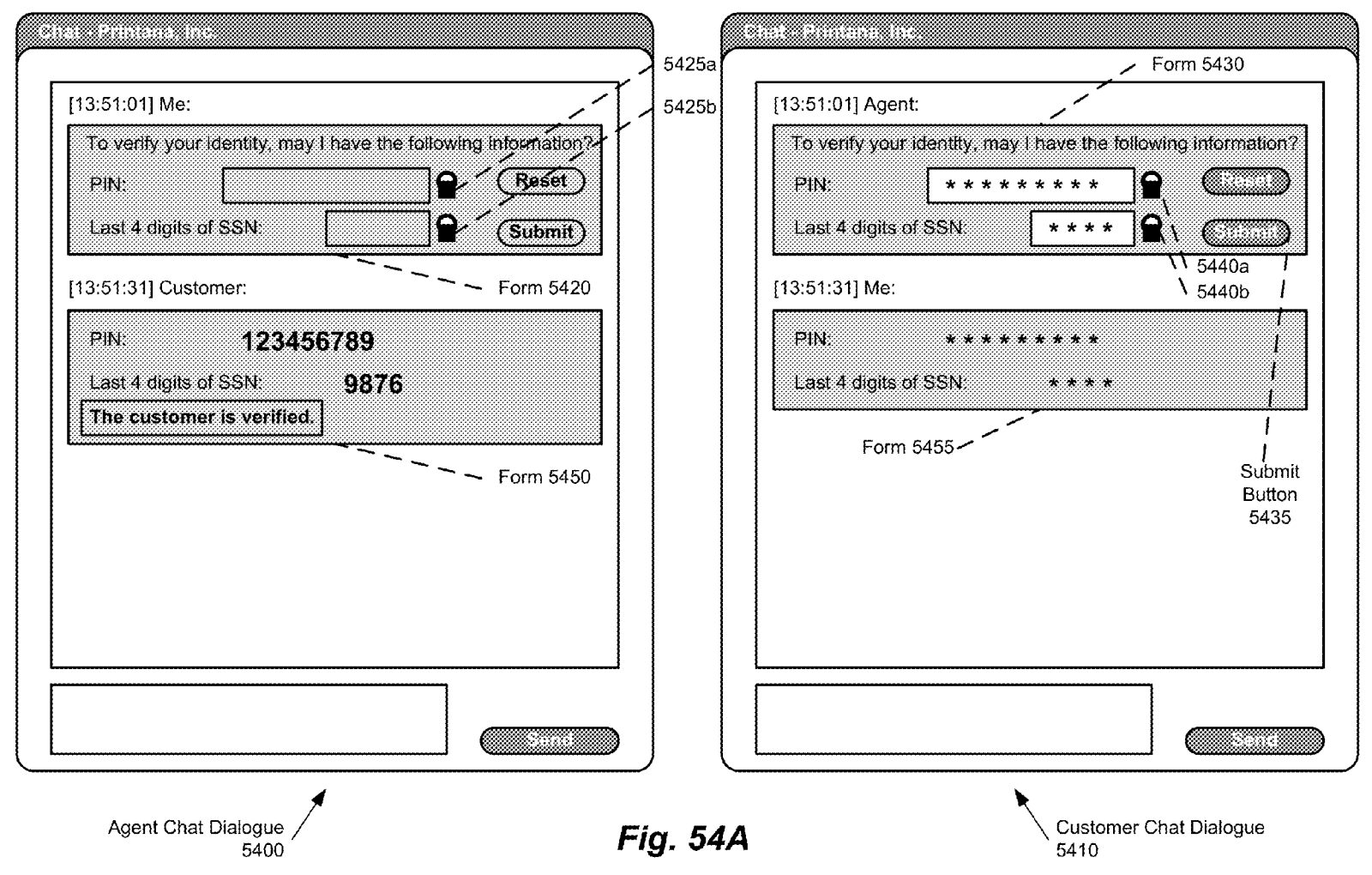

FIG. 54A is a block diagram illustrating an example of an agent dialogue and a customer dialogue presented by a messaging system according to embodiments of the present invention, in which the masking of input fields in the customer dialogue is depicted. FIG. 54A illustrates an example in which an agent chat dialogue 5400 and a customer chat dialogue 5410 are used to convey confidential information. In the example depicted in FIG. 54, the agent submits a form 5420, which solicits sensitive information from the customer. In this scenario, the information to be entered into the input fields of form 5420 is to be masked when displayed in customer chat dialogue 5410, as is indicated by lock icons 5425a and 5425b. Thus, when the customer enters the sensitive information (e.g., as depicted in FIG. 54, a PIN and a portion of the customer's SSN), the information thus entered is masked when displayed in customer chat dialogue 5410. Once the customer has completed entering the requested information in form 5430, the customer submits the now-completed form to the agent by selecting a submit button 5435. As in form 5420, the fields of form 5430 are indicated as being safe for the entry of sensitive information by way of lock icons 5440a and 5440b. Once the customer submits the now-completed form 5430, the information appears in agent chat dialogue 5400 as a form 5450, and in customer chat dialogue 5410 as a form 5455. In the example shown in FIG. 54, once the agent receives the information in form 5450, the information is presented in clear-text, but remains masked in form 5455. An indication is provided as a result, indicating (in this example) that the identity of the customer is verified.

Figure 54B:
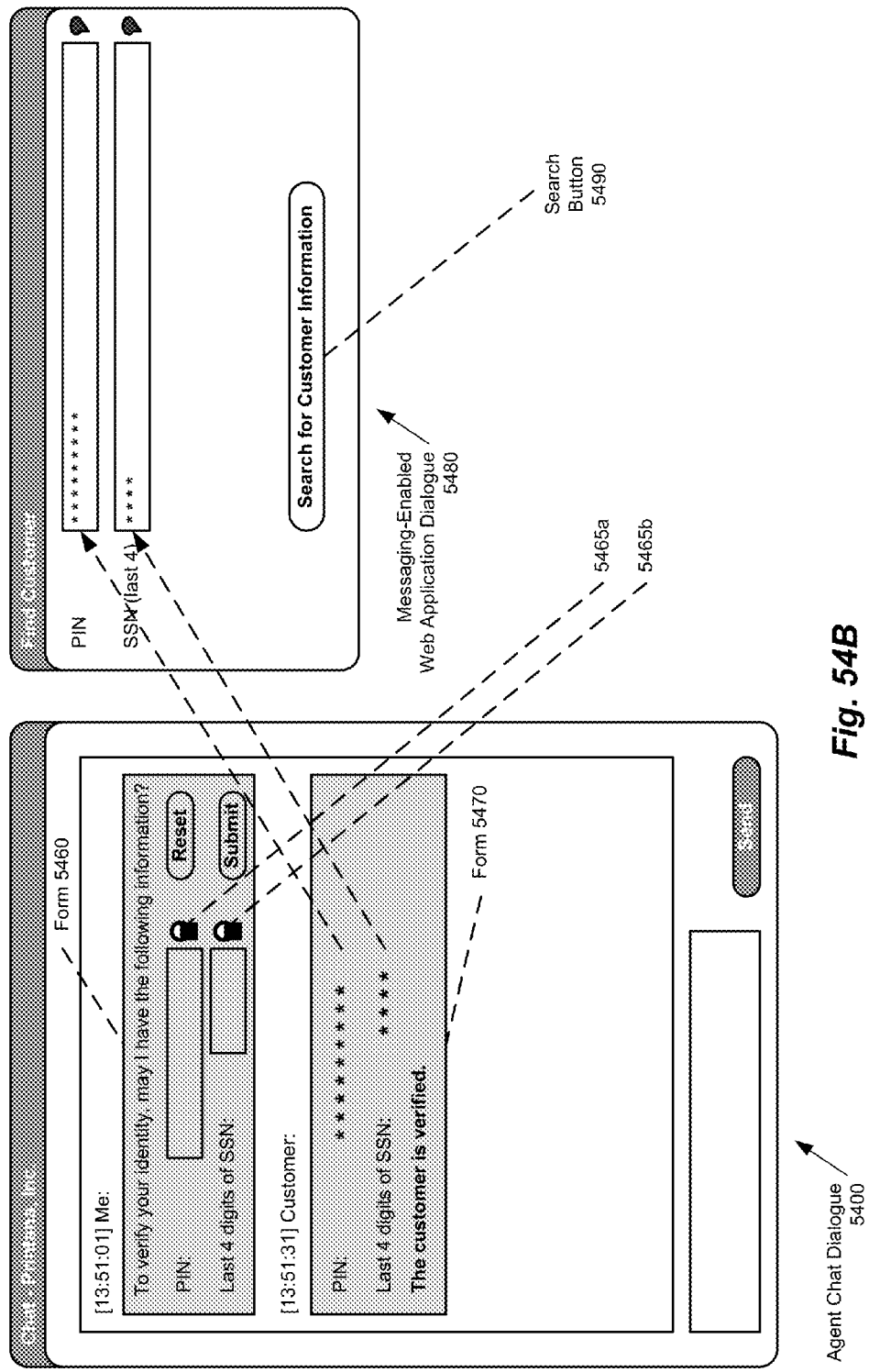
FIG. 54B is a block diagram illustrating an example of an agent dialogue presented by a messaging system and a user interface of a web application, according to embodiments of the present invention, in which the masking of input fields in a dynamic form in the agent dialogue and automatically-populated input fields of the web application's user interface is depicted.

FIG. 54B is a block diagram illustrating an example of an agent dialogue presented by a messaging system and a user interface of a web application, according to embodiments of the present invention, in which the masking of input fields in a dynamic form in the agent dialogue and automatically-populated input fields of the web application's user interface is depicted. FIG. 54B depicts an example in which agent chat dialogue 5400 reflects a messaging session in which a form (corresponding to a form 5460) has been pushed into the messaging session shown in agent chat dialogue 5400. As will be appreciated from the example depicted in FIG. 54B, the input fields of form 5460 are masked, as indicated by lock icons 5465a and 5465b. In response, the customer submits a form (depicted in FIG. 54A as a form 5470) containing the requested information (e.g., a PIN and portion of a SSN). In contrast to form 5450 of FIG. 54, form 5470 does not present the information contained in its input fields in clear-text, but instead masks this information. This can be done, for example, in order to maintain the confidentiality of sensitive information, even after the information is provided to the agent.

In the scenario depicted in FIG. 54, the messaging system auto-populates the input fields of a messaging-enabled web application dialogue 5480, which can also be configured to mask such information. Thus, such information is masked in agent chat dialogue 5400 and the forms presented therein, and is also masked when such information is used to auto-populate the input fields of a dialogue such as messaging-enable web application dialogue 5480. By employing such auto-population and masking functionality, the confidentiality of a customer's sensitive information can be maintained while still allowing a customer service agent or other such user to perform tasks associated with providing service to the customer. Once the input fields of messaging-enabled web application dialogue 5480 are auto-populated, the agent can simply select a search button 5490, in order to search for the desired customer information. Further, as noted elsewhere herein, the customer's confidential information can be encrypted upon entry into the form in question, and such encryption (and so security) maintained until the web application receives and processes the encrypted information. This provides a high level of security for users of such messaging systems.

Figure 55:
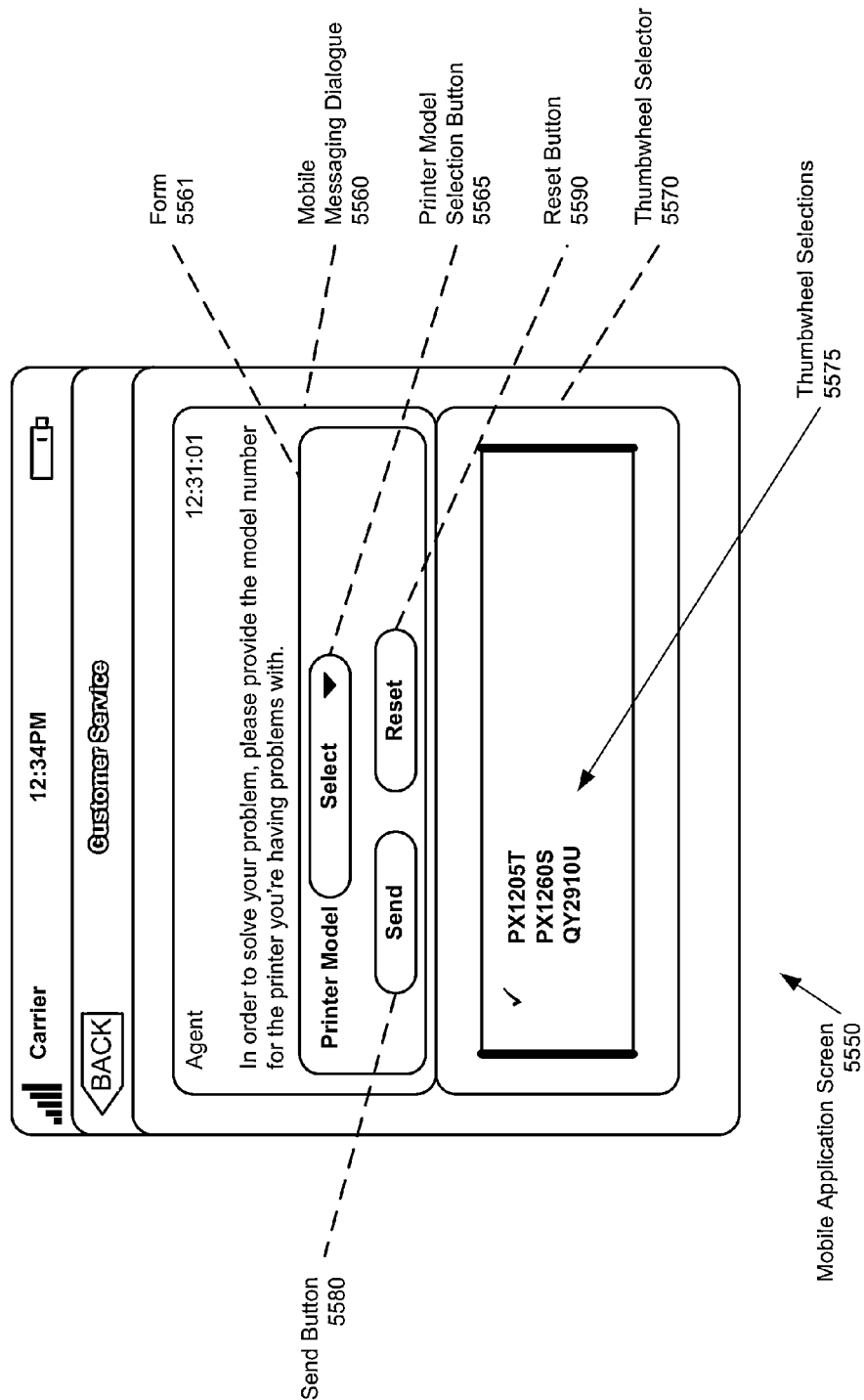
FIG. 55 is a block diagram illustrating an example of a customer dialogue presented by a messaging system accessed by a user interface of a mobile application, according to embodiments of the present invention.

FIG. 55 is a block diagram illustrating an example of a customer dialogue presented by a messaging system accessed by a user interface of a mobile application, according to embodiments of the present invention. The mobile application of FIG. 55 is designed to present a mobile application screen 5550 on a display of a mobile device used by a customer accessing a messaging system according to embodiments of the present invention. In the example depicted in FIG. 55, the user interface displayed in mobile application screen 5550 includes a mobile messaging dialogue 5560, in which messages that are part of the messaging system are displayed (e.g., the agent's query, as to the printer model, depicted in FIG. 55). Mobile messaging dialogue 5560 presents a form 5561, which includes a printer model selection button 5565, the selection of which results in the display of a thumbwheel selector 5570. By displaying thumbwheel selector 5570, the mobile application is able to allow the customer to more easily enter the requested information by simply "rolling" thumbwheel selector 5570 to the desired one of a number of thumbwheel selections (depicted in FIG. 55 as thumbwheel selections 5575). Once the customer reaches the desired one of thumbwheel selections 5575, the user selects the desired thumbwheel selection (e.g., indicated by a check mark next to the entry entitled "PX1205T" in FIG. 55). The user is then able to send this information to the agent by selecting a send button 5580. Alternatively, the customer can select a reset button 5590, should the customer decide to re-start the entry process.

As noted, in an implementation such as that depicted in FIG. 55, customers employing mobile devices are able view other message communications (e.g., textual portions of a messaging session, such as mobile messaging dialogue 5560), while still being able to interact with a form that an agent has submitted into a messaging session (e.g., thumbwheel selections 5575 presented as the result of the display and selection of printer model selection button 5565). As also noted, such interactions are made possible by the "in-band" nature of the messaging system's communications and user interface.

An Example Computing and Network Environment

As shown above, the present invention can be implemented using a variety of computer systems and networks. An example of one such computing and network environment is described below with reference to FIGS. 56 and 57.

Figure 56:
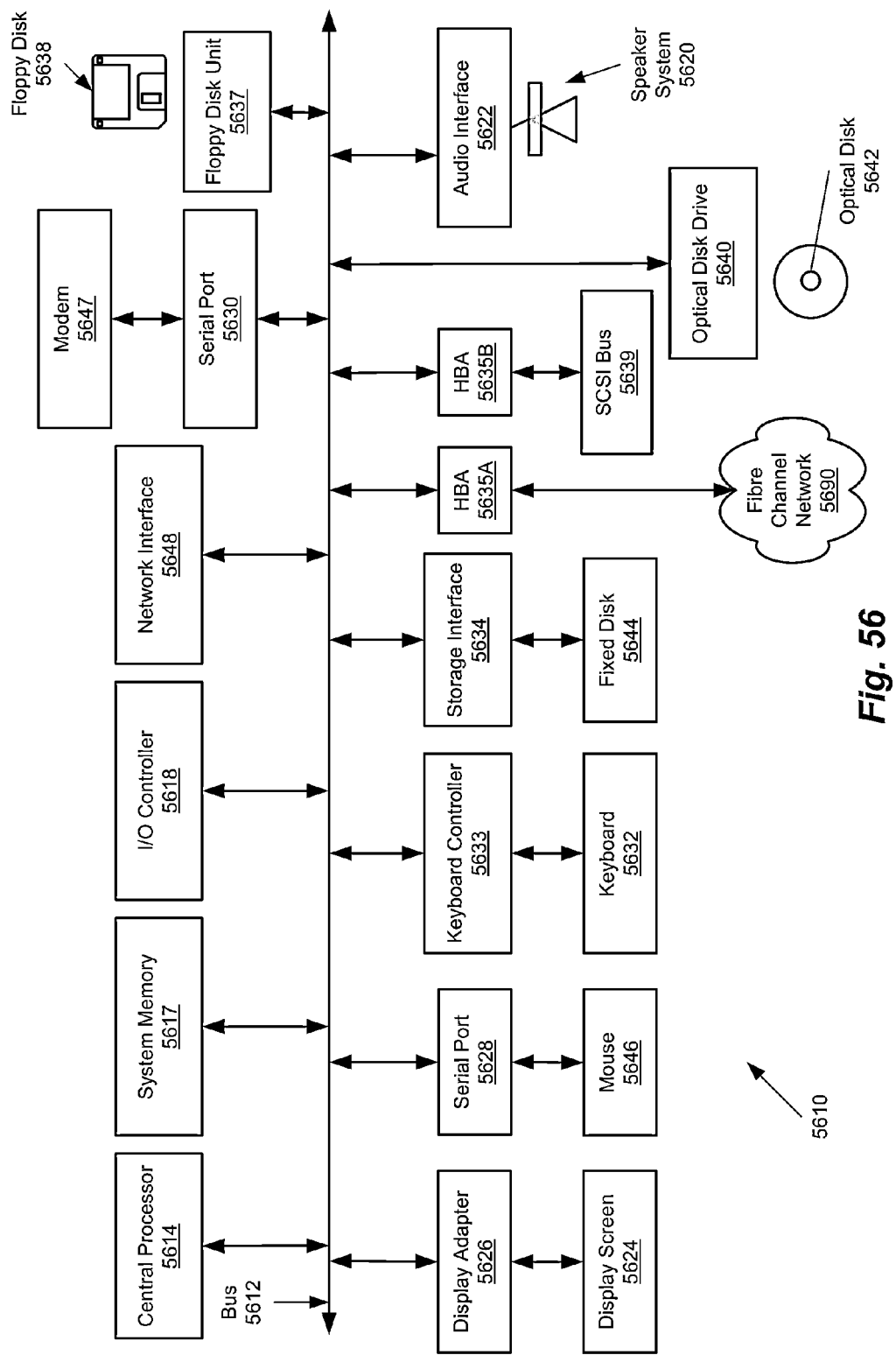
FIG. 56 is a block diagram depicting a computer system suitable for implementing aspects of the present invention.

FIG. 56 depicts a block diagram of a computer system 5610 suitable for implementing aspects of the present invention (e.g., web servers 930(1)-(N), clients 925(1)-(N) and the like). Computer system 5610 includes a bus 5612 which interconnects major subsystems of computer system 5610, such as a central processor 5614, a system memory 5617 (typically RAM, but which may also include ROM, flash RAM, or the like), an input/output controller 5618, an external audio device, such as a speaker system 5620 via an audio output interface 5622, an external device, such as a display screen 5624 via display adapter 5626, serial ports 5628 and 5630, a keyboard 5632 (interfaced with a keyboard controller 5633), a storage interface 5634, a floppy disk drive 5637 operative to receive a floppy disk 5638, a host bus adapter (HBA) interface card 5635A operative to connect with a Fibre Channel network 5690, a host bus adapter (HBA) interface card 5635B operative to connect to a SCSI bus 5639, and an optical disk drive 5640 operative to receive an optical disk 5642. Also included are a mouse 5646 (or other point-and-click device, coupled to bus 5612 via serial port 5628), a modem 5647 (coupled to bus 5612 via serial port 5630), and a network interface 5648 (coupled directly to bus 5612).

Bus 5612 allows data communication between central processor 5614 and system memory 5617, which may include read-only memory (ROM) or flash memory (neither shown), and random access memory (RAM) (not shown), as previously noted. The RAM is generally the main memory into which the operating system and application programs are loaded. The ROM or flash memory can contain, among other code, the Basic Input-Output system (BIOS) which controls basic hardware operation such as the interaction with peripheral components. Applications resident with computer system 5610 are generally stored on and accessed via a computer-readable medium, such as a hard disk drive (e.g., fixed disk 5644), an optical drive (e.g., optical drive 5640), a floppy disk unit 5637, or other storage medium.

Storage interface 5634, as with the other storage interfaces of computer system 5610, can connect to a standard computer-readable medium for storage and/or retrieval of information, such as a fixed disk drive 5644. Fixed disk drive 5644 may be a part of computer system 5610 or may be separate and accessed through other interface systems. Modem 5647 may provide a direct connection to a remote server via a telephone link or to the Internet via an internet service provider (ISP). Network interface 5648 may provide a direct connection to a remote server via a direct network link to the Internet via a POP (point of presence). Network interface 5648 may provide such connection using wireless techniques, including digital cellular telephone connection, Cellular Digital Packet Data (CDPD) connection, digital satellite data connection or the like.

Many other devices or subsystems (not shown) may be connected in a similar manner (e.g., document scanners, digital cameras and so on). Conversely, all of the devices shown in FIG. 56 need not be present to practice the present invention. The devices and subsystems can be interconnected in different ways from that shown in FIG. 56. The operation of a computer system such as that shown in FIG. 56 is readily known in the art and is not discussed in detail in this application. Code to implement the present invention can be stored in computer-readable storage media such as one or more of system memory 5617, fixed disk 5644, optical disk 5642, or floppy disk 5638. The operating system provided on computer system 5610 may be MS-DOS®, MS-WINDOWS®, UNIX®, Linux®, or another such operating system.

Moreover, regarding the signals described herein, those skilled in the art will recognize that a signal can be directly transmitted from a first block to a second block, or a signal can be modified (e.g., amplified, attenuated, delayed, latched, buffered, inverted, filtered, or otherwise modified) between the blocks. Although the signals of the above described embodiment are characterized as transmitted from one block to the next, other embodiments of the present invention may include modified signals in place of such directly transmitted signals as long as the informational and/or functional aspect of the signal is transmitted between blocks. To some extent, a signal input at a second block can be conceptualized as a second signal derived from a first signal output from a first block due to physical limitations of the circuitry involved (e.g., there will inevitably be some attenuation and delay). Therefore, as used herein, a second signal derived from a first signal includes the first signal or any modifications to the first signal, whether due to circuit limitations or due to passage through other circuit elements which do not change the informational and/or final functional aspect of the first signal.

Figure 57:
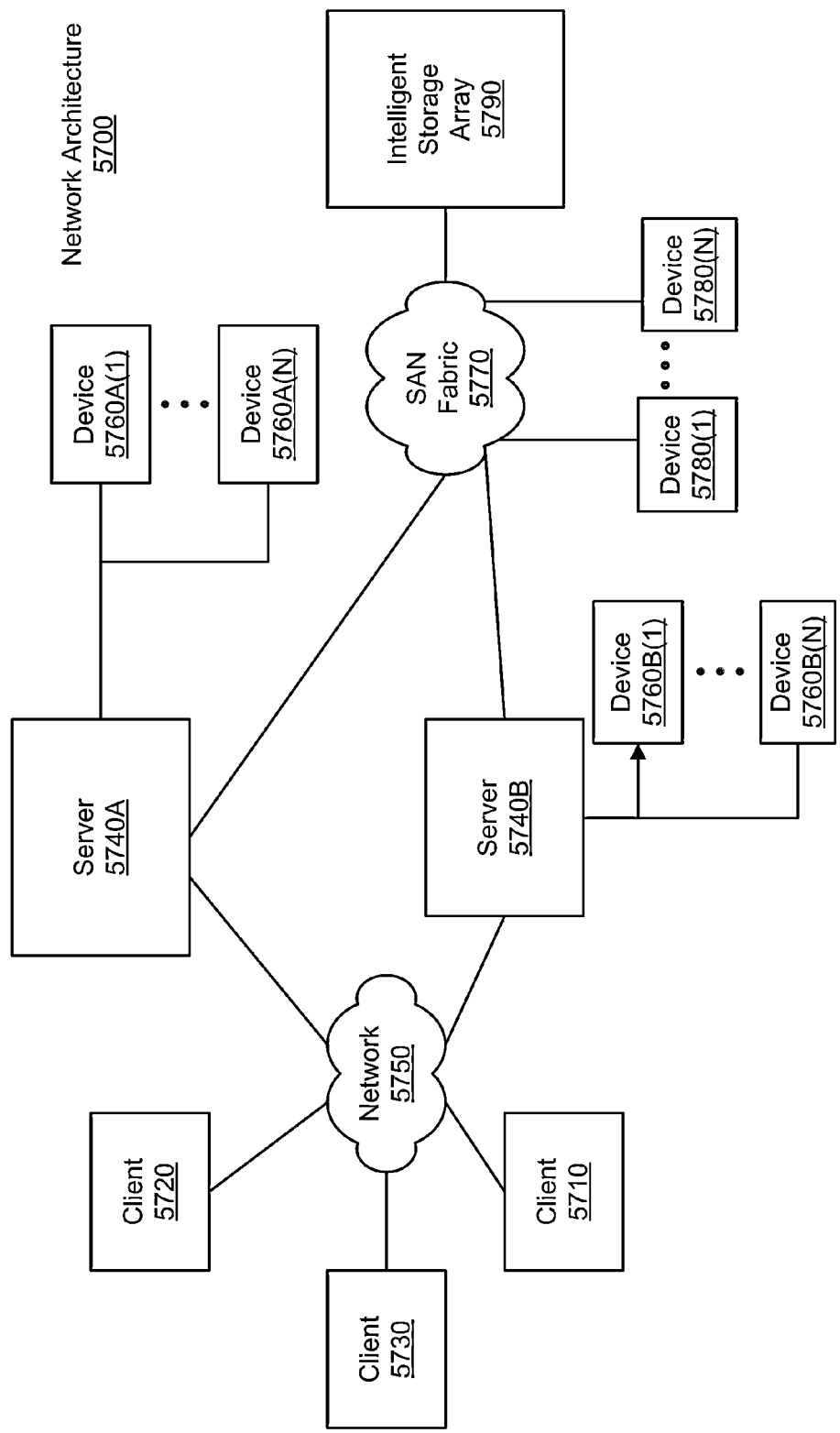
FIG. 57 is a block diagram depicting a network architecture suitable for implementing aspects of the present invention.

FIG. 57 is a block diagram depicting a network architecture 5700 in which client systems 5710, 5720 and 5730, as well as storage servers 5740A and 5740B (any of which can be implemented using computer system 5710), are coupled to a network 5750. Storage server 5740A is further depicted as having storage devices 5760A(1)-(N) directly attached, and storage server 5740B is depicted with storage devices 5760B(1)-(N) directly attached. Storage servers 5740A and 5740B are also connected to a SAN fabric 5770, although connection to a storage area network is not required for operation of the invention. SAN fabric 5770 supports access to storage devices 5780(1)-(N) by storage servers 5740A and 5740B, and so by client systems 5710, 5720 and 5730 via network 5750. Intelligent storage array 5790 is also shown as an example of a specific storage device accessible via SAN fabric 5770.

With reference to computer system 5610, modem 5647, network interface 5648 or some other method can be used to provide connectivity from each of client computer systems 5710, 5720 and 5730 to network 5750. Client systems 5710, 5720 and 5730 are able to access information on storage server 5740A or 5740B using, for example, a web browser or other client software (not shown). Such a client allows client systems 5710, 5720 and 5730 to access data hosted by storage server 5740A or 5740B or one of storage devices 5760A(1)-(N), 5760B(1)-(N), 5780(1)-(N) or intelligent storage array 5790. FIG. 57 depicts the use of a network such as the Internet for exchanging data, but the present invention is not limited to the Internet or any particular network-based environment.

OTHER EMBODIMENTS

The present invention is well adapted to attain the advantages mentioned as well as others inherent therein. While the present invention has been depicted, described, and is defined by reference to particular embodiments of the invention, such references do not imply a limitation on the invention, and no such limitation is to be inferred. The invention is capable of considerable modification, alteration, and equivalents in form and function, as will occur to those ordinarily skilled in the pertinent arts. The depicted and described embodiments are examples only, and are not exhaustive of the scope of the invention.

The foregoing describes embodiments including components contained within other components (e.g., the various elements shown as components of computer system 5610). Such architectures are merely examples, and, in fact, many other architectures can be implemented which achieve the same functionality. In an abstract but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermediate components. Likewise, any two components so associated can also be viewed as being "operably connected," or "operably coupled," to each other to achieve the desired functionality.

The foregoing detailed description has set forth various embodiments of the present invention via the use of block diagrams, flowcharts, and examples. It will be understood by those within the art that each block diagram component, flowchart step, operation and/or component illustrated by the use of examples can be implemented (individually and/or collectively) by a wide range of hardware, software, firmware, or any combination thereof.

The present invention has been described in the context of fully functional computer systems; however, those skilled in the art will appreciate that the present invention is capable of being distributed as a program product in a variety of forms, and that the present invention applies equally regardless of the particular type of computer-readable media used to actually carry out the distribution. Examples of computer-readable media include computer-readable storage media, as well as media storage and distribution systems developed in the future.

The above-discussed embodiments can be implemented by software modules that perform one or more tasks associated with the embodiments. The software modules discussed herein may include script, batch, or other executable files. The software modules may be stored on a machine-readable or computer-readable storage media such as magnetic floppy disks, hard disks, semiconductor memory (e.g., RAM, ROM, and flash-type media), optical discs (e.g., CD-ROMs, CD-Rs, and DVDs), or other types of memory modules. A storage device used for storing firmware or hardware modules in accordance with an embodiment of the invention can also include a semiconductor-based memory, which may be permanently, removably or remotely coupled to a microprocessor/memory system. Thus, the modules can be stored within a computer system memory to configure the computer system to perform the functions of the module. Other new and various types of computer-readable storage media may be used to store the modules discussed herein.

The above description is intended to be illustrative of the invention and should not be taken to be limiting. Other embodiments within the scope of the present invention are possible. Those skilled in the art will readily implement the steps necessary to provide the structures and the methods disclosed herein, and will understand that the process parameters and sequence of steps are given by way of example only and can be varied to achieve the desired structure as well as modifications that are within the scope of the invention. Variations and modifications of the embodiments disclosed herein can be made based on the description set forth herein, without departing from the scope of the invention. Consequently, the invention is intended to be limited only by the scope of the appended claims, giving full cognizance to equivalents in all respects.

Although the invention has been described in connection with several embodiments, the invention is not intended to be limited to the specific forms set forth herein. On the contrary, it is intended to cover such alternatives, modifications, and equivalents as can be reasonably included within the scope of the invention as defined by the appended claims.

What is claimed is:

1. A method comprising:

receiving, from a first computer system, a message comprising a completed execution-enabled object, wherein the completed execution-enabled object comprises
 a first completed response element comprising form information received in a form entry field displayed by the first computer system within a first-system dialogue of a messaging session, the form entry field comprising a plurality of form entry selection options for selection by a user, and
 a second completed response element indicating selection of an execution-enabled element displayed by the first computer system within the first-system dialogue of the messaging session,
the form entry field and the execution-enabled element correspond to a respective form entry field and execution-enabled element that an application program is configured to display during execution by a second computer system, and
the completed execution-enabled object is configured such that the application program, in response to selection of the execution-enabled element, performs an operation using the form information;
in response to the receiving the completed execution-enabled object, communicating, to the application program, the form information and an indication of the selection of the execution-enabled element; and
receiving, from the application program, a status update regarding the operation.

2. The method of claim 1, further comprising:
sending the form information to the second computer system for display within a second-system dialogue of the messaging session.

3. The method of claim 1, further comprising:
sending information regarding the status update to the second computer system for display within a second-system dialogue of the messaging session.

4. The method of claim 3, further comprising:
sending a description of a result of the operation to the second computer system for display in a user interface of the application program.

5. The method of claim 4 wherein
the information regarding the status update comprises a send element configured to, when selected, cause the description of a result of the operation to be sent to the first computer for display within the first-system dialogue of the messaging session.

6. The method of claim 5, wherein
the operation the application program performs in response to selection of the execution-enabled element comprises a search operation based on the form information,
the receiving a status update regarding the operation comprises receiving a status update on the search operation, and
the send element is configured to, when selected, cause one or more search results to the first computer for display within the first system dialogue of the messaging session.

7. The method of claim 1, wherein
the completed execution-enabled object is configured such that
 the operation is performed automatically in response to the communicating the form information to the application program.

8. The method of claim 1, wherein the completed execution-enabled object further comprises:
a first request element comprising information relating to display of the form entry field in the first-system dialogue of the messaging session, and
a second request element comprising information relating to display of the execution-enabled element in the first system dialogue of the messaging session.

9. The method of claim 1, wherein
the form entry field and execution-enabled element are represented within a predetermined form accessible by the application program.

10. The method of claim 9, wherein the completed execution-enabled object further comprises:
additional response objects corresponding to respective additional form entry fields or execution-enabled elements represented within the predetermined form.

11. The method of claim 1, wherein
the form entry field and execution-enabled element represent a respective form-entry field and execution-enabled element dynamically selected using a user interface of the application program.

12. The method of claim 1, further comprising:
receiving, from the application program,
identification of the form entry field and execution-enabled element that the application program is configured to display during execution by the second computer system, and
form entry field information and execution-enabled element information associated with the identified form entry field and execution-enabled element;
assembling an initialized execution-enabled object using the form entry field information and execution-enabled element information, wherein
the initialized execution-enabled object comprises
a first initialized response element configured to receive the form information,
a second initialized response element configured to receive information indicating selection of the execution-enabled element,
a first request element comprising information relating to display of the form entry field in the first-system dialogue of the messaging session, and
a second request element comprising information relating to display of the execution-enabled element in the first system dialogue of the messaging session;
sending a message comprising the initialized execution-enabled object to the first computer system for display within the first-system dialogue of the messaging session; and
sending a message comprising the initialized execution-enabled object to the second computer system for display within a second-system dialogue of the messaging session.

13. The method of claim 1, wherein
the messaging session represents at least one request and corresponding response exchanged between the first computer system and the second computer system.

14. The method of claim 13, wherein
the first computer system is configured for use by a customer; and
the second computer system is configured for use by a customer service agent.

15. The method of claim 1, wherein
the operation the application program performs in response to selection of the execution-enabled element comprises a search operation based on the form information, and
the receiving a status update regarding the operation comprises receiving a status update on the search operation.

16. A non-transitory computer-readable storage medium including a plurality of instructions, comprising:
a first set of instructions, executable on a server computer system, configured to receive, from a first computer system, a message comprising a completed execution-enabled object, wherein
the completed execution-enabled object comprises
a first completed response element comprising form information received in a form entry field displayed by the first computer system within a first-system dialogue of a messaging session, the form entry field comprising a plurality of form entry selection options for selection by a user, and
a second completed response element indicating selection of an execution-enabled element displayed by the first computer system within the first-system dialogue of the messaging session,
the form entry field and the execution-enabled element correspond to a respective form entry field and execution-enabled element that an application program is configured to display during execution by a second computer system, and
the completed execution-enabled object is configured such that the application program, in response to selection of the execution-enabled element, performs an operation using the form information,
a second set of instructions, executable on the server computer system, configured to, in response to receiving the completed execution-enabled object, communicate, to the application program, the form information and an indication of the selection of the execution-enabled element, and
a third set of instructions, executable on the server computer system, configured to receive, from the application program, a status update regarding the operation.

17. The non-transitory computer-readable storage medium of claim 16, wherein the instructions further comprise:
a fourth set of instructions, executable on the server computer system, configured to send the form information to the second computer system for display within a second-system dialogue of the messaging session.

18. The non-transitory computer-readable storage medium of claim 16, wherein the instructions further comprise:
a fifth set of instructions, executable on the server computer system, configured to send information regarding the status update to the second computer system for display within a second-system dialogue of the messaging session, and
a sixth set of instructions, executable on the server computer system, configured to send a description of a result of the operation to the second computer system for display in a user interface of the application program.

19. The non-transitory computer-readable storage medium of claim 18, wherein the information regarding the status update comprises a send element configured to, when selected, cause the description of a result of the operation to be sent to the first computer for display within the first-system dialogue of the messaging session, and the completed execution-enabled object is configured such that the operation is performed automatically in response to the communicating the form information to the application program.

20. A computer system comprising:

a processor;

a computer-readable medium coupled to the processor; and a plurality of instructions, encoded in the computer-readable medium, configured to cause the processor to receive, from a first computer system, a message comprising a completed execution-enabled object, wherein the completed execution-enabled object comprises a first completed response element comprising form information received in a form entry field displayed by the first computer system within a first-system dialogue of a messaging session, the form entry field comprising a plurality of form entry selection options for selection by a user, and a second completed response element indicating selection of an execution-enabled element displayed by the first computer system within the first-system dialogue of the messaging session, the form entry field and the execution-enabled element correspond to a respective form entry field and execution-enabled element that an application program is configured to display during execution by a second computer system, and the completed execution-enabled object is configured such that the application program, in response to selection of the execution-enabled element, performs an operation using the form information, in response to receiving the completed execution-enabled object, communicate, to the application program, the form information and an indication of the selection of the execution-enabled element, and receive, from the application program, a status update regarding the operation.

\* \* \* \* \*